US012767051B2

(12) United States Patent
O'Keeffe

(10) Patent No.: US 12,767,051 B2
(45) **Date of Patent: *Oct. 20, 2026**

(54) SELF-DRIVING TRUCK WITH MIRRORS TO EXTEND A FIELD OF VIEW

(71) Applicant: James Thomas O'Keeffe, Mountain View, CA (US)

(72) Inventor: James Thomas O'Keeffe, Mountain View, CA (US)

( * ) Notice: Subject to any disclaimer, the term of this patent is extended or adjusted under 35 U.S.C. 154(b) by 1077 days.

This patent is subject to a terminal disclaimer.

(21) Appl. No.: 17/720,303

(22) Filed: Apr. 14, 2022

(65) Prior Publication Data

US 2022/0242319 A1 Aug. 4, 2022

Related U.S. Application Data

(63) Continuation-in-part of application No. 16/792,135, filed on Feb. 14, 2020, now Pat. No. 11,340,338, (Continued)

(51) Int. Cl.
*B60R 1/28* (2022.01)
*B60R 11/04* (2006.01)

(52) U.S. Cl.
CPC ................ *B60R 1/28* (2022.01); *B60R 11/04* (2013.01); *B60R 2300/301* (2013.01); *B60R 2300/802* (2013.01); *B60R 2300/8093* (2013.01)

(58) Field of Classification Search
CPC ... B60R 1/28; B60R 11/04; B60R 2300/8093; B60R 2300/802; B60R 2300/301
(Continued)

(56) References Cited

U.S. PATENT DOCUMENTS 3,927,402 A 12/1975 Thompson
4,464,115 A 8/1984 Simpson et al.
(Continued)

FOREIGN PATENT DOCUMENTS

JP 62-121855 U 8/1987
JP 2002-323565 A 11/2002
WO WO2016/011557 A1 1/2016

OTHER PUBLICATIONS

Beger et al.; Data fusion of extremely high resolution aerial imagery and LiDAR data for automated railroad centre line reconstruction; ISPRS Journal of Photogrammetry and Rem.
(Continued)

*Primary Examiner* — Isam A Alsomiri

(57) ABSTRACT

An autonomous truck may have several blind spots. These blind spots can be regions outside the direct field of view (FOV) of on-board sensors e.g. Cameras, LIDARs or RADARs. A remote mirror can be attached to the tractor or trailer of the truck and augment the direct FOV of sensors by illuminating a blind spot with emitted light AND/OR providing light reflections from a blind spot. However, remote mirrors are prone to move as a truck moves (e.g. as a truck articulates while turning). Within embodiments, a computer can process sensor data to identify a current location of the remote mirror in the FOV of a sensor and thereby identify a portion of the sensor data as being deflected by the remote mirror. In other embodiments the remote mirror is repositioned as the vehicle moves to perform a specific task, for example parking or reversing.

20 Claims, 72 Drawing Sheets

Related U.S. Application Data which is a continuation-in-part of application No. 15/851,686, filed on Dec. 21, 2017, now Pat. No. 10,564,266, which is a continuation of application No. PCT/US2017/053343, filed on Sep. 25, 2017, application No. 17/720,303, filed on Apr. 14, 2022 is a continuation-in-part of application No. 17/492,513, filed on Oct. 1, 2021, now Pat. No. 12,650,513, which is a continuation-in-part of application No. 15/858,174, filed on Dec. 29, 2017, now Pat. No. 11,137,481, which is a continuation-in-part of application No. PCT/US2017/032585, filed on May 15, 2017, said application No. 16/792,135 is a continuation-in-part of application No. 15/815,695, filed on Nov. 16, 2017, now Pat. No. 10,591,599, which is a continuation-in-part of application No. PCT/US2017/046385, filed on Aug. 10, 2017.

(60) Provisional application No. 62/372,934, filed on Aug. 10, 2016, provisional application No. 62/337,867, filed on May 18, 2016, provisional application No. 62/350,670, filed on Jun. 15, 2016, provisional application No. 62/441,492, filed on Jan. 2, 2017, provisional application No. 62/441,563, filed on Jan. 3, 2017, provisional application No. 62/399,466, filed on Sep. 25, 2016, provisional application No. 62/441,627, filed on Jan. 3, 2017.

(58) Field of Classification Search
USPC ........................................................ 356/4.01
See application file for complete search history.

(56) References Cited

U.S. PATENT DOCUMENTS

| | | | | |
|---|---|---|---|---|
| 4,627,734 | A | 12/1986 | Rioux | |
| 4,688,937 | A | 8/1987 | Konig et al. | |
| 4,943,157 | A | 7/1990 | Reding | |
| 5,125,736 | A | 6/1992 | Vaninetti et al. | |
| 5,231,401 | A | 7/1993 | Kaman et al. | |
| 5,638,164 | A | 6/1997 | Landau | |
| 5,914,826 | A | 6/1999 | Smallwood | |
| 6,055,490 | A | 4/2000 | Dunne | |
| 6,091,037 | A | 7/2000 | Bachschmid | |
| 6,731,845 | B1 | 5/2004 | Gerdt | |
| 7,064,817 | B1 | 6/2006 | Schmitt et al. | |
| 7,086,163 | B1 | 8/2006 | Makotinsky | |
| 7,089,114 | B1 | 8/2006 | Huang | |
| 7,299,892 | B2 | 11/2007 | Radu et al. | |
| 7,446,733 | B1 | 11/2008 | Hirimai | |
| 7,608,948 | B2 | 10/2009 | Nearhoof et al. | |
| 8,666,104 | B2 | 3/2014 | Ivey et al. | |
| 8,675,887 | B2 | 3/2014 | Yuan et al. | |
| 8,752,969 | B1 | 6/2014 | Kane et al. | |
| 8,786,835 | B1 | 7/2014 | Reardon et al. | |
| 8,878,901 | B2 | 11/2014 | Meinherz | |
| 8,948,591 | B2 | 2/2015 | Scherbarth | |
| 9,002,511 | B1 | 4/2015 | Hickerson et al. | |
| 9,069,059 | B2 | 6/2015 | Vogt et al. | |
| 9,097,800 | B1 | 8/2015 | Zhu | |
| 9,121,703 | B1 | 9/2015 | Droz et al. | |
| 9,128,190 | B1 | 9/2015 | Ulrich et al. | |
| 9,199,643 | B1 | 12/2015 | Zeng | |
| 9,279,796 | B1 | 3/2016 | Weisberg | |
| 9,285,477 | B1 * | 3/2016 | Smith | G01S 7/4817 |
| 9,383,753 | B1 | 7/2016 | Templeton et al. | |
| 9,625,582 | B2 | 4/2017 | Gruver et al. | |
| 9,804,264 | B2 | 10/2017 | Villeneuve et al. | |
| 10,145,731 | B2 | 12/2018 | Qian et al. | |
| 10,151,836 | B2 | 12/2018 | O'Keeffe | |
| 10,185,027 | B2 | 1/2019 | O'Keeffe | |
| 10,302,746 | B2 | 5/2019 | O'Keeffe | |
| 10,408,940 | B2 | 9/2019 | O'Keeffe | |
| 10,564,266 | B2 | 2/2020 | O'Keeffe | |
| 10,578,719 | B2 | 3/2020 | O'Keeffe | |
| 10,591,599 | B2 | 3/2020 | O'Keeffe | |
| 10,859,678 | B2 | 12/2020 | O'Keeffe | |
| 10,908,264 | B2 | 2/2021 | O'Keeffe | |
| 10,928,487 | B2 | 2/2021 | O'Keeffe | |
| 11,340,338 | B2 * | 5/2022 | O'Keeffe | G01S 17/931 |
| 2005/0057741 | A1 | 3/2005 | Anderson et al. | |
| 2005/0237218 | A1 | 10/2005 | Tang et al. | |
| 2006/0006309 | A1 | 1/2006 | Dimsdale et al. | |
| 2006/0104585 | A1 | 5/2006 | Cho | |
| 2006/0161270 | A1 | 7/2006 | Luskin et al. | |
| 2007/0024841 | A1 | 2/2007 | Kloza | |
| 2007/0289860 | A1 | 12/2007 | Newman et al. | |
| 2008/0068584 | A1 | 3/2008 | Mori et al. | |
| 2009/0147239 | A1 | 6/2009 | Zhu et al. | |
| 2009/0219962 | A1 | 9/2009 | Meyers et al. | |
| 2009/0262760 | A1 | 10/2009 | Krupkin et al. | |
| 2009/0273770 | A1 | 11/2009 | Bauhahn et al. | |
| 2010/0026982 | A1 | 2/2010 | Kludas et al. | |
| 2010/0177929 | A1 | 7/2010 | Kurtz et al. | |
| 2011/0181201 | A1 | 7/2011 | Hollis | |
| 2013/0127854 | A1 | 5/2013 | Shpunt et al. | |
| 2013/0222791 | A1 | 8/2013 | Steffey et al. | |
| 2014/0133011 | A1 | 5/2014 | Schwedt et al. | |
| 2014/0168631 | A1 | 6/2014 | Haslim et al. | |
| 2014/0240721 | A1 | 8/2014 | Herschbach | |
| 2014/0270237 | A1 | 9/2014 | Wang et al. | |
| 2014/0270264 | A1 | 9/2014 | Wang et al. | |
| 2014/0350836 | A1 | 11/2014 | Stettner et al. | |
| 2015/0185246 | A1 | 7/2015 | Dakin et al. | |
| 2015/0192677 | A1 * | 7/2015 | Yu | G01S 17/89 356/5.01 |
| 2015/0241812 | A1 * | 8/2015 | Takura | G03G 15/043 399/49 |
| 2015/0247703 | A1 | 9/2015 | Teetzel et al. | |
| 2015/0286340 | A1 | 10/2015 | Send et al. | |
| 2015/0307020 | A1 | 10/2015 | Salter et al. | |
| 2015/0378011 | A1 | 12/2015 | Owechko | |
| 2016/0047896 | A1 | 2/2016 | Dussan | |
| 2016/0245919 | A1 | 8/2016 | Kalscheur et al. | |
| 2016/0282468 | A1 | 9/2016 | Gruver et al. | |
| 2016/0327648 | A1 | 11/2016 | Lipson et al. | |
| 2017/0024877 | A1 | 1/2017 | Versace et al. | |
| 2017/0169703 | A1 | 6/2017 | Carrasco et al. | |
| 2017/0176990 | A1 | 6/2017 | Keller et al. | |
| 2017/0328990 | A1 | 11/2017 | Magee et al. | |
| 2018/0059248 | A1 | 3/2018 | O'Keeffe | |
| 2018/0074175 | A1 | 3/2018 | O'Keeffe | |
| 2018/0196133 | A1 | 7/2018 | Sun | |
| 2019/0011541 | A1 | 1/2019 | O'Keeffe | |
| 2019/0064353 | A1 | 2/2019 | Nugent, Jr. et al. | |
| 2019/0107711 | A1 | 4/2019 | Blanche et al. | |
| 2019/0120939 | A1 | 4/2019 | O'Keeffe | |
| 2019/0196579 | A1 | 6/2019 | Shpunt et al. | |
| 2019/0361096 | A1 | 11/2019 | Popovich et al. | |
| 2020/0271761 | A1 | 8/2020 | O'Keeffe | |
| 2021/0109197 | A1 | 4/2021 | O'Keeffe | |
| 2022/0018961 | A1 | 1/2022 | O'Keeffe | |

OTHER PUBLICATIONS

Teo et al.; Pole-Like Road Object Detection From Mobile Lidar System Using a Coarse-to-Fine Approach; IEEE Journal of Selected Topics in Applied Earth Observations and Remote.
Vojnovic; Notes on optical fibres and fibre bundles; Gray Institute, Department of Oncology, University of Oxford; 15 pages; retrieved from the internet ( http://users.ox.ac.u.
O'Keeffe; U.S. Appl. No. 15/857,960 entitled "Planning a lidar scan with smart test vectors," filed Dec. 29, 201.

* cited by examiner

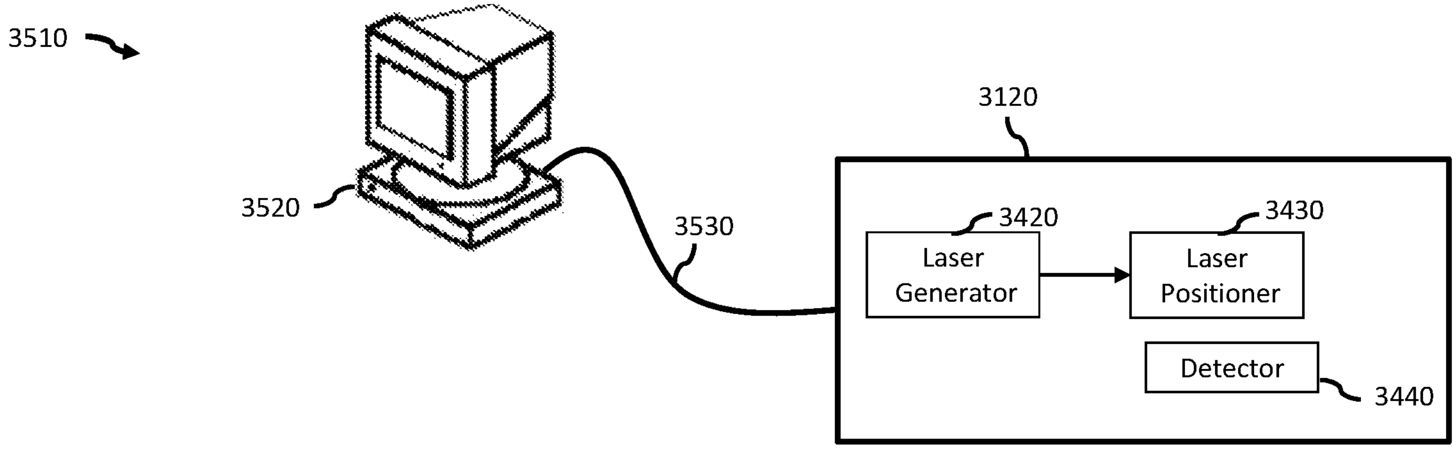
FIG. 26A
3501
| | | |
|---|---|---|
| 3502 | Start Location: | 30,10 |
| 3504 | Region Width: | 30 |
| 3506 | Region Height: | 30 |
| 3508 | Region bounds: | 30,10; 30,40; 60,40; 60,10 |
| 3511 | Pulse Locations: | 30,10; 30,11; 30,12 |
| 3512 | Path waypoints: | 30,10; 30,40; 30,41; 30,11 |
| 3514 | Laser scan speed: | 5deg.millisecond |
| 3516 | Laser pulse size: | 10mm, 4mm |
| 3518 | Number of Pulses: | 300 |
FIG. 26B
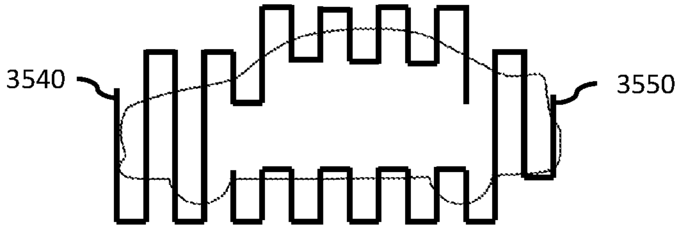
FIG. 26C

SELF-DRIVING TRUCK WITH MIRRORS TO EXTEND A FIELD OF VIEW

CROSS-REFERENCE TO RELATED APPLICATIONS

This application is a continuation-in-part of U.S. patent application Ser. No. 16/792,135, filed Feb. 14, 2020, which is a continuation-in-part of U.S. patent application Ser. No. 15/851,686, filed Dec. 21, 2017, now U.S. Pat. No. 10,564,266, which is a continuation of International Patent Application No. PCT/US2017/053343, filed Sep. 25, 2017, which claims the benefit of priority to each of: U.S. Provisional Patent Application No. 62/399,466, filed on Sep. 25, 2016; and U.S. Provisional Patent Application No. 62/441,627, filed on Jan. 3, 2017.

Application Ser. No. 16/792,135 is also a continuation-in-part of U.S. patent application Ser. No. 15/815,695, filed Nov. 16, 2017, now U.S. Pat. No. 10,591,599, which is a continuation-in-part of International Patent Application No. PCT/US2017/046385, filed Aug. 10, 2017, which claims the benefit of priority to of U.S. Provisional Patent Application No. 62/372,934, filed on Aug. 10, 2016.

This application is a continuation-in-part of U.S. patent application Ser. No. 17/492,513, filed Oct. 1, 2021, which is a continuation-in-part of U.S. patent application Ser. No. 15/858,174, filed Dec. 29, 2017, now U.S. Pat. No. 11,137,481, which is a continuation of International Patent Application No. PCT/US17/32585, filed May 15, 2017, which claims the benefit of priority to each of: U.S. Provisional Patent Application No. 62/337,867, filed on May 18, 2016; U.S. Provisional Patent Application No. 62/350,670, filed on Jun. 15, 2016; U.S. Provisional Patent Application No. 62/441,492, filed on Jan. 2, 2017; and U.S. Provisional Patent Application No. 62/441,563, filed on Jan. 3, 2017.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

This disclosure relates generally to apparatuses and methods of utilizing a remote mirror on a vehicle to enhance sensor fields of view.

BACKGROUND

There are applications in which a distance measurement is needed for a plurality of locations in the environment surrounding a distance measurement system. There are existing technologies that provide such distance information in the form of a 3-dimensional (3D) point cloud that represents the 3D coordinates of points on objects in the local environment. An ongoing challenge is to enhance these distance measurement systems, for example to provide improved coverage range, measurement density, measurement accuracy, measurement relevance. One challenge is that in most cases, real-world applications of distance measurement (e.g., ranging in autonomous vehicles) can encounter obstacles that dynamically obstruct portions of the field of view (FOV). For example, the trailer of a tractor-trailer truck can obstruct a dynamically varying portion of the FOV of a distance measurement system located in the tractor portion of the truck.

One exemplary distance measurement technology is computer stereo vision in which 3D information is extracted from 2-dimensional (2D) images obtained by a digital camera, by comparing captured information about the scene from two vantage points. Another exemplary distance measurement technology is light detection and ranging (LIDAR) in which a light emitter (e.g., a laser diode) illuminates one or more directions in a field of view and the time associated with the reflections from each of the one or more directions is used to measure distance to objects in the associated direction. Several varieties of LIDAR are presently used. For example, flash LIDAR illuminates many points at once with light in a FOV and uses an array of detectors to sense reflections and associated times. Scanned LIDAR can use a pulsed laser to scan the FOV and sequentially measure laser reflections.

Another challenge with LIDAR is that the FOV represents the limited set of directions in which the LIDAR can directly measure distance to surrounding locations. Conventional mechanical LIDAR can have a rotating sensor head that spins around an axis and provides a 360 degree FOV in the azimuthal plane and a limited (e.g., +/−20 degree) FOV in the elevation plane. Hence the directions in which a LIDAR can provide direct range measurements from the surrounding environment can be limited by the system design. In a related challenge the LIDAR is often mounted on a platform (e.g., a car, truck, or airplane) and this platform obstructs some of the FOV. Therefore, insofar as I am aware, no previous LIDAR system effectively addresses the challenge of adapting the limited FOV to the often-obstructed and changing local environment in real-world applications (e.g., autonomous vehicles or smart buildings).

LIDAR is increasingly useful for providing range measurements in the vicinity of autonomous vehicles, robots and smart buildings. Traditionally, LIDAR systems have been placed on the exterior of host platforms (e.g., vehicles) with direct access to a FOV. While this is useful during research and development, external LIDAR placement with a single FOV poses challenges including aesthetics, long-term reliability and cost.

Flash LIDAR or time-of-flight (TOF) cameras are a class of scannerless LIDAR in which a laser or LED source illuminates a plurality of directions at once and a photodetector array such as a focal plane array (FPA) of avalanche photodiodes detects the timing of reflections from the plurality of directions. An ongoing challenge is that the photodetector array (e.g., single photon avalanche detector) can be the most expensive part of a flash LIDAR. Providing the LIDAR with an unobstructed view of the vicinity typically requires mounting the LIDAR on the exterior of the host platform, where it is subject to weather and damage. In a related aspect, external placement often only provides an unobstructed view of a portion of the surroundings. U.S. Patent Application Publication No. 2015/0192677 to Yu addresses this challenge by disclosing multiple LIDAR sensors around a vehicle to provide adequate coverage, but does not address the associated cost and weight penalty.

U.S. Pat. No. 9,069,059 to Vogt et al. discloses a LIDAR jammer that detects a laser emitter in the local environment by gathering light with an input lens into an input fiber optic cable coupled to a photodiode. While useful for laser detection somewhere in the surroundings, it does not address the challenge of constructing a detailed 3-D depth image. Therefore, the challenge of performing LIDAR measurements in a wide range of directions, while minimizing the number of LIDARs and protecting expensive LIDAR components, remains.

SUMMARY

Within examples, systems and methods are provided to implement a distributed LIDAR that transfers light reflections from one or more fields of view (FOVs) around a vehicle to a remotely located range calculating assembly, using one or more coherent fiber optic image bundles (CFOB). In one aspect, the coherent arrangement of fibers in each CFOB preserves the direction information associated with light reflections from an associated FOV at one end of the CFOB, thereby enabling the ranging subassembly to be remotely located from several FOVs, while providing range measurements for a plurality of directions in those FOVs.

An embodiment of the invention is a distributed optical LIDAR that gathers data from several FOVs around a host vehicle using a network of CFOBs and generates a digital, time-varying 3D point cloud that represents the 3D coordinates of the real world surfaces that are within the FOVs. The distributed LIDAR can comprise a light emitter and a lens with direct access to a FOV. The distributed LIDAR can further comprise a ranging subassembly with a photodetector array (e.g., a single photon detector array), that is remotely located from the FOV and coupled to the FOV by a coherent fiber optic image bundle (CFOB). The lens is operable to focus light reflections from the FOV onto an input surface of the CFOB. The CFOB comprises thousands of elongated fiber optic elements, arranged in a common sequence at both the input and an output surface. In one aspect, each fiber optic element is operable to gather light from a specific part of the FOV, thereby enabling recovery of the direction information within the FOV at the remote ranging subassembly.

In another embodiment, a vehicle based distributed LIDAR system is disclosed, operable to provide centralized range sensing using reflection from multiple fields of view around a vehicle (e.g., passenger vehicle or truck). The distributed LIDAR comprises laser emitters to illuminate a plurality of FOVs around the vehicle and a plurality of CFOBs to transfer laser reflections from objects in the FOVs to a remotely-located ranging subassembly. Unlike multiple discrete LIDARs, the ranging subassembly in a distributed LIDAR can receive laser reflections from several FOVs and is thereby shared by the several FOVs. Exemplary methods to share the remotely located ranging subassembly among several FOVs include time multiplexing FOVs at the ranging subassembly or spatially combining several FOVs from around the vehicle at the remote ranging subassembly. In one aspect, the CFOBs function to transfer direction information regarding reflections from parts of each FOV, thereby enabling remote placement of the ranging subassembly (e.g., in a centralized location). In another aspect, the distributed LIDAR system can comprise an optical multiplexor to time multiplex light reflections from each CFOB onto a single, remotely-located, shared photodetector array in the ranging subassembly. The distributed LIDAR system with remote ranging subassembly can reduce the number of LIDARs required by multiplexing light reflections from several FOVs that are faithfully transferred to a shared remote photodetector array using CFOBs.

In various embodiments the LIDAR system can be a flash LIDAR system, wherein some or all of each FOV is illuminated at once. In other embodiments the LIDAR system can be a scanned LIDAR in which an emitter produces pulses of light in a sequence of specific directions within each FOV. In one aspect, of several embodiments a distributed LIDAR system contains a FOV combiner component operable to provide light reflections from multiple FOVs to a shared remote detector array. Exemplary FOV combiners include spatial FOV combiners (e.g., to spatially multiplex light reflections from several FOVs onto a remote detector array at once) and FOV multiplexors (e.g., a mechanical optical multiplexor, a solid state switchable mirror array or micromirror array) to time share multiple FOVs onto a common remote detector array.

In one embodiment, a light detection and ranging system comprises an emitter to generate an outgoing set of light pulses, a coherent fiber optic image bundle (CFOB) comprising, a plurality of elongated optical fibers with a common spatial sequence at an input surface and an output surface, wherein the CFOB is positioned to transmit a set of light reflections corresponding to the outgoing set of light pulses, from the input surface to the output surface, and a ranging subassembly comprising a detector, operably coupled to the output surface, to detect the set of light reflections, and electronic circuitry to compute for the set of light reflections a corresponding set of 3D locations indicative of reflection locations corresponding to the set of light reflections.

In a related second group of embodiments, a LIDAR can comprise a remotely located ranging subassembly with two similar or identical photodetector arrays. A challenge associated with shared remote sensing (e.g., in vehicles) is malfunction detection and failsafe operation in the event of a malfunction. Embodiments provide for two photodetectors in a shared remote ranging subassembly to address the challenges of malfunction detection and failsafe operation of a remote light-based ranging subassembly. The two photodetector arrays can each receive light reflections from overlapping angular ranges in one or more FOVs (e.g., transferred using CFOBs) and thereby function to provide redundancy and confirmation of detected light reflections. The two photodetectors can receive pluralities of light reflections from common or overlapping angular ranges in a common FOV and thereby enable system-error detection and failsafe operation while only requiring 2 detectors and not 2×N where N is the number of FOVs around the vehicle. A malfunction indicator in the ranging subassembly can calculate a difference value indicating a measure of difference between first reflection signals generated by a first detector and second reflection signals generated by a second detector and generate a malfunction signal at an output of the LIDAR when the difference value is greater than a threshold value.

In one embodiment a light detection and ranging system with malfunction indication capability comprises one or more emitters configured to produce an outgoing set of light pulses in a field of view, a first detector configured to detect a first plurality of light reflections corresponding to at least some of the outgoing set of light pulses and thereby generate first reflection signals, a second detector configured to detect a second plurality of light reflections and thereby generate second reflection signals, and electronic circuitry, configured to process at least some of the first and second reflection signals and generate a difference value indicating a measure of difference between the at least some of the first and second reflection signals, and configured to generate a malfunction signal when the difference value is greater than a threshold value.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

A remote mirror whose location or existence may be initially unknown to a laser range finder poses challenges and opportunities. Specifically, a remote mirror at some distance from a laser range finder in the FOV of the range finder can provide indirect reflections from otherwise inaccessible locations (e.g., around corners). Various embodiments of the present disclosure relate to detecting and characterizing a remotely located mirror in the FOV of a laser range finder system. In several cases the remotely located mirror can initially have an unknown position, shape and size (e.g., a reflector attached to a shipping container that can be used by a LIDAR in an autonomous truck or a mirror located in a building that can be discovered by a robot with a LIDAR, or a mirror on a passenger vehicle such as on a door with unknown placement relative to a LIDAR). Various embodiments provide for discovering the presence of a remote mirror in the FOV of a laser range finder, tracking the remote mirror position and increasing the utilization of a remote mirror (e.g., density of laser pulses generated by a LIDAR in a portion of the FOV containing the remote mirror).

In one embodiment a LIDAR system includes a laser generator, a laser positioner to scan a FOV, a reflection receiver or detector and an electronic circuitry such as a processing subassembly. The processing subassembly processes aspects of reflections from the FOV and thereby identifies a remote mirror located in the FOV, associated with some of the reflection data. The processing subassembly can identify the location of the remote mirror (e.g., an angular range within a FOV) and use a variety of techniques to determine the range of angles in the FOV associated with the remotely located mirror. The processing subassembly can further characterize a transfer function of the mirror (i.e., the relationship between the angle of the laser beam produced by a laser positioner attached to the remote mirror and the angle of the reflected beam from the remote located mirror). The LIDAR system can use the characterization of the mirror to estimate reflection locations in 3D space associated with laser beams or reflections deflected by the remote mirror and subsequently detected by the laser range finder.

One exemplary aspect of several embodiments of the present disclosure is directed to a method for a LIDAR to discover a remotely located mirror, located at an initially unknown location in the local environment, to perform a laser ranging scan of a field of view that utilizes the discovered mirror, and to identify a subset of laser reflections that have been deflected by the remote mirror and compensate the corresponding reflection data. In one aspect the laser range finder can comprise a laser reflection detector and a portion of the FOV of the detector can be associated with a discovered mirror in the local environment (e.g., a LIDAR on a truck with a large wing-mirror can have a large but variable portion of the detector FOV occupied by the wing mirror). A laser range finder can have a detector that generates a sequence of laser pulses, thereby illuminating the surrounding environment. The laser pulses can reflect from objects in the local surroundings and the laser range finder can receive a set of laser reflections. Reflections can arrive in a set of reflection directions. For example, the detector can be scanned in a raster pattern or a rotating pattern. The detector field of view can be considered the set of all possible reflection directions. In a simple case wherein a laser reflection travels directly from the reflecting object to the detector the 3D reflection location can be determined using the time of flight (TOF) of the laser reflection (i.e., time elapsed since outgoing laser pulse) and the reflection direction.

Several embodiments of this disclosure deal with the special case of reflections from a remote mirror. In some embodiments the initial location of the remote mirror can be unknown. A remote mirror can be very useful (e.g., a convex wing mirror provides an expanded FOV that is often the range of directions forming the unaided detector FOV). However, reflections that arrive from reflection directions in the detector FOV associated with the mirror have been deflected. Therefore an aspect of several embodiments is to identify the subset laser reflections (the deflected subset) that have undergone deflection by the remote mirror. Subsequently, a 3D location can be computed for each laser reflection including performing a correction step performed when computing the 3D location corresponding to laser reflections in the deflected subset. In this way the laser range finder or a system with a laser range finder can account for the effect of the remote mirror when computing 3D locations representative of reflection locations (e.g., when computing a 3D point cloud). In some embodiments the curvature and placement of the remote mirror can be learned by the laser range finder and the correction step can improve the accuracy of the 3D location associated with reflections from the mirror (e.g., the correction can determine a correct 3D reflection location accounting for the deflection in the mirror). In other embodiments, the correction step separates out the deflected subset of laser reflections and provides them as a secondary point cloud (e.g., provides a smaller separate point cloud, distinct from the main point cloud, that shows relative placement of reflection locations for the deflected subset of laser reflections).

In a related second group of embodiments a laser range finder system has a dynamically steerable laser assembly capable of steering a sequence of outgoing laser pulses in a dynamically selectable, non-uniform and modifiable manner. The steerable laser assembly is controlled by a set of laser steering parameters, similar to how a 3-D printer is dynamically controlled by a set of parameters describing an object. In response to obtaining a location estimate for a remote mirror (e.g., a 2-D range of directions in a FOV or a 3D range of coordinates) the laser range finder system generates a set of laser steering parameters operable to improve the utilization of the remote mirror. For example, the remote mirror (e.g., wing mirrors in automotive applications) can be a convex mirror, which increases the angular range of reflections captured by the mirror but makes objects appear smaller. Hence several embodiments provide a method to discover a remote mirror in the FOV and generate laser steering parameters to interrogate the mirror with a customized non-uniform pattern of laser pulses (e.g., increased density, decreased angular spacing, smaller or larger laser spot sizes, or optimized laser intensity). In another embodiment, a laser range finder system can selectively magnify a portion of the FOV containing a remote mirror, thereby providing a higher density of laser reflections from a remote mirror and increasing its utilization. For example, a set of laser steering parameters based on a location estimate for a remote mirror can be used to position a controllable magnifier within a flash LIDAR, thereby magnifying a portion of the FOV estimated to contain a remote mirror.

In a third group of embodiments a remote mirror positioning system is disclosed that controls (e.g., adjusts) a remote mirror based at least in part on processing reflection data from laser reflections, wherein at least some of the laser reflections have undergone deflection by the remote mirror. The remote mirror positioning system is useful for adjusting remote mirrors to provide enhanced utility for the laser range finder or to dynamically compensate for changes in the local environment, such as when an articulated vehicle makes a sharp turn. In one embodiment a remote mirror control system comprises a laser transceiver subassembly and processing subassembly with a transceiver operable to transmit position signals to a mirror positioner. The laser transceiver functions to transmit a set of laser pulses, gather a corresponding set of laser reflections and generate corresponding reflection data. Some of the laser reflections have been deflected by a remote mirror in the FOV of the laser transceiver. The processing subassembly processes at least some of the reflection data and thereby generates a position signal. The transceiver transmits the position signal to the mirror positioner that is mechanically coupled to the remote mirror. Embodiments of the remote mirror positioning system can provide feedback control of a remote mirror when the position of the remote mirror is not fully controllable or initially known by the mirror positioning system.

In a related fourth group of embodiments a laser range finder can be operatively coupled to a positioning mechanism (e.g., a mirror positioner) attached to a remote mirror on a vehicle or in the local environment (e.g., a LIDAR on a truck that is connected to a remote mirror on a cargo trailer attached to the truck). The laser range finder can discover the position of the remote mirror and can reposition the remote mirror in response to a change in shape or position of the vehicle. For example, a tractor-trailer truck can have a LIDAR located in the tractor portion that discovers and utilizes a remote mirror located in the trailer. The trailer can be articulated relative to the tractor and the laser range finder can control the remote mirror to adapt as the tractor-trailer makes a sharp turn providing optimized coverage. In another embodiment a laser range finder is mounted on a first portion of an articulated vehicle and a set of reflectors on a second portion that is articulated relative to the first portion, and received some or all of the incoming sequence of laser pulses from the laser range finder. The laser range finder discovers and controls a remote mirror to compensate for the articulation of the second (e.g., trailer) portion relative to the first (e.g., tractor) portion. In this way the controllable remote mirror ensures the FOV associated with the set of reflectors on the second portion remains invariant to the articulation of the vehicle.

Advantages

Embodiments of the present disclosure are operable to provide the following exemplary advantages: In one advantage the disclosed LIDAR system with one or more CFOBs enables the majority of the LIDAR electronics to be remotely located (e.g., in the engine bay of a vehicle) while receiving and preserving the direction and timing data of light reflections. Embodiments of the distributed LIDAR with CFOBs can reduce the number and footprint of LIDAR components placed on the vehicle exterior. For example, lenses and CFOBs can be more easily integrated into the headlight assembly of an autonomous vehicle, than the LIDAR detector and signal processing electronics. Traditionally, LIDAR systems have been mounted on the exterior of host platforms (e.g., vehicles) where the ranging subassembly (e.g., comprising the photodetector and scanning mirror or photodetector array) receives light reflection directly from a single FOV. External placement can be useful during research and development. However in consumer applications, exterior mounting LIDARs, each with a single FOV poses challenges including aesthetics, long-term reliability and cost to cover multiple FOVs.

In another advantage, CFOBs enable remote placement of the ranging subassembly, thereby providing protection for expensive components in a minor collision as well as protection from weather, EMI and vibration. Remote placement of the ranging subassembly can improve ranging accuracy and reliability while reducing environment-related damage and wear. LIDARs work by accurately sensing the time-of-flight of reflected light pulses. In many designs the range detection performance is sensitive to temperature variations and electromagnetic interference (EMI). The CFOBs enable the ranging subassembly to be located in a temperature and EMI controlled environment, away from direct exposure to the local environment (e.g., the exterior of a vehicle) with associated sun exposure and temperature ranges.

In another advantage, the CFOBs enable reflections from multiple FOVs to be detected with a shared photodetector array in a shared ranging subassembly, thereby reducing system cost, complexity, weight and number of LIDARs required to serve multiple FOVs.

In another advantage, the length of high-speed (e.g., CAT5e or Ethernet) cables from the LIDAR to other systems can be reduced (e.g., the LIDAR electronics can be placed close to the automotive ECU or a central computer vision controller). A car is an EMI filled environment, particular EMI sources include sparkplugs, and DC motors. Embodiments of a remote LIDAR with fiber image bundles enable data laser reflections to be optically aggregated in a network of CFOBS in a more EMI shielded location, thereby improving signal integrity. Fiber optic signals are inherently more resistant to electromagnetic interference.

In another advantage, transferring laser reflections using a network of CFOBs to a shared photodetector array may provide improved design flexibility, such as adapting the shape of FOVs, and spatially combining FOVs or time multiplex FOVs at the detector. For example, several locations around a vehicle may only require a small FOV (e.g., a 10×10 degree fOV to protect a wheel from scraping curbs or doors from opening onto curbs). While these small regions may not justify a dedicated LIDAR, embodiments of the present disclosure can provide range detection using a plurality of small CFOBs in appropriate locations and spatially combining the small CFOBs at a shared detector array. Laser reflections from spatially combined FOVs can be time multiplexed with larger FOVs (e.g., a forward facing FOV). The size of the fiber optic image bundles can be adapted to provide for the specific needs of a location. In comparison, multiple discrete LIDARs may only offer the capabilities of each model number (e.g., a specific number of pixels for each model number).

In yet another advantage, CFOBs can have a variety of sizes (e.g., diameters and numbers of fibers) thereby providing tailoring angular ranges for several FOVs around a vehicle. CFOBs can be combined to provide simultaneous transmission and combination of laser reflections to a single shared photodetector array in a remotely located ranging subassembly. Alternatively, separate image bundles can simultaneously transmit laser reflections onto a single detector array, providing spatial multiplexing of the image array. In several locations it may be advantageous to gather a few reflections from strategically important directions: e.g., backup detection, wheel-arch reflection detection.

The techniques described in this specification can be implemented to achieve the following exemplary advantages:

Several embodiments provide a laser range finder that can identify and estimate the location of a remote mirror. Laser range finders in autonomous vehicles are very likely to inadvertently and sporadically experience mirrors in their field of view. Therefore the accuracy of 3D laser range finding is improved by the disclosed systems and methods to detect and estimated the location of remote mirrors.

In a related advantage several embodiments enable tracking of a remote mirror in the FOV of a laser range finder, following mirror detection. For example, a large variation in range, reflection location, time of flight or depth in a small window of the FOV can be used to identify the presence of a remotely located convex mirror. In several embodiments a LIDAR can track the bounds of a region of the FOV identified to contain a remote mirror.

A laser range finder according to several embodiments can increase the use of a discovered remote mirror to provide laser reflections from locations outside of the direct FOV (e.g., around corners). Convex mirrors have been used with limited success on roadways to help drivers see around corners. Such mirrors are sometimes found on country roads or sharp bends in roads. A drawback with convex mirrors is that objects are distorted and appear smaller than they really are. Hence drivers have difficulty understanding or utilizing convex mirrors and this has limited their deployment. Several embodiments of the present disclosure can enable an autonomous vehicle with a laser range finder to discover a remote mirror, zoom in (e.g., with optical or digital zoom) on the remote mirror to improve utilization of the mirror (i.e., magnify the remote field of view provided by the mirror) and use learned or stored characterization about the mirror to better understand the remote field of view offered by the mirror. For example, a remote roadside mirror can have defining features (e.g., a size or a model number indicator) that helps a laser range finder to recognize the type or model of remote mirror and thereby select a set of stored characteristics for the roadside mirror (e.g., the curvature, angular range, size).

In another advantage a laser range finder can identify a deflected subset of a set of laser reflections thereby enabling more accurate 3D ranging in an environment with remote mirrors.

Similarly, a laser range finder can identify and isolate reflection data from the deflected subset of laser reflections thereby providing a clear indication that the reflection data is from a mirror. For example, in one aspect a LIDAR can identify that a subset of a set of laser reflections have characteristics indicating that they come from a remote mirror. The LIDAR may not initially know the transfer function of the remote mirror and may isolate the subset as representing a deflected subset with known relative placement but unknown absolute placement relative to other laser reflections in the FOV.

Several embodiments enable gathering more information from a remote mirror by estimating the mirror location and then densely scanning the remote mirror, or estimated mirror location, with a laser range finder (e.g., greater than average density of laser pulses). In another advantage, a system for remotely controlling a remote mirror based on processing laser reflections can automate the process of provisioning mirrors (e.g., automatically characterize and provision a remote mirror attached to the trailer of a truck when a new trailer is attached to the truck), and improve the effectiveness of discovered mirrors (e.g., adjust the mirror position to provide greatest blind-spot coverage).

In yet another advantage, a system that controls the position of a remote mirror based at least in part on processing laser reflections can automatically adjust the remote mirror in response to a changing shape of a host vehicle (e.g., trailer position) and thereby compensate the indirect FOV from the remote mirror for changes in the vehicle shape (e.g., dynamic blind-spot coverage for a trailer during sharp turns). While such changing mirror position might confuse a vehicle driver and hence be inappropriate, an automated system can easily receive feedback regarding the changing orientation of a remote mirror and the anticipated indirect field of view expected from the remote mirror in response to the change in orientation.

In another advantage a remote mirror and laser steering parameters operable to distribute laser range measurement in a LIDAR can be adapted in combination to specific road conditions. For example, a set of remote mirrors on a vehicle trailer and an associated set of laser steering parameters can be adapted to scan a particular indirect FOV (e.g., a known blindspot of the LIDAR) during a sharp turn and adapted differently on a straight highway.

In another advantage, the most expensive component of a laser range finder is often the detector array (e.g., a focal plane array). Aspects of the present invention enable lower cost components such as remote mirrors to be disposed on a trailer (or cargo containers) while the expensive components can be located in the tractor portion of a vehicle and utilize the remote mirrors. Specific aspects provide methods for automatically discovering the location of these mirrors. Hence a long-haul truck driver can attach a trailer to a tractor and several embodiments disclosed herein provide for automatically discovering and characterizing a set of remote mirrors on the tractor or trailer that can enhance vehicle safety and autonomy.

DRAWINGS

The embodiments of the inventions described herein are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

Figure 3A:
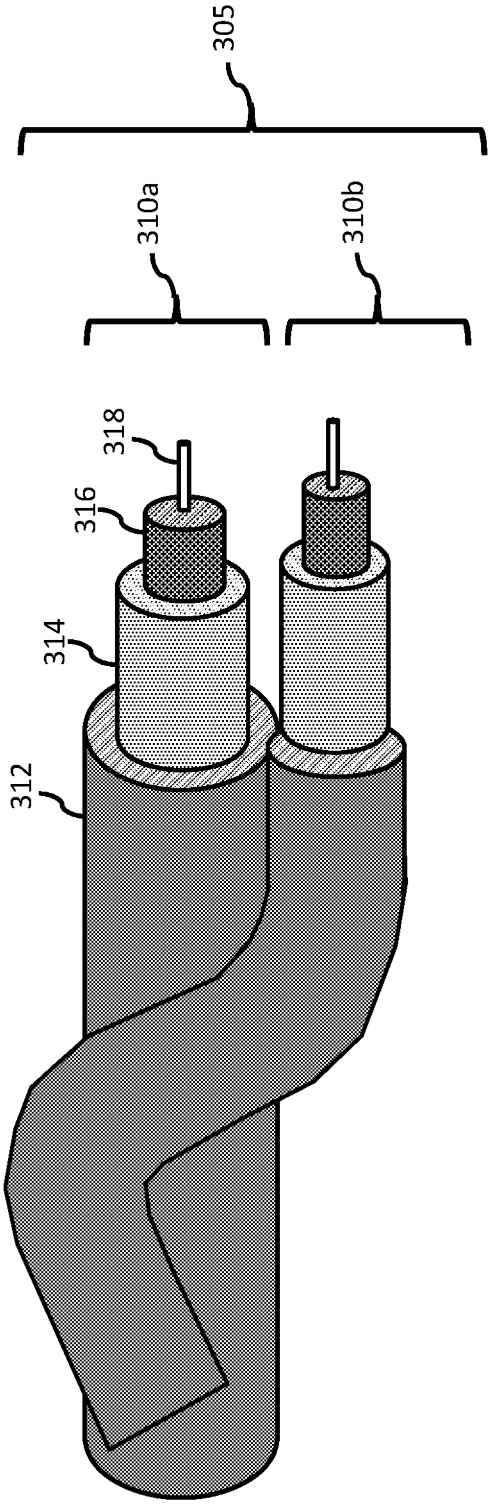

FIG. 3A illustrates fiber optic cable 305 comprising two optical fibers 310*a* and 310*b* for the purpose of comparison and contrasting with coherent optical fiber image bundles.

Figure 3B:
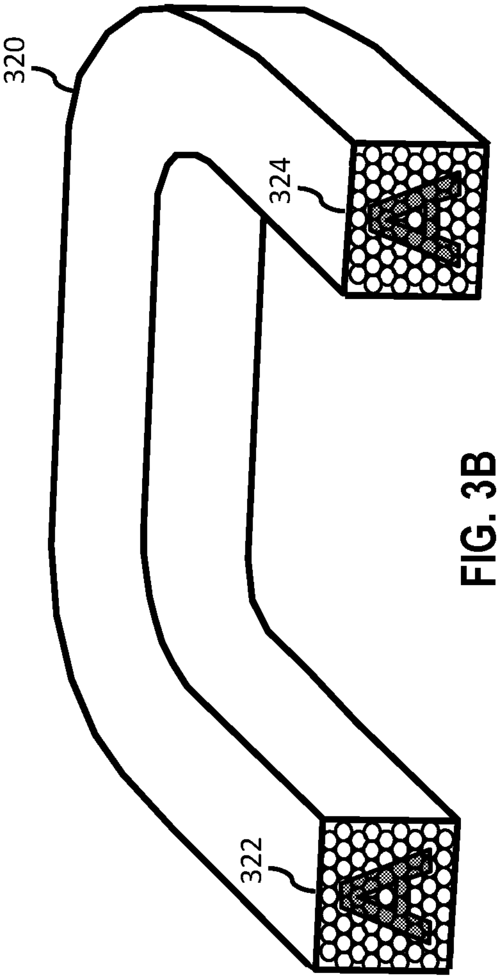

FIG. 3B illustrates a fused coherent fiber optic image bundle, operable to carry laser reflections to a remote photodetector array according to an embodiment of the resent disclosure.

Figure 3C:
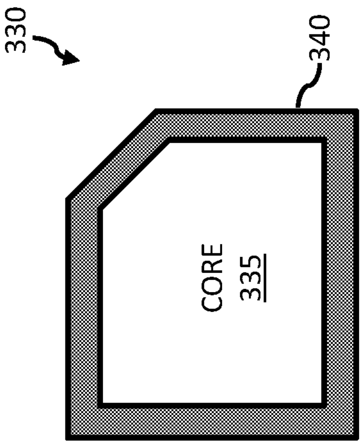

FIG. 3C illustrates a monofiber used in a coherent fiber optic image bundle including a fiber core and fiber cladding.

Figure 3D:
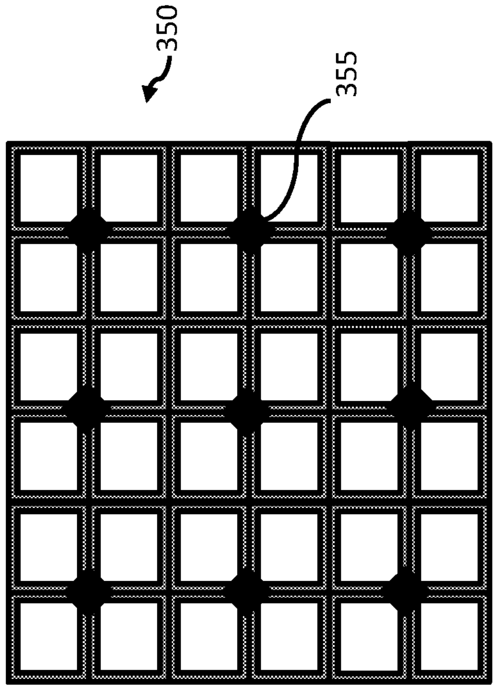

FIG. 3D illustrates a multi-fiber boule used to construct a coherent fiber optic image bundle according to several embodiments of the present disclosure.

Figure 3E:
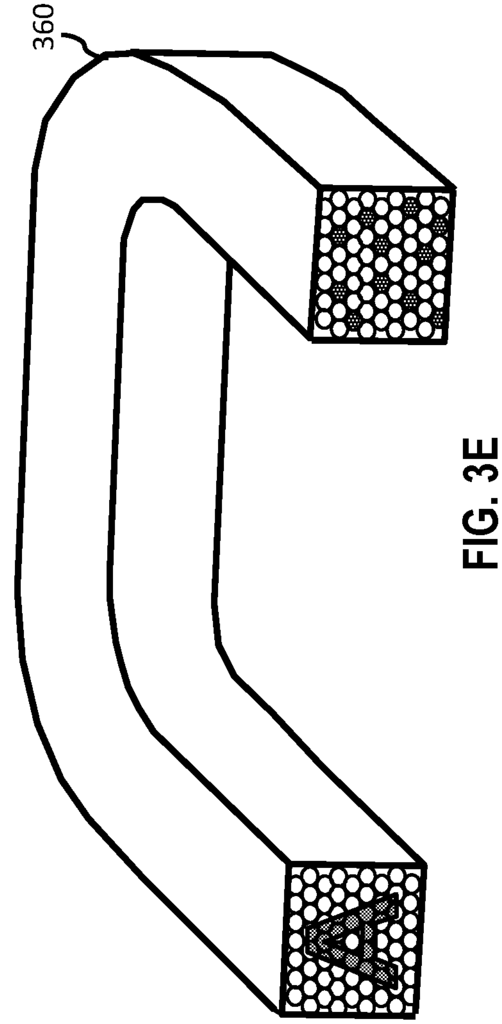

FIG. 3E illustrates an incoherent fiber optic bundle.

Figure 3F:
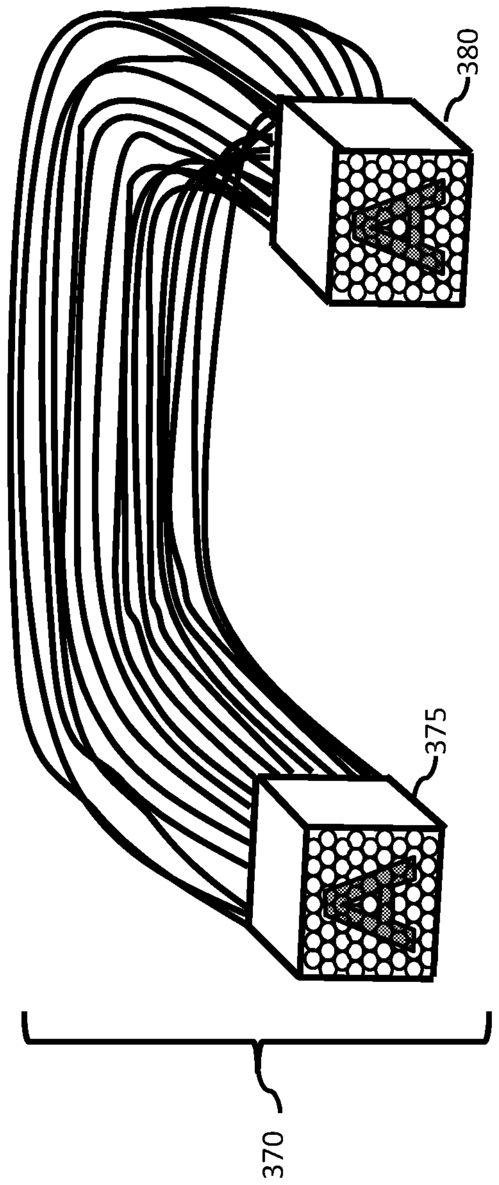

FIG. 3F illustrates a flexible coherent fiber optic image bundle, operable to carry laser reflections to a remote photodetector array according to an embodiment of the present disclosure.

Figure 4A:
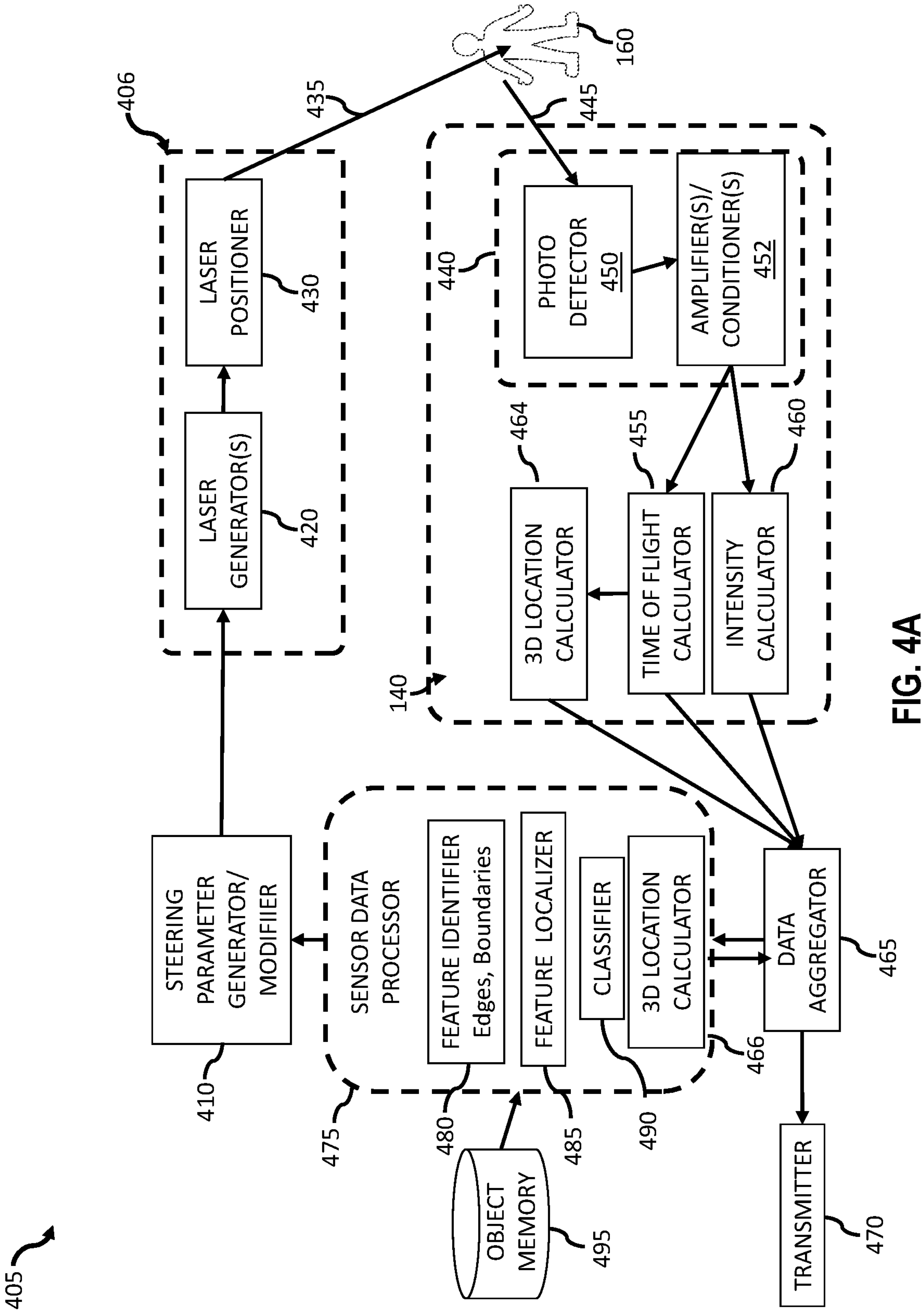
Figure 4B:
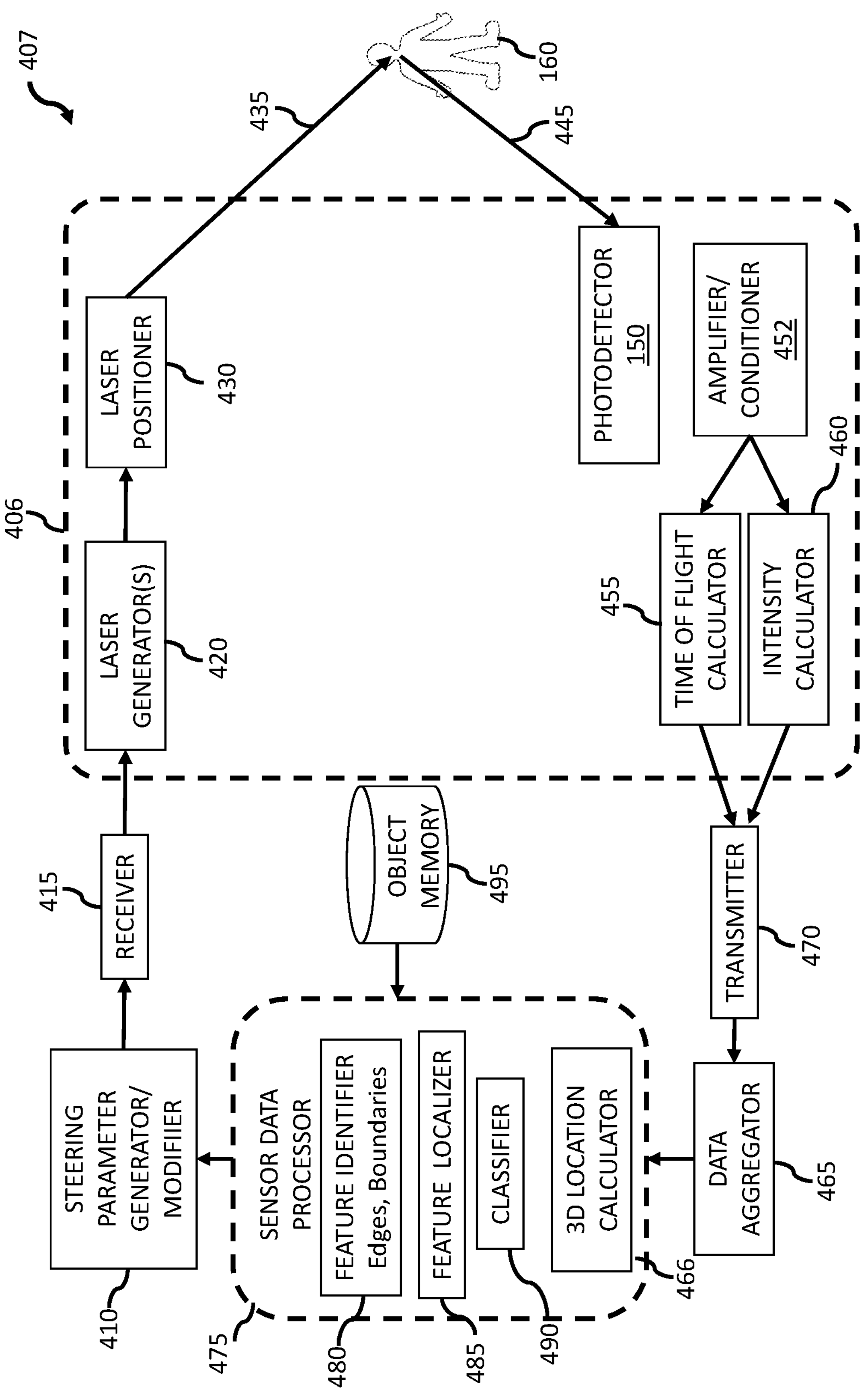

FIGS. 4A and 4B are functional diagrams illustrating several components of an exemplary dynamically steerable laser range finder in accordance with an embodiment of the present disclosure.

Figure 5:
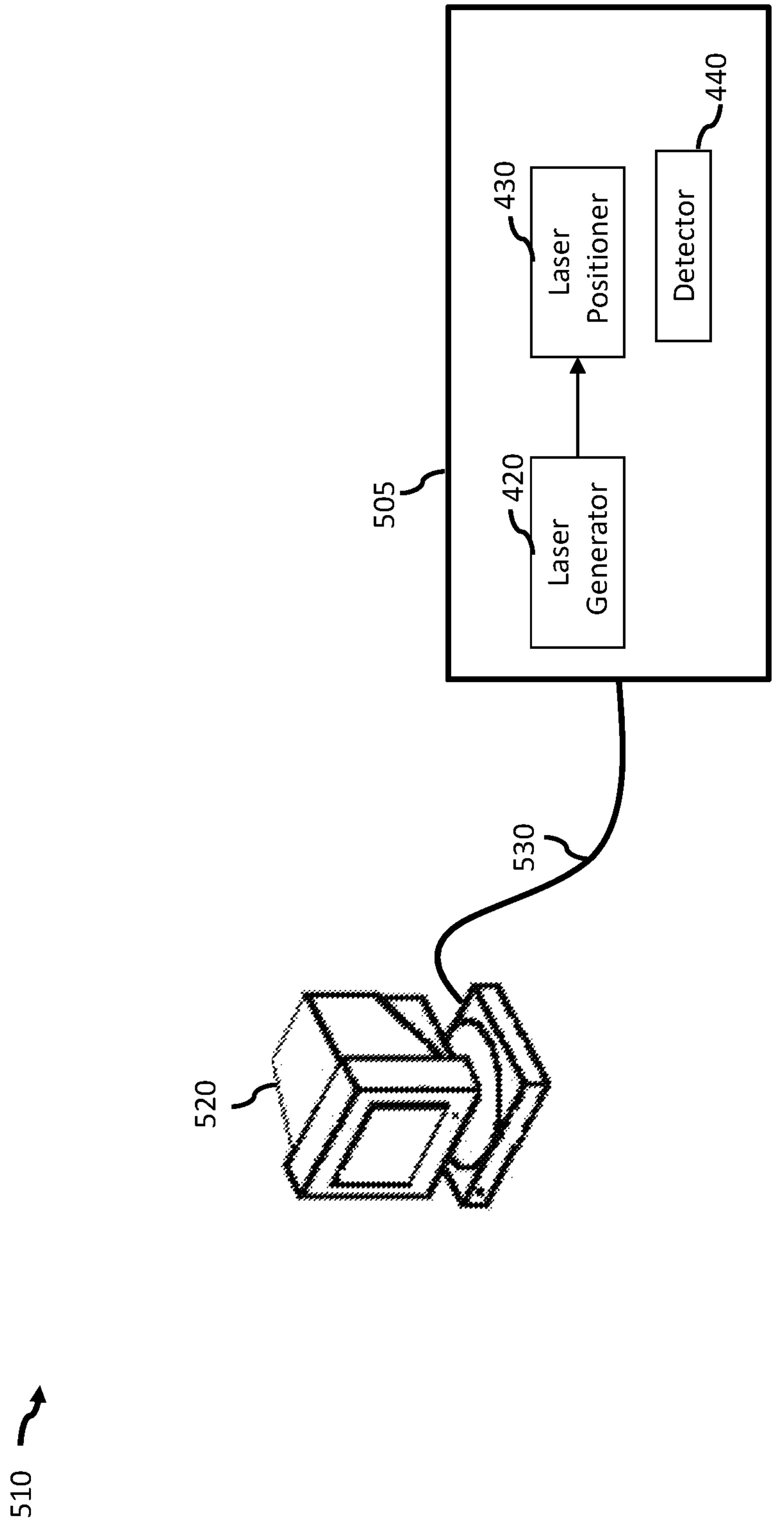

FIG. 5 illustrates an exemplary laser range finding system including a processing subassembly and a steerable laser assembly connected by a communication link, according to an embodiment of the present disclosure.

Figure 6:
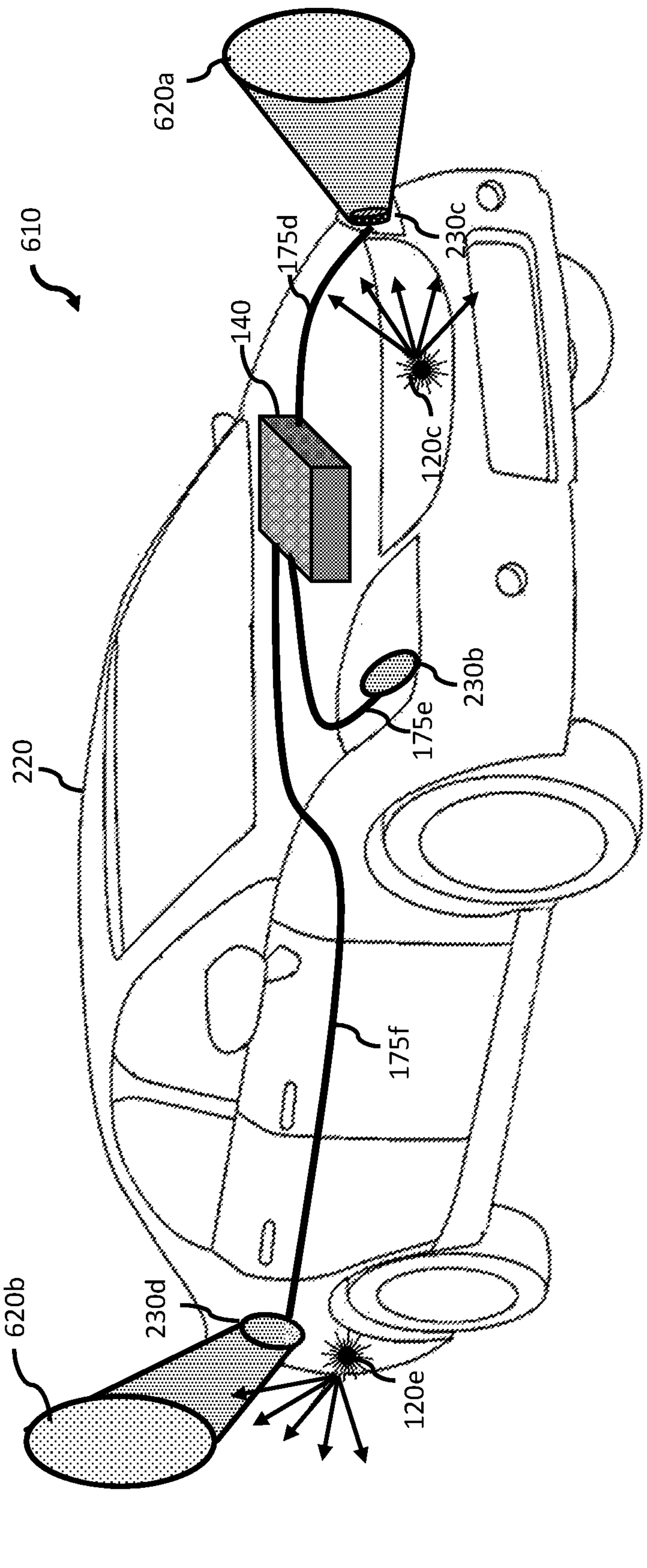

FIG. 6 illustrates a vehicle-based distributed LIDAR system with a remote ranging subassembly and a plurality of fiber optic image bundles, according to an embodiment of the present disclosure.

Figure 7:
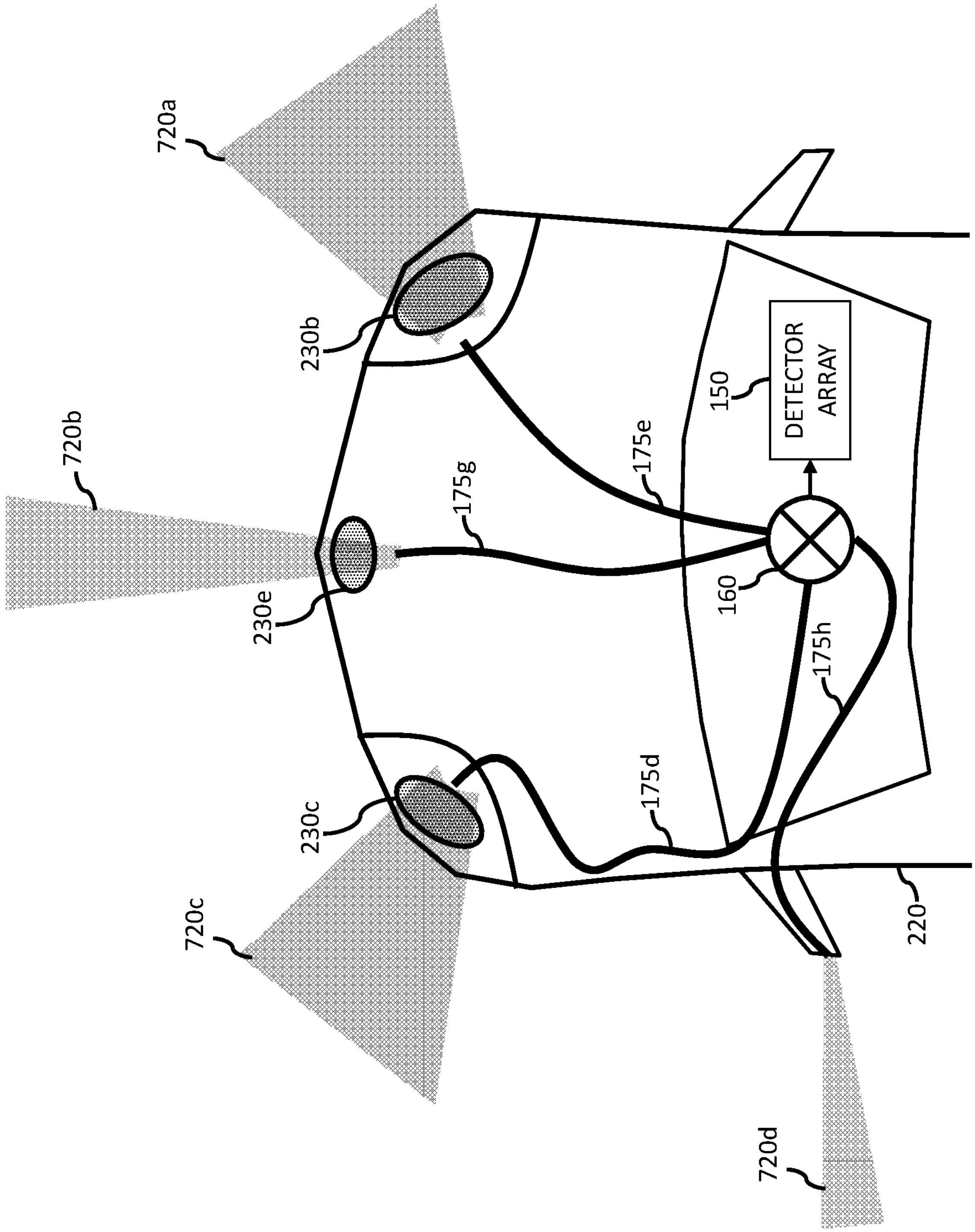

FIG. 7 illustrates a vehicle-based distributed LIDAR system with a remote detector array and a plurality of fiber optic image bundle, according to an embodiment of the present disclosure.

Figure 8:
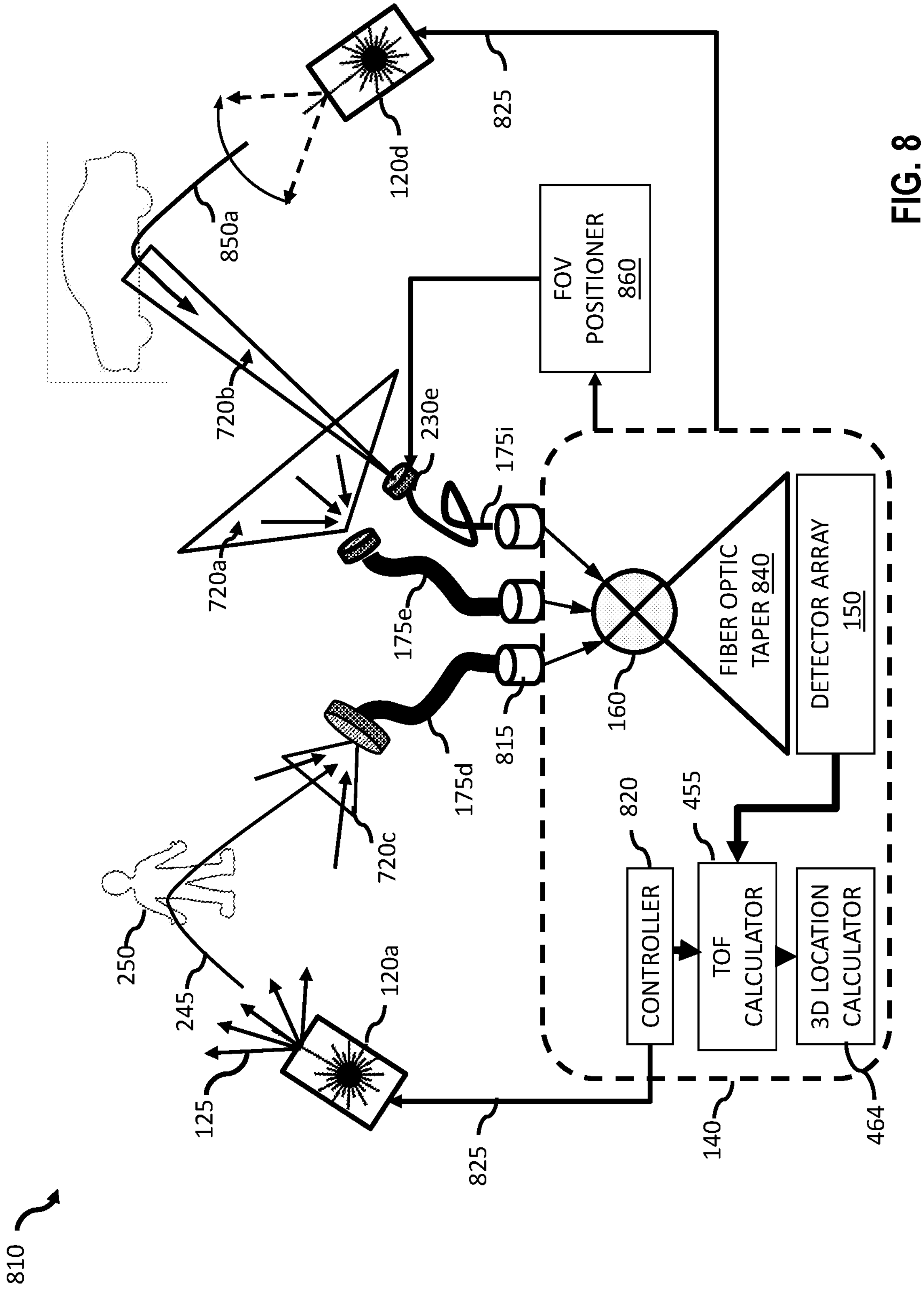

FIG. 8 illustrates several components of a distributed LIDAR system with a remote ranging subassembly and a plurality of fiber optic image bundles, according to an embodiment of the present disclosure.

Figure 9:
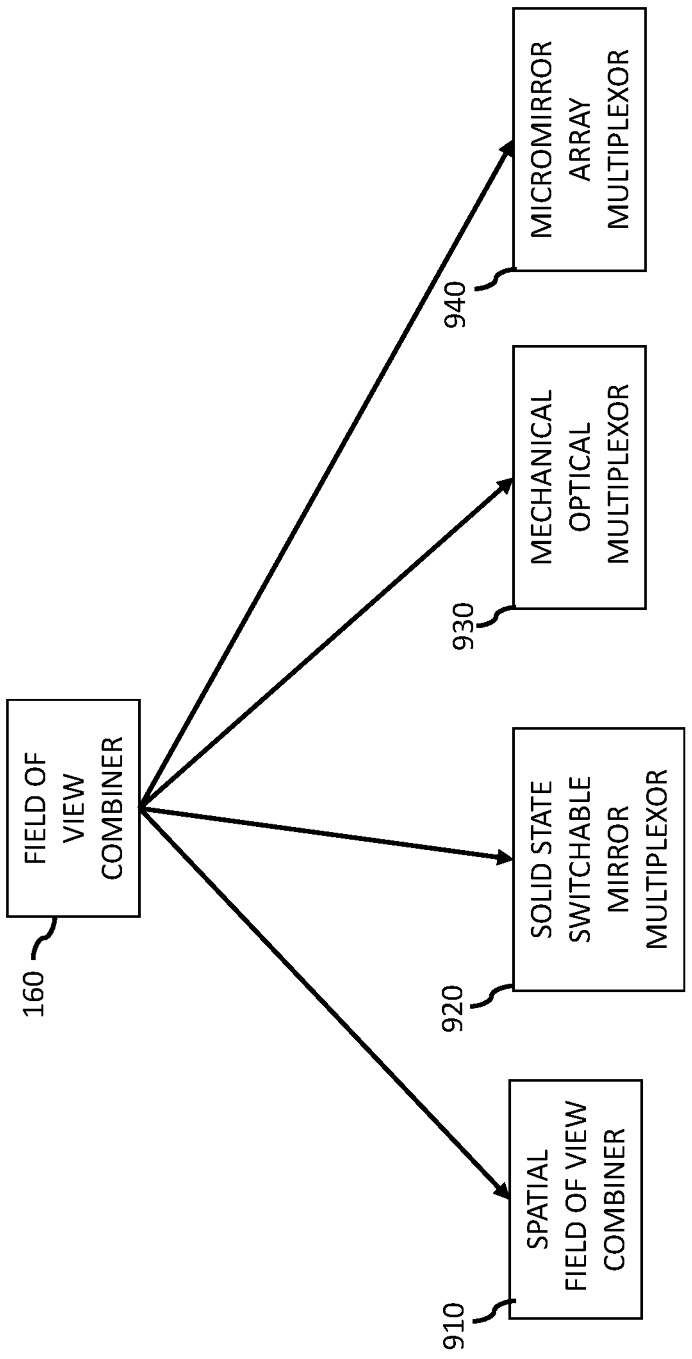

FIG. 9 illustrates a plurality of exemplary FOV combiners operable to combine or multiplex laser reflections from fiber optic image bundles, according to an embodiment of the present disclosure.

Figure 10A:
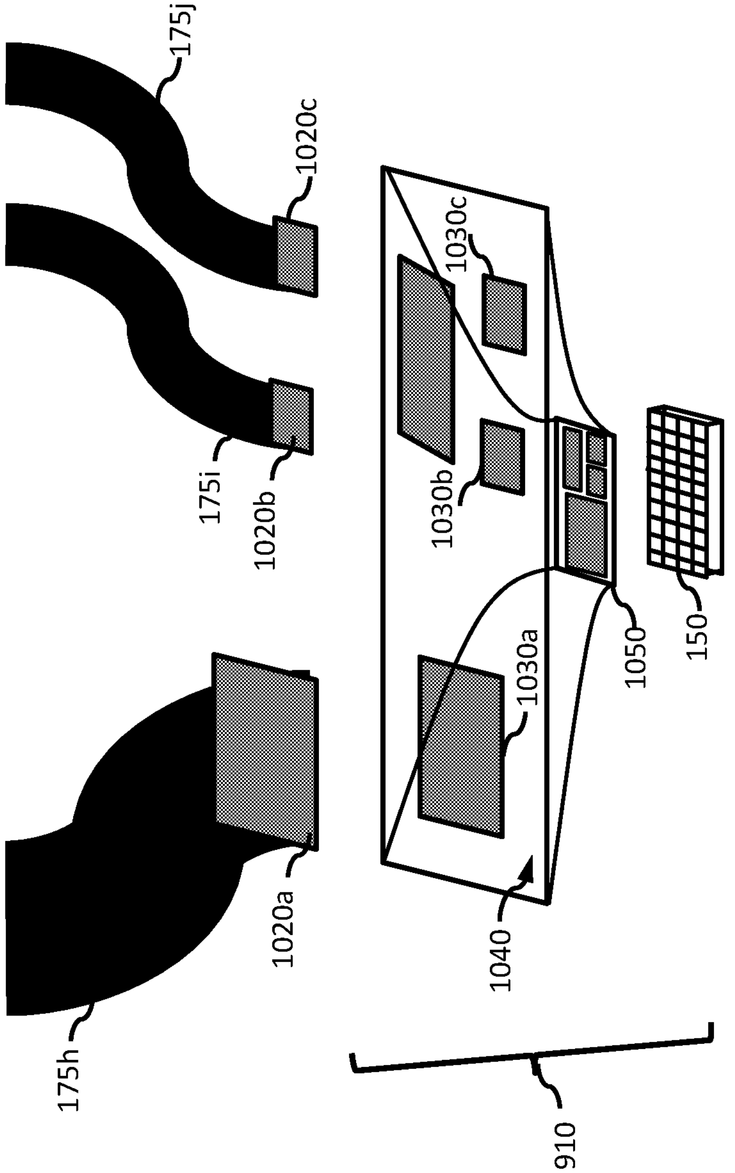
Figure 10B:
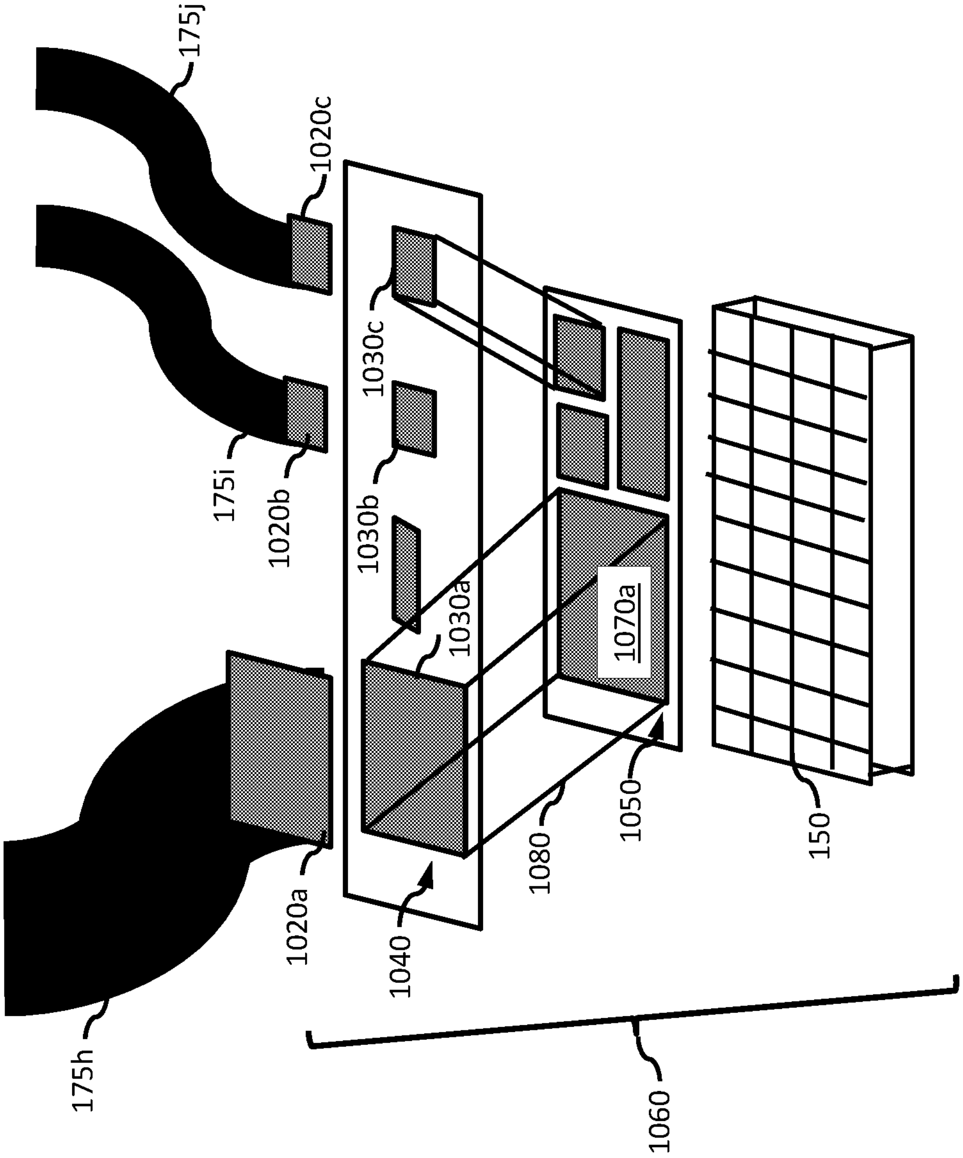

FIGS. 10A and 10B illustrate spatial FOV combiners, according to an embodiment of the present disclosure.

Figure 11:
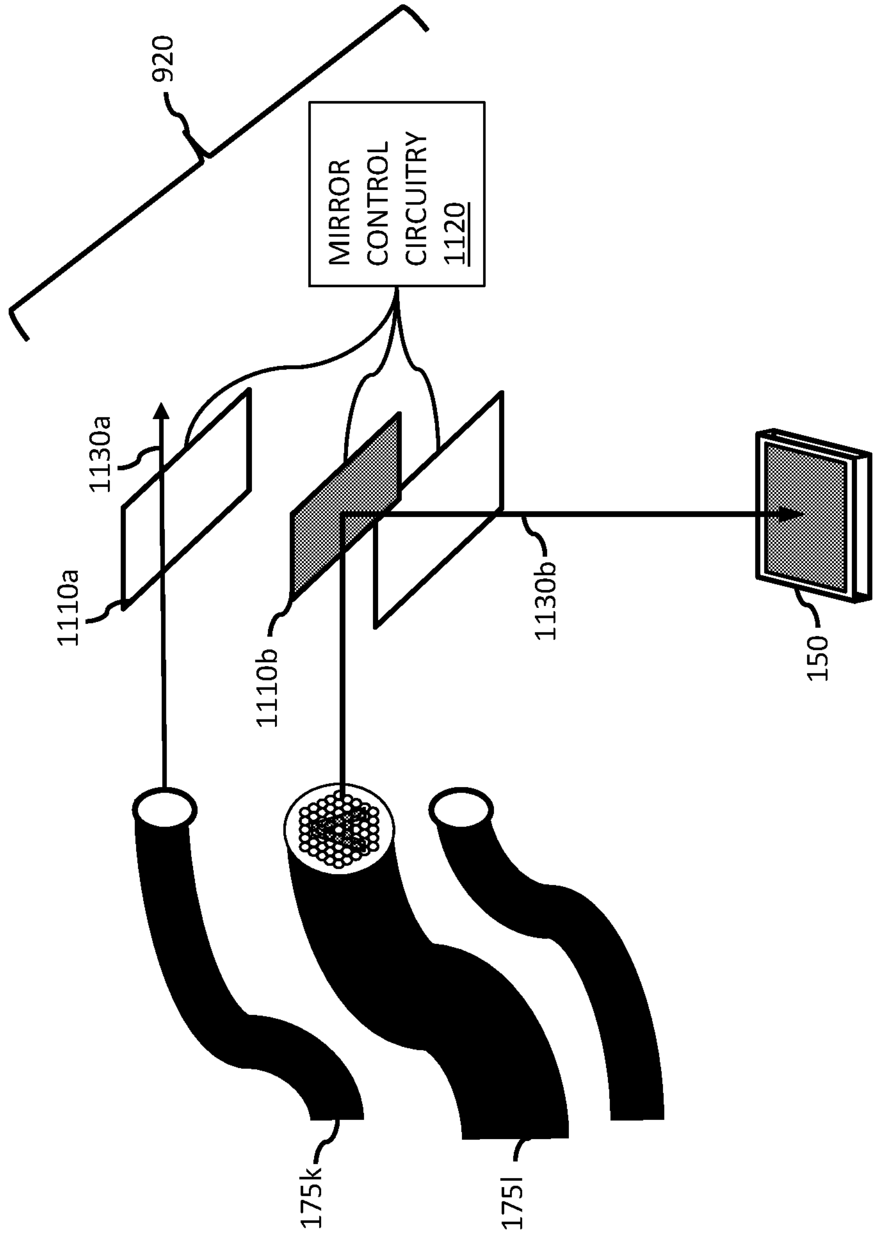

FIG. 11 illustrates a solid-state switchable mirror multiplexor, according to an embodiment of the present disclosure.

Figure 12:
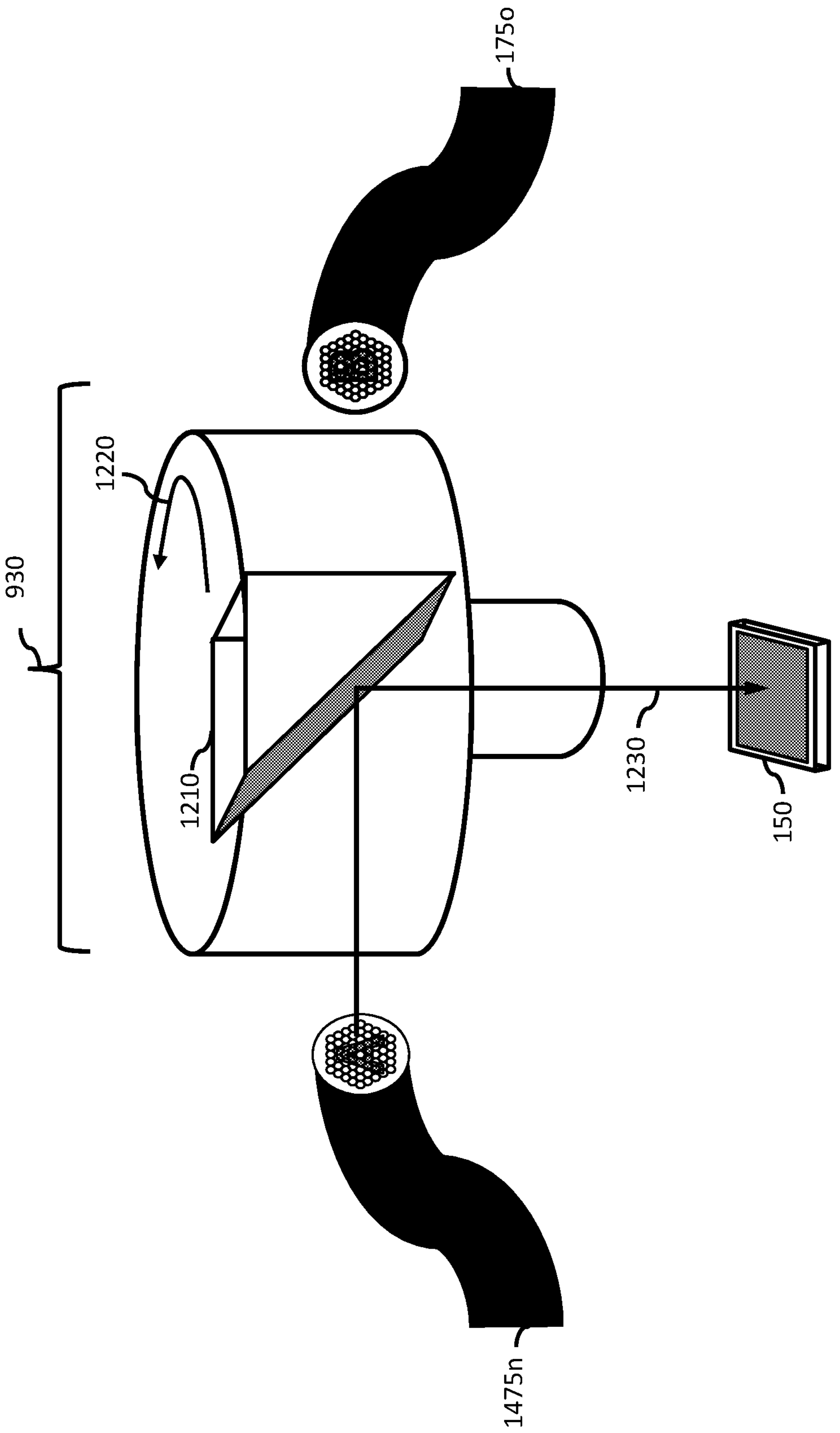

FIG. 12 illustrates a mechanical optical multiplexor operable to multiplex light reflections from a plurality of fiber optic image bundles according to an embodiment of the present disclosure.

Figure 13:
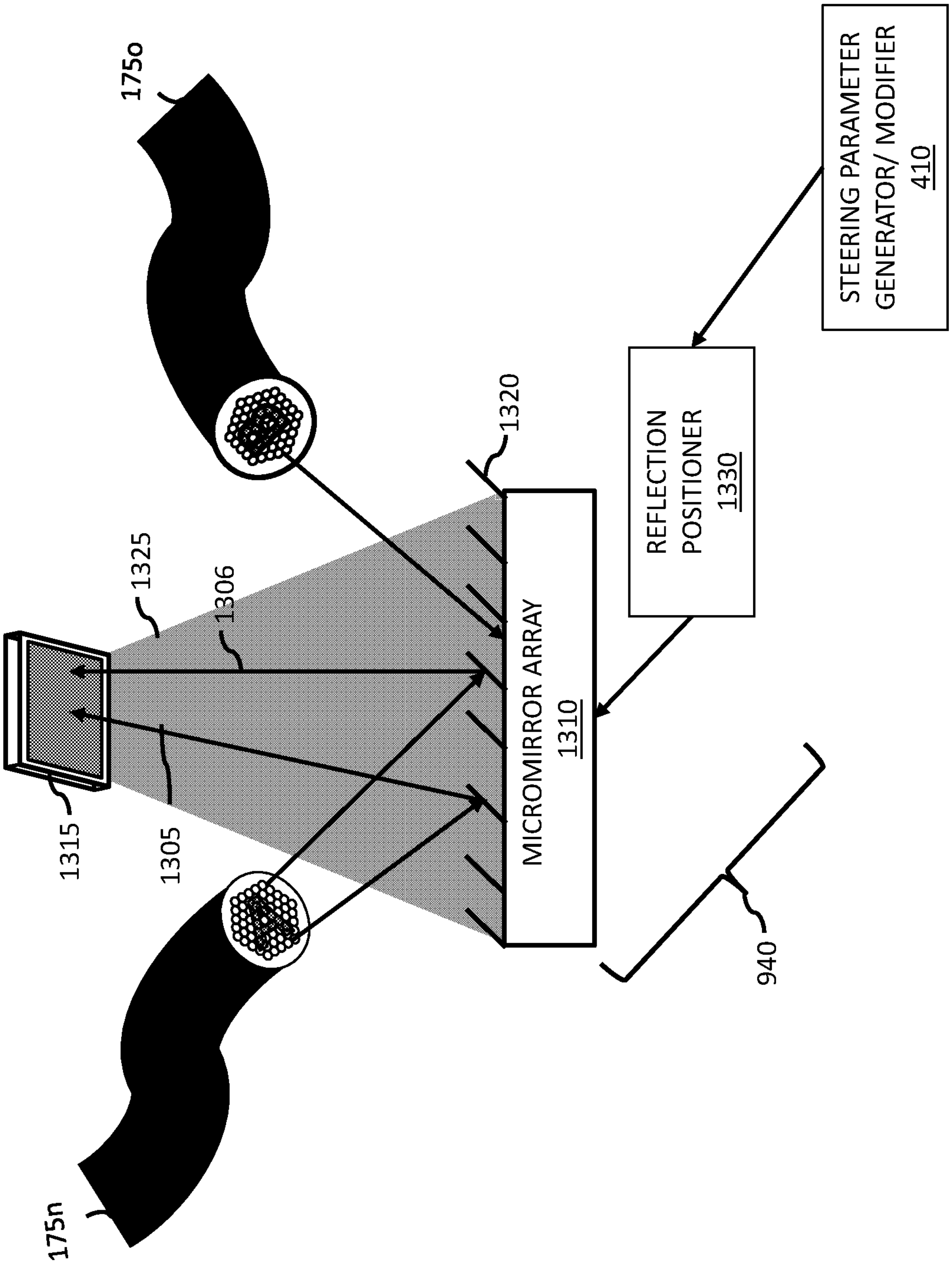

FIG. 13 illustrates a micromirror array multiplexor operable to multiplex laser reflections from a plurality of fiber optic image bundles onto a remote photodetector array, according to an embodiment of the present disclosure.

Figure 14A:
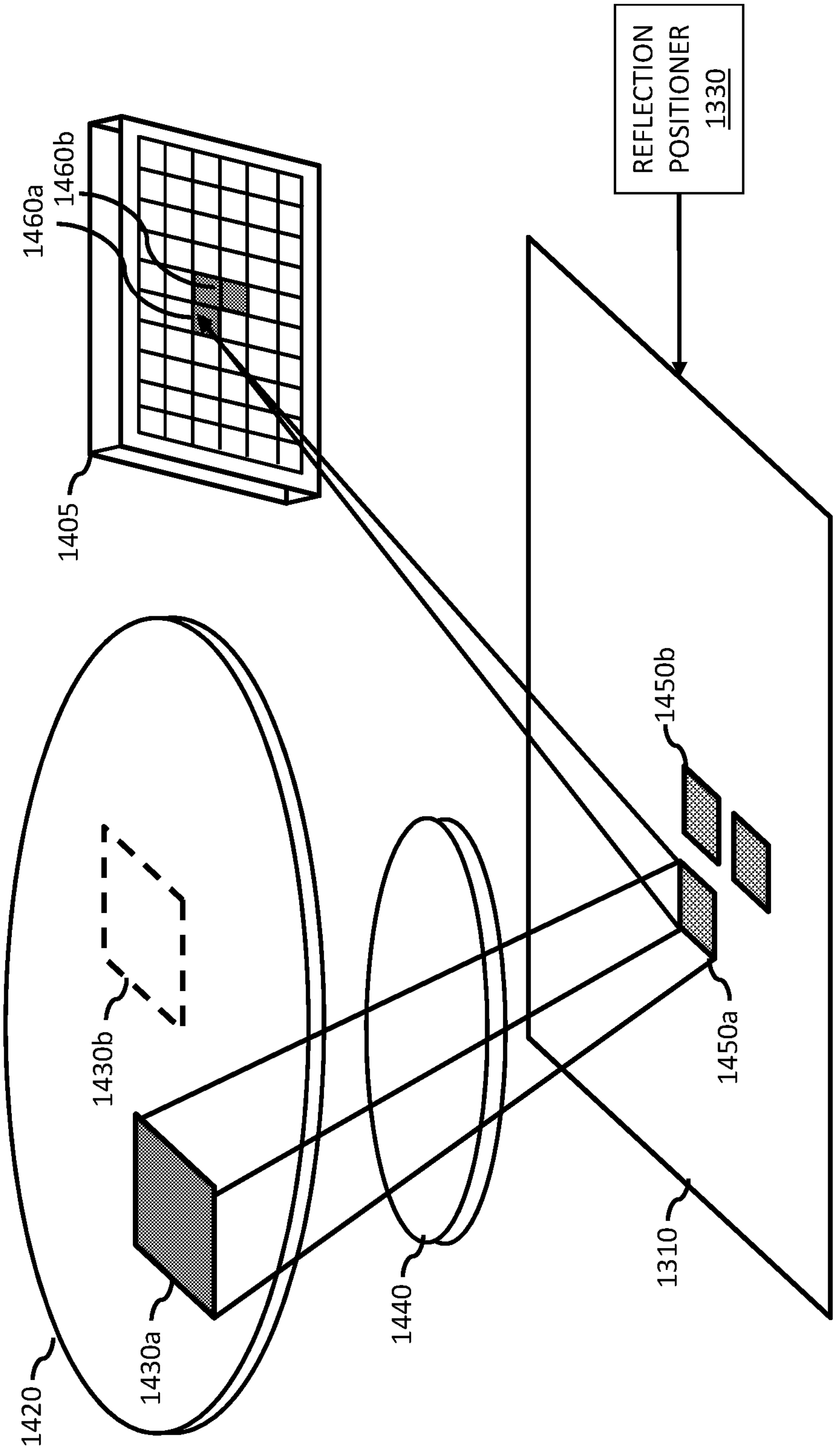

FIG. 14A illustrates a micromirror array operable to focus portions of a FOV onto a detector array according to an embodiment of the present disclosure.

Figure 14B:
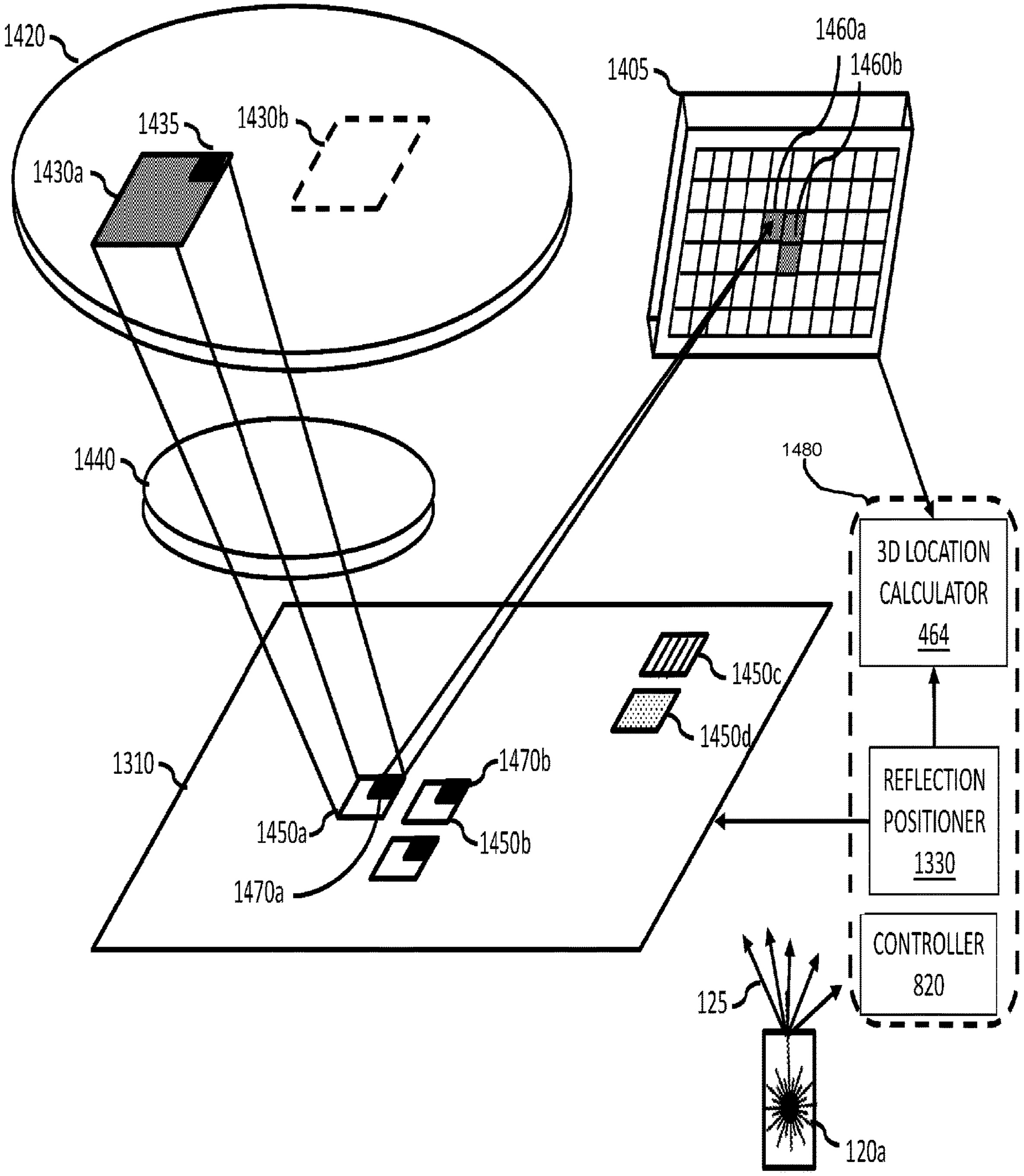

FIG. 14B illustrates a micromirror array operable to focus portions of a FOV onto a detector array according to an embodiment of the present disclosure.

Figure 15A:
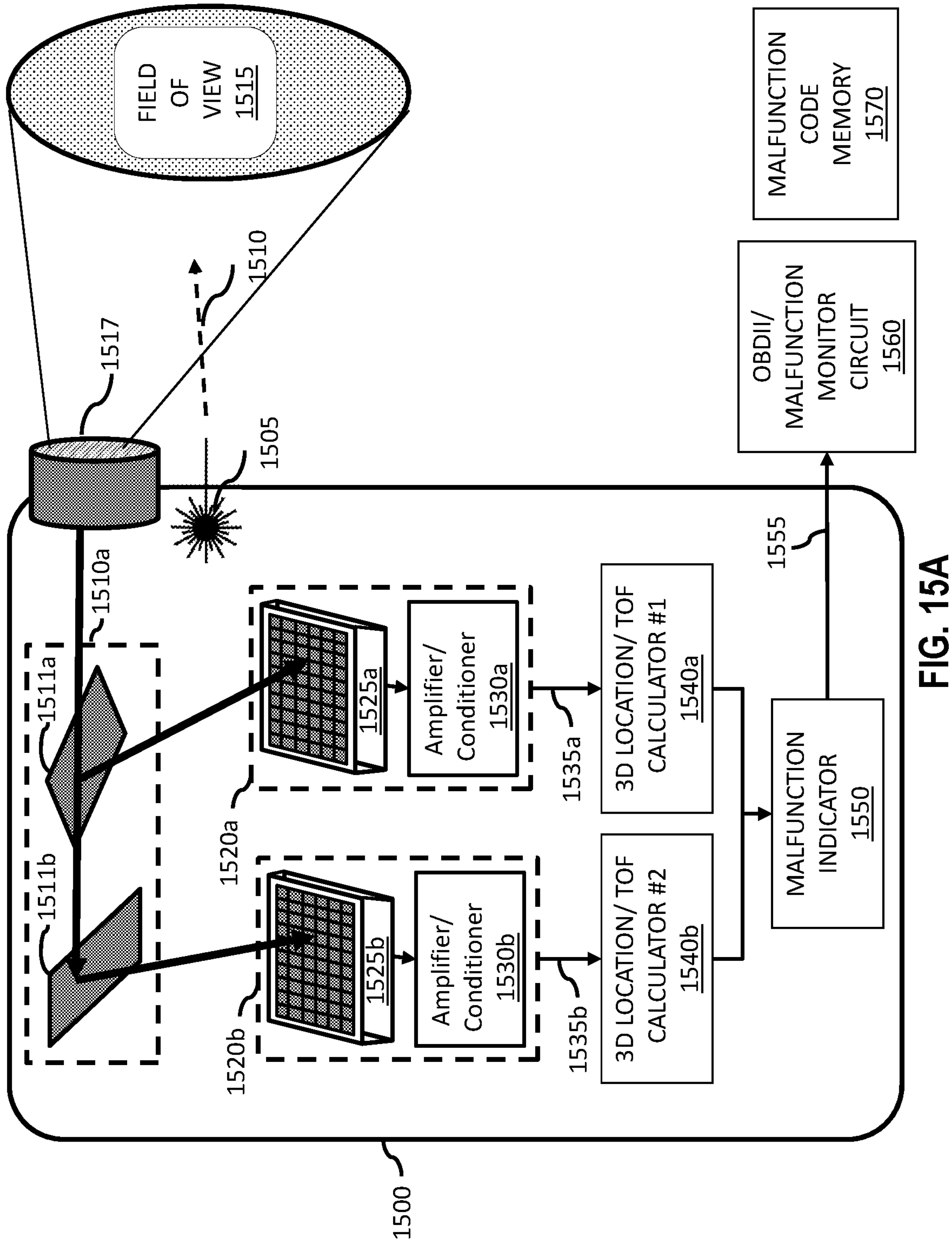

FIG. 15A illustrates a LIDAR system that directs light reflections to one of two detectors and comprises a malfunction indicator circuit, in accordance with an embodiment of the present disclosure.

Figure 15B:
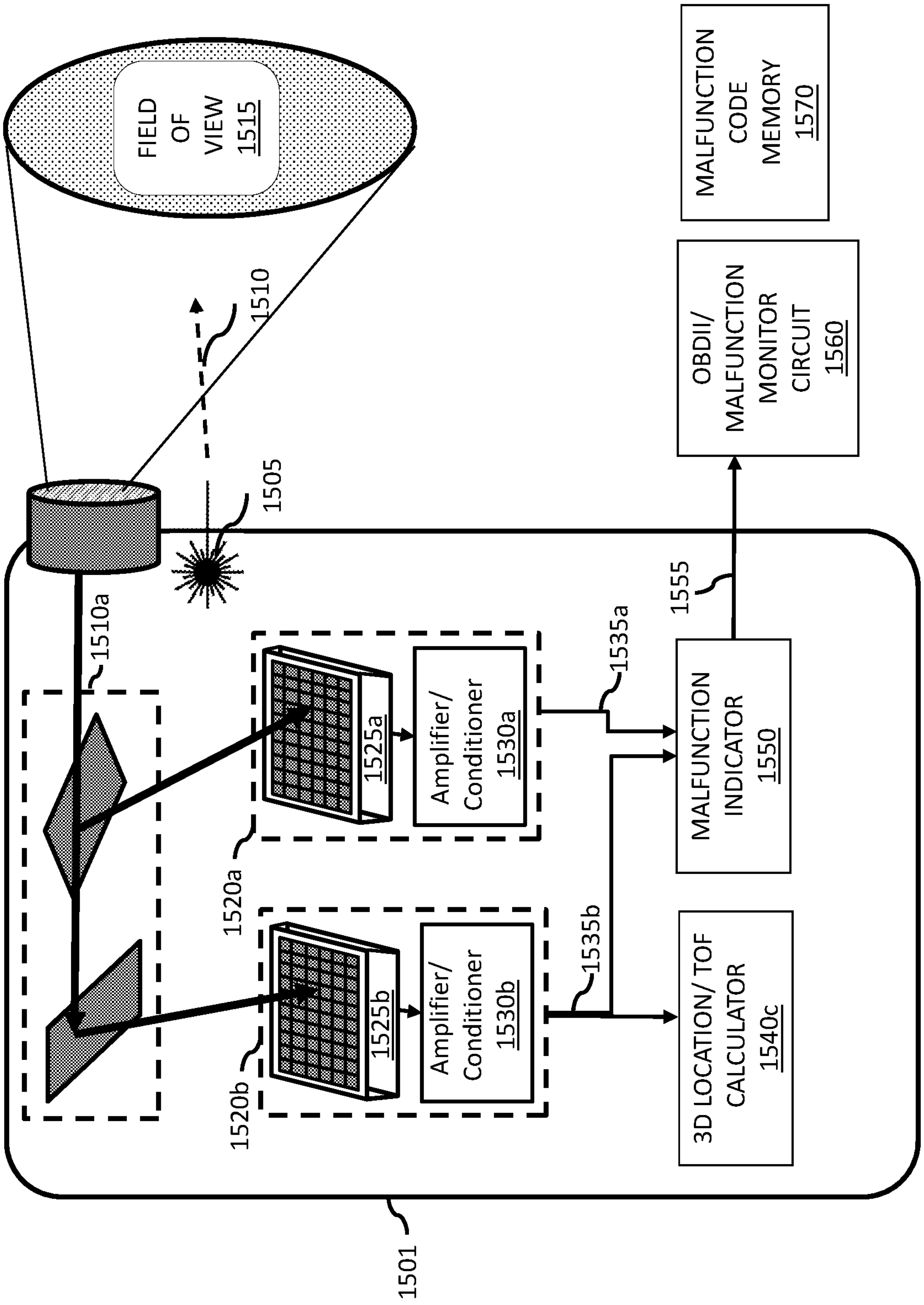

FIG. 15B illustrates a LIDAR system that directs light reflections to one of two detectors and comprises a malfunction indicator circuit, in accordance with an embodiment of the present disclosure.

Figure 15C:
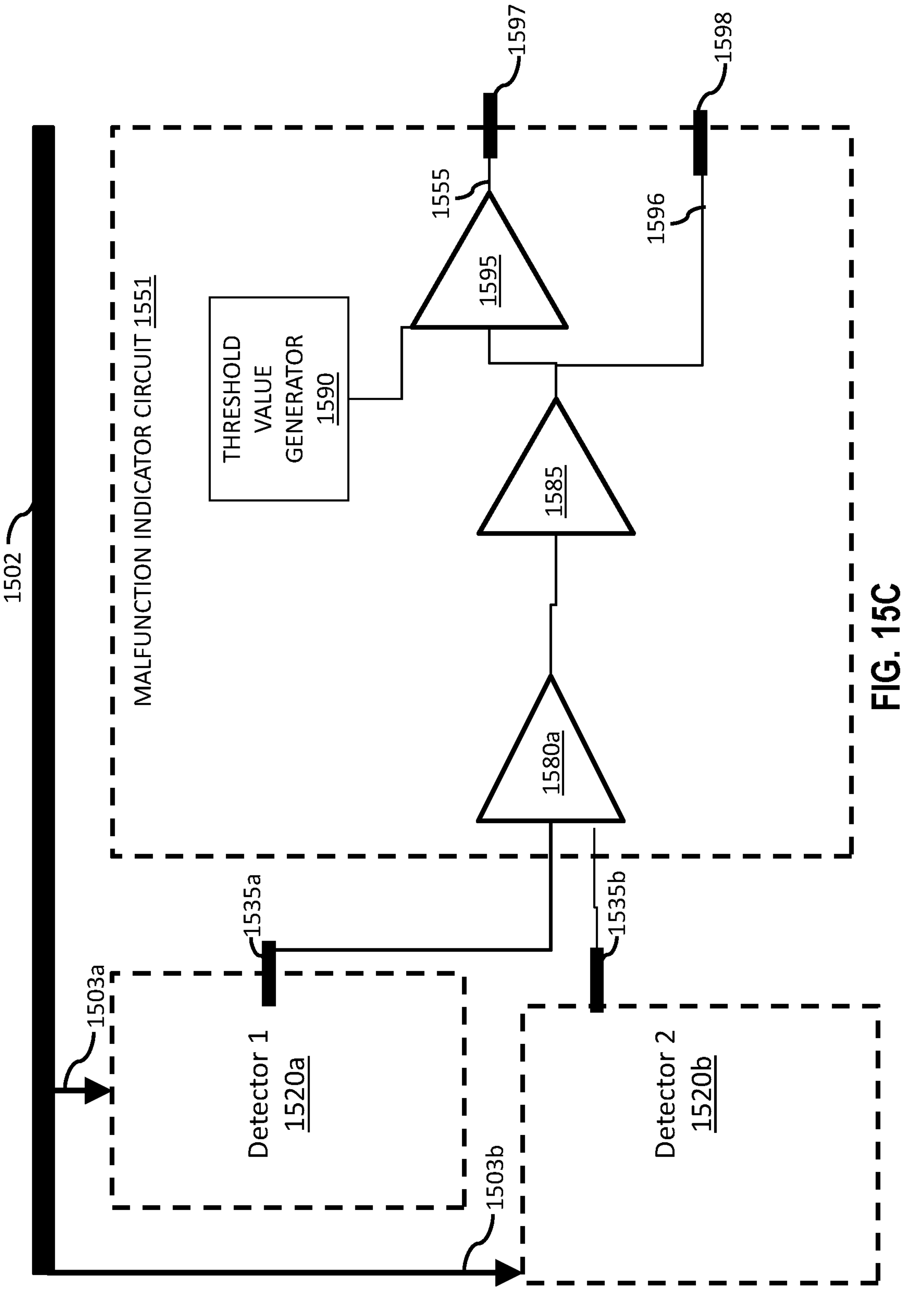
Figure 15D:
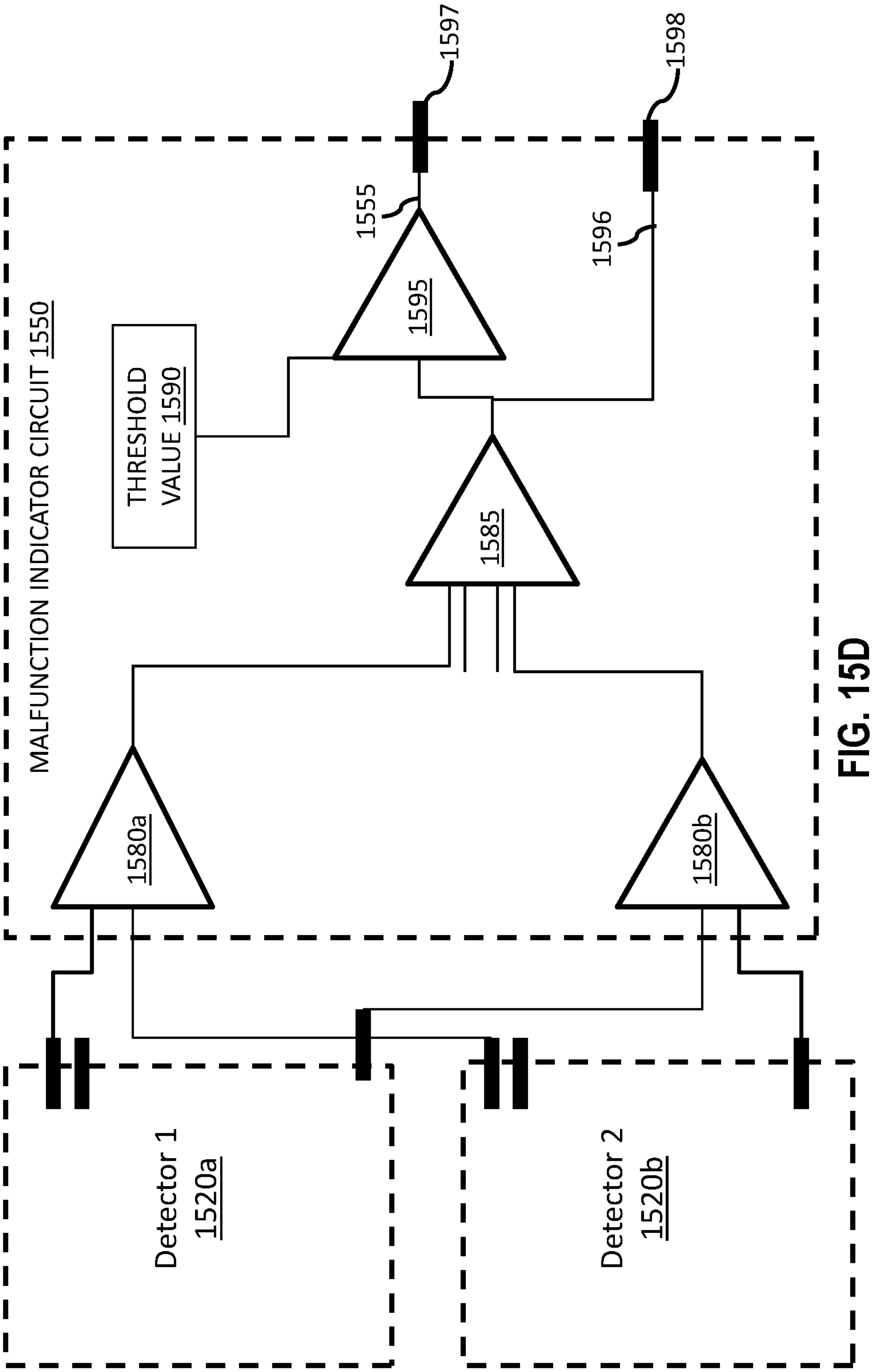

FIGS. 15C and 15D illustrate exemplary malfunction indicator circuits, in accordance with an embodiment of the present disclosure.

Figure 16:
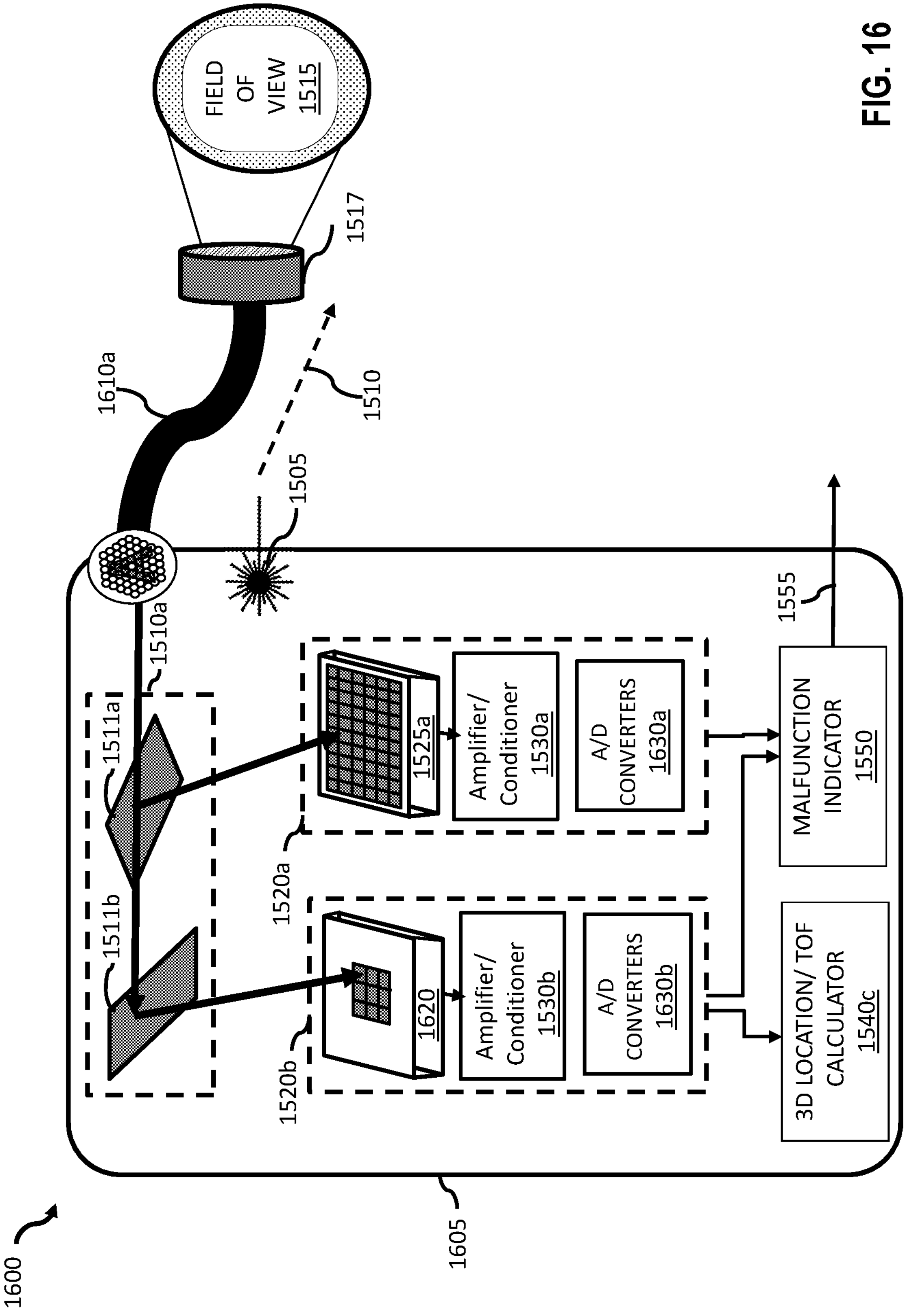

FIG. 16 illustrates several components of a failsafe LIDAR system including a coherent fiber optic image bundle that transfers light reflections from a FOV, in accordance with an embodiment of the present disclosure.

Figure 17A:
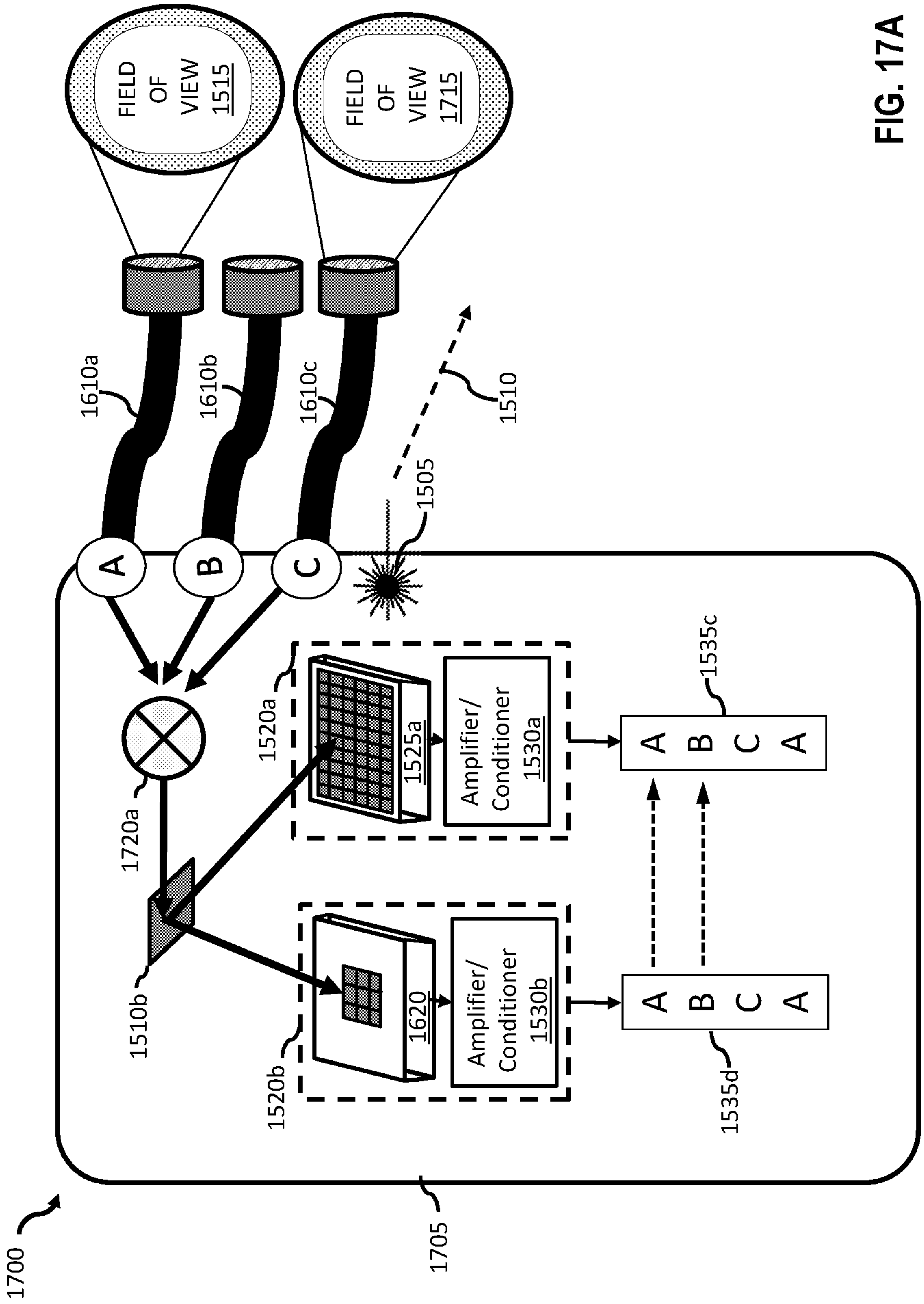

FIG. 17A illustrates several components of a failsafe LIDAR system including a FOV combiner and several coherent fiber optic image bundles, in accordance with an embodiment of the present disclosure.

Figure 17B:
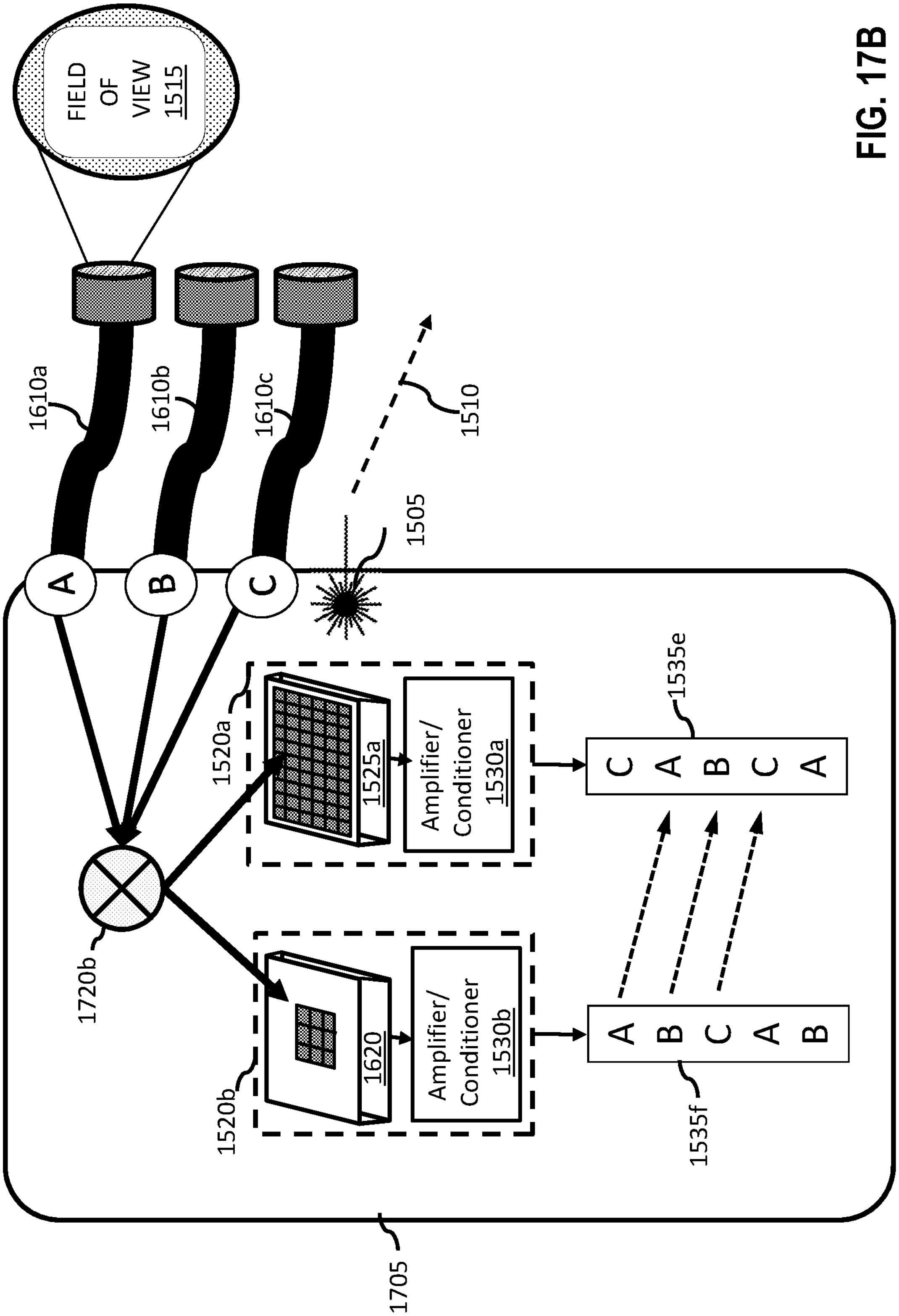

FIG. 17B illustrates several components of a failsafe LIDAR system including a FOV combiner and several coherent fiber optic image bundles, in accordance with an embodiment of the present disclosure.

Figure 18:
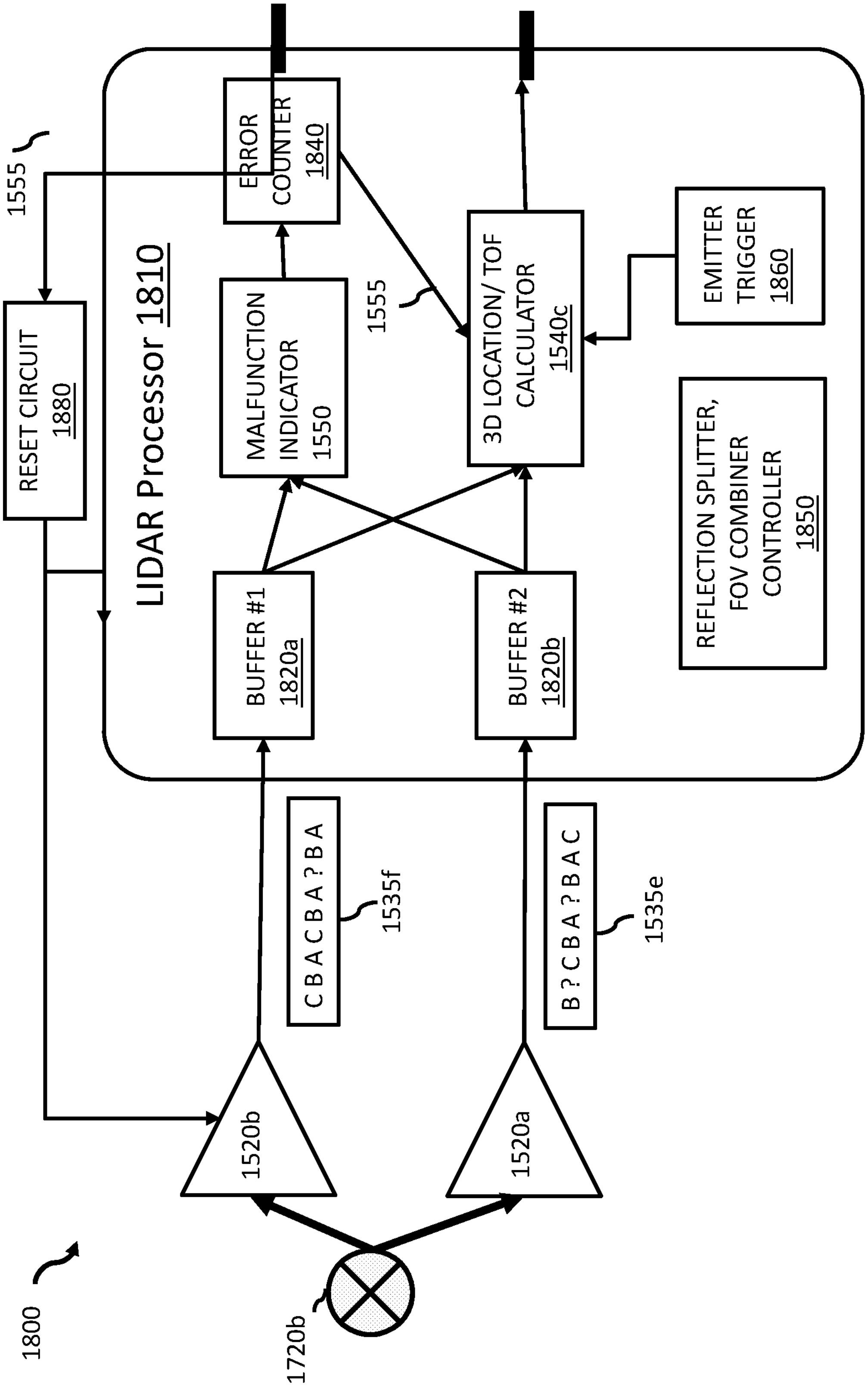

FIG. 18 illustrates several components of a failsafe LIDAR system, in accordance with an embodiment of the present disclosures.

Figure 19A:
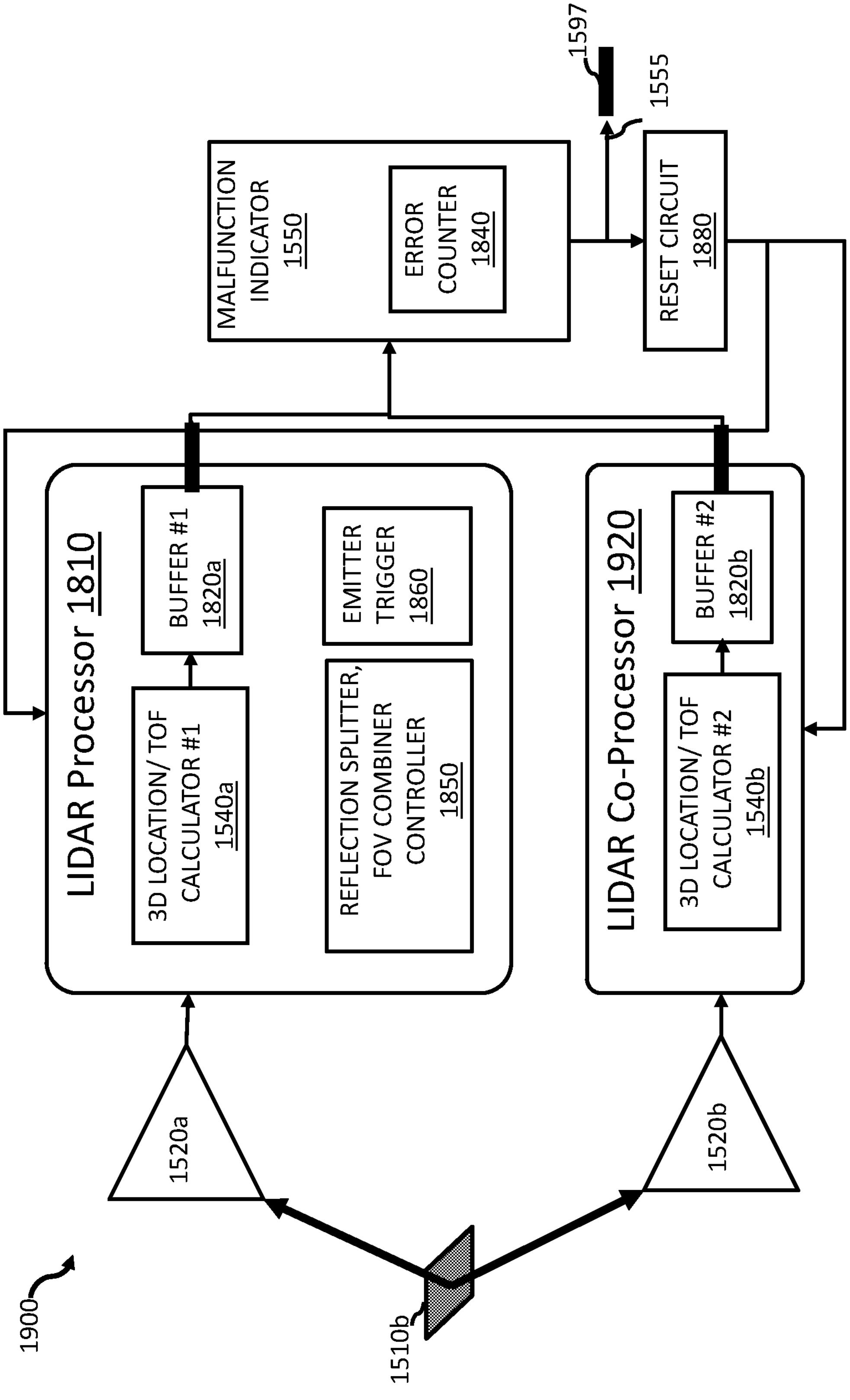
Figure 19B:
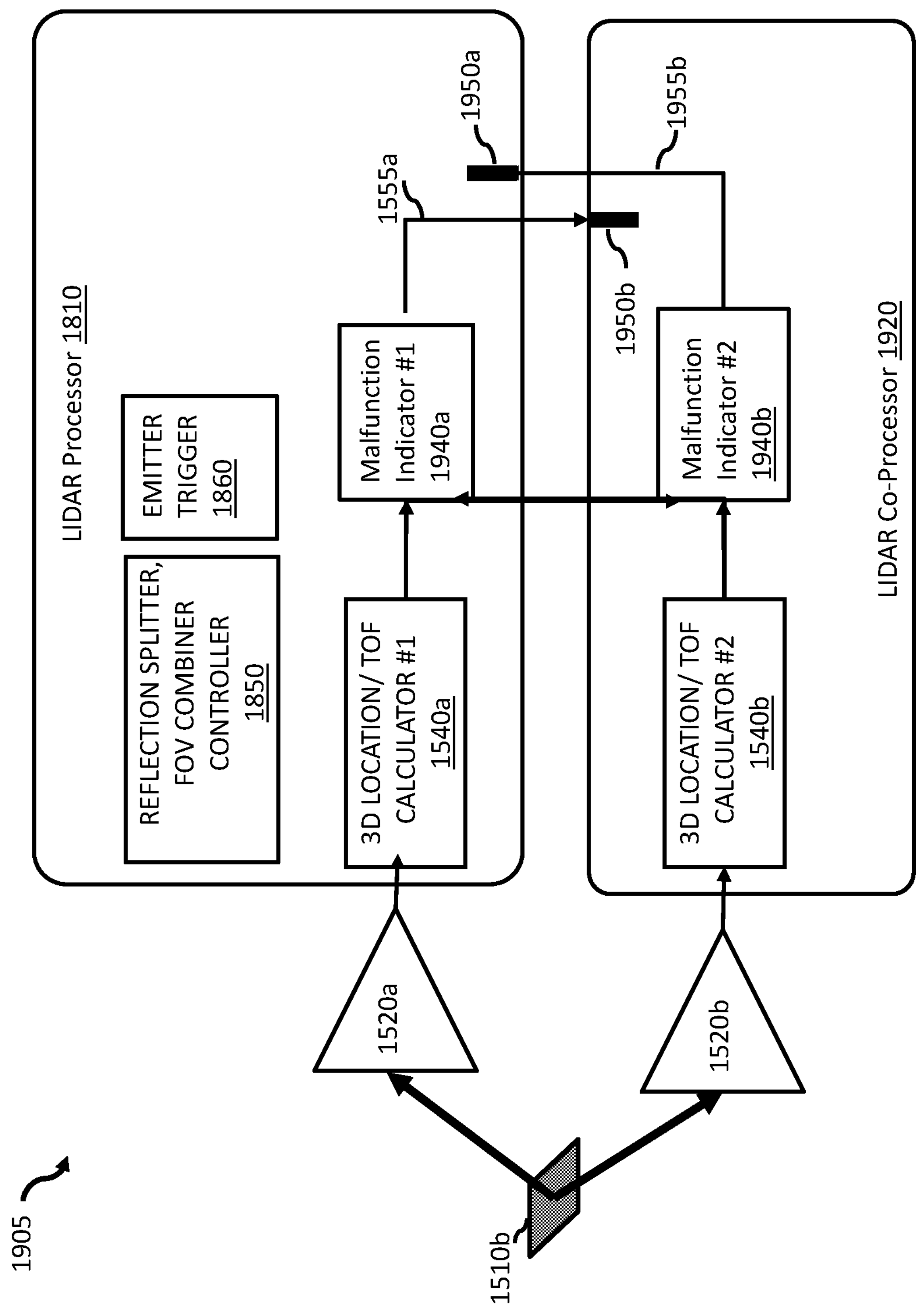

FIGS. 19A and 19B illustrate several components of a failsafe LIDAR system, in accordance with an embodiment of the present disclosures.

Figure 20:
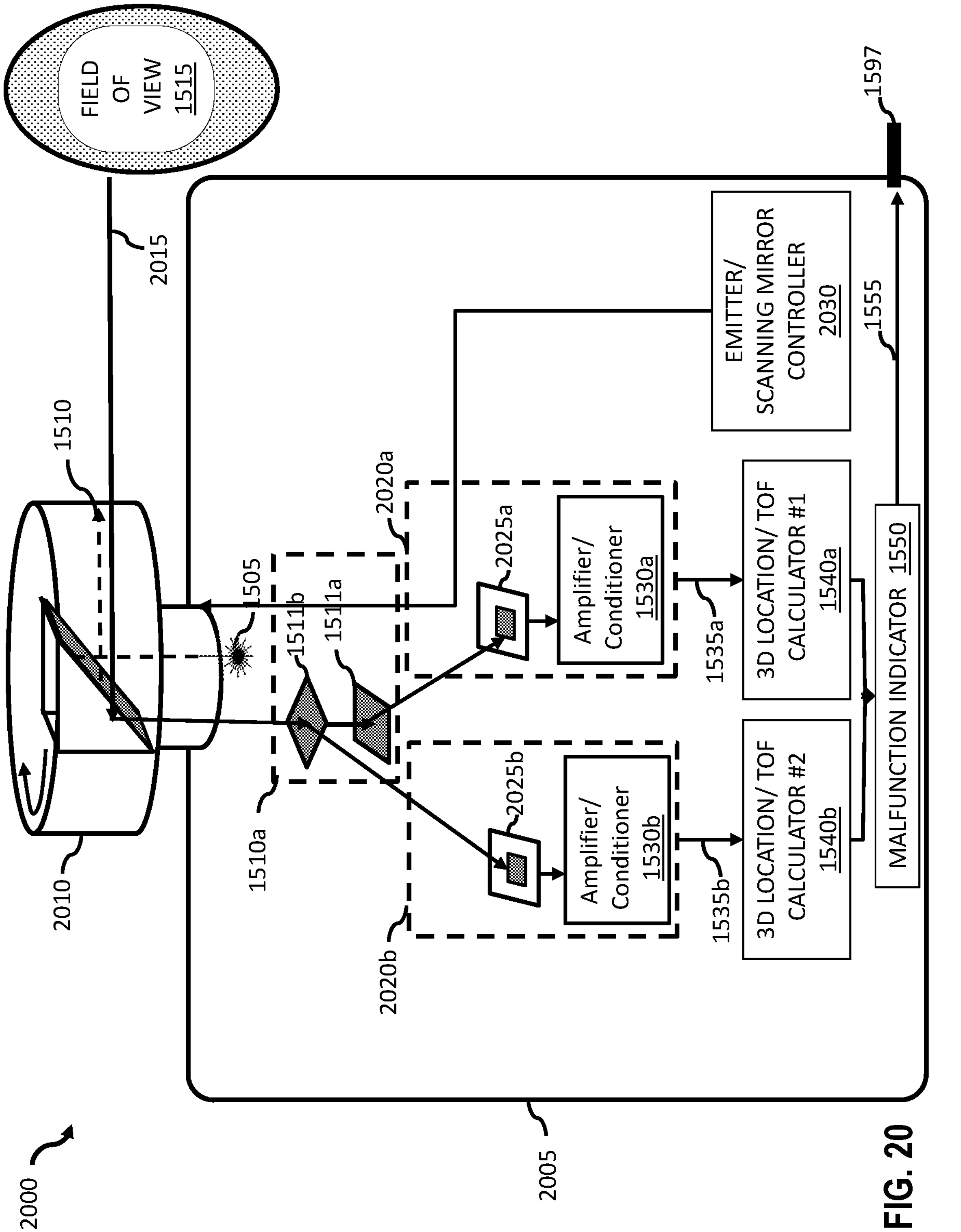

FIG. 20 illustrates several components of a failsafe LIDAR system with a mechanical scanning mirror, in accordance with an embodiment of the present disclosures.

Figure 21:
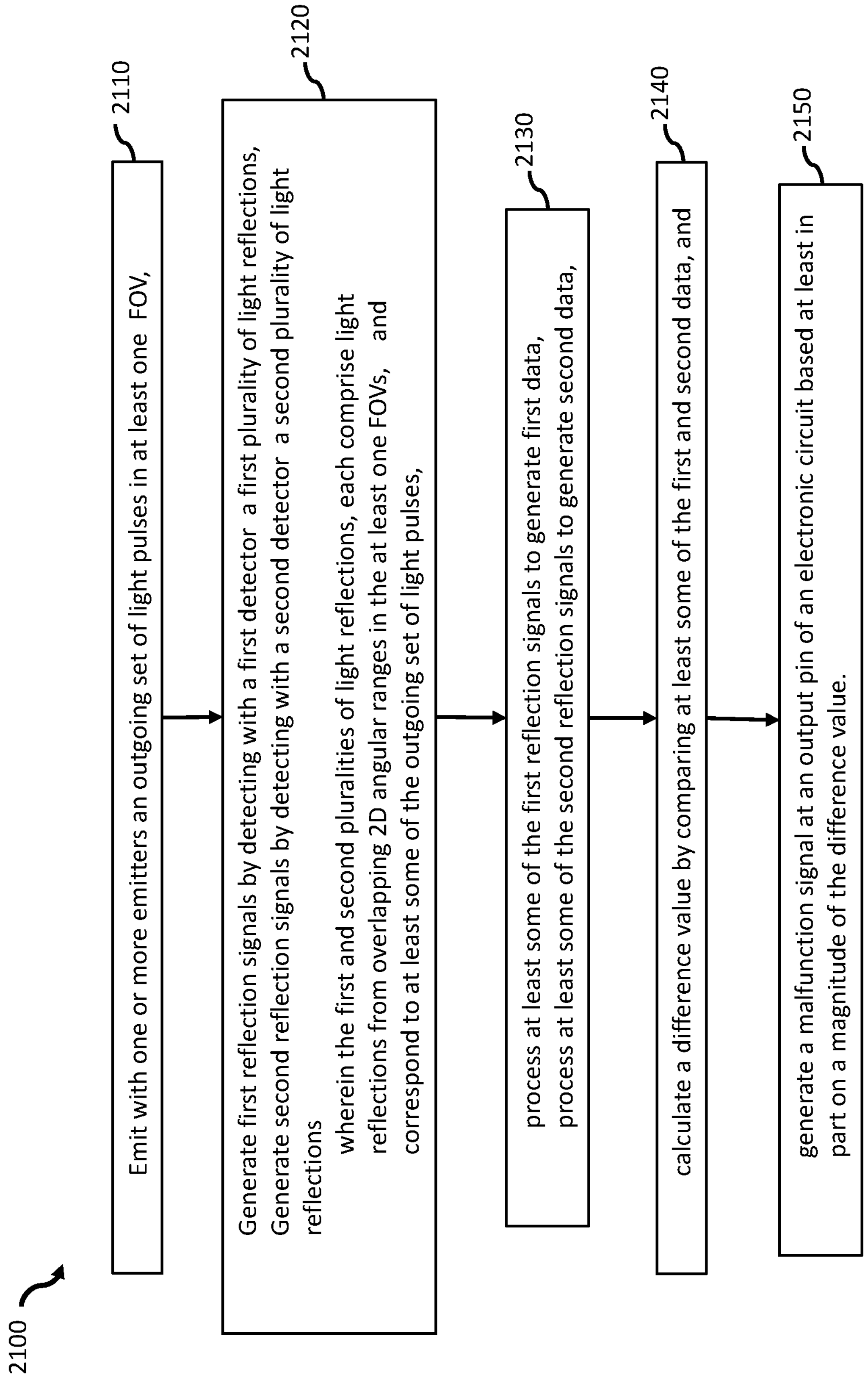

FIG. 21 is a flow diagram illustrating a method for generating a malfunction signal using two detectors in a light-based range finding system.

Figure 22:
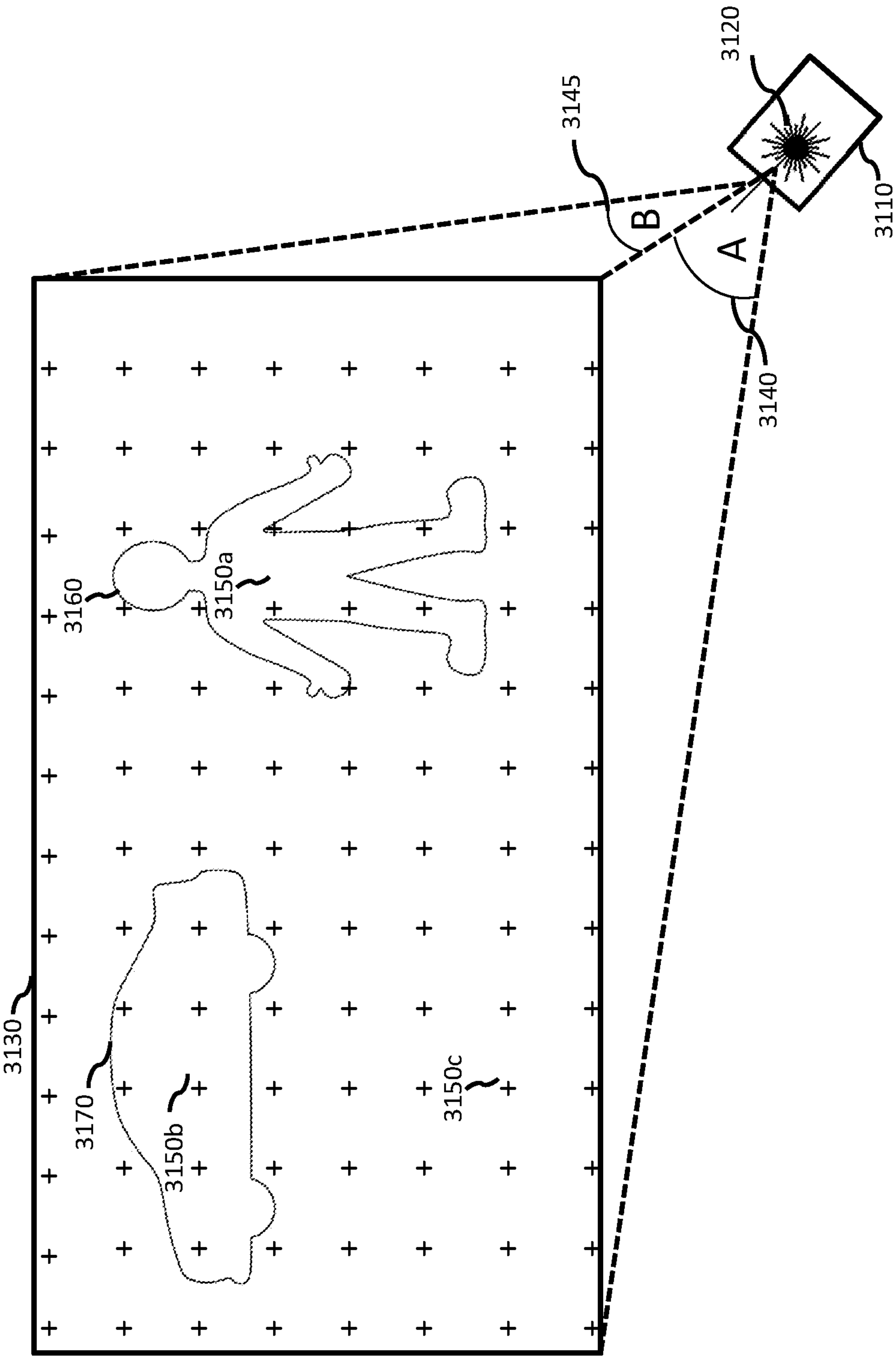

FIG. 22 is an exemplary diagram of a laser range finder and a plurality of laser pulse locations in a field of view, according to an embodiment of the present disclosure.

FIG. 23A-23E are exemplary diagrams of a laser range finder and a plurality of laser pulse locations in a field of view, according to an embodiment of the present disclosure.

Figure 24:
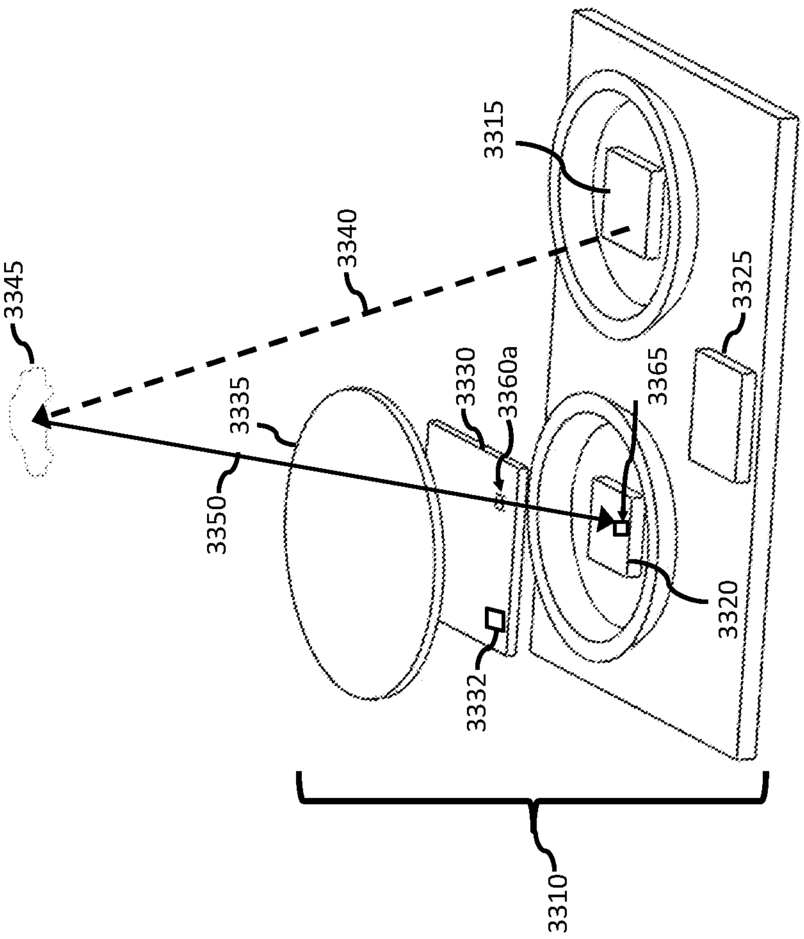

FIG. 24 illustrates several components of a solid state laser range finder, according to an embodiment of the present disclosure.

Figure 25A:
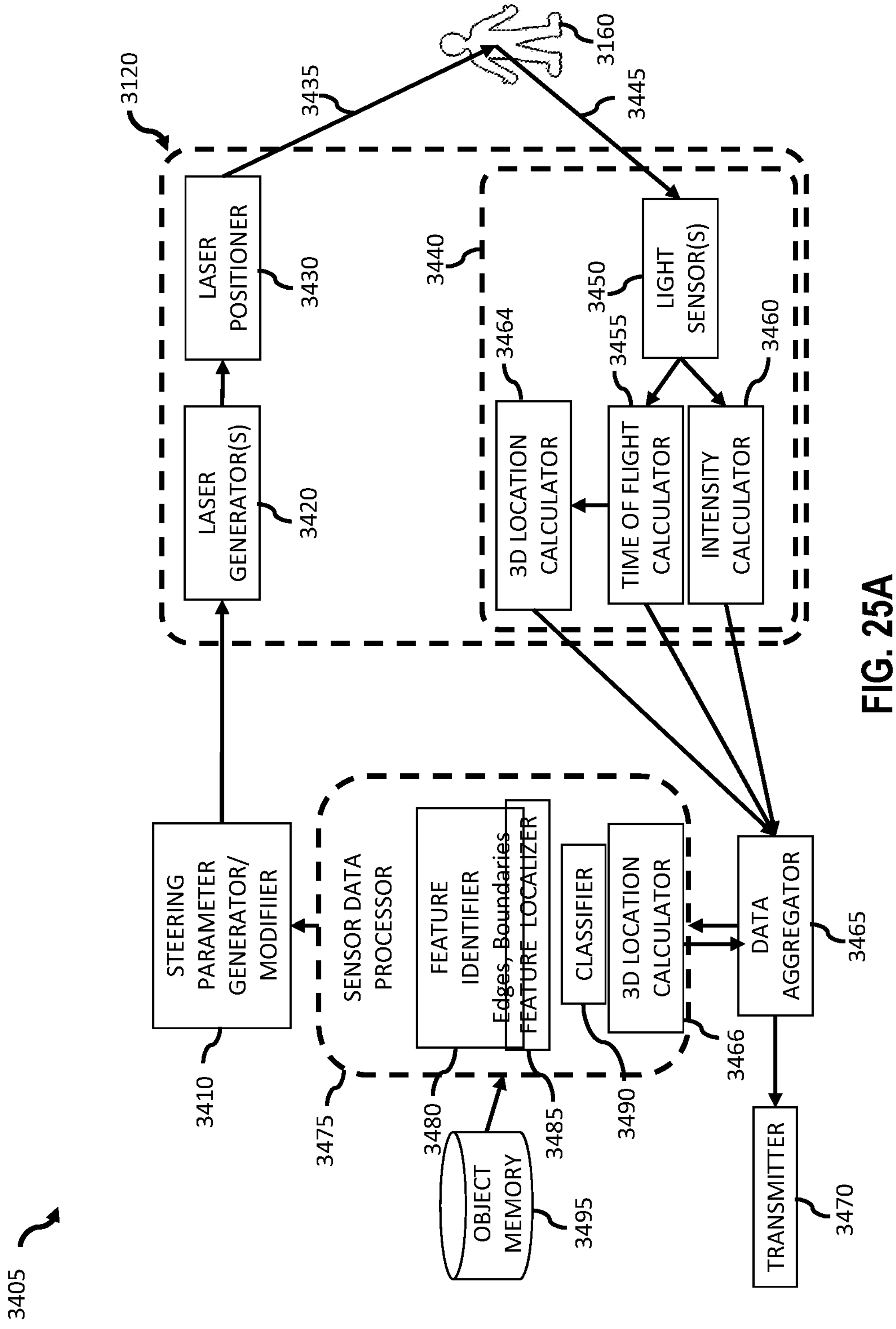
Figure 25B:
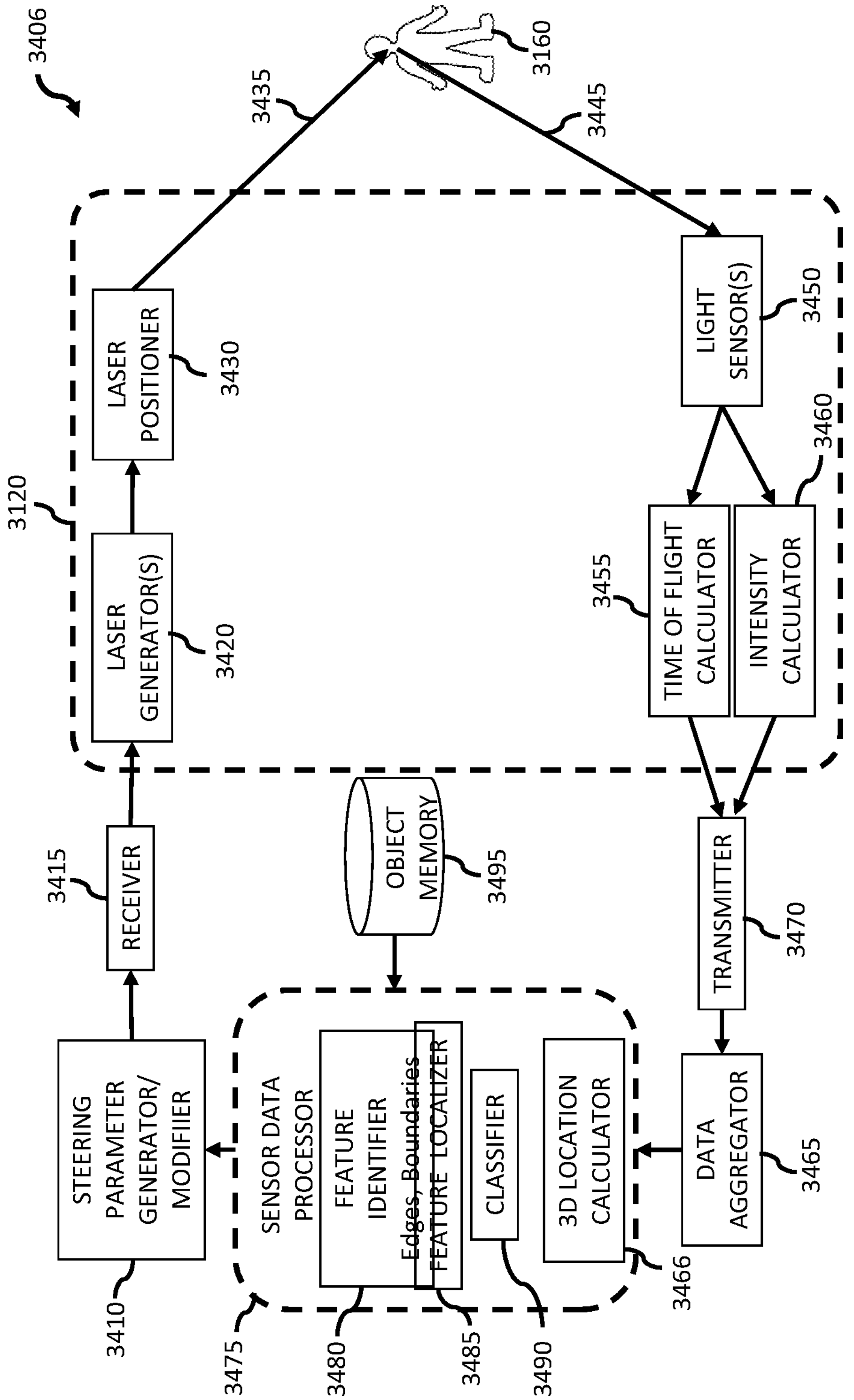

FIGS. 25A and 25B are functional diagrams illustrating several components of an exemplary dynamically steerable laser range finder in accordance with an embodiment of the present disclosure.

FIG. 26A illustrates an exemplary laser range finding system including a processing subassembly and a steerable laser assembly connected by a communication link, according to an embodiment of the present disclosure.

FIGS. 26B and 26C illustrate exemplary laser steering parameters according to an aspect of the technology.

Figure 27A:
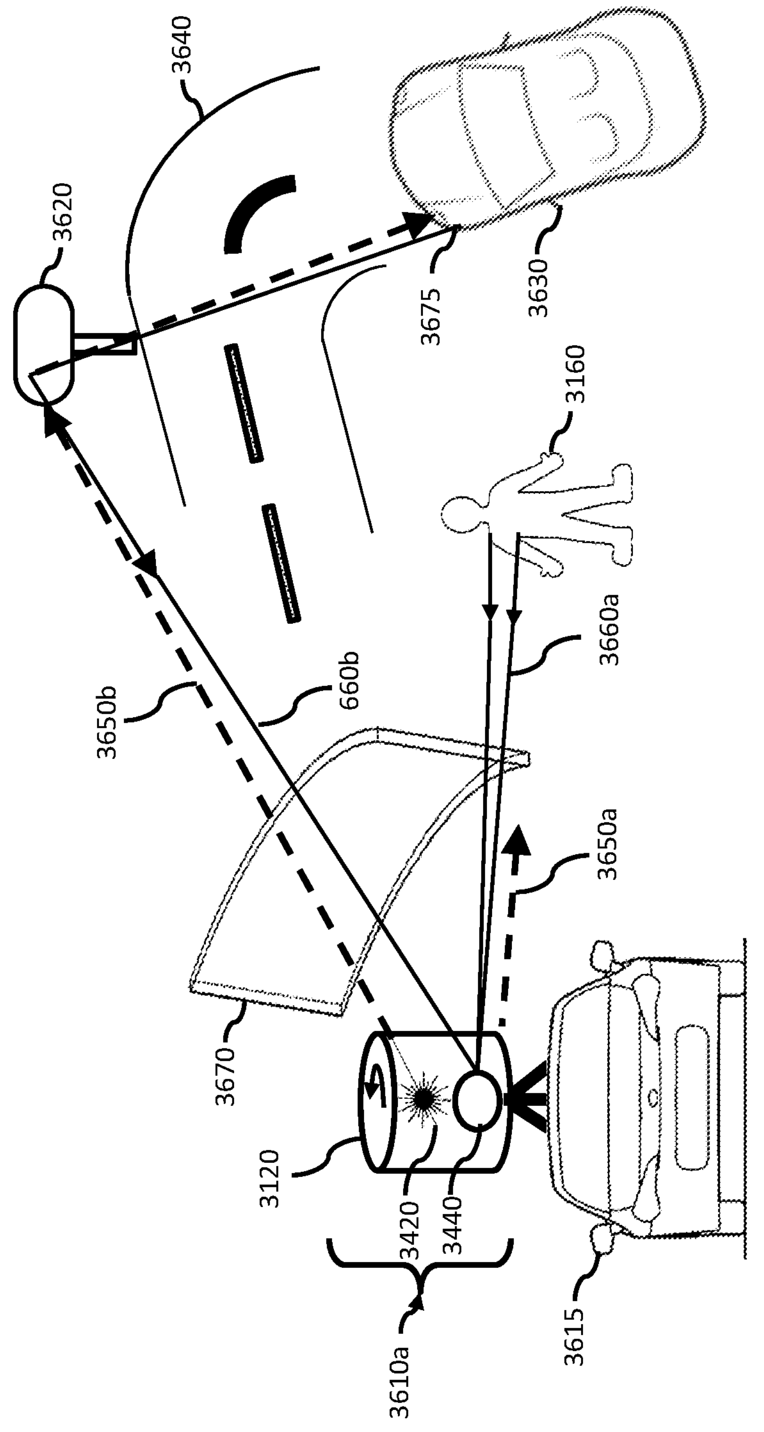
Figure 27B:
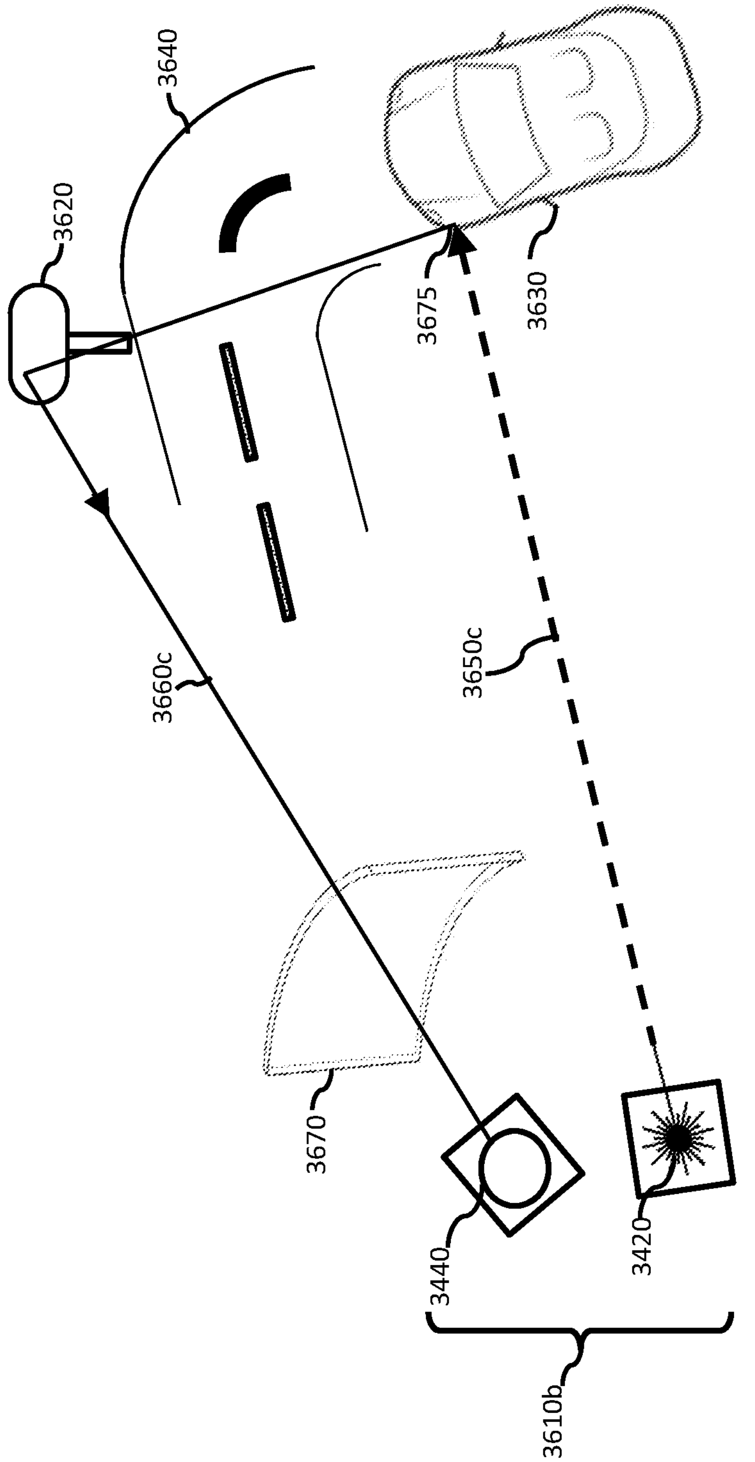
Figure 27C:
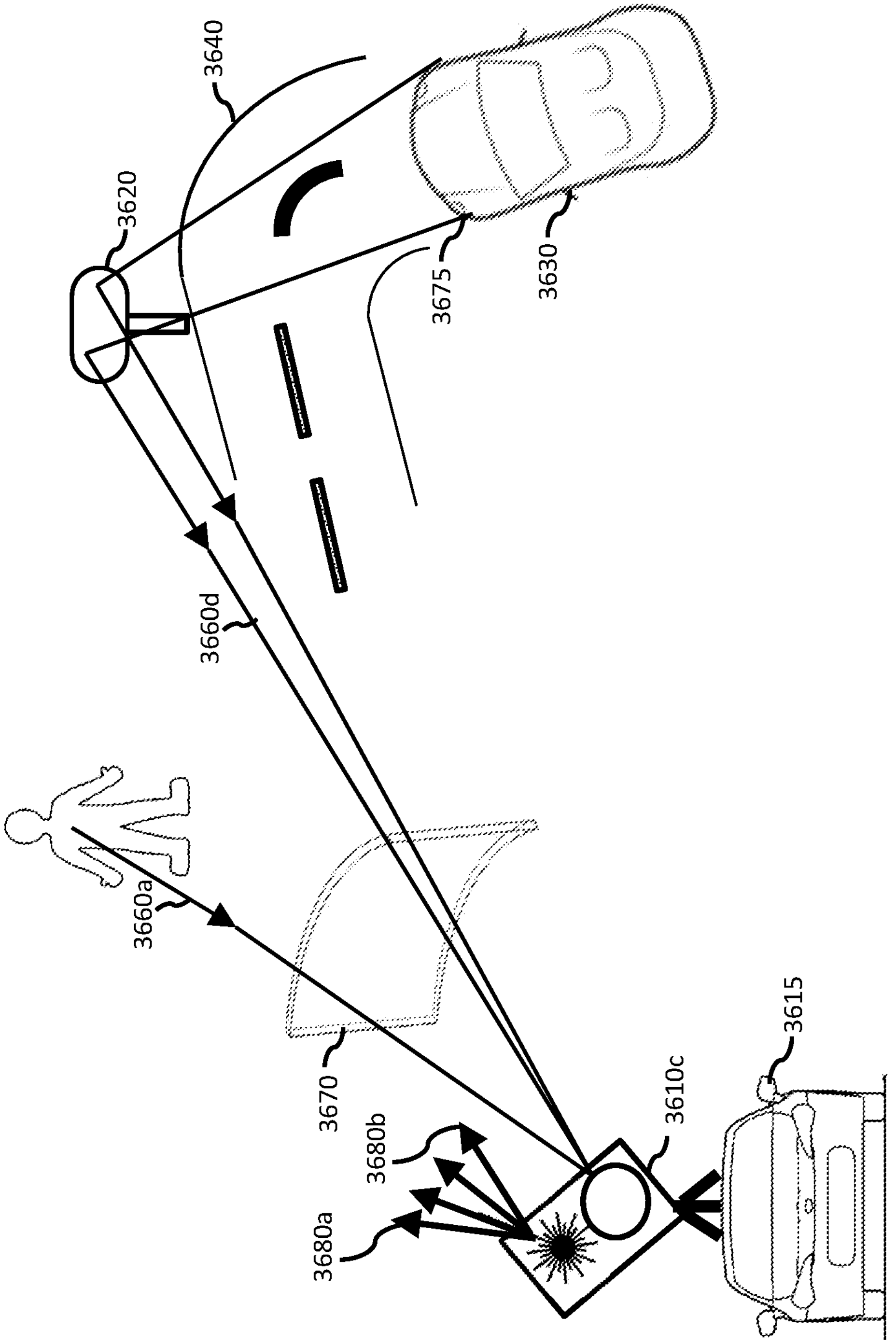

FIGS. 27A, 27B and 27C illustrate systems in which a laser range finder utilizes a remote mirror in the FOV to provide some of laser reflections, according to embodiments of the present disclosure.

Figure 28A:
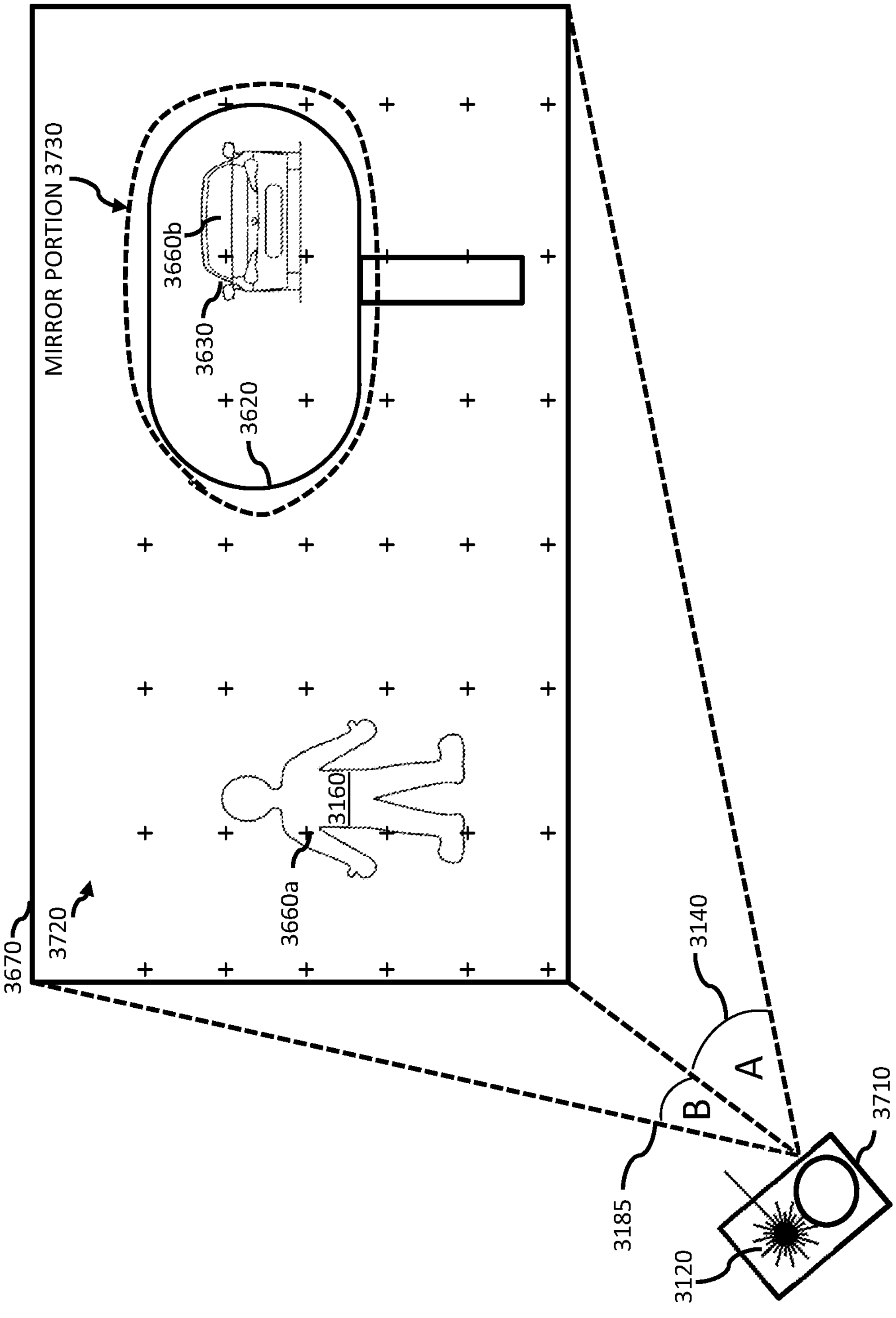
Figure 28B:
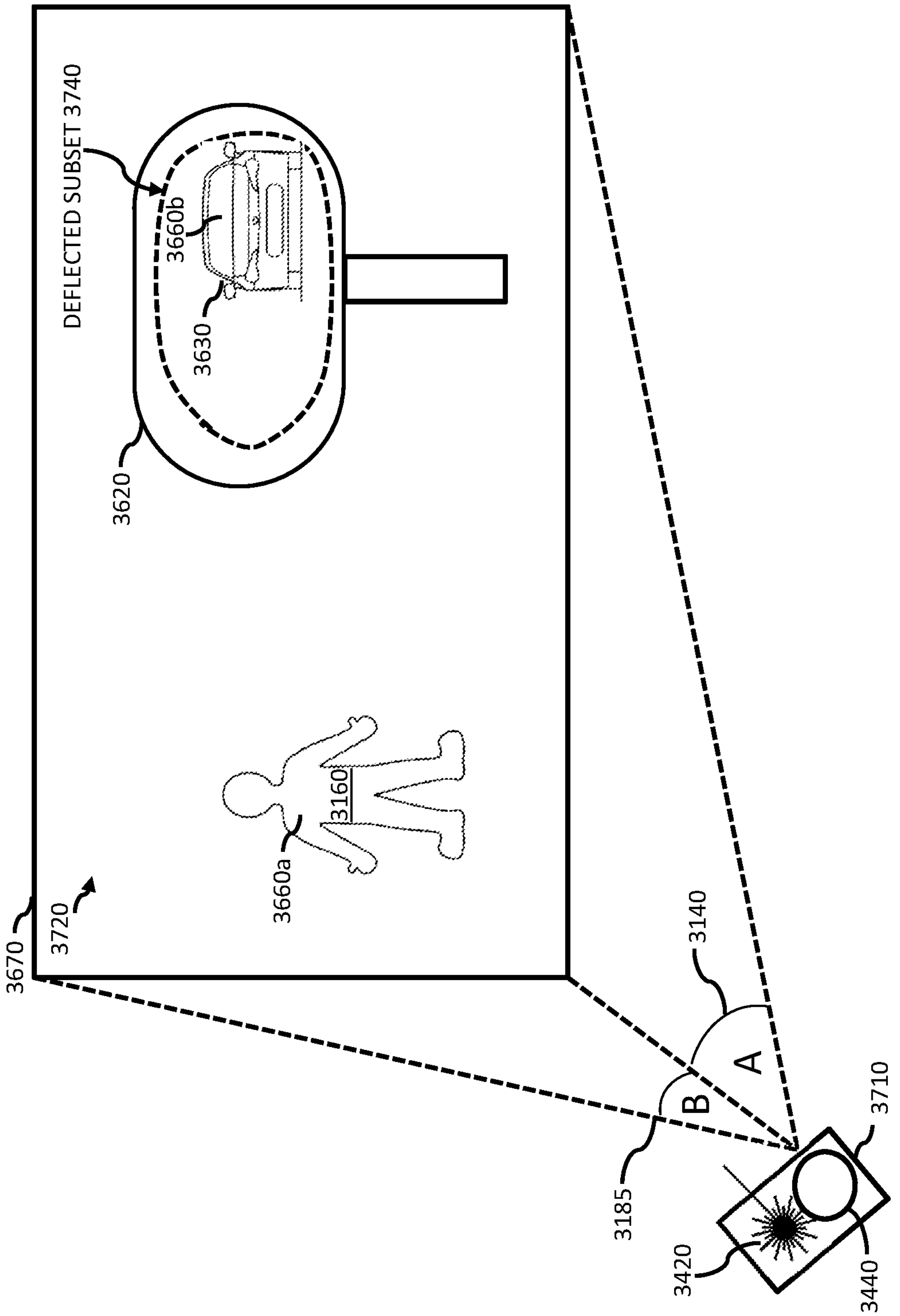

FIGS. 28A and 28B illustrate a laser range finder and an associated FOV that contains a remote mirror, according to aspects of the present technology.

Figure 29:
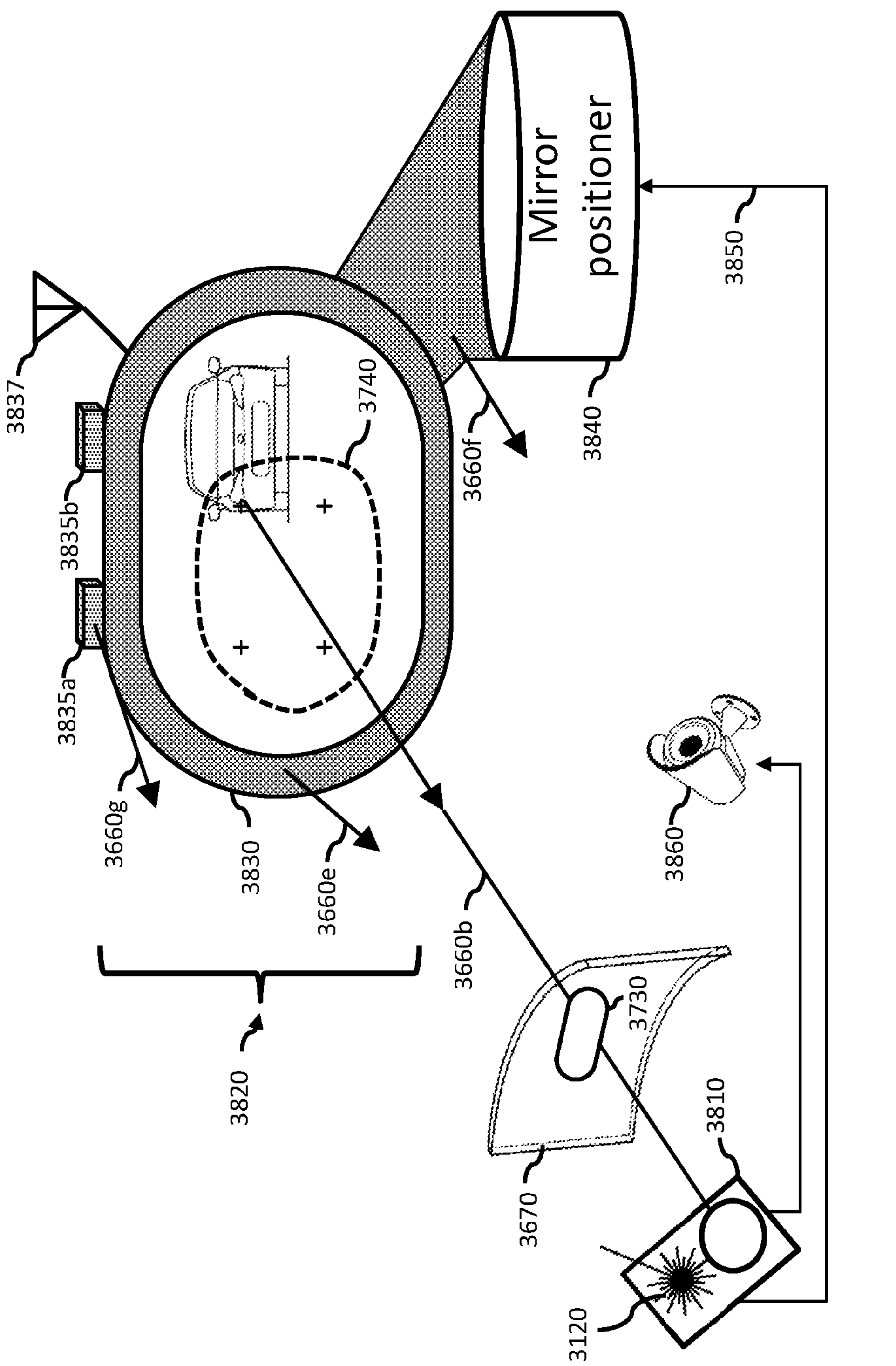

FIG. 29 illustrates several components operable to estimate the location of a remote mirror by a laser range finder accord to aspects of the present technology.

Figure 30A:
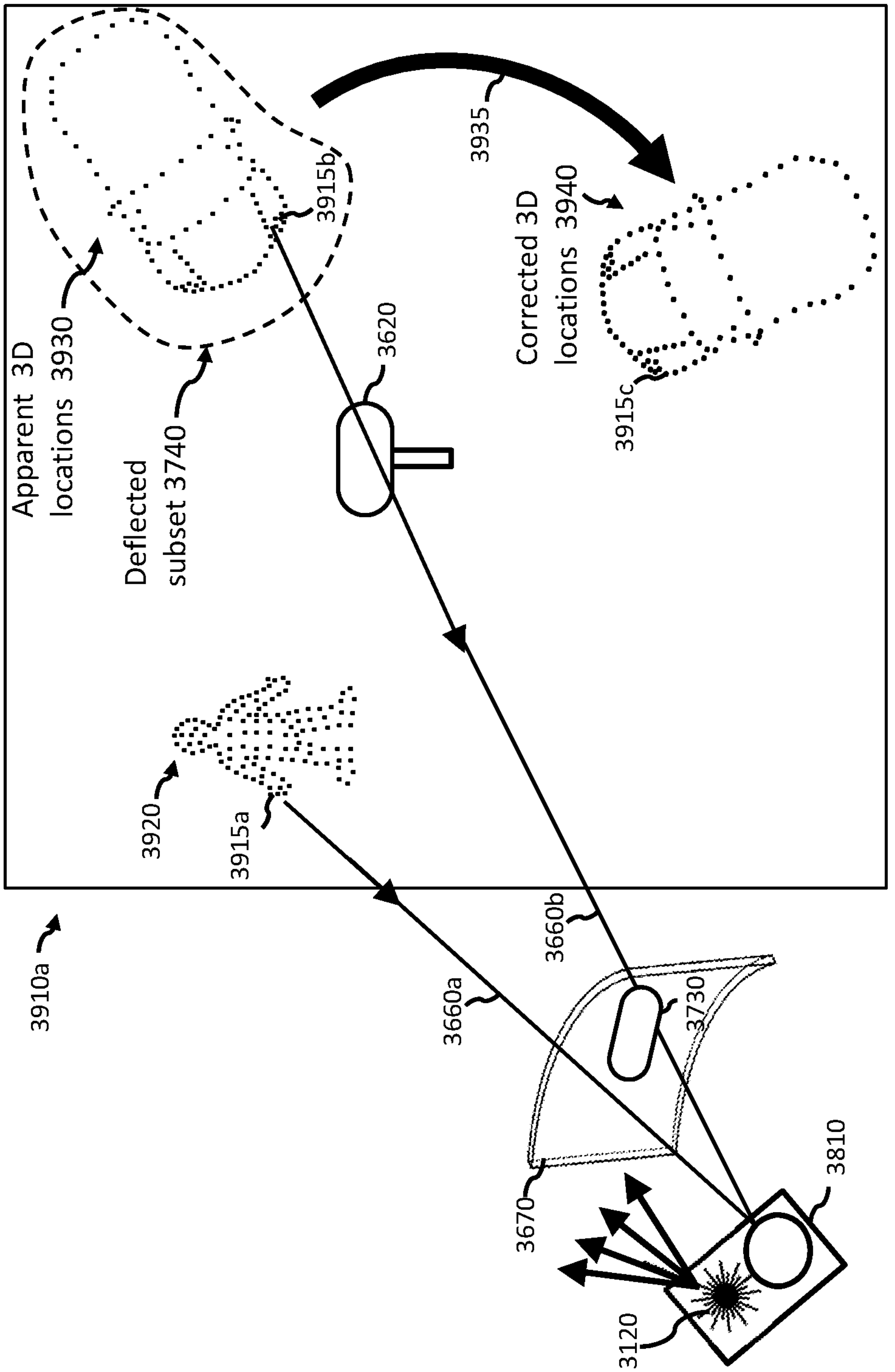
Figure 30B:
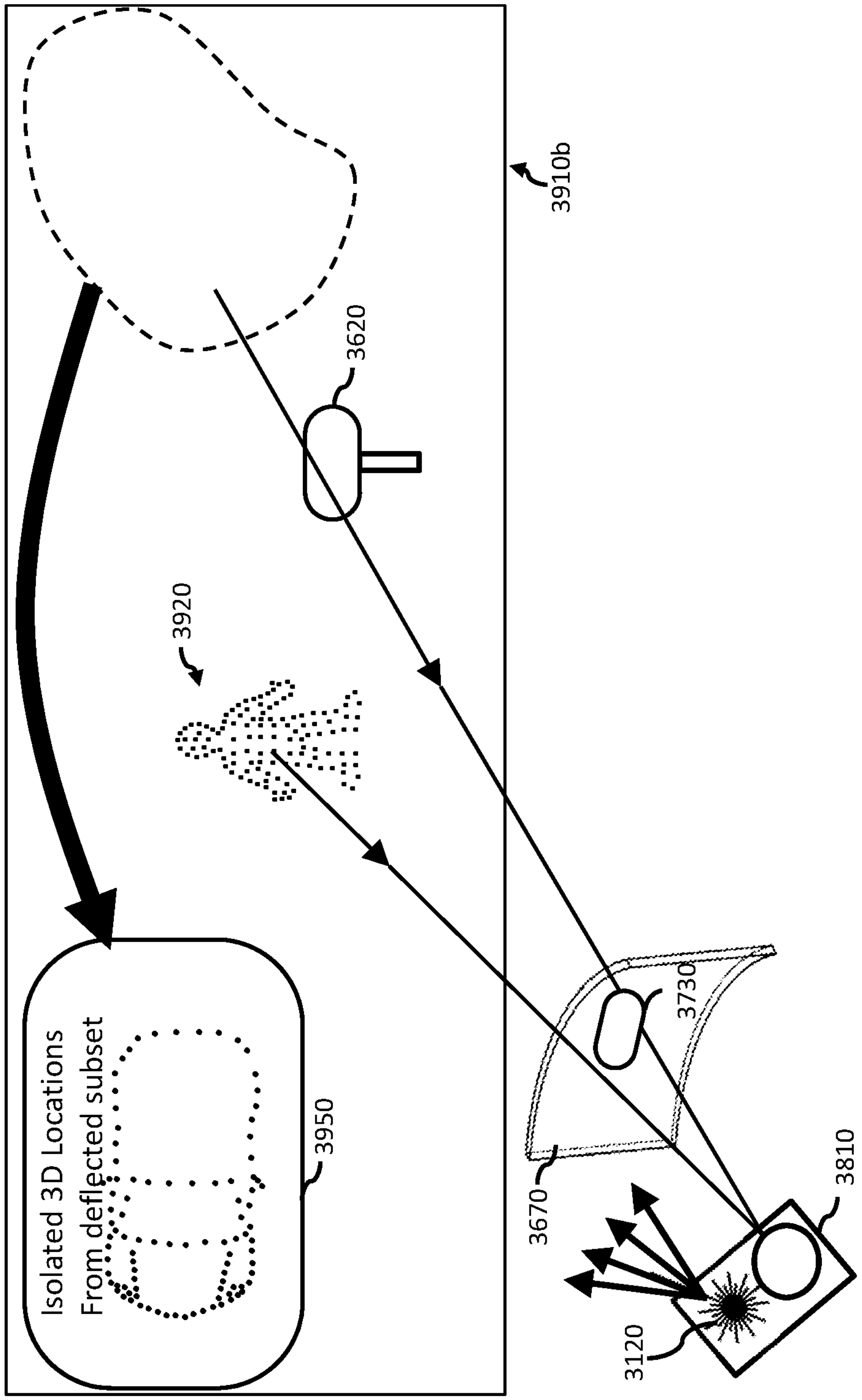

FIGS. 30A and 30B illustrate 3D depth maps including 3D locations indicative of the reflection locations corresponding to a set of laser reflections detected by a laser range finder, according to an embodiment of the present disclosure.

Figure 31A:
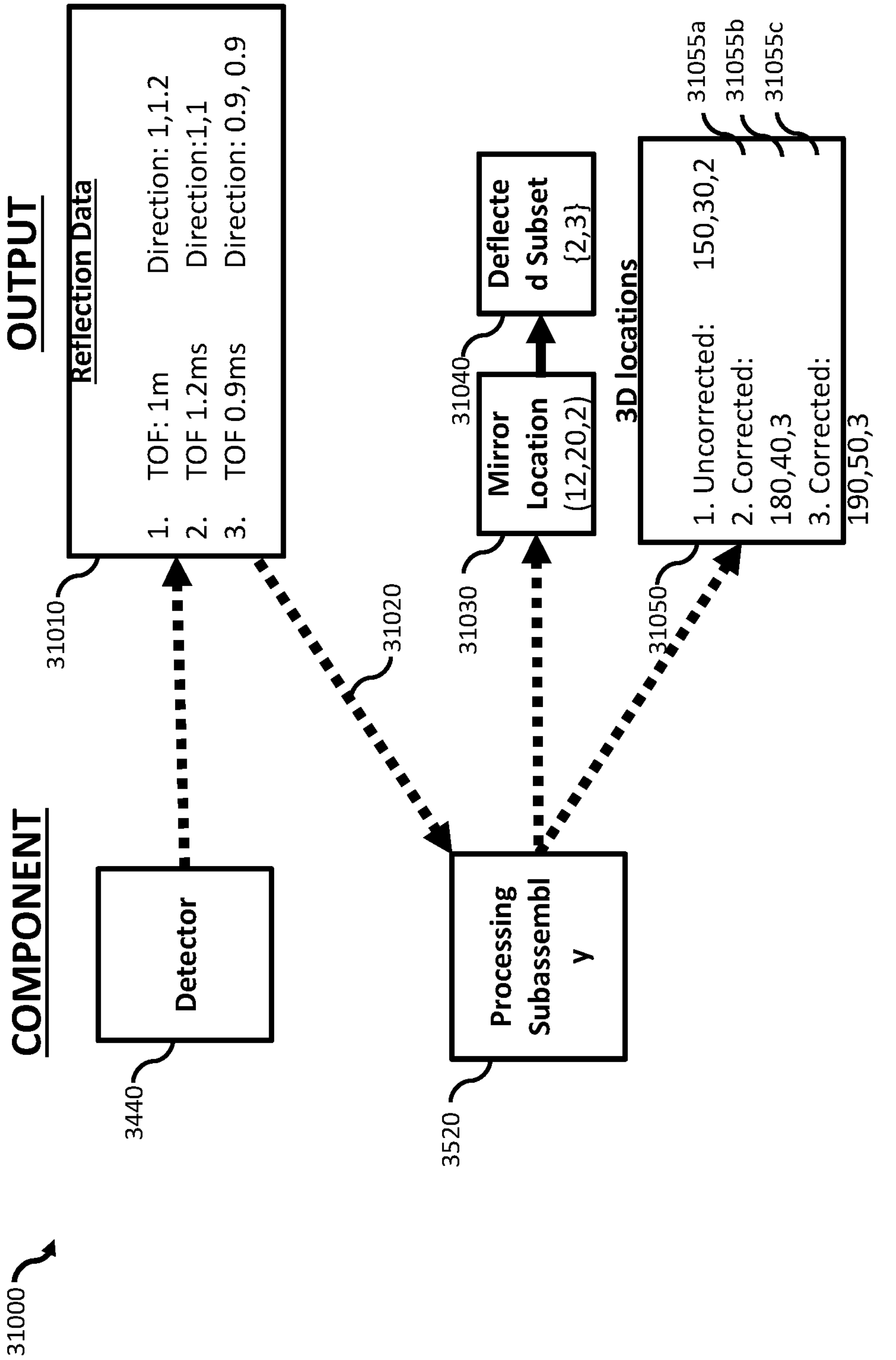
Figure 31B:
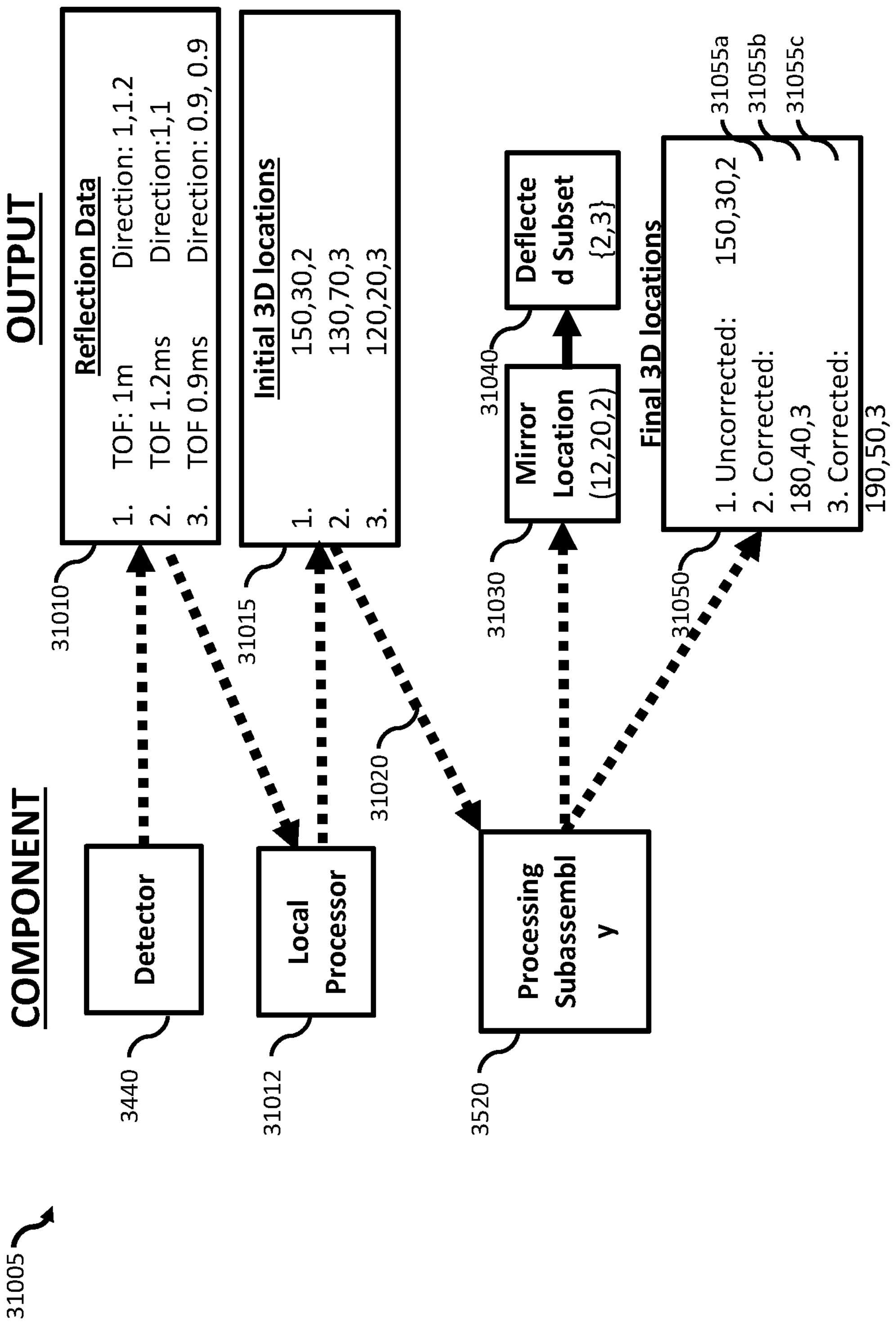

FIGS. 31A and 31B are functional diagrams illustrating the generation of 3D locations from reflection data including applying a correction step for laser reflections that have been deflected by a remote mirror in the local environment, according to aspects of the present disclosure.

Figure 32A:
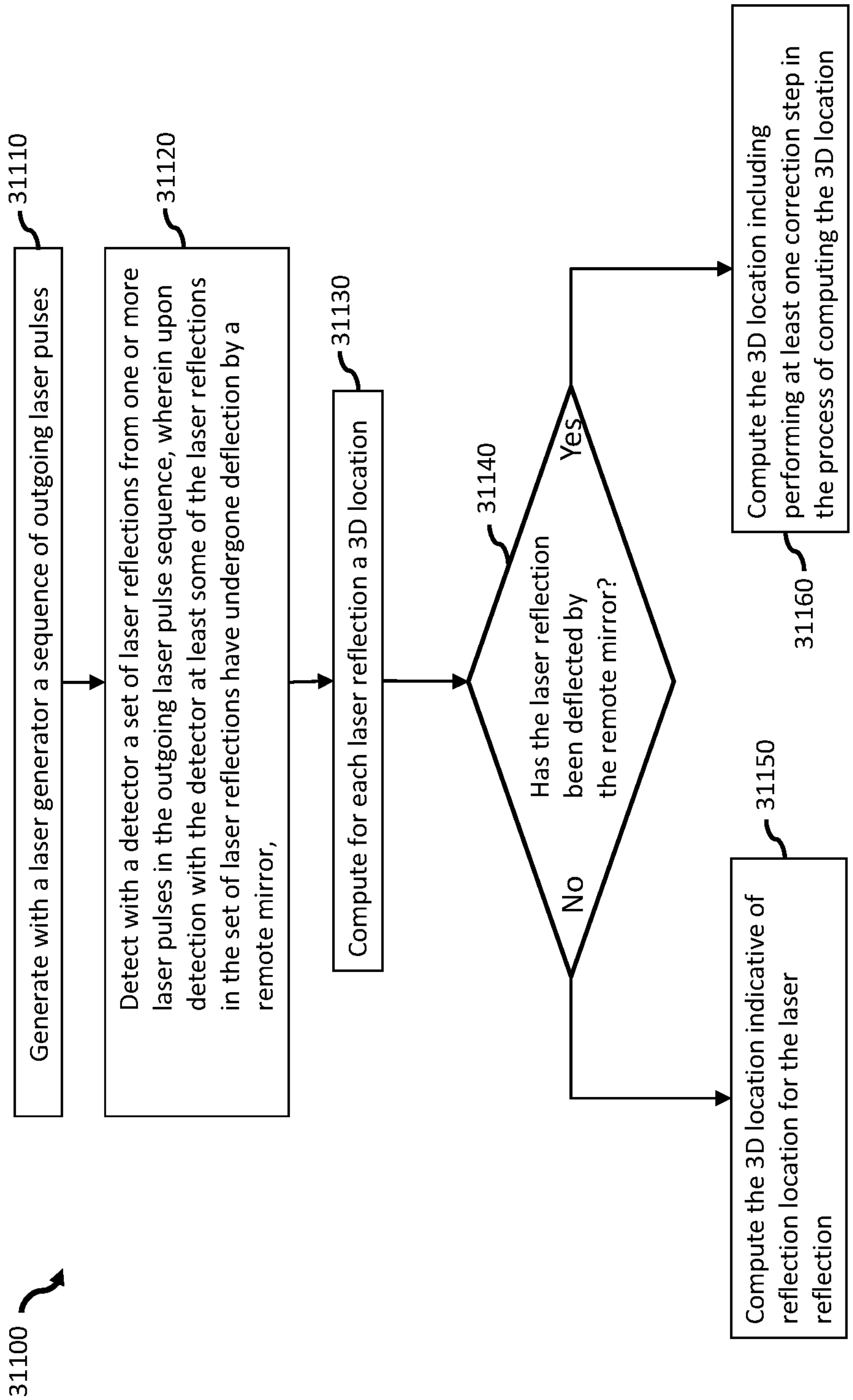
Figure 32B:
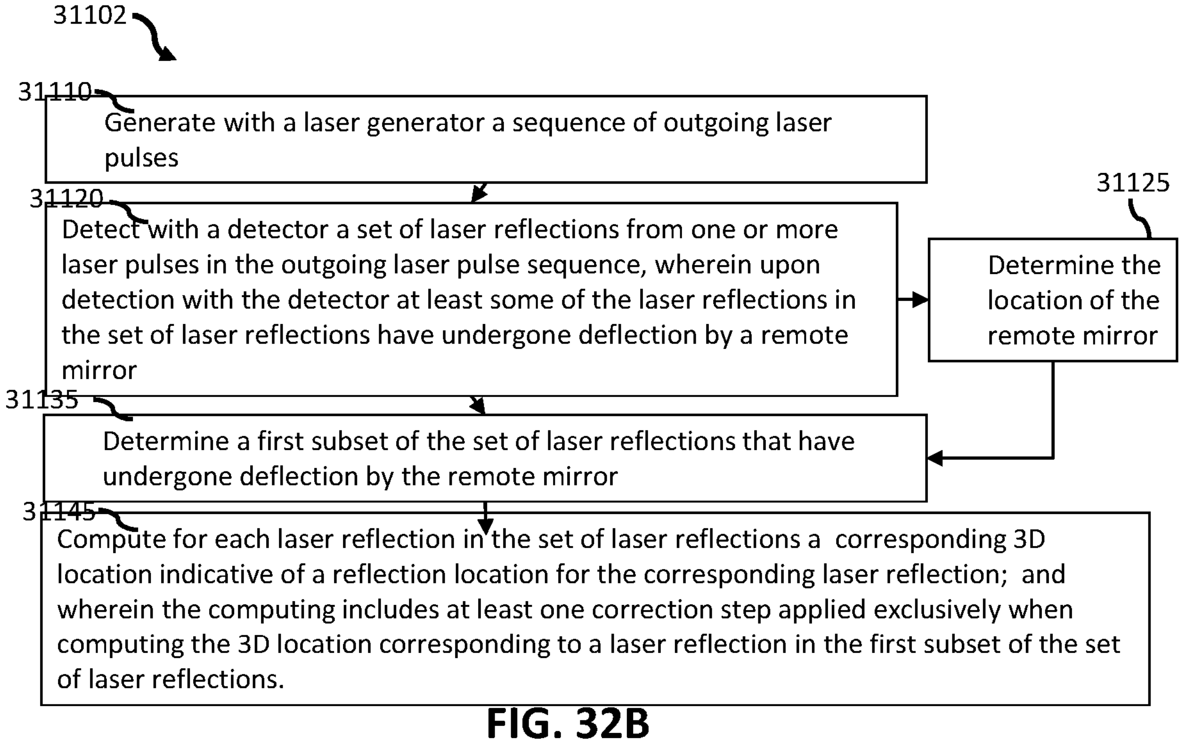
Figure 32C:
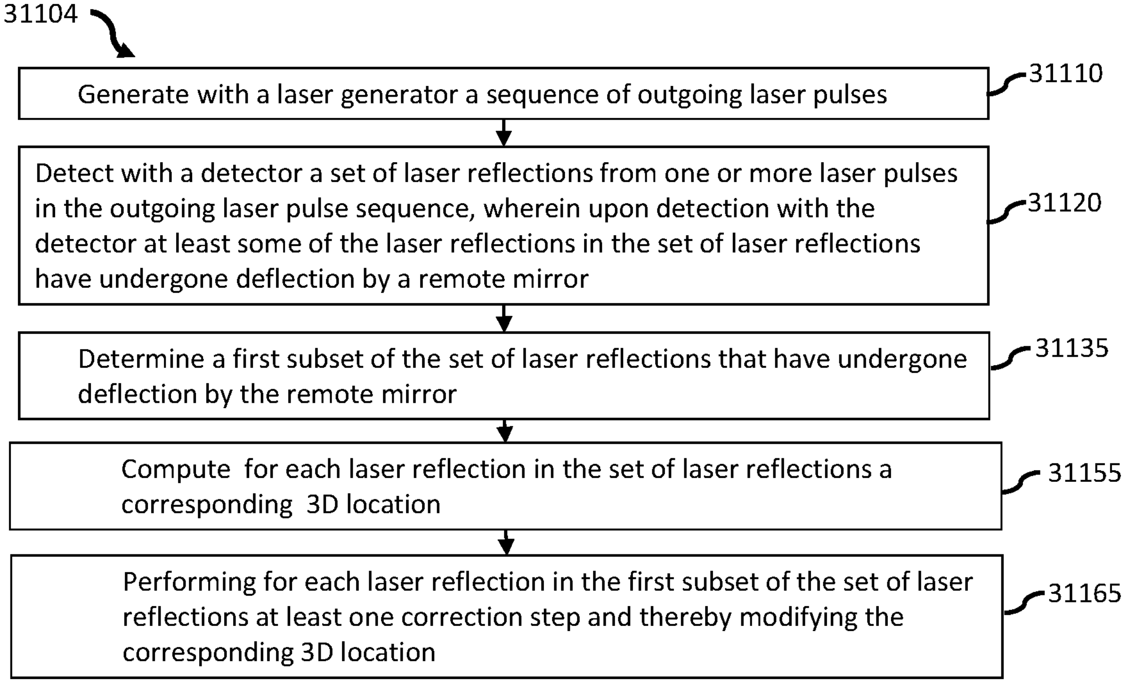

FIGS. 32A, 32B and 32C illustrate methods for computing 3D locations indicative of laser reflection locations including a correction step performed for laser reflections that are deflected by a remote mirror, according to embodiments of the present disclosure.

Figure 33A:
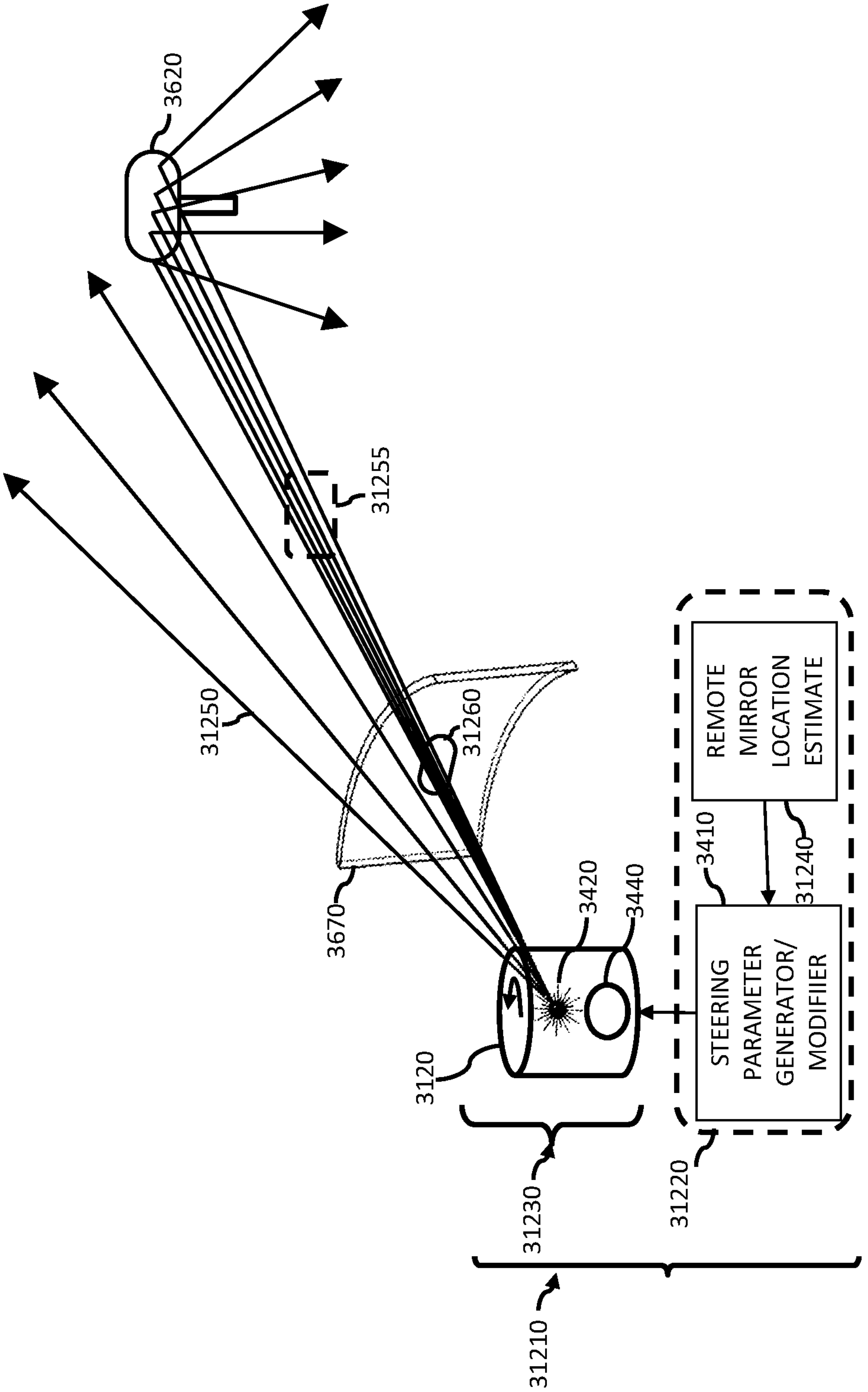
Figure 33B:
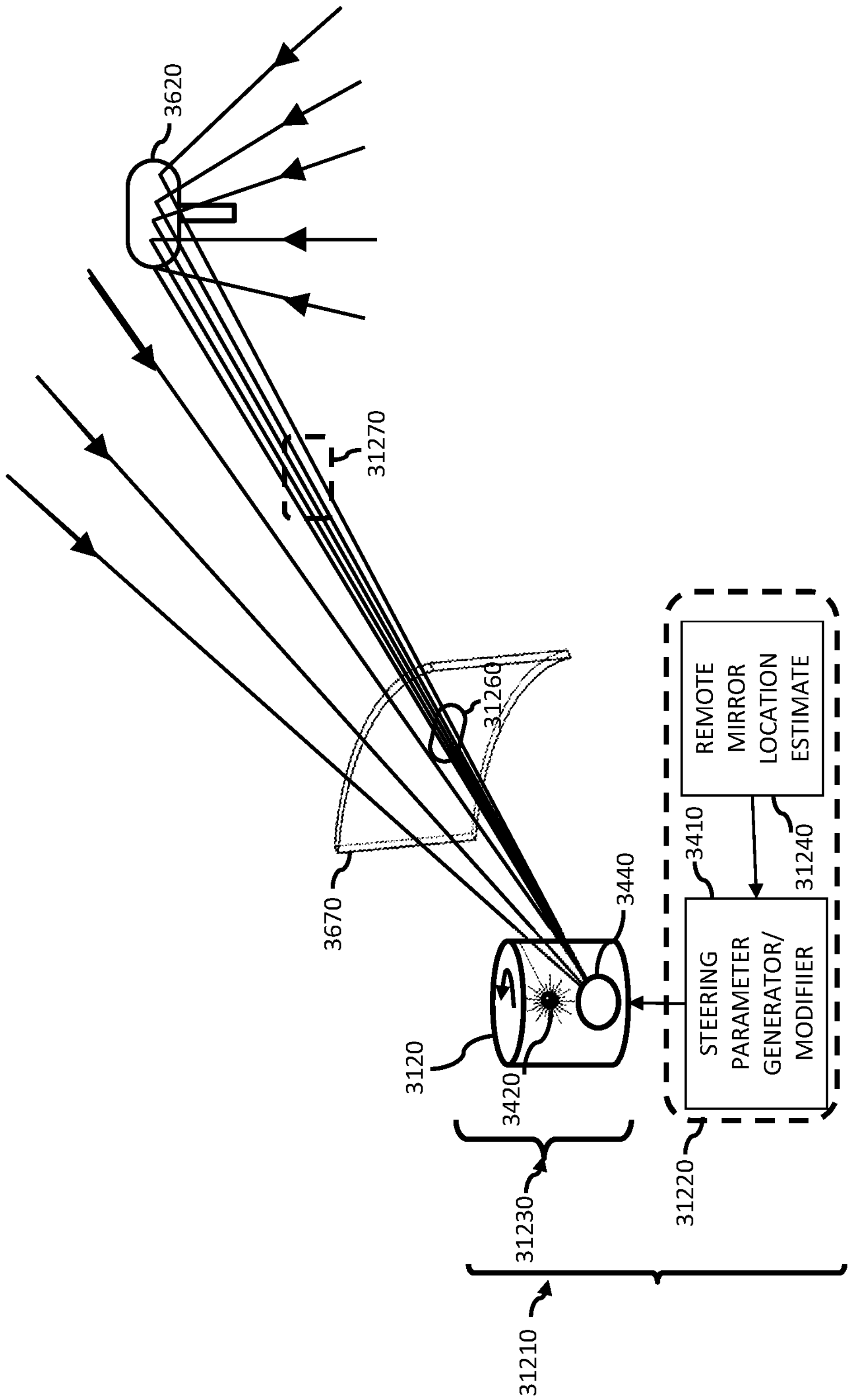
Figure 33C:
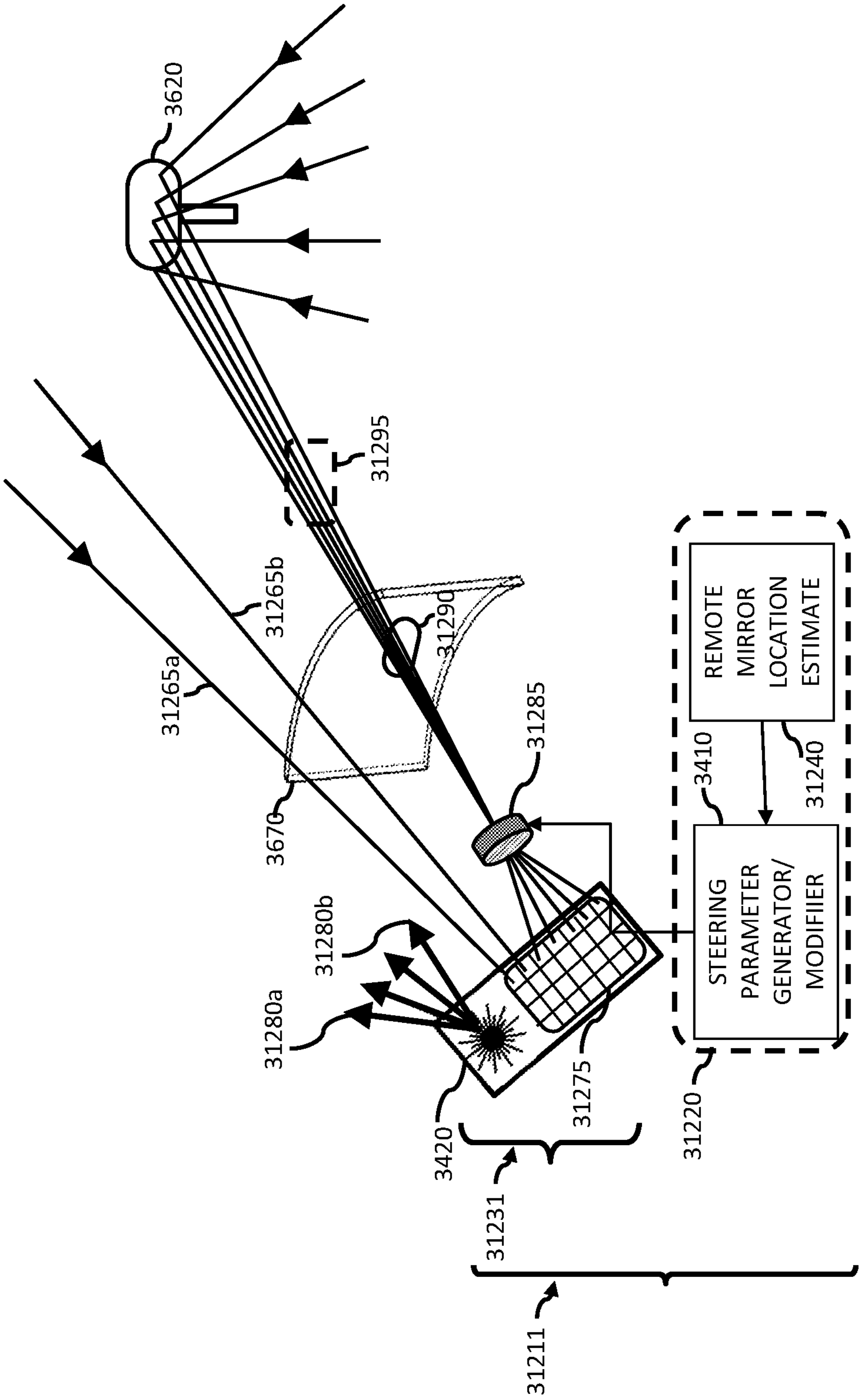

FIGS. 33A, 33B and 33C illustrate several components of optical systems operable to modulate the density of laser reflection measurements based at least in part on the location of a remote mirror, according to embodiment of the resent disclosure.

Figure 34B:
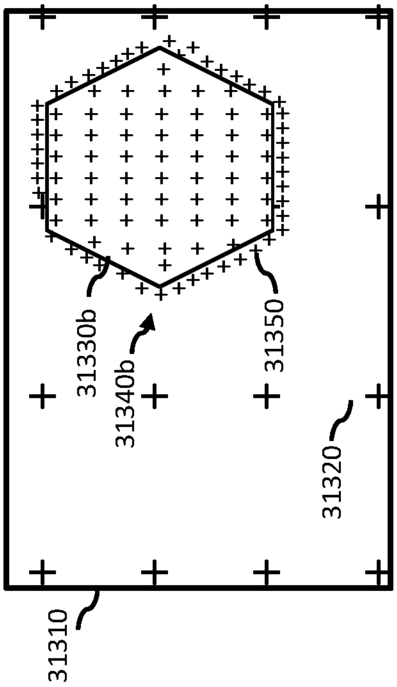
Figure 34A:
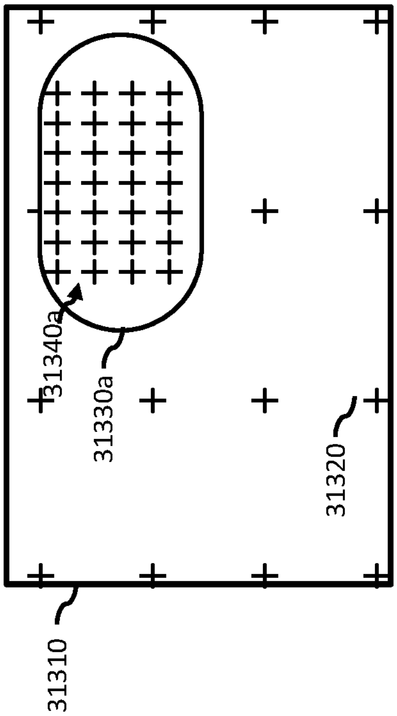
Figure 34C:
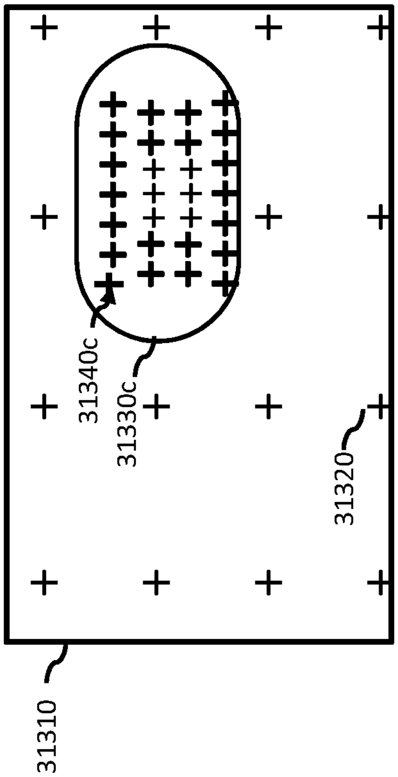

FIGS. 34A, 34B and 34C illustrate an exemplary FOV for an exemplary laser range finder in accordance with an embodiment of the present disclosure.

Figure 35A:
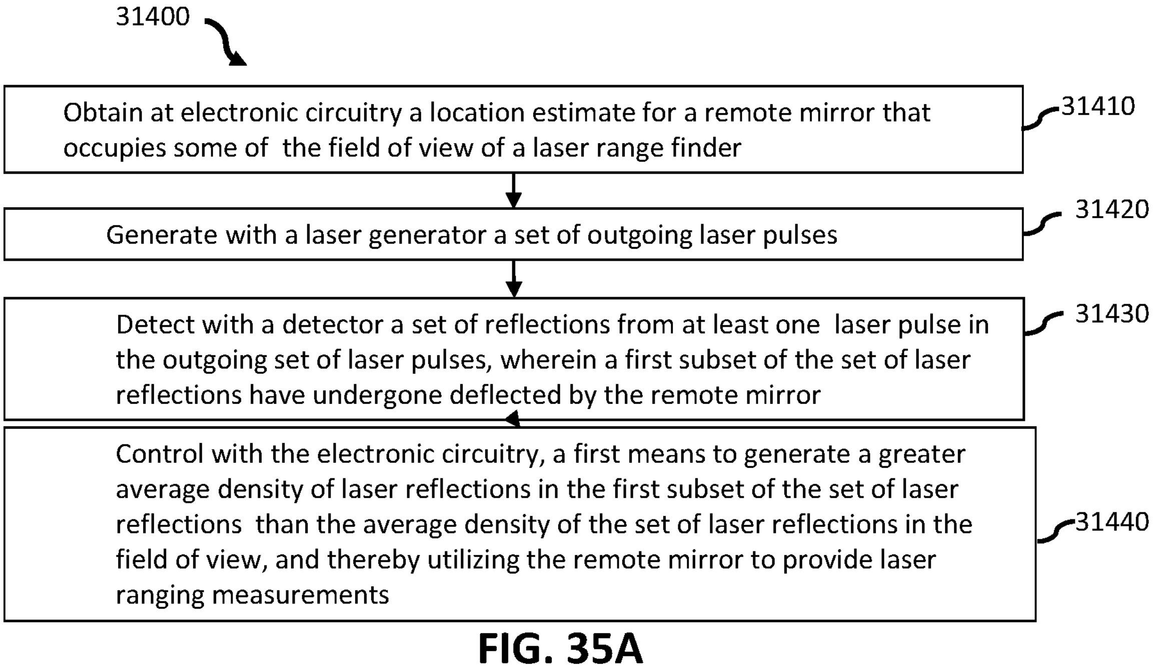
Figure 35B:
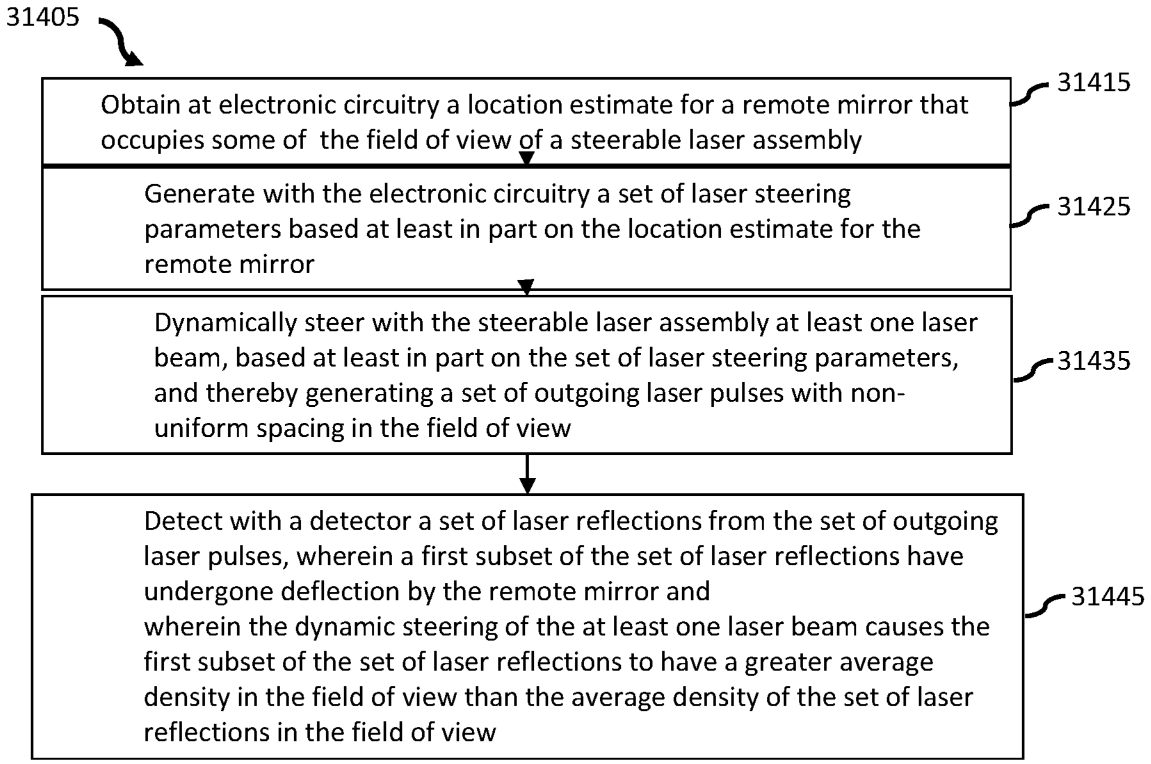

FIGS. 35A and 35B illustrate flow diagrams of methods to detect a set of laser reflections from a FOV including detecting an increased density of laser reflections in a region of the FOV containing a remote mirror, according to some embodiments.

Figure 36:
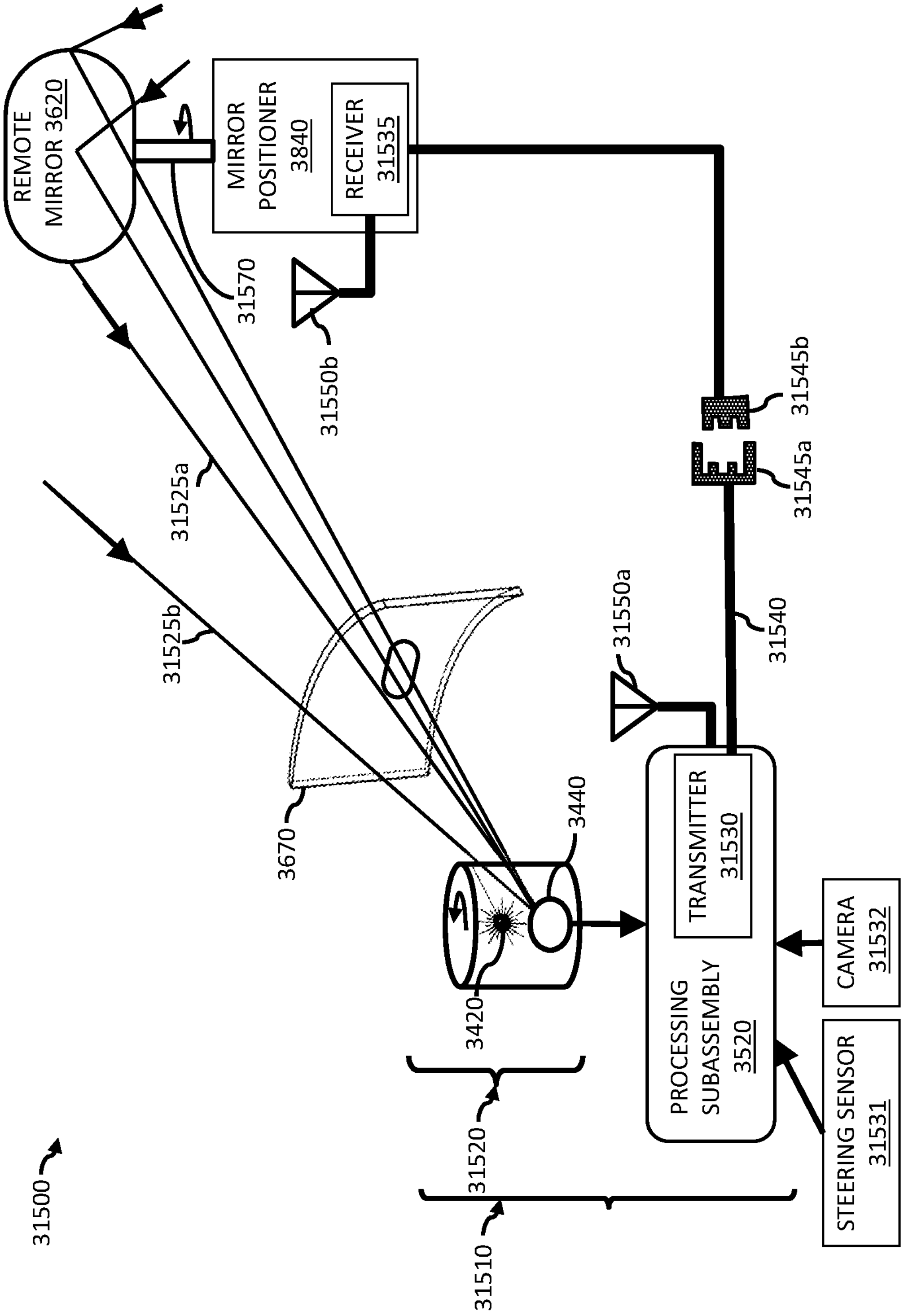

FIG. 36 illustrates several components of a system that controls the position of a remote mirror based at least in part on laser reflections, according to an embodiment of the present disclosure.

Figure 37:
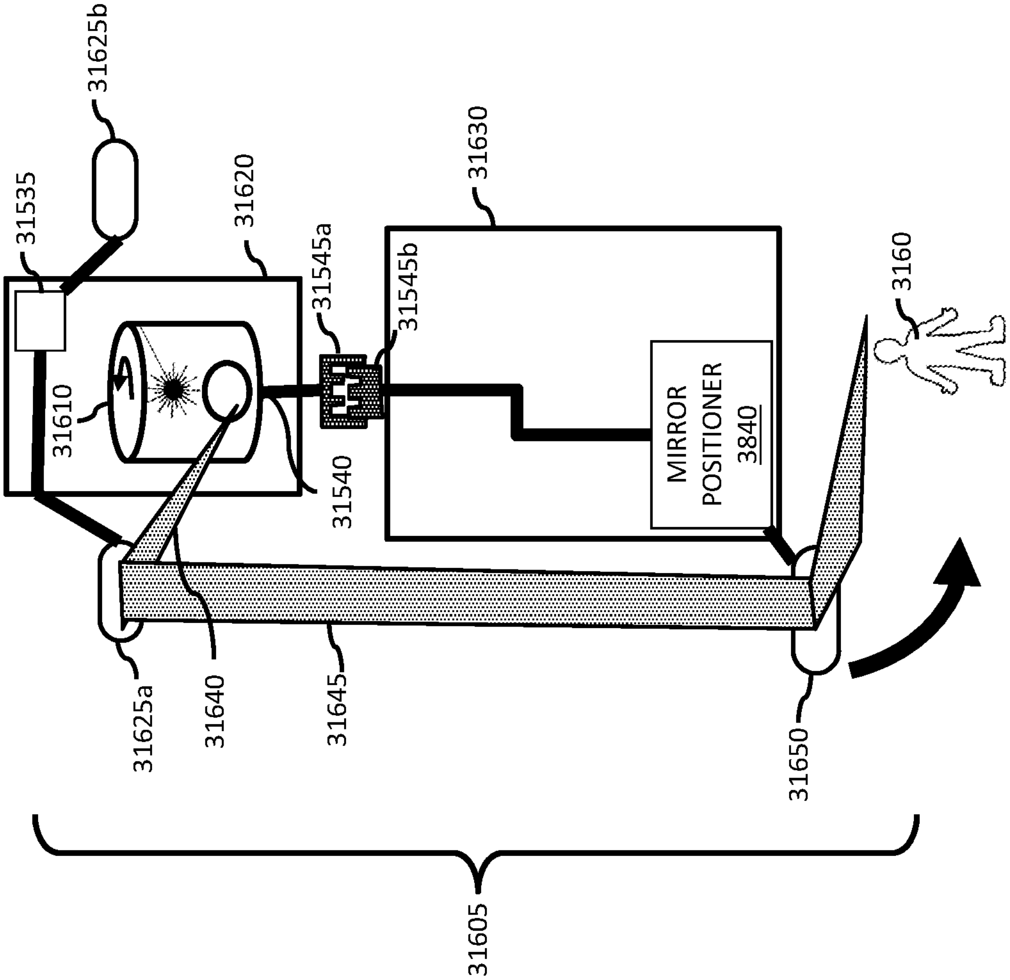

FIG. 37 illustrates a system mounted to a tractor-trailer vehicle that controls remote mirrors based at least in part on processing laser reflection data, according to some embodiments of the present disclosure.

Figure 38:
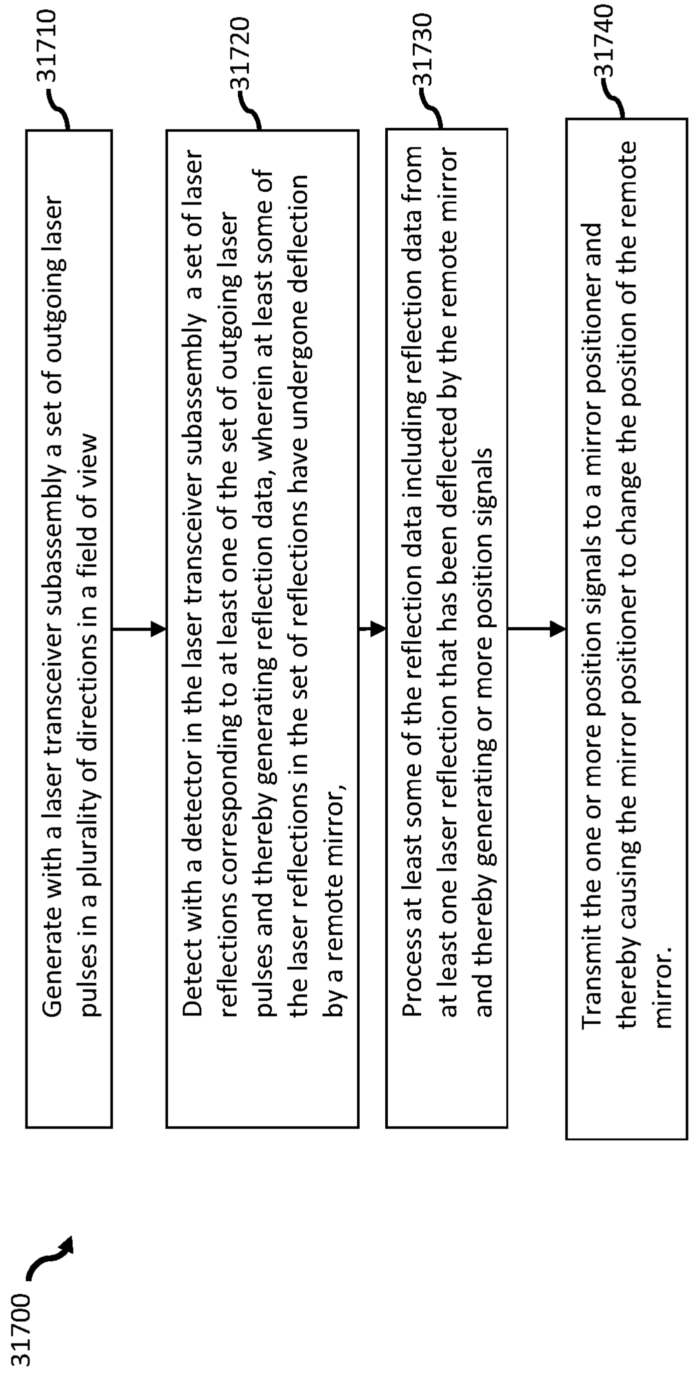

FIG. 38 illustrates a method for controlling a remote mirror based at least in part on processing reflection data from a set of laser reflections, according to an embodiment of the present disclosure.

Figure 39B:
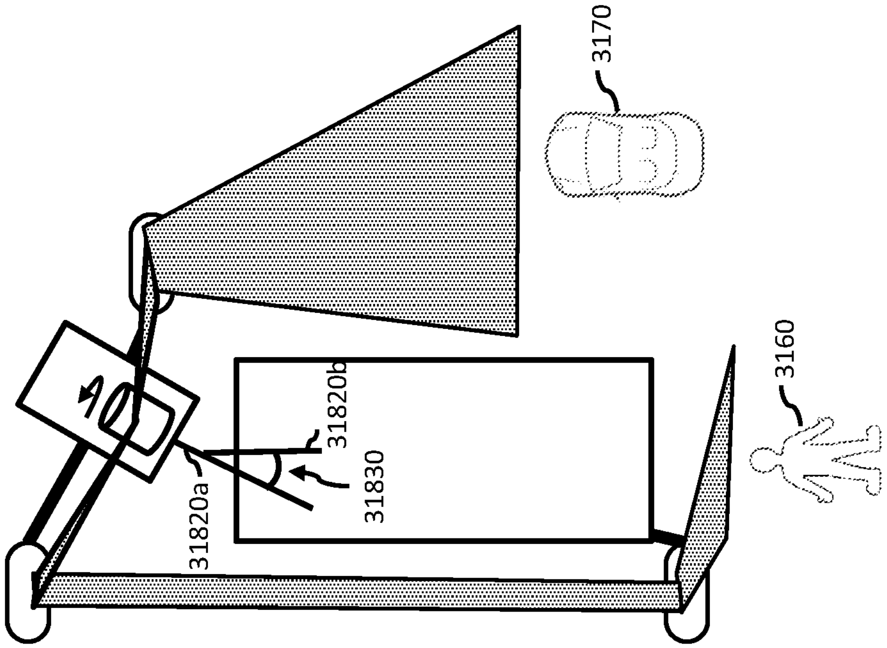
Figure 39A:
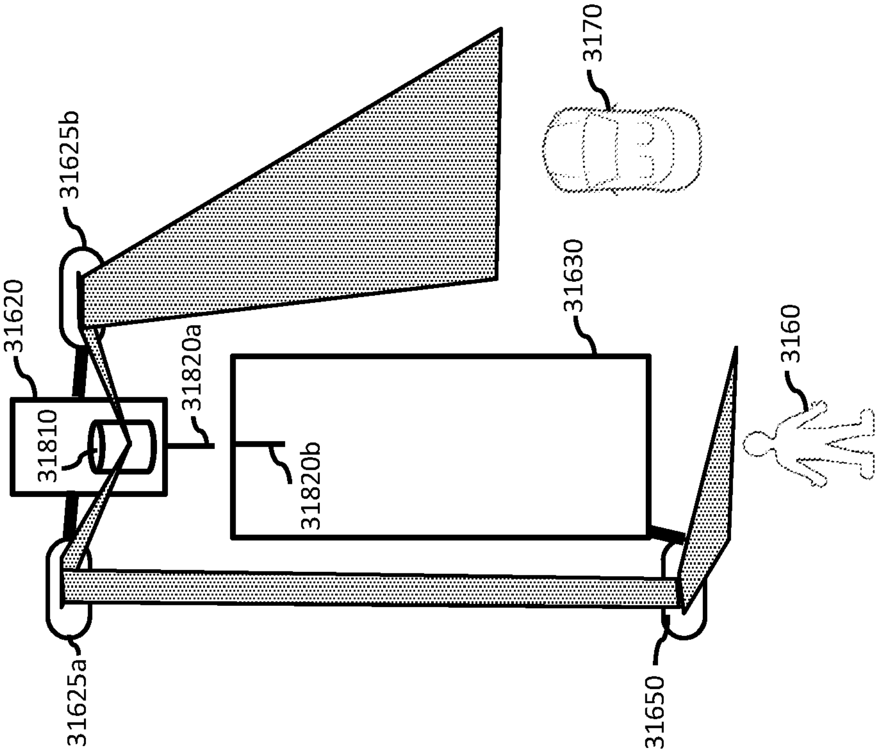

FIGS. 39A and 39B illustrate an articulated tractor-trailer vehicle with a system for controlling remote mirrors based on sensing a change in the direction of a tractor-trailer vehicle, according to an embodiment of the present disclosure.

Figure 40:
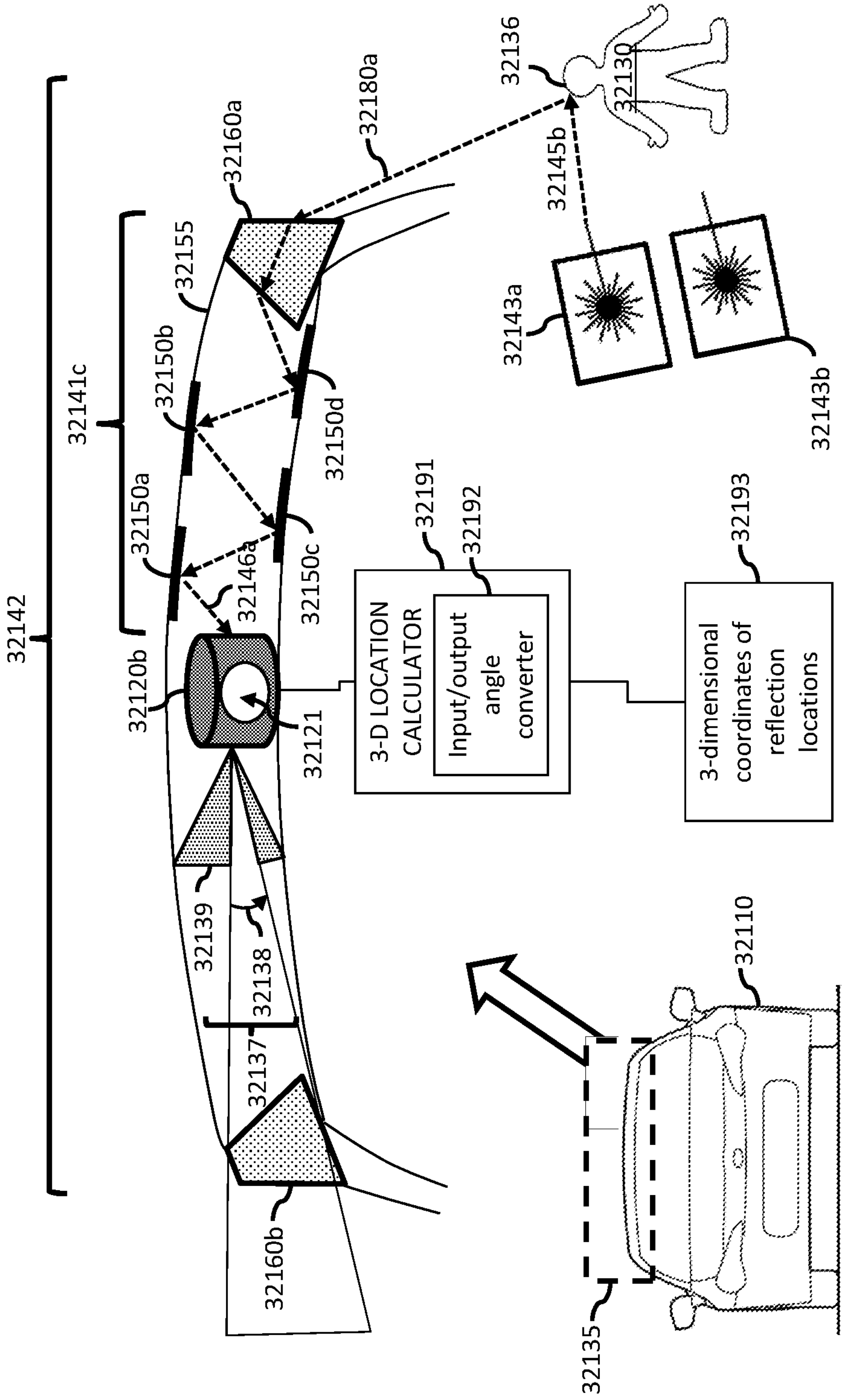

FIG. 40 is an exemplary diagrams of vehicle-integrated laser distribution systems, attached to the roof of a vehicle, including a laser range finder and a beam guide, according to an embodiment of the present disclosure.

Figure 41A:
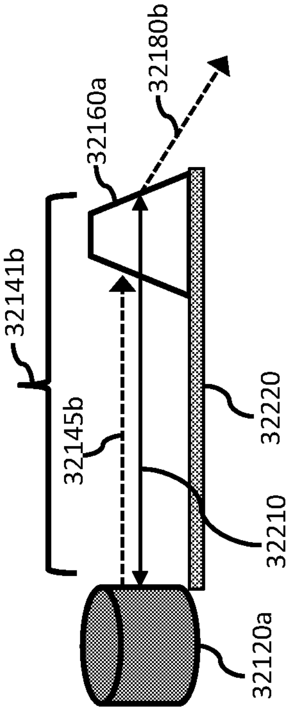
Figure 41B:
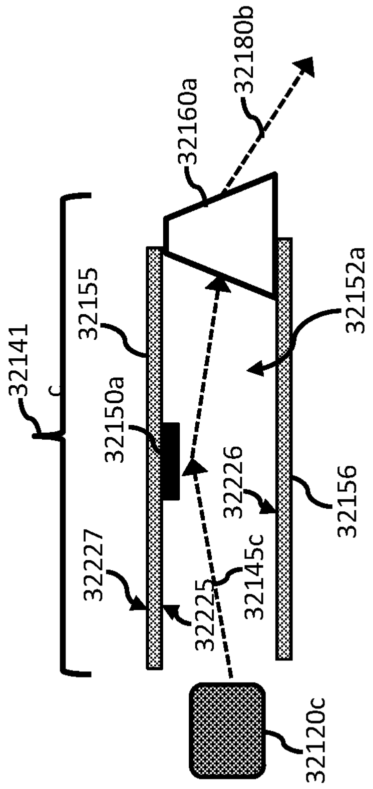
Figure 41C:
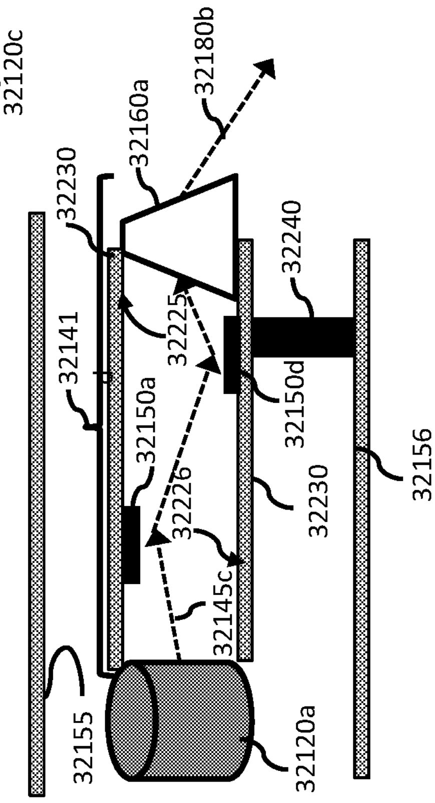

FIGS. 41A, 41B and 41C illustrates several exemplary beam guides according to several embodiments of the present disclosure.

Figure 42:
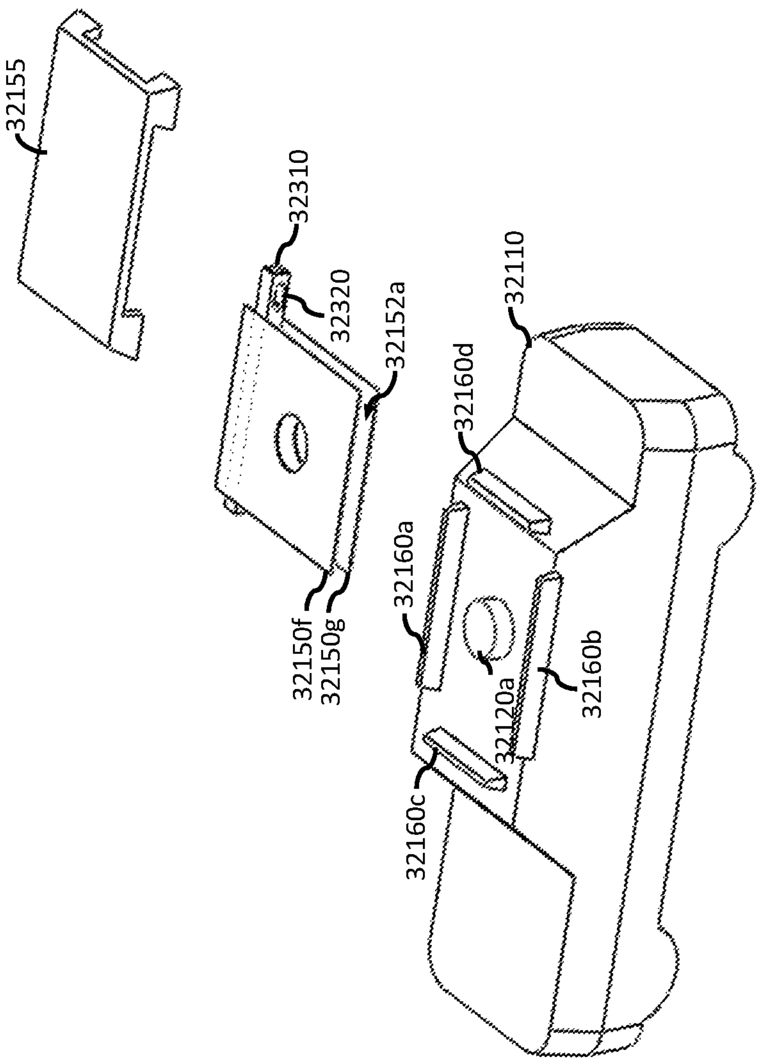

FIG. 42 is an exploded view of a variety of components of a vehicle-integrated laser distribution system in accordance with an embodiment of the present disclosure.

Figure 43A:
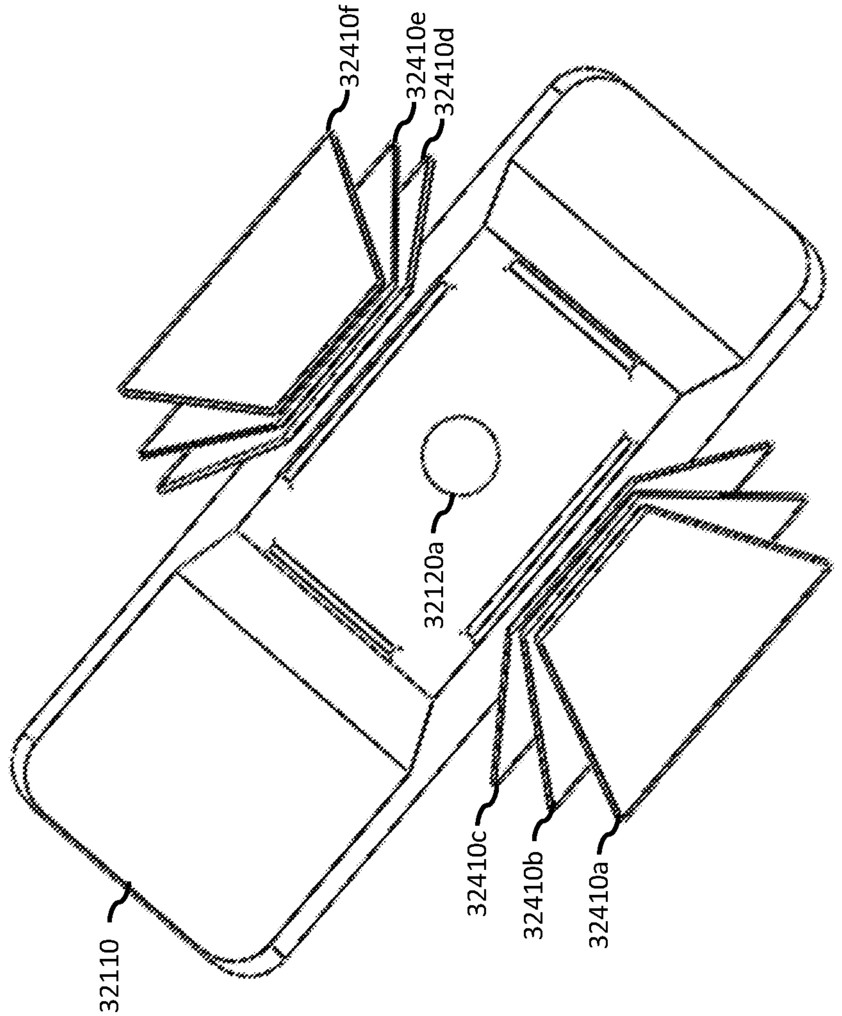

FIG. 43A illustrates a plurality of planes, each representing directions along which the indirect reflections from objects that are outside the direct FOV of a laser LIDAR can be provided to the LIDAR using various components of a vehicle-integrated laser distribution system in accordance with an embodiment of the present disclosure.

Figure 43B:
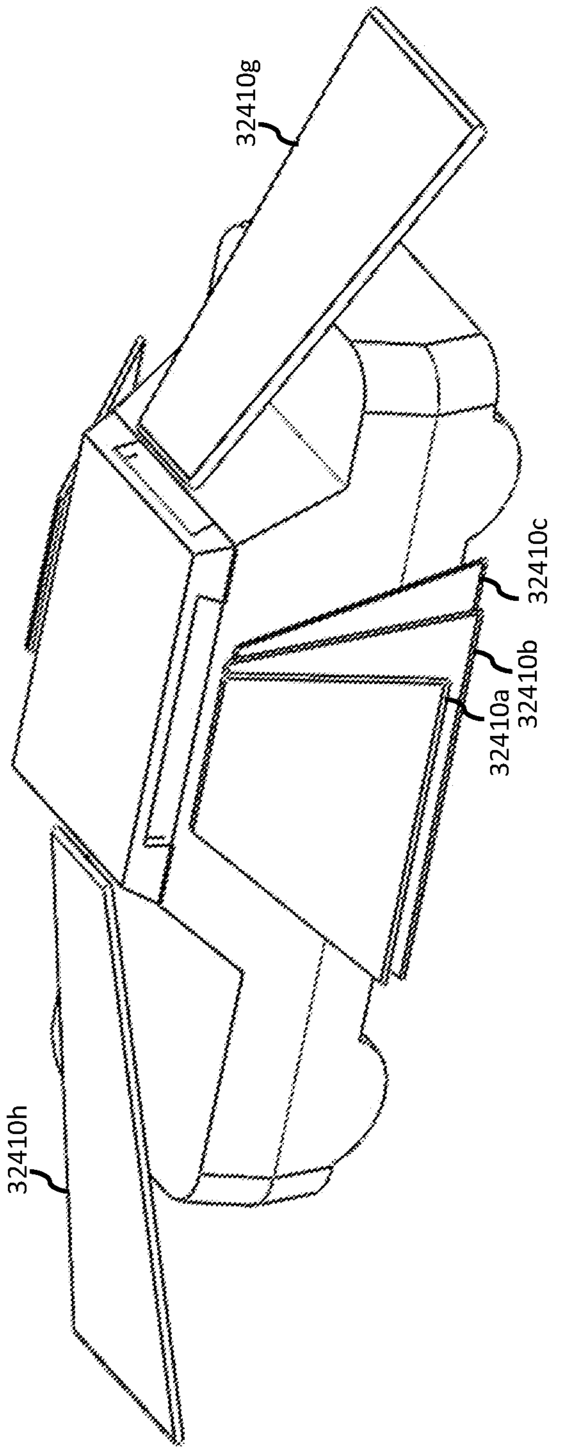

FIG. 43B illustrates a plurality of planes, each representing directions along which the indirect reflections from objects that are outside the direct FOV of a laser LIDAR can be provided to the LIDAR using various components of a vehicle-integrated laser distribution system in accordance with an embodiment of the present disclosure.

Figure 44:
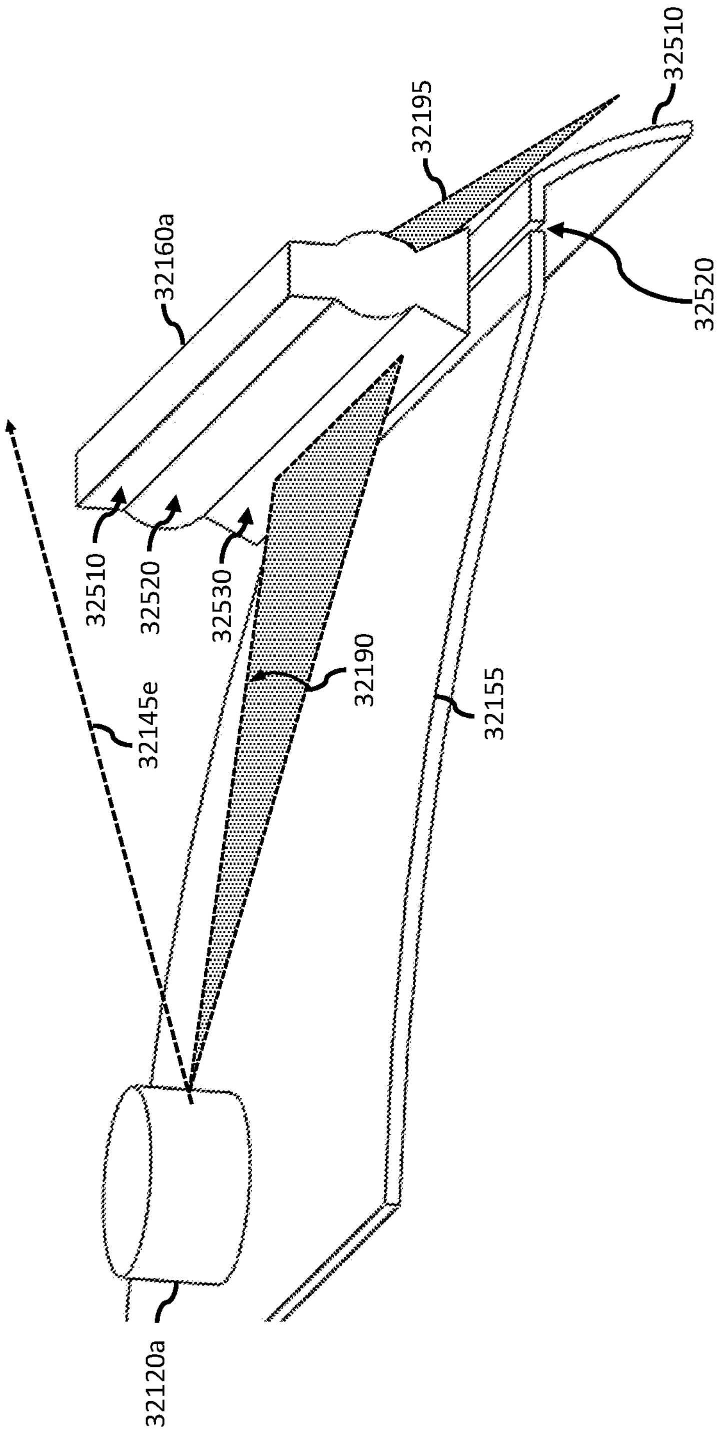

FIG. 44 is a block diagram of several components of an integrated laser distribution system, according to an embodiment of the present disclosure.

Figure 45:
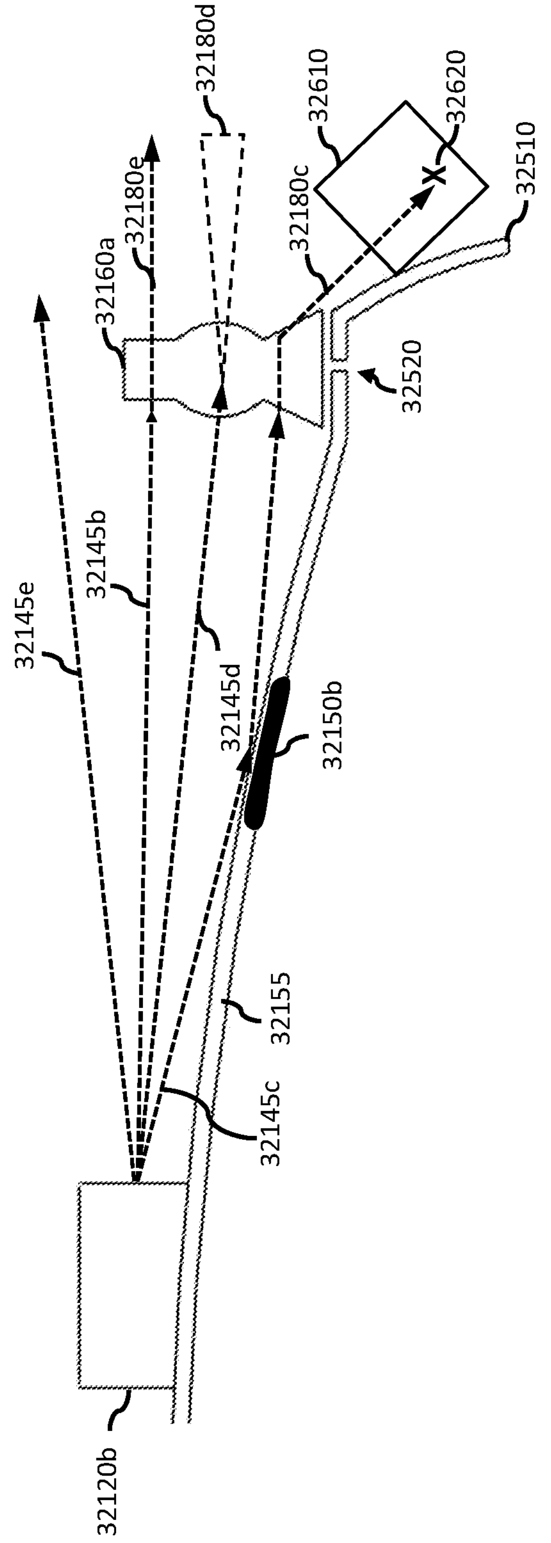

FIG. 45 is a diagram of several laser beam paths in an integrated laser distribution system, according to an embodiment of the present disclosure.

Figure 46A:
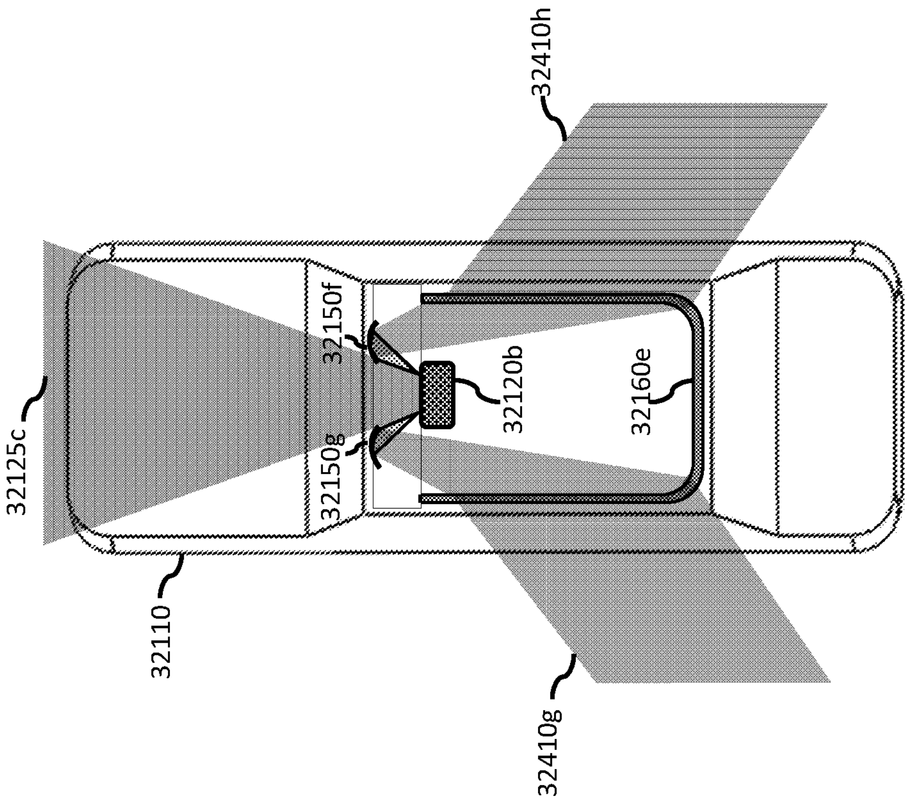

FIG. 46A is an exemplary diagram of an vehicle-integrated laser distribution system, embedded in the roof of a vehicle, including a laser range finder and a beam guide, according to an embodiment of the present disclosure.

Figure 46B:
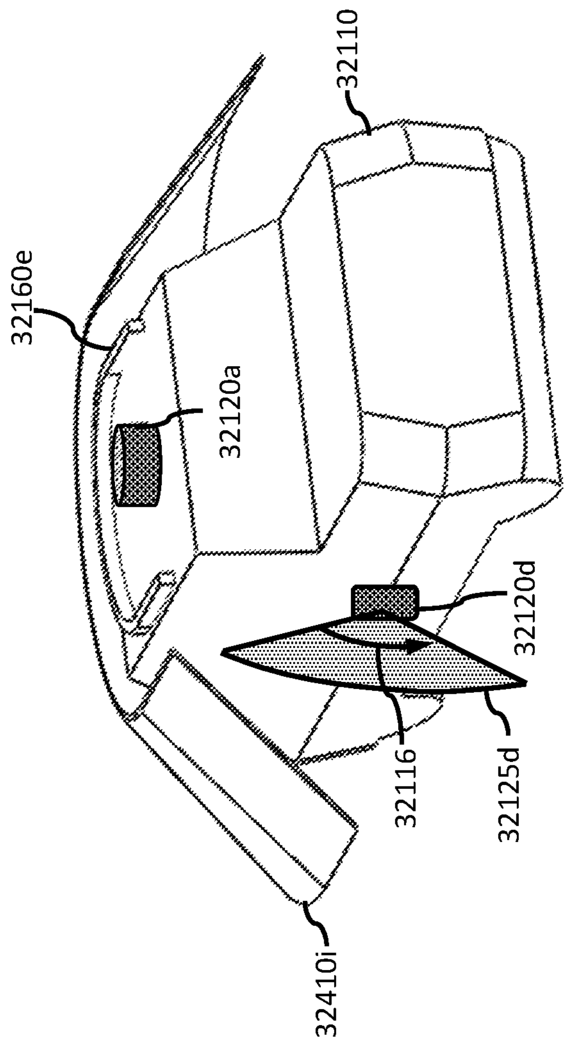
Figure 46C:
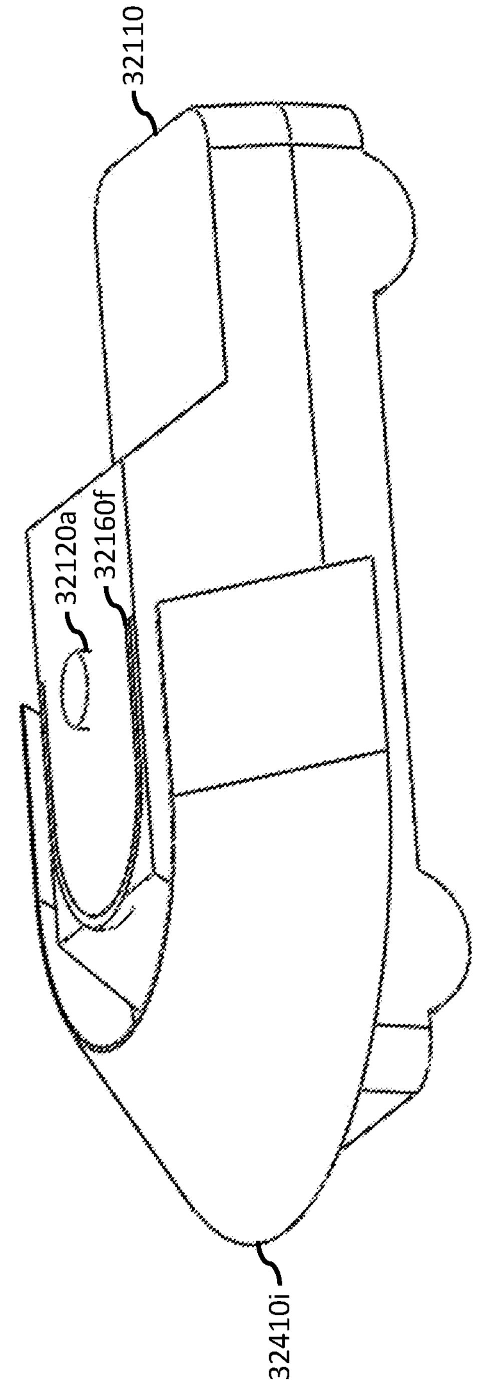

FIGS. 46B and 46C illustrate an exemplary vehicle-integrated laser distribution system, with wide azimuthal coverage at low elevation angles, embedded in the roof of a vehicle, according to an embodiment of the present disclosure.

Figure 47:
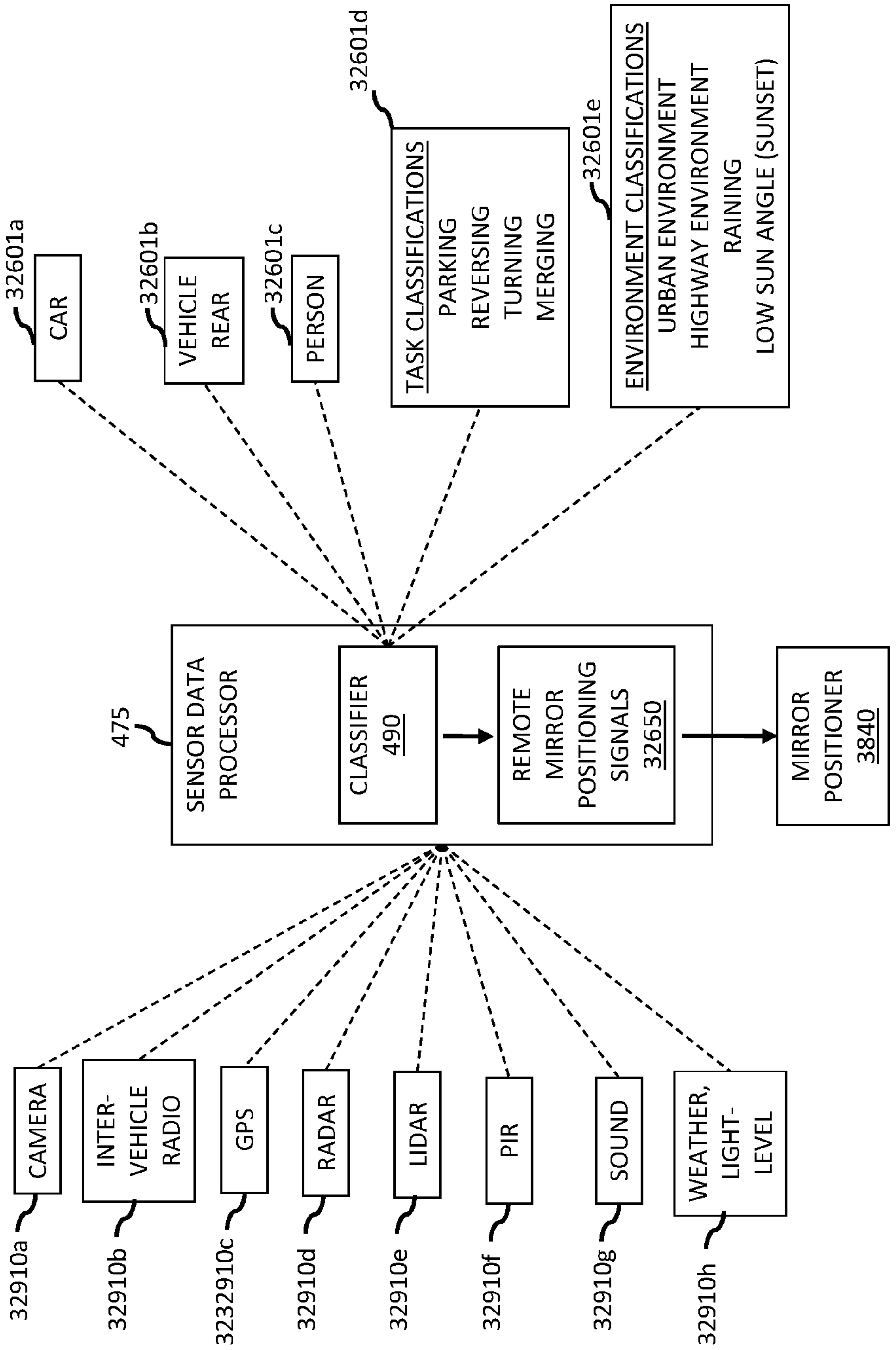

FIG. 47 is a functional diagram illustrating several components of an exemplary vehicle in accordance with an embodiment of the present disclosure.

DETAILED DESCRIPTION

Figure 1A:
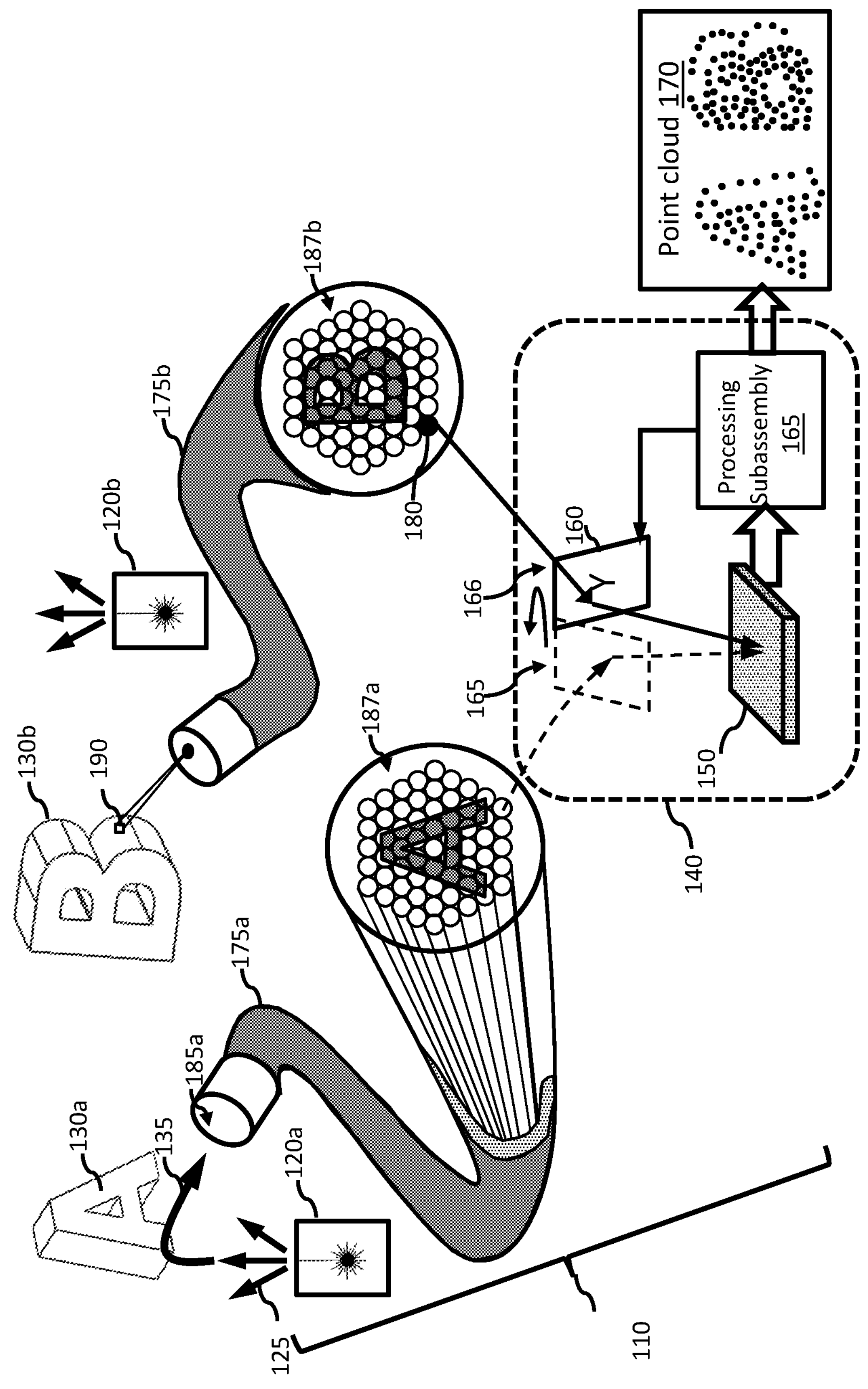
FIG. 1A illustrates a distributed LIDAR system including a remotely located ranging subassembly and two fiber optic image bundles according to an embodiment of the present disclosure.

FIG. 1A illustrates a distributed LIDAR system 110 according to an embodiment of the present disclosure. LIDAR system 110 comprises two light emitters 120*a* and 120*b* that can generate outgoing light pulses (e.g., pulse 125) that reflect from objects (e.g., 130*a* and 130*b*) in the vicinity of LIDAR system 110. Light emitters can be incoherent light emitting diodes (LEDs) or coherent laser diodes. Light emitters can generate visible, infrared or ultraviolet light.

LIDAR system 110 further comprises a ranging subassembly 140 that is remotely located (e.g., located such that photodetector array 150 does not have direct line-of-sight visibility to objects 130*a* and 130*b*). Ranging subassembly 140 can function to control the timing of light generators 120*a* and 120*b* (e.g., providing a light modulation waveform). Ranging subassembly 140 can further comprise a photodetector array 150 to sense and record the time-of-flight of light reflections from objects such as 130*a* and 130*b* thereby generating reflection signals. Ranging subassembly can further comprise a FOV combiner 160 (e.g., an optical multiplexor or a spatial FOV combiner) to share light reflections from multiple FOVs (e.g., from around multiple parts of a vehicle) with the photodetector array 150. The FOV combiner 160 can spatially combine light reflections from multiple FOVs onto different parts of the photodetector array simultaneously; can time multiplex light reflections from different FOVs onto the photodetector array 150, or both spatially and temporally combine light reflections from different FOVs. In one embodiment FOV combiner 150 can be a scanning mirror that rotates or continuously moves along a path, similar to the scanning mirrors found in mechanical LIDAR. In another embodiment FOV combiner 160 can occupy multiple discrete positions (e.g., flipping a mirror from position 165 to position 166. Ranging subassembly 140 can further comprise a processing subassembly 167 (e.g., a computer processor or graphics processing unit) that functions to generate a time-varying 3D point cloud 170 that represents the 3D coordinates of real world surfaces that are within the multiple combined FOVs. For example, FIG. 1A illustrates processing subassembly 167 controlling the position of FOV combiner 160 between position 165 and 166 and thereby gathering reflections from objects 130*a* and 130*b* at different times to generate a combined point cloud 170.

One challenge is how to receive light reflections at a remotely located ranging subassembly 140. Specifically, in order to generate 3D point cloud 170 both the timing and incoming direction of each light reflection should be identifiable at the remote ranging subassembly. To address this challenge LIDAR system 110 further comprises two CFOBs 175*a* and 175*b*. Unlike single-core fiber optic cables or multifiber optic cables where the incoming direction of a light reflection is lost, the CFOBs are designed to capture and transfer information regarding the 2D input direction of light reflections in their respective FOVs, thereby enabling a remote ranging subassembly to associate a 2D direction with the location of light received from an output end of each CFOB. Each CFOB comprises an input surface, an output surface and a plurality (e.g., often thousands) of elongated optic fibers (e.g., fiber 180) that are closely spaced and have a common sequence of fiber ordering at both the input and output surface. Each CFOB has a corresponding input FOV comprising the range of directions that light (e.g., reflection 135) can enter the bundle at the input surface 185*a* and be transported to the output surface 187*a*. Each optic fiber (e.g., fiber 180) functions to transport light reflections from a small portion of a FOV (e.g., angular range of directions 190) at the input surface to the output surface.

In one embodiment, the operation of remote LIDAR 110 is as follows: ranging subassembly 140 instructs light generators 120*a* and 120*b* to generate a sequence of light pulses (e.g., laser flashes), thereby illuminating objects 130*a* and 130*b*. Light reflections (e.g., 135) from surfaces in the path of the light pulses can be gathered by CFOBs 175*a* and 175*b*. The common spatial sequence of optic fibers in each CFOB at both the input and output end can function to preserve a measure of the input direction of each light reflection from the FOV at the output of the CFOB. This preservation of the incoming reflection direction can be maintained through several twists and turns in the CFOB along a path to the remote ranging subassembly 140. At the ranging subassembly 140, FOV combiner 160 can timeshare the photodetector array 150 with the output ends of both CFOBs. In one example, emitter 120*a* can operate first and FOV combiner 160 can occupy position 165 to transfer reflections from the output surface of CFOB 175*a* to detector array 150. Subsequently, emitter 120*b* can emit an outgoing light pulse and FOV combiner 160 can occupy position 166 to transfer reflections from the output surface 187*b* of CFOB 175*b* to photodetector array 150. Circuitry in the ranging subassembly, such as a processing subassembly 167 can then generate point cloud 170 indicative of the 3D reflection locations associated with objects 130*a* and 130*b*. In one aspect, the spatial relationship between objects in the point cloud (e.g., the points associated with object 130*a* and 130*b*) can be determined based in part on a known offset or spatial relation between the respective FOVs of CFOB (175*a* and 175*b*). For example, in point cloud 170 the 3D locations for the letter "A" are neighboring the 3D locations for the letter "B" indicating that the FOVs for CFOBs 175*a* and 175*b* are neighboring or adjoining. The ranging subassembly can store a database of offsets vectors indicating the placement of local origins for FOVs associated with CFOBs, thereby enabling 3D locations from many FOVs supplied by CFOBs to be transformed (e.g., shifted in space and rotated) for placement on a single point cloud. In one aspect, the CFOBs 175*a* and 175*b* can have a coherent arrangement of optical fibers with two or more distinct diameters (e.g., some fibers with 20 micrometer diameter cores and some fibers with 60 micrometer cores) thereby providing regions of higher and lower resolution (e.g., numbers of fibers per angular range subtended in the FOV.)

Exemplary Detectors

Figure 1B:
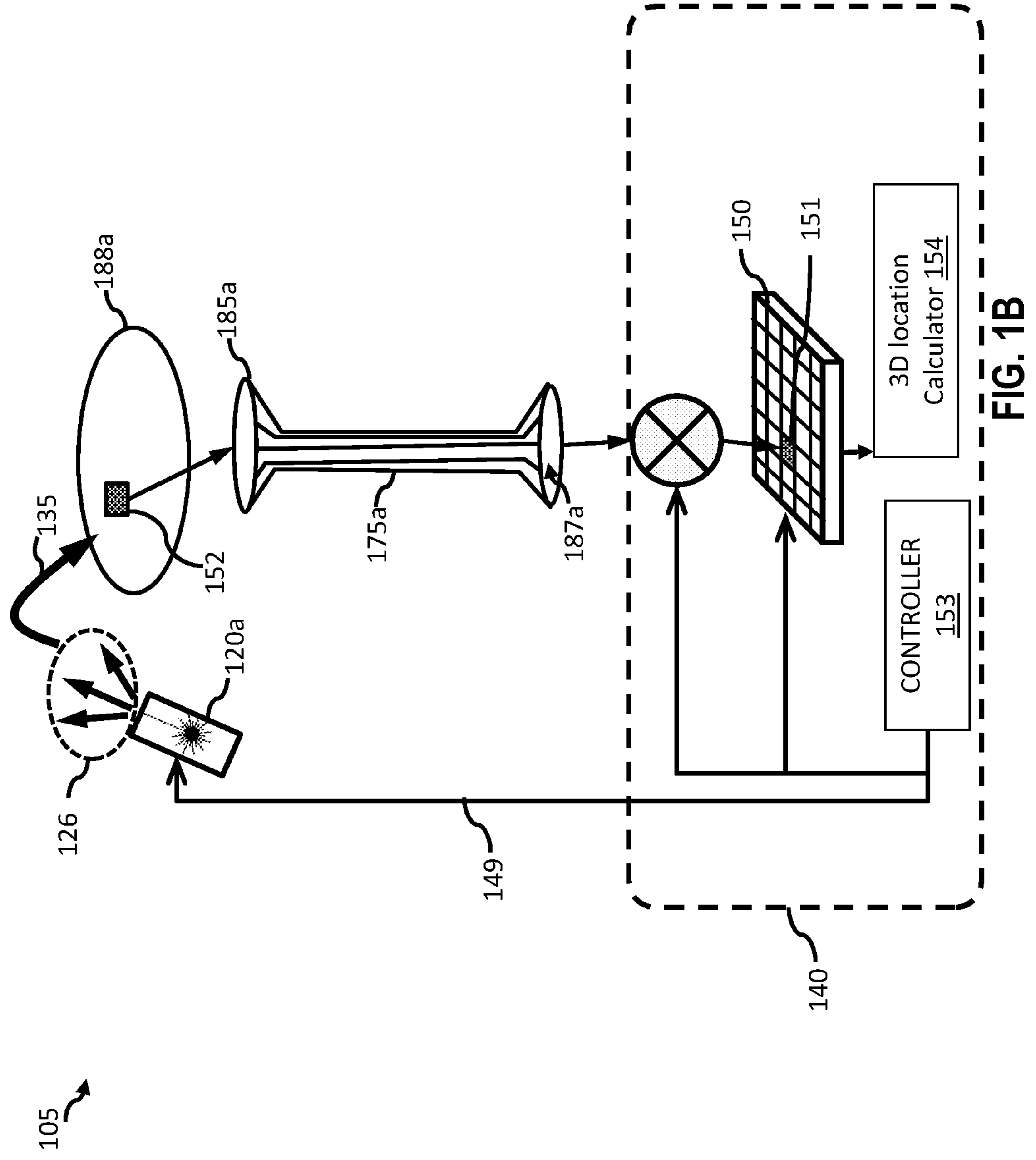
FIG. 1B illustrates a distributed LIDAR system including a remotely located ranging subassembly and a fiber optic image bundle according to an embodiment of the present disclosure.

FIG. 1B illustrates the operation of an exemplary distributed LIDAR system 105 according to an embodiment of the present disclosure. Distributed LIDAR system 105 comprises a light generator 120*a* that can generate an outgoing set of light pulses 126. LIDAR system 105 further comprises a CFOB 175*a* comprising an input surface 185*a*, an output surface 187*a* and a coherent bundle of elongated optical fibers connecting the input and output surfaces, the bundle having a common spatial sequence at the input and output surface. For example, a CFOB can have a bundle of 9 fibers identified by the numbers 1-9 and an exemplary spatial sequence can be to arrange the fibers in a 3×3 grid with a sequence from left to right and top to bottom given by 1, 2, 3, 4, 5, 6, 7, 8, 9. In the case of a coherent CFOB the same sequence or ordering of the optical fibers in the bundle is preserved at the input and output surfaces. Finally CFOB 175*a* has a FOV 188*a* comprising the set of all directions that a light reflection (e.g., reflection 135) from at least one of the set of outgoing light pulses, can enter the bundle of coherent optical fibers at the input surface 185*a*. FOV 188*a* can be a 2-D angular range (e.g., an azimuthal range and an elevation range). Alternatively a FOV can be a 1-D angular range (e.g., an azimuthal angular range at a particular elevation).

CFOB 175*a* can have one or more expanded ends where some or all of the coherent optical fibers have a larger cross-section than in the center of each elongated fiber, thereby aiding the transmission of light reflections into each CFOB at the input surface or transmission from the output surface. CFOB 175*a* functions to channel light reflections from the outgoing light pulses into the coherent optical fibers. The specialized structure of each CFOB (discussed in depth later) enables transmission of the light reflections along the length of the CFOB without mixing light between fibers. Therefore, while the output surface may be very small (e.g., 1 mm in diameter) it can contain thousands of non-interacting optical fibers in a known sequence. Hence, the location of a reflection in the sequence at the output surface can be highly indicative of the reflection direction in the corresponding FOV (e.g., 188*a*).

LIDAR system 105 further comprises a ranging subassembly 140 that can be remotely located from the FOV 188*a*. This is a distinction from external mounted LIDAR where the ranging subassembly is often placed with direct line-of-sight access to reflections from the outgoing light pulses. Ranging subassembly 140 can contain a photodetector array 150 comprising a 2-D array of detector elements. Photodetector array 150 can be optically coupled to the output surface of CFOB 175*a* (e.g., coupled through free space, coupled using one or more lenses or FOV combiners). Photodetector array 150 can function to detect a set of light reflections, each with an arrival time and reflection direction within the FOV. Unlike a single core optic fiber cable (e.g., the fiber optic cables disclosed in U.S. Pat. No. 9,069,059) in which the arrival direction of each light reflection is lost as the reflection bounces along the core, the CFOB 175*a* instead indicates the arrival direction in the FOV of each light reflection by the position of the reflection (e.g., location in the sequence) at the output surface. In this way CFOB 175*a* can enable a detector array 150 to associate each of the 2D array of detector elements (e.g., element 151) with a portion of a FOV (e.g., portion 152). Detector 150 can detect a corresponding arrival direction associated with each light reflection by identifying the particular detector element (e.g., detector element 151) at which the reflection was detected. The CFOB components can function to create a relationship (e.g., a mathematical transfer function) between each detector element (e.g., element 151) in the photodetector array and a corresponding subset of directions in one or more FOVs (e.g., subset of directions 152). Therefore, the CFOBs enable an arrival direction to be associated with a light reflection at the detector array by identifying the particular detector element that senses the light reflection and a known relationship (e.g., transfer function) between the detector element and a direction or subset of directions in a FOV. Exemplary 2D photodetector arrays can be the 128×128 InGaAs array in TigerEye Flash Lidar from ASC of Santa Barbara CA, or the Matrix Avalanche Photodiode (APD) array product line from Pacific Silicon Sensors Inc. of Westlake Village, CA or Part No. VFCH-GAZA (128×128 InGaAs array) from Voxtel Inc. of Beaverton OR.

Ranging subassembly 140 can comprise a time-of-flight controller 153 (e.g., OPT9221 available from Texas Instruments). In one example controller 153 can generate control signals that instruct the emitter to generate light pulses, instruct a FOV combiner to select a CFOB and associated FOV and instruct the photodetector array 150 to select a detector element (e.g., 151). Controller 153 can thereby cause photodetector array 150 to connect detector element 151 to a 3D location calculator 154 that can associate a direction (e.g., based on the selected CFOB and selected detector element) and a range associated with the time-of-flight.

Ranging subassembly 140 further comprises electronic circuitry (e.g., time-of-flight 3D location calculator 154) which computes for each light reflection in the set of light reflections a distance based on the corresponding arrival time, a 3D location indicative of a reflection location corresponding to the each light reflection, based on the distance (e.g., radius or radial distance from the ranging subassembly) and the corresponding arrival direction. 3D location calculator 154 can comprise a time-of-flight calculator coupled to each detector element that can calculate for each light reflection the time difference (e.g., time-of-flight) between when the light reflection was detected by a detector element and when the corresponding output light pulse was generated. The time-of-flight can be multiplied by the speed of light in a vacuum or in air to determine an estimate of the distance or range to a reflection location associated with each light reflection. Finally, a 3-D location estimator circuit 154 can calculate for each light reflection a 3D location according to the detected arrival direction or location of the detecting element in the detector array and the distance. In another aspect, the 3D direction corresponding to each light reflection from a FOV can be determined based in part on a stored value for the location and/or orientation (e.g., forward or rear facing) associated with the FOV (e.g., location: Left Rear Wing, orientation: Forward facing). The location and/or orientation of the corresponding FOV can be used to perform an operation on each light reflection to enable all 3D locations for all FOVs to be plotted in a single point cloud (e.g., a single point cloud representative of 3D locations of all reflection locations relative to a single origin). In yet another aspect, the 3D location calculator can receive initial data indicative of a time-of-flight (e.g., electronic charge data from a photodetector array element) and can correct the initial data based on a known time or distance offset associated with the length of control signal path 149 to the emitter and the length of the CFOB. For example, a distributed LIDAR system 105 can be installed in a vehicle and one or more time or distance offsets can be stored in controller 153 or 3D location calculator 154 to account for portions of the time-of-flight of each light reflection that are due to output pulse generation and transmission of the received light reflection from the input surface of the CFOB to the photodetector array 150.

Figure 1C:
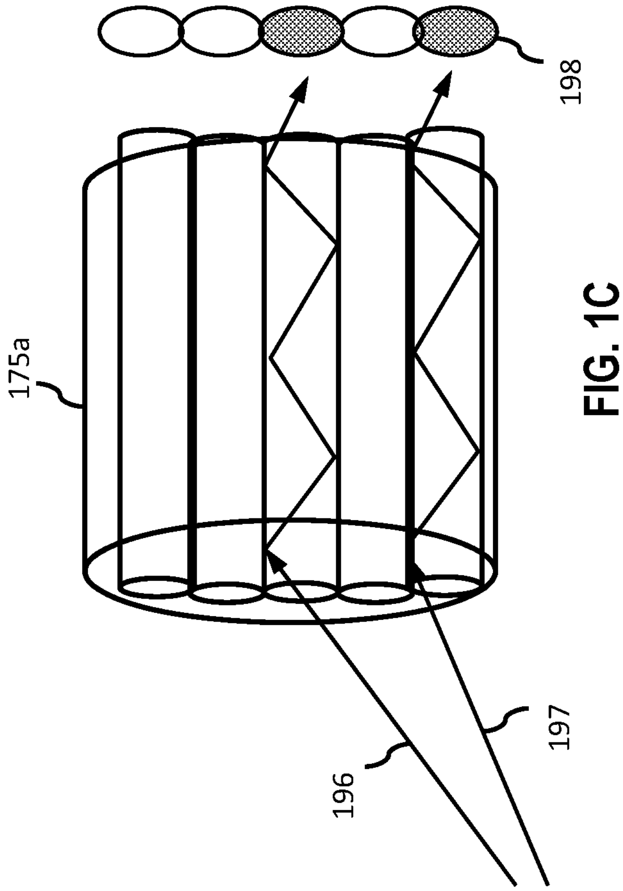
FIG. 1C illustrates a coherent fiber optic image bundle according to an embodiment of the present disclosure.

FIG. 1C illustrates an operating principle of a CFOB. Light rays incident on the input surface in directions 196 and 197 are transmitted in corresponding optical fibers. The sequence of fibers is repeated at the output surface. The light is internally reflected in two of the optical fibers but does not leak into neighboring optical fibers. Hence, while the light is homogenized (e.g., homogenized into uniform intensity spot 198) at the end of the CFOB the incoming direction can be inferred from the placement of the spot within the sequence.

Figure 2:
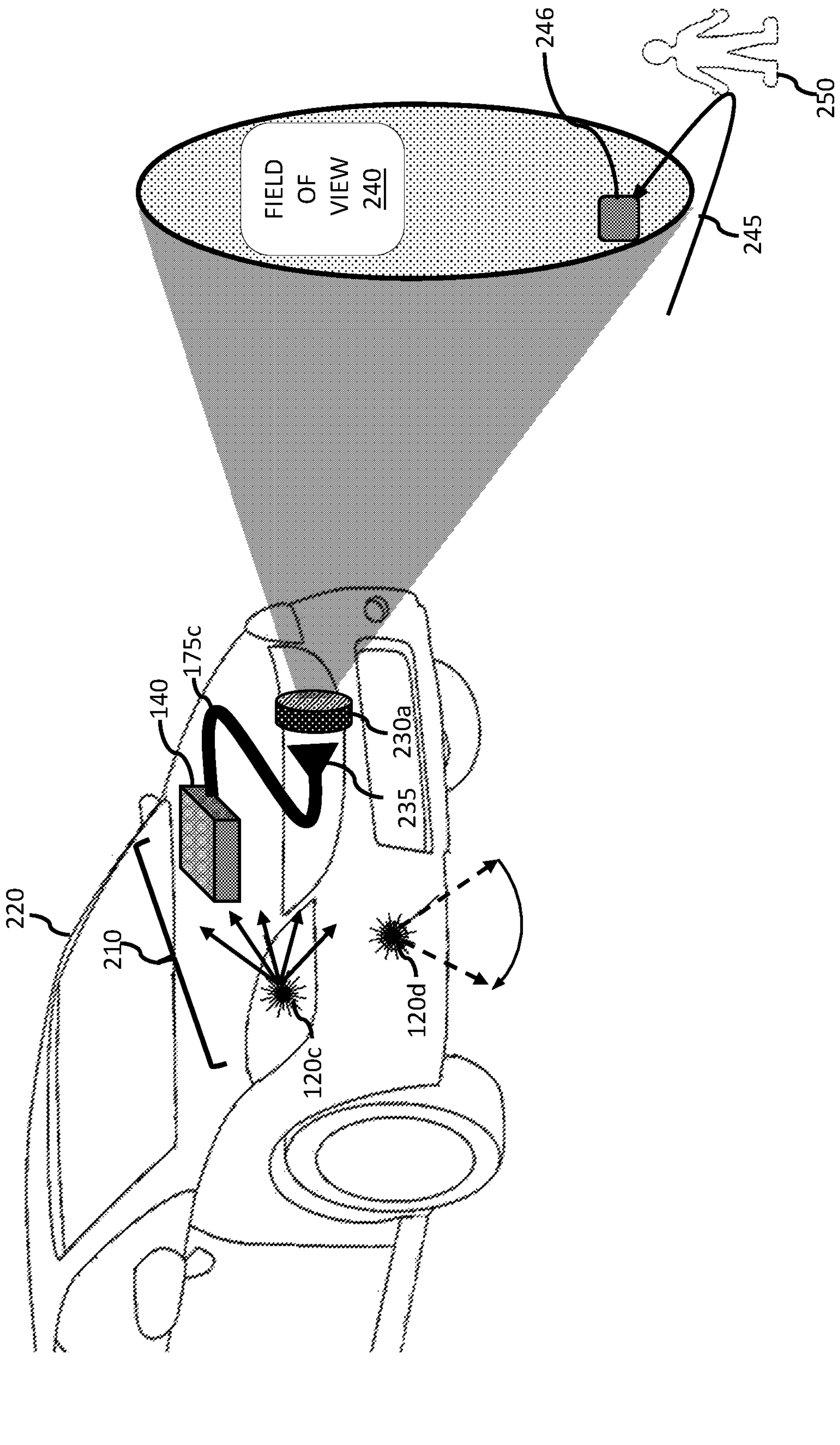
FIG. 2 illustrates a vehicle-based distributed LIDAR system with a remote ranging subassembly and a fiber optic image bundle, according to an embodiment of the present disclosure.

FIG. 2 illustrates another embodiment of a LIDAR system 210 integrated into a vehicle 220. In the embodiment of FIG. 2 remotely located LIDAR system 210 comprises a laser emitter 120*c* to generate a set of outgoing laser pulses in a plurality of directions simultaneously. Laser emitter 120*c* can comprise one or more laser diodes and a light diffuser to spread the laser pulses over a range of directions in the vicinity of the vehicle.

LIDAR system 210 further comprises a lens 230*a* and CFOB 175*c* to gather laser reflections (e.g., laser reflection 245 from person 250) and transmit the laser reflections to a remotely located ranging subassembly 140. Lens 230*a* can be a concave lens operable to gather laser reflections from a FOV 240 and focus the laser reflections onto the input end of CFOB 175*c*. CFOB 175*c* can have an expanded end 235 designed to gather laser reflections from distinct portions of FOV 240 into CFOB 175*c*. CFOB 175*c* transports laser reflections while keeping them separated thereby preserving an indication of the direction associated with a laser reflection 245, or a range of directions (e.g., illustrated by portion 246 of the FOV 240). Lens 230*a* and the input end of CFOB 175*c* are located with direct optical access to the environment surrounding vehicle 220. Exemplary locations include behind a grille, as part of a headlight or indicator light assembly, behind a window (e.g., a windshield) or located in an opening in a body panel. CFOB 175*c* can be embedded behind a body panel, or can be part of a wiring bundle (e.g., a headlight wiring bundle). Ranging subassembly 140 can be located inside the engine or passenger compartment. For example, ranging subassembly 140 can be located in close proximity to the automotive electronic control unit (ECU). Alternatively ranging subassembly 140 can be located with a processing subassembly (e.g., in a region of the vehicle devoted to computer vision or autonomous vehicle control). This is a departure from traditional LIDAR architectures where the ranging subassembly typically has direct line-of-sight access to the FOV and transfers data at high speed to a processing subassembly.

In an alternative embodiment, LIDAR system 210 can comprise a scanning laser emitter 120*d*. Scanning laser generator 120*d* can be similar to the laser generator on a scanned LIDAR and can comprise one or more laser diodes and/or a laser positioner to position the laser beam. The laser positioner can be a mechanical positioner such as a rotating mirror found in mechanical LIDAR (e.g., the HDL-64e LIDAR from Velodyne Inc. of Morgan Hill CA.)

Coherent Fiber Optic Image Bundles

FIG. 3A illustrates fiber optic cable 305 comprising two optical fibers 310*a* and 310*b*. Fiber optic cable 305 is illustrated for the purpose of comparing and contrasting a fiber optic cable with a coherent optical fiber image bundle. Single and multi-fiber optic cables have been used for optical data transmission. Coherent fiber optic image bundles share some fundamental elements with fiber optic cables (e.g., core optic fiber strands) but have several structural and architectural differences designed to enable image transfer rather than signal transfer. Fiber optic cable 305 comprises two optical fibers 310*a* and 310*b*. Each optical fiber comprises an outer jacket 312 for insulation and environmental protection, a strength member 314 to prevent breakage, a glass or plastic core 318 and cladding 316 to retain light in the core. FIG. 3B illustrates a fused CFOB, comprising a multitude of cores each with cladding material to retain light through internal reflection. The cores and cladding material are fused such that the sequence of fibers at the input surface 322 is repeated at the output surface 324.

In one aspect, the ratio of core material to the total area of the input surface is called the packing fraction. In CFOBs the packing fraction is high (e.g., >60%) since the objective is to transfer a 2D array of light reflections (e.g., an image) from the input end to the output end.

Looking at FIGS. 3A and 3B two distinctions between fiber optic cable 310 and CFOB 320 are apparent. Firstly, a fiber optic cable 310 is designed to protect and isolated one or several cores and hence the packing fraction is low (e.g., <10%), due in part to the thickness of the cladding and strength members. Secondly, fiber optic cable 310 does not conserve the spatial relationship between the positions of the cores at the ends of the fiber optic cable.

To further illustrate differences in the structure of CFOBs a brief overview of CFOB construction is presented and constituent components are illustrated in FIGS. 3C and 3D. A first step of constructing a CFOB involves assembling of a monofiber. FIG. 3C illustrates a monofiber 330 comprising a core 335 and a cladding 340. In comparison to fiber optic cables for data transport, the packing fraction is important in CFOBs and hence the choice of core shape can improve packing fraction, by reducing the space between fibers. For example, core 335 is approximately a square, resulting in a greater packing fraction than a circle of similar cross sectional area. The monofiber 330 is then heated and drawn down to size (e.g., 1-100 μm in diameter), thereby fusing the cladding to the core.

FIG. 3D illustrates a second step of constructing a CFOB, comprising a multi-fiber boule 350 made from thousands of monofibers. The multi-fiber boule can further comprise extra-mural absorption fibers. Extra-mural absorption (EMA) fibers are special black absorbing fibers, inserted between (or in place of) mono fibers, which will absorb stray (scattered) light in the fiber optic material. The multi-fiber boule is fused together in a heating process and drawn down to the final elongated shape. Importantly the sequence of monofibers can remain consistent throughout the process. The drawing process can generate rigid fused CFOBs. The ends of the CFOBs can be expanded to enable a larger surface on which to focus light reflections with a lens. FIG. 3E illustrates an incoherent fused fiber bundle 360 for comparison with the coherent bundle 320 in FIG. 3B.

FIG. 3F illustrates a flexible CFOB 370 with rigid fused ends 375 and 380. A flexible CFOB can be advantageous for vehicle (e.g., car) enabling installation in wire bundles, and behind body panels. Flexible CFOB 370 can be constructed by bathing the center section of a fused CFOB in a chemical bath to dissolve the bonds between individual monofiber, thereby causing the center section to be flexible and the ends to remain rigid in order to maintain the coherent light transport properties. For the purpose of this disclosure a flexible CFOB is a fiber optic bundle where the ends are fused in a coherent array and an elongated center section is flexible such that the relative arrangement of the fibers can change.

Dynamically Steerable Laser Range Finder

FIG. 4A illustrates several components of an exemplary dynamically steered laser range finder 405 in accordance with an embodiment of this disclosure. Laser range finder 405 can contain a steerable laser assembly 406. Laser range finder 405 can contain a laser steering parameter generator 410 to receive sensor data and generate laser steering parameters based on the sensor data, Sensor data can be received from sensor data processor 475 or directly from a sensor. Sensor data can indicate one or more aspects of the local environment. Laser steering parameter generator 410 can function to generate laser steering parameters (e.g., instructions) and transmit the parameters to the steerable laser assembly 406. Laser steering parameter generator 410 can transmit the parameters in a timed manner, such that upon receiving each laser steering parameter the steerable laser assembly 406 executes or reacts to the laser steering parameter. Alternatively, laser steering parameters can be transmitted in a batch or instruction file that is executed over a period of time by the steerable laser assembly 406.

Steerable laser assembly 406 can comprise one or more laser generators 420 and a laser positioner 430. The one or more laser generators 420 (often shortened to "lasers") can be laser diodes to produce one or more laser beams (e.g., beam 435) at one or more locations in the FOV determined by the laser positioner 430. Laser positioner 430 functions to steer one or more laser beams (e.g., beam 435) in the FOV based on the laser steering parameters. Laser positioner 430 can mechanically steer a laser beam from laser generator 420. Rotating LIDARs often use a mechanically steered laser positioner. An exemplary mechanically steered laser positioner 430 can include mechanical means such as a stepper motor or an induction motor to move optical components relative to the one or more laser generators. The optical components in an exemplary mechanical laser positioner can include one or more mirrors, gimbals, prisms, lenses and diffraction grating. Acoustic and thermal means have also been used to control the position of the optical elements in the laser positioner 430 relative to the one or more laser generators 420. Laser positioner 430 can also be a solid state laser positioner, having no moving parts and instead steering an incoming laser beam using electronic means to steer the laser beam in an output direction within the FOV. For example, an electronically steerable laser assembly can have a solid state laser position comprising a plurality of optical splitters (e.g., Y-branches, directional couplers, or multimode interference couplers) to split an incoming laser beam into multiple portions. The portions of the incoming laser beam can then be transmitted to a plurality of delay lines where each portion is delayed by a selectable amount (e.g., delaying a portion by a fraction of a wavelength). Alternatively the delay lines can provide wavelength tuning (e.g., selecting slightly different wavelengths from an incoming laser beam). The variable delayed portions of the incoming laser beam can be combined to form an output laser beam at an angle defined at least in part by the pattern of delays imparted by the plurality of delay lines. The actuation mechanism of the plurality of delay lines can be thermo-optic actuation, electro-optic actuation, electro-absorption actuation, magneto-optic actuation or liquid crystal actuation. Laser positioner 430 can be combined with one or more laser generators 420 onto a chip-scale optical scanning system such as DARPA's Short-range Wide-field-of-view extremely agile electronically steered Photonic Emitter (SWEEPER). Laser positioner 430 can also be one or more electromechanical mirrors such as the array of electromechanical mirrors disclosed in U.S. Pat. No. 9,128,190 to Ulrich et al. For the purpose of this disclosure a steerable laser assembly (e.g., 406 in FIG. 4A) is considered a dynamically steerable laser assembly if the laser positioner (e.g., positioner 430) can dynamically steer laser pulses in the course of a scan of a field of view. In some embodiments a dynamically steerable laser assembly has a laser positioner that comprises circuitry to process instructions (e.g., laser steering parameters) during a scan of a FOV and a reconfigurable mechanical or electronic tuning portion to direct one or more laser pulses during the scan. For example, a steerable laser assembly can have 64 lasers and a laser positioner comprising a simple rotating mirror. In contrast a dynamically-steerable laser assembly may have 64 lasers and an optical beam steering array operable to steer laser pulses from each of the lasers dynamically based on a stream of instructions (e.g., laser steering parameters) provided during a scan of a FOV.

Laser range finder 405 can further comprise a ranging subassembly 438. Ranging subassembly 438 can have a detector 440 that can comprise a photodetector 450 (e.g., photodiodes, avalanche photodiodes, PIN diodes or charge coupled devices CCDs, single photon avalanche detectors (SPADs), streak cameras). Photodetector 450 can also be a 2D photodetector array such as a CCD array or an InGaAs array. Detector 440 can further comprise signal amplifiers and conditioners 452 (e.g., operational amplifiers or transconductance amplifiers) to convert photocurrent into voltage signals. Ranging subassembly 438 can further comprise circuitry such as a time of flight calculator circuit 455 (e.g., a phase comparator) and an intensity calculator 460. The construction of the steerable laser assembly 406 can co-locate detector 440 and steerable laser assembly 406 such that detector 440 is pointed in the direction of the outgoing laser beam and can focus the detector on a narrow part of the FOV where the reflected light is anticipated to come from.

Steerable laser assembly 406 can contain a time of flight calculator 455 to calculate the time of flight associated with a laser pulse striking an object and returning. The time of flight calculator 455 can also function to compare the phase angle of the reflected wave with the phase of the outgoing laser beam and thereby estimate the time-of-flight. Time of flight calculator 455 can also contain an analog-to-digital converter to convert an analog signal resulting from reflected photons and convert it to a digital signal. Laser range finder 405 can contain an intensity calculator 460 to calculate the intensity of reflected light. Laser range finder 407 can further comprise a 3D location calculator 464 to calculate a 3D location associated with a laser reflection 445.

Laser range finder 405 can contain a data aggregator 465 to gather digitized data from time of flight calculator 455 and intensity calculator 460 or 3D location calculator 464. Data aggregator 465 can group data into packets for transmitter 470 or sensor data processor 475. Laser range finder 405 can contain a transmitter 470 to transmit data packets. Transmitter 470 can send the data to a processing subassembly (e.g., a computer or a remote located sensor data processor) for further analysis using a variety of wired or wireless protocols such as Ethernet, RS232 or 802.11.

Laser range finder 405 can contain a sensor data processor 475 to process sensor data and thereby identify features or classifications for some or all of the FOV. For example, data processor 475 can identify features in the FOV such as boundaries and edges of objects using feature identifier 480. Data processor 475 can use feature localizer 485 to determine a region in which the boundaries or edges lie. Similarly a classifier 490 can use patterns of sensor data to determine a classification for an object in the FOV. For example, classifier 490 can use a database of previous objects and characteristic features stored in object memory 495 to classify parts of the data from the reflected pulses as coming from vehicles, pedestrians or buildings. In the embodiment of FIG. 4A sensor data processor 475 is located close to the steerable laser assembly (e.g., in the same enclosure), thereby enabling processing of the sensor data (e.g., reflection ranges) without the need to transmit the reflection data over a wired or wireless link. FIG. 4A is an example of an embedded processing architecture where the latency associated with a long distance communication link (e.g., Ethernet) is avoided when transmitting range data to the sensor data processor.

FIG. 4B illustrates several components of a dynamically steered laser range finder 407 in accordance with an embodiment of this disclosure. In this embodiment the data processing and laser steering parameter generation components are remotely located from the steerable laser assembly 406. Steerable laser assembly can contain one or more lasers (e.g., laser generator 420), and a positioner 430, that can include circuitry to dynamically steer a laser beam from the laser generator based on processing laser steering parameters. Laser range finder 407 can contain a receiver 415 to receive laser steering parameters from the remotely located laser steering parameter generator 410. Receiver 415 can be a wired or wireless receiver and implement a variety of communication protocols such as Ethernet, RS232 or 802.11. Transmitter 470 can transmit data from the time of flight calculator 455 intensity calculators and 3D location calculator 464 (in FIG. 4A) to a remote located data aggregator 465.

FIG. 5 illustrates several components of a laser range finder 510 according to several embodiment of the present disclosure. Laser range finder 510 can contain a processing subassembly 520, a steerable laser assembly subassembly 505 and a communication link 530 for linking the processing and steerable laser assemblies. Processing subassembly 520 can include one or more processors (e.g., sensor data processor 475 in FIGS. 4A and 4B) and one or more transceivers (e.g., a transceiver including receiver 415 and transmitter 470) such as an Ethernet, RS485, fiber optic, Wi-Fi, Bluetooth, CANBUS or USB transceiver. Processing subassembly 520 can also include a computer-readable storage medium (e.g., flash memory or a hard disk drive) operable to store instructions for performing a method to detect and utilize a remote mirror (e.g., a roadside mirror). Steerable laser assembly 505 can include a laser generator 420 and a laser positioner 430 to steer a laser beam at one or more locations in the FOV based on the laser steering parameters. Laser positioner 430 can include one or more optical delay lines, acoustic or thermally based laser steering elements. In a solid state steerable laser assembly laser positioner 430 can function to receive instructions (e.g., laser steering parameters) and thereby delay portions of a laser beam (i.e., create a phase difference between copies of the laser beam) and then combine the portions of the laser beam to form an output beam positioned in a direction in the FOV. A mechanical laser positioner 430 can be a mirror and mirror positioning components operable to receive input signals (e.g., PWM input to a steeper motor) based on laser steering parameters and thereby steer the mirror to position a laser in a direction in the FOV. Steerable laser subassembly 505 can also include a detector 440 comprising components such as light sensor(s) 450, time of flight calculator 455 and light intensity calculator 460. Steerable laser subassembly 505 can include one or more transceivers (e.g., receivers 415 and transmitters 470) such as Ethernet, RS485, fiber optic, Wi-Fi, Bluetooth, CANBUS, or USB transceivers. Communication link 530 can be a wired link (e.g., an Ethernet, USB or fiber optic cable) or a wireless link (e.g., a pair of Bluetooth transceivers). Communication link 530 can transfer laser steering parameters or equivalent instructions from the processing subassembly 520 to the steerable laser assembly 505. Communication link 530 can transfer ranging data from the steerable laser assembly to the processing subassembly 520.

When operably linked to steerable laser assembly 505 the processing subassembly 520 can perform one or more embodiments of the method to find, utilize and correct for a remote mirror in the FOV of laser range finder 510.

Laser steering parameters can be instructions operable to steer a laser beam with a steerable laser assembly in a FOV or steer a controllable magnifier. For example, in an electronically scanned laser range finder (e.g., model S3 from Quanergy Inc. of Sunnyvale, CA) a set of laser steering parameters can define aspects of the output laser beam such as the direction, pulse duration, intensity and spot size. Laser steering parameters can function to instruct the laser generator 420 to define aspects such as laser spot size, intensity and pulse duration. Laser steering parameters can instruct laser positioner 430 how to delay portions of the laser beam and combine the delayed portions to define the direction of the output laser beam. A mechanically steered LIDAR can perform dynamic steering by using laser steering parameters to dynamically position the laser in the FOV or to dynamically position a mirror to reflect the laser beam in a desired direction. Laser steering parameters can be operable to instruct a steerable laser assembly to steer a laser beam and can be transmitted to the steerable laser assembly as a file. Alternatively laser steering parameters can be stored in a file and can be sequentially processed and used to generate electrical signals operable to generate and guide a laser beam. For example, laser steering parameters similar to the parts of a stereolithography (.STL) file. STL files are commonly used as instruction sets to position extruder heads and cutting heads in 3D printers, cutting tools and laser stereolithography. A set of laser steering parameters can include a start location indicating where one or more other laser steering parameters should be applied. A Start location can be a point in a Cartesian coordinate system with an associated unit of measure (e.g., 20 mm to the right and 20 mm above the lower right corner of the lower left corner of the field of view). In several laser range finders the FOV is described in terms of angular position relative to an origin in the FOV. For example, a starting point could be +30 degrees in the horizontal direction and +10 degrees in the vertical direction, thereby indicating a point in the FOV.

A laser steering parameter can be a region width or a region height. The width and height can be expressed in degrees within the FOV. One exemplary set of laser steering parameters could include a start location, region width and region height thereby defining a four sided region in the FOV. Other laser steering parameters in the exemplary set of laser steering parameters can indicate how to tailor a scan within this region, such as laser scan speed, laser pulse size or number of laser pulses.

A laser steering parameter can be one or more region boundaries defining the bounds of a region. A laser steering parameter can be one or more laser pulse locations. Pulse locations can provide instructions to a steerable laser to move to corresponding positions in the FOV and generate one or more laser pulses. In some embodiments the laser can be generating a laser beam while being steered from one location to another and can dwell for some time at the laser pulse locations. In other embodiments the steerable laser can use these points to generate discrete pulses in the defined locations. In such embodiments the laser beam can be generated at discrete pulse locations and can dwell at the pulse location for some time.

A laser steering parameter can be one or more path waypoints, which define points in a FOV where a steerable laser can traverse or points at which the steerable laser can implement direction changes. It would be obvious to a person of skill in the art that several laser steering parameters can produce equivalent or nearly equivalent regions of non-uniform pulse density.

FIG. 6 illustrates a LIDAR system 610 distributed in a vehicle 220, that uses three CFOBs 175*d-f* to gather laser reflections from a variety of FOVs (e.g., FOV 620*a* and 620*b*) at a shared receiver assembly 140 located remotely from the FOVs. In the embodiment of FIG. 6 emitters 120*c* and 120*e* create a set of outgoing light pulses in a plurality of directions. LIDAR system 610 can comprise a set of lenses (e.g., 230*b* and 230*c*) that function to gather light reflections from some of the light pulses from within a corresponding FOV (620*a* and 620*b*) and focus the laser reflections onto an input surface of a corresponding CFOB (e.g., CFOBs 175*d-f*). LIDAR system 610 can perform laser ranging in FOV 620*a* located in front of vehicle 220 using lenses and CFOBs that can be integrated into headlight assemblies. Other flexible CFOBs can be arranged within the structure of vehicle 220 to reach the rear of the vehicle and gather laser reflections from the rear or rear blindspots (e.g., the left and right of the vehicle). In one embodiment CFOB 175*f* and lens 230*d* can be co-located with a backup camera, an ultrasonic backup sensor or located in a rear light assembly. In a related embodiment a distributed LIDAR system in an articulated tractor-trailer vehicle (e.g., an 18-wheel truck) can further comprise one or more fiber-optic connectors to connect one or more CFOBs within a trailer to a receiver assembly 140 in the tractor portion. A fiber-optic connector comprising two connector halves can connect two ends of two CFOBs to form a single continuous CFOB. Alignment features in a fiber-optic connector can align the two CFOBs thereby ensuring the spatial arrangement of reflections in the connected CFOBs is maintained between the input surface of a first CFOB (e.g., located in the trailer) and the output end of a second CFOB (e.g., located in the tractor of an articulated vehicle).

FIG. 7 illustrates a distributed LIDAR system 710 in a vehicle 220. In the embodiment of FIG. 7 lenses 230*b* and 230*c* can have a wide FOV (e.g., FOV 720*a* and 720*c* can be 60 degrees azimuthal and 60 degrees elevation), thereby providing LIDAR coverage to the sides of vehicle 220. Lens 230*e* can be designed to focus a narrow FOV 720*b* onto the input surface of a CFOB (e.g., 20 degrees azimuthal and 20 degrees elevation), thereby providing greater resolution for detecting objects ahead of vehicle 220. In one aspect, CFOB 175*h* can have a few fused optic fibers (e.g., 500-1000) and can be positioned in a location that can be too small to accommodate a complete LIDAR (e.g., wing mirror or a spoiler) and can transport laser reflections from a FOV 720*d*. In some embodiments, several small CFOBs can project laser reflections onto a detector array simultaneously. For example, FOV combiner 160 can spatially combine laser reflections from several small CFOBs such as those on wing-mirrors, or in wheel arches and thereby use a single detector array 150 to sense light reflections in multiple FOVs simultaneously. The same FOV combiner 160 can time multiplex the spatially combined smaller FOVs (e.g., 720*d*) with larger FOVs providing more reflections and therefore requiring dedicated access to the photodetector array 150. For example, FOV combiner 160 can combine reflections from 6 small CFOBs (e.g., 100,000 fused fibers) each measuring reflections from a 10×10 degree fOV (e.g., 720*d*). FOV combiner can further timeshare (e.g., time multiplex) the photodetector array 150 between the combined reflections from the smaller CFOBs (e.g., 175*h*) and 3 large CFOBs (e.g., 1 million fibers) that gather reflections from important broad FOVs (e.g., 720*c*) or high resolution reflections from a narrow FOV (e.g., FOV 720*b*). Smaller CFOBs can provide lower resolution LIDAR coverage than larger CFOBs in areas such as blindspots, wheel arches, doors and bumpers. In this way CFOBs can be supplied to replace backup sensors or blindspot warning sensors.

FIG. 8 illustrates several components of LIDAR system 810 according to an embodiment of the present disclosure. A ranging subassembly 140 is located remotely from several FOVs (e.g., FOVs 720*a*-720*c*) and functions to determine 3D locations corresponding to light reflections from light pulses in a set of outgoing light pulses (e.g., pulse 125) within one of the FOVs. Ranging subassembly 140 can comprise electronic circuitry (e.g., controller 820) to transmit signals 825 to light generators (e.g., flash light generator 120*a* or scanned light generator 120*d*). Signals 825 cause the light generators to generate a set of one or more outgoing light pulses (e.g., pulse 125). Light pulses can be coherent light (e.g., laser light) or incoherent light (LED flashes). Controller 820 can comprise signal generation and transmission circuitry such as a memory, and an output transistor to generate signals 825. Controller 820 can further comprise a timing circuit to measure the time between the generation of signal 825 and the detection of corresponding reflections. Alternatively, controller 820 can send a timing signal to other circuitry (e.g., time-of-flight calculator 455 or 3D location calculator 464. The timing signal can indicate that a signal 825 has been sent to one or more light generators.

Reflections from light pulses (e.g., reflections 245 and 850*a*) can be focused by lenses (e.g., 230*c*) onto the input surfaces of CFOBs 175*d*, 175*e* and 175*i*. In one aspect, CFOB 175*i* and lens 230*e* can gather reflections 850*a* in a FOV 720*f* that is a narrow subset of a wider FOV 720*e*. This is useful because LIDAR system 810 can thereby alternate between ranging at a first resolution (e.g., 2 degrees azimuth per detector element) in a wide FOV 720*e* and ranging with a second finer resolution (e.g., 0.1 degrees of azimuthal angular range per detector element) in a narrower FOV 720*f*. LIDAR system 810 can further comprise one or more FOV positioners 860 that can control the mechanical position or relative spatial arrangement of a CFOB (e.g., 175*i*) and lens (e.g., 230*e*) to dynamically alter the properties of a corresponding FOV 720*f*. For example, lens 230*e* can be a zoom-lens comprising a set of three lens forming an a-focal zoom system or a vari-focal lens. FOV positioner 860 can receive signals from the ranging subassembly 140, and can convert the signals to mechanical movements operable to pan, tilt or zoom lens 230*e* and thereby position FOV 720*f*.

In another aspect, ranging subassembly 140 can further comprise an enclosure with separable optical connectors (e.g., connector 815). Optical connector 815 enables a CFOB to be attached and detached from the ranging subassembly. The optical connector can contain an optical pass-through (e.g., a piece of glass) and can contain a feature to register the CFOB relative to the ranging subassembly enclosure, thereby ensuring a precise orientation for the CFOB that can be related to the input FOV. For example, the registration feature can be a detent or a pin that ensures the optical connector connects the CFOB to the ranging subassembly enclosure in only one specific orientation of the CFOB, thereby ensuring a specific orientation of the output surface and alignment of the fiber bundle relative to the photodetector array 150. Detachable optical connectors (e.g., 815) provide for replacement of either the associated CFOB or the range subassembly 140, should either component require replacement. Optical connectors further enable the ranging subassembly to be sealed (e.g., potted or permanently sealed to avoid water ingress) similar to sealing requirements on automotive electronics in the engine compartment (e.g., ingress protection standard 67 or IP67). Optical connectors 815 can be part of or optically aligned with a FOV combiner 160 in ranging subassembly 140. In another aspect, ranging subassembly 140 can contain a fiber optic taper 840 comprising an expanded section of fused optic fibers similar to a CFOB, which functions to magnify or reduce the light reflections coming from the FOV combiner 160.

FIG. 9 illustrates several exemplary FOV combiners 160 that can function to share several FOVs with a photodetector array, using either spatial combination of FOVs, time multiplexing of FOVs or both spatial and time multiplexing. Exemplary FOV combiners can be a spatial FOV combiner 910, a solid-state electronically switchable mirror multiplexor 920, mechanical optical multiplexor 930 or a micromirror array 940.

FIG. 10A illustrates a spatial FOV combiner 910 that accepts light reflections from a plurality of CFOBs and reduces or condenses the light reflections in order to project light reflections from several FOVs simultaneously onto a detector or detector array. In one embodiment, spatial FOV combiner can comprise a fiber optic taper while in another embodiment, spatial FOV combiner can be a magnifying lens. Spatial FOV combiner 910 can receive light reflections from several FOVs at the output surfaces 1020*a*-1020*c* of a plurality of CFOBs 175*h*-175*j*. Spatial FOV combiner can be arranged such that light reflections from several FOVs are operable to arrive at several portions 1030*a*-1030*c* of an input surface 1040 and are reduced or in some cases magnified and transmitted to an output surface 1050. This configuration can enable light reflections from several input CFOBs to be simultaneously sensed by a photodetector array 150. In this embodiment portions 1030*a-c* of input surface 1040 align directly with the output surfaces of the CFOBs. In other embodiments, various components can act as intermediaries guiding the light reflections from each CFOB to a corresponding input surface or portion of an input surface e.g., 1030*a* in the spatial FOV combiner 910. Exemplary intermediary components can include optical connectors, optical windows, lenses or fiber tapers or optical filters. In one aspect, a fiber optic taper reduces or increases the cross-section of each constituent optic fiber between the input and output surfaces.

One challenge with a spatial FOV combiner comprising a fiber optic taper or a lens is that the space between the portions 1030*a*-1030*c* at the input surface (e.g., surface 1040) is often recreated at the output surface 1050. Hence the ratio of portions 1030*a*-1030*c* to total area of surface 1040 is transferred to the output surface and thereby determines, and in some cases limits, the utilization of the detector array (e.g., percentage of the detector array that is used for range detection). FIG. 10B illustrates a spatial FOV combiner 1060 that address this challenge by individually routing multiple CFOB output surfaces 1020*a*-1020*c* to the output surface 1050, thereby increasing the utilization of the detector array 150 to sense light reflections from multiple FOVs simultaneously. Spatial FOV combiner 1060 can comprise several light conduits each comprising an input surface, e.g., 1030*a* an output surface, e.g., 1070*a* and an optically transmitting portion between the input and output surfaces. Exemplary conduits can be glass or plastic pass-through or optical connectors. The conduits function to increase utilization of the detector array 150 by arranging the light reflections from the plurality of CFOBs close together in a shape corresponding to the shape of the detector array. In one alternative embodiment spatial FOV combiner 1060 can comprise an input surface 1040 that simply holds the output surfaces of CFOBs 175*h-j* at an orientation such that at the output surface 1050 the light reflections from the various CFOBs generate a dense arrangement with a shape similar to the shape of the detector array.

FIG. 11 illustrates a FOV combiner embodied as a solid state switchable mirror multiplexer 920 that functions to time multiplex light reflections from a plurality of CFOBs onto a photodetector array 150. Recent advancements in reflective liquid crystal materials have made electronically switchable mirrors possible (e.g., the e-Transflector product line available from Kent Optoelectronics of Hopewell Junction, NY). Solid-state switchable mirror multiplexer 920 can comprise a plurality of switchable mirrors 1110*a* and 1110*b* and mirror control circuitry 1120 to select one or more mirrors. In the unselected state switchable mirror 1110*a* can be transparent and can transmit light reflection(s) 1130*a* from CFOB 175*k* without deflecting the light reflections towards detector array 150. Conversely, in the selected state, switchable mirror 1110*b* can be reflective thereby deflecting light reflections 1130*b* from the FOV corresponding to CFOB 175*l* towards photodetector array 150. In this way mirror control circuitry 1120 can make none, one, some or all of a set of electronically switchable mirrors transparent or reflective and thereby time share the reflected or transmitted light refections from a plurality of CFOBS onto a common detector array.

FIG. 12 illustrates an exemplary mechanical optical multiplexor 930 comprising a rotating mirror 1210 that rotates in direction 1220, thereby periodically deflecting laser reflections (e.g., reflections 1230) from a plurality of CFOBs 175*n* and 1750 onto a detector array 150. In an alternative embodiment of a mechanical optical multiplexor a mirror positioner such as a stepper motor or an actuator can switch the position of a movable mirror, thereby periodically alternating between a plurality of CFOBs and thereby time multiplexing light reflections from a plurality of FOVs.

FIG. 13 illustrates a micromirror array 1310 placed in the field of view 1325 of a photodetector 1315 that can operate to multiplex light reflections from the output ends of two CFOBs 175*n* and 1750 onto the photodetector array 1315. Exemplary micromirror arrays include the DLP6500FLQ DLP chip available from Texas Instruments Inc. of Santa Clara, CA. A modern micromirror array chip can comprise over 4 million electronically positioned micromirrors (e.g., mirror 1320). Reflection positioner 1330 can be similar to an LCD driver chip and can signal individual micromirrors or groups of micromirrors to change position. In the position shown in FIG. 13 the micromirror array deflects light reflections from CFOB 175*n* onto photodetector 1315, while light reflections from CFOB 1750 are not deflected towards the photodetector array 1315.

The micromirror array 1310 can be used to dynamically select inputs for the FOV 1325 of detector 1315. Micromirror array 1310 can occupy the entire FOV 1325 of a detector or photodectector array 1315. In various configurations the micromirror can then present to the detector 1315 light reflections from one of multiple CFOBs, or light reflection from multiple CFOBs simultaneously with light reflections from each CFOB directed to different parts of the detector. Alternatively, micromirror 1310 can then present to the detector 1315 light reflections from multiple CFOBs simultaneously with light from each CFOB directed to overlapping parts of the detector. Mirrors (e.g., 1320) in some of all of the micromirror array can be arranged at different angles to form angled reflectors to focus light reflections from all or portions of a CFOB onto a single detector element or a few detector elements. This can be useful for detecting if any optical fiber in a portion of the output surface of a CFOB is carrying a light reflection. Alternatively micromirrors can form a convex mirror arrangement, thereby spreading light reflections from a portion of the CFOB output surface over a wider portion of the detector (e.g., a wider range of elements in a detector array). In this way the micromirror array can magnify, combine, select and overlap portions of one or multiple CFOBs onto a photodetector 1315. The usefulness of the micromirror array is enhances by available light reflections from multiple FOVs based on the plurality of CFOBs Lidar with a Micromirror Array for Dynamic Reflection Distribution In a related group of embodiments, a flash LIDAR can use a micromirror array to dynamically select one or more subsets of a FOV to transmit to a detector or detector array, and thereby improve the LIDAR resolution. While 2D digital cameras and 3D time-of-flight cameras are similar in some aspects, the different objectives makes scaling detector array in LIDARs challenging. Specifically, 2D digital cameras integrate the charge (photon current) at each pixel on the CCD array over a relatively large acquisition time (e.g., 10-100 milliseconds) often with little regard for when photons arrive within the acquisition time window. Subsequently, a read out circuit can read the charge stored on many pixels in a serial or parallel manner. Advances in the speed of read out circuitry have enabled the resolution of 2D cameras (e.g., number of pixels) to outpace the complexity of the corresponding read out circuitry. For example, read out circuits in 2D cameras are servicing increasing numbers of pixels per read out circuit, thereby enabling higher resolution 2D digital camera. Conversely, 3D time-of-flight cameras are designed to determine when light reflection arrives at the detector array and thereby determine distance to a reflection source. Each pixel often has associated electronics (e.g., transimpedance amplifiers, phase comparators or timing circuits). Hence LIDAR resolution (numbers of pixels per array) has lagged behind that of 2D digital cameras and ways to increase this resolution remain a challenge.

FIG. 14A illustrates an embodiment of a flash LIDAR using a micromirror array to dynamically select subsets of the reflected FOV and thereby improve the resolution. Consider the following example: many state-of-the-art focal plane arrays for IR wavelengths have 128×128 elements (e.g., the TigerCub Flash Lidar available from Advanced Scientific Concepts Inc. of Santa Barbara, CA). Consider that for a 64 degree azimuthal FOV each element receives laser reflections from 0.5 degrees of the FOV. This may seem like a high resolution but consider that at 100 m distance from such a flash lidar a 0.5 degree fOV resolution results in a 1 meter capture area (e.g., 100×Tan (0.5 degrees). Hence an unaided 128×128 element detector array has a 1 square meter resolution at 100 m. A challenge is to enhance this resolution and one way to achieve this is to only accept laser reflections from a portion of each 0.5×0.5 degree region of the FOV that serves each element in the array.

FIGS. 14A and 14B illustrate an embodiment where a micromirror array 1310 selects a sequence of portions of an incoming FOV to present to a detector 1405. In one example micromirror 1310 has 8 million micromirrors. Hence, the ratio of micromirrors to detector elements can be large (e.g., 488 micromirrors per detector element for a 128×128 element detector array and an 8M mirror DLP chip). Turning to FIG. 14A, micromirror array 1310 can be positioned in the FOV of a detector array 1405. Micromirror array 1310 can also have a FOV 1420 comprising the set of all directions in which a light reflection can reach the micromirror array 1310. In one operating mode, portions 1430*a* and 1430*b* of the micromirror FOV 1420 can be focused using input lens 1440 onto corresponding portions 1450*a* and 1450*b* of micromirror array 1310. In one example the portions 1450*a* and 1450*b* can each comprise 488 micromirrors (corresponding to 8 million total mirrors divided by 128×128 total detector elements).

In one aspect, reflection positioner circuitry 1330 can function to adjust the 488 micromirrors in each of the portions 1450*a* and 1450*b* to focus light reflections from the corresponding portions of the micromirror FOV onto corresponding detector elements 1460*a* and 1460*b* respectively. For example, reflection positioner circuitry 1330 can instruct the 488 micromirrors in portion 1450*a* to form a concave reflector with a focal distance equal to the detector array. This can provide operation similar to direct illumination of the detector element by laser reflections from a portion of the FOV. This mode can be useful for detecting weak reflections, since many micromirrors can combine laser reflections from a single part of the FOV (e.g., a 0.5×0.5 degree portion corresponding to 488 micromirrors).

FIG. 14B illustrates another related operating mode in which a micromirror array utilizes only a fraction of the micromirrors in the portions 1450*a* and 1450*b* to deflect light reflections from corresponding portions of the FOV 1420 towards the detector array 1405. In the embodiment of FIG. 14B electronic circuitry 1480 can comprise reflection positioner circuitry 1330 and can instruct micromirror array 1310 to direct a first quarter of each group of 488 micromirrors (e.g., subsets 1470*a* and 1470*b* within portions 1450*a* and 1450*b*) towards the detector array. A controller 820 in electronic circuitry 1480 can instruct the emitter 120*a* to emit a flash or beam of light, thereby illuminating some or all of FOV 1420. The detector array 1405 can measure and record the light reflections on the detector elements (e.g., a 128×128 array). Electronic circuitry 1480, including reflection positioner circuitry 1330 can subsequently instruct the micromirror array 1310 to position a second quarter of the 488 micromirrors in each portion (e.g., portion 1450*a* and 1450*b*) towards corresponding detector elements 1460*a* and 1460*b*. Controller 820 can instruct the light emitter to generate a second light pulse operable to illuminate some or all of a scene visible in FOV 1420. Detector array 1405 can again detect a second set of light reflections from the 128×128 detector elements. The electronic circuitry can generate several configurations thereby positioning a plurality of subsets of the micromirrors in each portion of the array towards the detector array. Following each configuration of the micromirror array the electronic circuitry can instruct the light emitter to generate one or more light pulses. Following each light pulse a set of light reflections are detected by detector array 1405. Detector array 1405 can detect the time of arrival of reflections and an arrival direction. The arrival direction can be indicated by the detector element (e.g., 1460*a* or 1460*b*) in the detector array that detects each light reflection. Electronic circuitry 1480 can further comprise a 3D location calculator 464. For the set of reflections corresponding to each micromirror array configuration the detected times of arrival and directions of arrival can be conveyed from the detector to the 3D reflection positioner using signals.

In one aspect, the 3D location calculator 464 can also receive data indicative of the configuration of the micromirror array 1310. For each light reflection in the set of light reflections the 3D location calculator can generate a 3D location indicative of a reflection location corresponding to the light reflection. The 3D location can be based on a detector element (e.g., the position in a detector array where the reflection was sensed) and further based on the configuration of the micromirror array (i.e., the subset of directions in the FOV being deflected towards the detector array). For example, a detected light reflection at detector element 1460*a* can indicate a reflection at a location encompasses by region 1430*a* in the FOV 1420. The micromirror array configuration can further refine the portion of the FOV to indicate the reflection came from the upper left portion 1435 of region 1430*a*. The time-of-flight between the corresponding emitted light pulse and a light reflection can indicate the range to the reflection location within region 1435. Hence the various micromirror array configurations enable more unique 2D locations (i.e., 2D reflection directions) to be generated (i.e., measured) in a corresponding 3D point cloud, than the number of photodetector elements in array 1405. For example the configuration of FIG. 14B enables 4 discrete configurations of the micromirror array 1310 and a 128×128 detector array to sense reflections in 4×128×128 unique directions.

Remote Lidar with Malfunction Detection

An increasing trend in modern automobiles is the automation of control systems and safety features. Within this environment, an active challenge is the timely identification of malfunctioning equipment and failsafe operation of vehicles in the event of a malfunction. For example, modern automotive electronic control units (ECUs) control acceleration and braking. Techniques such as redundancy, fault tolerance and failsafe modes are used to prevent and safely react to malfunctions. Computer vision systems (e.g., cameras, RADARs and LIDARs) pose some unique reliability challenges, in part because they often involve placing sensors and processors on the exterior of the vehicle where they can be subject to undetected or unreported damage, dirt and degradation (e.g., weather related wear).

A LIDAR with remotely located ranging (e.g., remote from the FOV being detected) is advantageous because it can gather sets of light reflections from a plurality of FOVs around a vehicle, thereby reducing the number of detectors required. However a shared remotely-located ranging subassembly and in particular the associated shared photodetector electronics can represent a single point of failure. For example, imagine that for six distinct fields of view around a self-driving car light-based ranging is performed by a single remotely-located single photon avalanche detector (SPAD) array. If the SPAD were to malfunction, ranging capability in all six FOVs could be lost. Some failure modes of a distributed remotely-located LIDAR are more easily detected than others. For example, a blocked or broken light emitter can be indicated by the absence of light reflections. Similarly, a stuck mechanical component (e.g., a scanning detector or emitter) can be sensed by position feedback. However, other failure modes such as degraded photonic efficiency of a photodetector array or temperature related drift in a time-of-flight calculation circuit can be more difficult to identify. In-system verification of optical ranging system performance can be advantageous considering the critical nature of vision systems for autonomous vehicles.

Within examples, LIDAR systems and methods are provided to generate a malfunction signal when a measure of difference in the performance of two detectors (e.g., avalanche detector arrays) is greater than a threshold value, in response to receiving similar subsets of reflections from a common input set of reflections, gathered from one or more FOVs. In one aspect, of several embodiment, a set of reflections gathered by a failsafe LIDAR is divided into two representative subsets by a reflection splitter (e.g., each sensing light from a similar range of directions in a common FOV). Each of the representative subsets is then directed to at least one of two separate detectors. In one aspect, the two detectors function to provide a measure of redundancy in generation of a 3D point cloud corresponding to the original set of reflections and a method to compare the performance of the two detectors and associated ranging circuitry. Distributing substantially similar subsets of a common set of reflections further provides a measure of failsafe performance in the event that one of the detectors or associated 3D ranging circuitry fails (e.g., continued performance with half of the data). In another aspect the two representative subsets of light reflections can each be detected and processed to form 3D locations. A measure of difference between the processed subsets of reflections can be compared and a measure of difference between the subsets calculated. When the measure of difference exceeds a threshold value, circuitry in the LIDAR can generate a malfunction signal.

In a first embodiment, a failsafe LIDAR comprises one or more emitters which produce an outgoing set of light pulses over one or more fields of view (FOVs), and further comprises means to gather light reflections corresponding to the outgoing set of light pulses (e.g., lenses, mirrors, a field of view combiner or CFOBs). The failsafe LIDAR can further comprise a reflection splitter to direct a first plurality of the light reflections to a first detector and thereby generate first reflection signals. The reflection splitter can further function to direct a second plurality of the light reflections to a second detector and thereby generate second reflection signals. In the first embodiment the reflection splitter can function such that the first and second pluralities of light reflections originate within overlapping 2D angular ranges in the one or more FOVs. Finally, the failsafe LIDAR can comprise electronic circuitry operably coupled to the first and second detectors, which generates a measure of difference between at least some of the first and second reflection signals, and generates at an output from the LIDAR a malfunction signal when the generated measure of difference is greater than a threshold value.

In a second embodiment, the failsafe LIDAR can comprise a primary LIDAR processor to generate 3D locations corresponding to a first plurality of reflections directed to a first detector by a reflection splitter and further comprise a LIDAR co-processor to generate 3D locations corresponding to a second plurality of reflections directed to a second detector by the reflection splitter. The failsafe LIDAR can further comprise a malfunction comparator (e.g., digital comparator) coupled to receive the 3D locations from the LIDAR processor and LIDAR co-processor and to generate a malfunction signal if a difference value indicating a measure of difference between the 3D locations received from each processor is greater than a threshold value. For example, the malfunction circuit can receive 3D point clouds (e.g., sets of 100,000 3D locations) covering a similar FOV from both the LIDAR processor and co-processor. The malfunction circuit could identify a systematic range or distance error (e.g., a consistent range difference of 3 meters between objects appearing in both point clouds) and thereby generate a malfunction signal.

Embodiments of the present disclosure are operable to provide the following exemplary advantages: A failsafe LIDAR according to embodiment of the present disclosure can provide continued operation if one of the two detectors malfunctions. A failsafe LIDAR can identify a malfunction in one or both detectors by calculating a measure of difference based on 3D locations generated from overlapping pluralities of light reflections detected by two detectors. Several embodiments can identify a malfunction of a 3D location calculator used to calculate some or all of the 3D locations corresponding to the first and second plurality of light reflections. For example, first 3D locations based on reflections from a first detector can be calculated by a LIDAR processor. Second 3D locations corresponding to reflections detected by a second detector can be processed by a co-processor and a malfunction indicator circuit process both the first and second 3D locations based on an expected similarity to determine a measure of difference between the sets of 3D locations. The malfunction indicator circuit can reset one or other of the processors if a processor ceases to produce 3D locations, indicates a systematic error (e.g., a systematic range error) or if the measure of difference exceeds a threshold.

Embodiments of the failsafe LIDAR can detect malfunctions earlier than a single detector LIDAR design by calculating the measure of difference based on detecting and processing similar sets of light reflections. The proposed failsafe LIDAR can more effectively differentiate between common-mode malfunction causes that effect all calculated 3D location (e.g., indicating a blocked FOV) and differential-mode malfunction causes that effect one of the detectors or associated 3D location calculators. This can significantly improve root-cause determination (e.g., identify the malfunctioning component). Similarly, the failsafe LIDAR can indicate malfunction data in a malfunction signal, indicating the type of malfunction (e.g., no input light reflections, a systematic range error associated with one processor, no data from one processor or a damaged detector such as a dead detector element). In another advantage, one of the two detectors can be used to calibrate the second detector. For example, one of the detectors can be very accurate, and designed to act as a calibration standard for another detector (e.g., a larger detector with many more elements but periodically in need of calibration).

FIG. 15A illustrates a LIDAR system 1500 with two detectors and a malfunction indicator circuit according with an embodiment of the present disclosure. LIDAR 1500 comprises an emitter 1505. Emitter 1505 functions to generate one or more pulses of light 1510 into field of view 1515. Emitter 1505 can be a stationary emitter such as a fixed position LED or laser diode. Emitter 1505 can also be a steerable emitter such as steerable laser assembly 505 in FIG. 5. Outgoing set of light pulses 1510 can be a set of discrete light pulses or a continuous or semi-continuous beam of light that is modulated to create the outgoing set of pulses based on the modulation. For example, continuous wave (CW) light-based range finding can modulate a continuous or semi-continuous beam of light and each period of the modulation frequency can be considered an outgoing light pulse. In the embodiment of FIG. 15A LIDAR 1500 can gather a set of light reflections from reflection locations in the FOV 1515 at input lens 1517.

Reflection Splitter

LIDAR 1500 comprises a reflection splitter 1510*a* which functions to direct a first plurality of the set of reflections to a first detector 1520*a* and a second plurality to a second detector 1520*b*. Unlike a scanning mirror that directs reflections from a plurality of directions (e.g., spanning a FOV) towards a single detector (e.g., often in a single output direction aimed at the detector), the reflection splitter can direct subsets of a set of light reflections with a common 2D angular range to different distinct detectors (e.g., each of 2 detectors receives light reflections in a 20×20 degree 2D angular range in the center of a FOV 1515). Therefore, each of the two detectors can see a similar set of reflections. By directing two pluralities of reflections, each with substantially similar angular ranges in the FOV to different detectors, reflection splitter 1510*a* can enable LIDAR 1500 to compare the performance of the two detectors and/or the associated 3D location calculation circuitry.

Unlike a multi-transceiver LIDAR system with multiple laser transceiver pairs that simultaneously scan distinct exclusive portions of a FOV (e.g., different elevation angles in a 360 degree azimuthal range such as measured with model HDL-64E from Velodyne Lidars), the reflection splitter can receive light reflections spanning one or more FOVs and distribute distinct pluralities of the light reflections spanning a common 2D angular portions to different detectors (i.e., presenting subsets of light reflections with overlapping 2D angular portions in a FOV to two distinct detectors).

Exemplary reflection splitters can be time multiplexed, such as a mirror that oscillates back and forth and thereby directs a common input range of light reflections onto one of two detectors in repeating sequence. This approach is useful because while neither detector experiences exactly the same reflections as the other (e.g., separated in time by at least one transition of the reflection splitter) the close time correlation ensures similar reflection locations are reported to both detectors (e.g., with a 100 millisecond time difference). For the purpose of this disclosure a reflection splitter is time-multiplexed if the reflection splitter provides light reflections from a common 2D angular range in one or more FOVs to each detector in a set of detectors (e.g., two detectors) in a repeating time sequence such that only one detector in the set receives the reflections at any given time. In the embodiment of FIG. 15A reflection splitter 1510*a* comprises two mirrors 1511*a* and 1511*b*. Mirror 1511*a* can be an imperfect reflector or semitransparent mirror that functions to deflect a first plurality of the set of light reflections towards detector array 1525*a* while permitting a second plurality of light reflection to pass through and be deflected by mirror 1511*b* towards detector array 1525*b*.

Other exemplary reflection splitters can be spatially multiplexed, and thereby direct light reflections from different spatial locations in the FOV to different detectors. One challenge with this approach is that different portions of the FOV can naturally contain reflections from different ranges and hence can complicate the use of deflected subsets of the reflections for comparing the performance of the detector hardware. One solution to address this challenge is a micromirror array (e.g., micromirror array 1310 in FIG. 13) operable to divide the light reflections into two pluralities at a microscopic level. For example, a micromirror array can have two interdigitated arrays of mirrors (e.g., in a checkerboard pattern) each arranged to deflect each incident light reflection in one of two directions. Such an arrangement can split the set of reflections into two distinct pluralities in two different directions, each representative of the same range of angles in the FOV.

A reflection splitter based on an electronically controlled micromirror array or electronically controlled time multiplexed mirror offers some additional advantages such as the ability to periodically perform the time or spatial multiplexing such as during a test of the LIDAR functionality. Conversely, when the functionality of the LIDAR is not being tested the reflection splitter 1510*a* can direct all of the set of light reflections towards one of the detectors. In one aspect, the LIDAR can enter a malfunction testing mode and instruct the reflection splitter to discontinue directing all of the light reflection to a single detector and instead direct a subset representative of a 2D angular portion of the one or more input FOVs to a second detector.

Detectors

LIDAR 1500 can further comprise two detectors 1520*a* and 1520*b* each located to receive a separate plurality of the set of light reflections from reflection splitter 1510*a*. Each detector can function to detect a separate plurality of the set of light reflections and generate a corresponding set of reflection signals. Each detector can further amplify and signals condition the reflections signals. A first detector 1520*a* can generate a first set of reflection signals 1535*a* in response to detecting a first plurality of the set of light reflections. Similarly a second detector 1520*b* can generate a second set of reflection signals 1535*b* in response to detecting a second plurality of the set of light reflections. Each of the detectors can comprise a photodetector (1525*a* and 1525*b*) coupled to amplifier conditioner circuitry (1530*a* and 1530*b*). In the embodiment of FIG. 15A, photodetectors 1525*a* and 1525*b* are illustrated as 2D arrays of photodetector elements. The individual elements in the 2D arrays can be CCDs, photodiodes, avalanche photodiodes or phototransistors. Exemplary photodetectors comprising 2D detector arrays for LIDAR ranging include OPT8241 from Texas Instruments or Part No. VFCH-GAZA (128×128 InGaAs array) from Voxtel Inc. of Beaverton OR. Amplifier conditioner circuitry 1530*a* and 1530*b* can include a transimpedance amplifier to convert current associated with detected photons of light into reflection signals (e.g., voltage signals).

In one architecture each detector element in the 2D photodetector array 1525*a* can be connected to corresponding dedicated amplifier and conditioner circuit (e.g., transimpedance amplifier and signal filter). In this architecture the reflection signal is associated with a sub-circuit in the amplifier conditioner circuitry 1530*a* and hence a direction can be associated with each reflection signal in the first and second set of signal reflections based on the associated sub-circuit. In another embodiment, amplifier and conditioner circuits 1530*a* and 1530*b* can be shared (e.g., time multiplexed) among a 2D array of detector elements (e.g., 1525*a*). In this architecture a 3D location calculator (e.g., 1540*a* and 1540*b*) can instruct a detector array (1525*a* and 15325*b*) to read out each of the 2D array of detector elements to the amplifier circuitry (1520*a* and 1530*b*) in a timed sequence. In this way the first and second set of reflection signals (1535*a* and 1535*b*) can be associated with unique detector elements and thereby the reflection signals can be associated with directions in the FOV 1515. Each of the set of reflection signals can include amplified voltage waveforms from each of the detector elements corresponding to the timing (e.g., phase) and amplitude of reflected light pulses corresponding to the outgoing set of pulses 1510.

LIDAR 1500 can further comprise two 3D location calculators (1540*a* and 1540*b*), each corresponding to a detector (1520*a* and 1520*b*). Each 3D location calculator can be part of a LIDAR controller microchip (e.g., OPT9221 from Texas Instruments). In particular, 3D location calculators can precisely control or receive precise indications of the timing of the outgoing set of light pulses. The 3D location calculators 1540*a* and 1540*b* can then receive a corresponding set of reflection signals or corresponding phase data and measure the time difference between outgoing pulses and light reflections. The time difference corresponding to each reflection signal can be multiplied by the speed of light (e.g., 300 meters per microsecond) to calculate a range (e.g., distance) to a reflection location associated with each light reflection and reflection signal. A location in the 2D field of view 1515 can be calculated by identifying the detector element responsible for the corresponding light reflection. In this way a 3D location can be calculated as a distance along a 2D direction in the FOV provided by a corresponding detector element. In various embodiments the 3D location calculators 1540*a* and 1540*b* can be part of a single microchip or in separate microchips. A common architecture in automotive ECUs is to use a master controller (e.g., a master LIDAR controller such as OPT9221 from Texas instruments) in conjunction with a co-processor microchip operable to perform some of the same calculations for verification and validation purposes.

LIDAR 1500 can further comprise a malfunction indicator 1550 that functions to determine a measure of difference based on the first and second signals. Malfunction indicator 1550 can be a dedicated circuit or can be instructions periodically performed by a circuit that performs a variety of operations including determining the measure of difference between the first and second signals. The measure of difference between the first and second signals can be calculated by comparing the first and second sets of signals directly (e.g., an analog comparison of the phases or amplitudes or arrival times). Alternatively, as illustrated in FIG. 15A the malfunction indicator 1550 can calculate a difference value indicative of a measure of difference between the set of first signals 1535*a* and the set of second signals 1535*b* by processing some or all of the corresponding 3D locations calculated by 3D location calculators 1540*a* and 1540*b*. In this way the 3D location calculators can process the first and second sets of reflection signals to generate 3D locations and the malfunction indicator circuit 1550 can determine a measure of difference between the reflection signals based on the 3D locations. Malfunction indicator circuit 1550 can generate a malfunction signal when the measure of difference is greater than a threshold value. For example, consider that one of the detectors (1520*a* or 1520*b*) develops a damaged region of the photodetector array. Malfunction indicator 1550 provides the capability to compare 3D locations derived from the first and second sets of reflection signals from substantially similar angular ranges. Over the course of a few seconds sufficiently large first and second sets of reflections can be gathered to remove sporadic variations between the first and second sets of reflection signals and thereby indicate a systematic difference in the 3D locations reported by the two 3D location calculators 1540*a* and 1540*b*. The malfunction indicator circuit can therefore quickly identify that the calculated measure of difference is greater than a threshold and generate the malfunction signal. Malfunction indicator 1550 is operable to indicate differences between the photodetectors arrays such as temperature drift, damage, or differences between the respective amplifier circuitry or differences between the 3D location calculators (e.g., a processor crash, latchup or reboot).

The measure of difference can further be used to differentiate internal malfunctions (e.g., related to LIDAR circuitry) from external causes (e.g., dirt on the lens 1517). For example, a systematically reported ranging error for a portion of the 3D locations from one detector can indicate a problem with the detector while a systematic error reported by both detectors can indicate an environment problem or issues with optical components (e.g., lenses, emitters or CFOBs).

LIDAR 1500 can transmit malfunction signal 1555 to a malfunction monitoring circuit 1560. The malfunction monitoring circuit can be part of the onboard diagnostic system (OBDII) and can function to monitor for malfunction signals from a variety of systems in addition to LIDAR 1500. Malfunction monitoring circuit 1560 can function to generate a malfunction code corresponding to malfunction signal 1555. The malfunction signal can comprise data indicating the type of malfunction (e.g., a processor reset or an inconsistent range measurement between the two detectors). The malfunction signal and data in the malfunction signal can be used to cause malfunction monitoring circuit 1560 to store a specific error code in a malfunction code memory 1570.

FIG. 15B illustrates a failsafe LIDAR system 1501 that uses a reflection splitter to direct light reflections to one of two detectors and comprises a malfunction indicator circuit, in accordance with an embodiment of the present disclosure. In the embodiment of FIG. 15B the first and second sets of reflection signals (1535*a* and 1535*b*) are transmitted to the malfunction indicator circuit 1550 instead of transmitting the processed 3D locations. Malfunction indicator 1550 can be an analog circuit operable to compare the sets of signals and thereby generate a measure of difference (e.g., a voltage value indicating the integrated difference from the previous 1000 signals from each detector array or a voltage pulse whose width or duration in seconds is proportional to a sum of the phase differences between the first and second signals in the previous 1 second). The measure of difference between the first and second sets of reflections can be a difference result or value. For example, the measure of difference can be a difference result calculated in an arithmetic logic unit or dedicated logic circuit in a malfunction indicator circuitry and stored in memory. The result can be a binary number representing the measure of difference (e.g., 10011100), a pass/fail indication (e.g., 0=a difference result that is a below a threshold and a difference result of 1 is the result of a calculation that indicates a difference greater than some threshold). Similarly, a measure of difference can be a difference value such as an analog value from a differential amplifier (e.g., 0.1243V). In the embodiment of FIG. 15B a single 3D location calculator can receive one or both sets of reflection signals 1535*a* and 1535*b* and calculate corresponding 3D locations. In the embodiment of FIG. 15B the malfunction indicator can diagnose differences between the sets of reflection signals (e.g., indicative of a malfunctioning detector) but may not indicate malfunctions in the subsequent processing of the reflection signals to generate 3D locations.

FIG. 15C illustrates an exemplary malfunction indicator circuit 1551, in accordance with an embodiment of the present disclosure. In the embodiment of FIG. 15C a set of control wires 1502 carry control signals 1503*a* and 1503*b* to the detectors 1520*a* and 1520*b*. Control wires 1502 can be used to implement one of several standard communication protocols between a LIDAR controller and the detectors to select a detector element to provide reflection signals from a 2D photodetector array (e.g., 1525*a* or 1525*b*). Exemplary communication protocols include inter-integrated circuit (I2C), serial peripheral interface (SPI) and universal serial bus (USB).

In one aspect, control signals 1503*a* and 1503*b* can select equivalent detector elements in each of two detector 1520*a* and 1520*b*. When the reflection splitter provides highly correlated or overlapping pluralities of reflections to each detector array the reflection signals from equivalent detector elements should also be similar (or correlated). For example, a modulated light beam, comprising several modulation pulses, that is detected by equivalent detector elements in detectors 1520*a* and 1520*b*, each receiving equivalent control signals, should output light reflection signals 1535*a* and 1535*b* with equivalent timing (e.g., the phase relation of the pulses or charge associated with a pixel in a TOF pixel array with built-in demodulation). Malfunction indicator circuit 1551 can comprise a difference amplifier 1580*a* (e.g., an operational amplifier or an instrumentation amplifier) that amplifies the difference between reflection signals 1535*a* and 1535*b*. Malfunction indicator circuit 1551 can further comprise a summation component 1585 to gather the output of difference amplifier 1580*a* over a period of time during which different control signals 1503*a* and 1503*b* select a sequence of detector elements. Summation component 1585 can be a summation amplifier circuit or an integrator circuit. The function of summation component 1585 can be to generate the measure of difference 1596 in the form of a difference value (e.g., 0.1243V). The measure of difference (e.g., difference value or difference result) indicative of the difference between a corresponding plurality of reflection signals can be transmitted to an output pin 1598 (e.g., an input/output pin or an electrical contact pad). In this way, the malfunction indicator circuit 1550 can make the measure of difference available at output pin 1598 to other circuitry within LIDAR 1501 or other diagnostic systems in the host platform (e.g., autonomous vehicle or robot).

Malfunction indicator circuit 1551 can further comprise a threshold value generator 1590. Threshold value generator 1590 can function to provide a threshold value or basis of comparison for the measure of difference (e.g., difference result). Exemplary threshold value generators 1590 can include a programmable digital-to-analog voltage generator or a voltage reference generator. Each of these is operable to generate a reference voltage that can be compared with the measure of difference (e.g., difference value) in a comparator circuit 1595. Comparator 1595 can be configured such that when the measure of difference 1596 is greater than the threshold value supplied by the reference generator the comparator 1595 generates a malfunction signal 1555. Malfunction indicator circuit 1551 can make the malfunction signal 1555 available at a malfunction indicator pin 1597.

FIG. 15D illustrates another exemplary malfunction indicator circuit 1550 operable to receive a plurality of reflection signals from two detectors simultaneously. The 2D photodetector arrays 1525*a* and 1525*b* can generate several reflection signals simultaneously. In the example of FIG. 15C the detector elements can be sequentially connected to the malfunction indicator circuit. Conversely, in the embodiment of FIG. 15D several reflection signals are simultaneously generated and transmitted to the malfunction indicator circuit 1551. Malfunction indicator circuit 1551 can comprise a plurality of difference amplifiers (e.g., 1580*a* and 1580*b*) to amplify the difference between corresponding pairs of output signals. Summation component 1585 can be a summing amplifier operable to sum (or integrate) the output from the plurality of difference amplifiers simultaneously.

FIG. 16 illustrates a LIDAR system 1600 that enables a ranging subassembly 1605 to be remotely located relative to FOV 1515 using a CFOB 1610*a* and to further provide failsafe capability by using a reflection splitter 1510*a* and a malfunction indicator 1550. LIDAR 1600 comprises optical components (e.g., lens 1517), reflection transmission components (e.g., CFOB 1610*a*) and a ranging subassembly 1605 with a failsafe architecture. The components of LIDAR 1600 can be distributed such that the ranging subassembly 1605 is remotely located from the FOV 1515 (e.g., located in the engine bay, or behind the dashboard of a car). Optical components (e.g., lens 1517 and emitter 1505 can be positioned on the exterior of a car or robot, with direct line-of-sight access to FOV 1515 and can thereby gather light reflections from a 2D angular range within FOV 1515, corresponding to an outgoing set of light pulses. CFOB 1610*a* can function to transfer the gathered reflections to the reflection splitter while preserving an indication of the relative placement of each light reflection in the FOV based on the coherent nature of the fiber bundle.

Reflection splitter 1510*a* can direct pluralities of the set of light reflections from CFOB 1610*a* to two detectors 1520*a* and 1520*b*. In the embodiment of FIG. 16 photodetector array 1620 can be different in size, shape, density, and composition from the corresponding photodetector array 1525*a* in the other detector 1520*a*. For example, photodetector array 1525*a* can be a large array (e.g., a 320×420 array of silicon CCD elements in a 2D array) and photodetector array 1620 can be a smaller more sensitive array (e.g., a 4×4 arrays of InGaAs infrared elements or single photon avalanche photodiodes). The smaller detector array 1620 can be designed to detect a second plurality of the set of light reflections that is only representative of a subset of the angular range of light reflections transferred to the larger detector array 1525*a*. For example, detector 1520*a* can receive a plurality of light reflections with an azimuthal range of +60 to −60 degrees and elevation angular range of +30 to −30 degrees. Mirror 1511*b* in reflection splitter 1510*a* can direct a second plurality of light reflections representative of light reflections in the range +/−10 degrees azimuthal and elevation to detector array 1620. Malfunction indicator 1550 can be designed to only compare the reflection signals from both detectors in the +/−10 degree range for which comparable reflection signals exist. In an alternative embodiment detector array 1620 can detect reflections from the same angular range as detector 1525 but with lower angular resolution (i.e., due to fewer detector elements than the larger array 1525*a*). The malfunction indicator 1550 can be designed to generate the measure of difference between the corresponding reflection signals, based in part on the aggregated light reflections at the smaller photodetector array 1620. For example, detector 1520*b* can have a single element photodetector 1620 that receives a second plurality of reflections representative of the same angular range as the reflection provided to detector 1520. The single detector element can cause reflection signals 1535*b* from detector 1520*b* to have all of the timing information of reflection signals 1535*a* but have none of the directional specificity (e.g., direction data) contained in reflection signals 1535*a*. Hence malfunction indicator circuit 1550 can generate the measure of difference between the two sets of reflection signal even though one set has no directional information. In the embodiment of FIG. 16 the reflection signals can be digitized by analog-to-digital converter circuits 1630*a* and 1630*b* before they are sent to the 3D location calculator 1540*c* and malfunction indicator circuit 1550.

FIG. 17A illustrates several components of a failsafe LIDAR system 1700 with a shared remotely located ranging subassembly 1705 (e.g., remotely located in an engine bay) that receives light reflections from several FOVs using a plurality of CFOBs. CFOBs 1610*a*-1610*c* can gather light reflections from a plurality of distinct FOVs (e.g., 1515 and 1715). The FOVs can be distributed at strategic locations around a vehicle (e.g., searching for objects in front of the vehicle and scanning blindspots at the side of the vehicle). The plurality of FOVs can also be overlapping and have a variety of magnifications (e.g., different resolution of angular range per fiber in the CFOBs). Each of the CFOBs can transport light reflections corresponding to outgoing emitter light pulses while retaining an indication of the directions associated with the light reflections. LIDAR 1700 can comprise a FOV combiner to gather light reflections from the plurality of CFOBs and generate a time-multiplexed or spatially multiplexed output set of light reflections. In the embodiment of FIG. 17A FOV combiner 1720*a* time shares (e.g., time multiplexes) light reflections from 3 FOV to generate a set of reflections that is a time varying sequence of the light reflections from each of the 3 FOVs (e.g., a time sequence comprising reflections from FOVs A followed by FOV B followed by FOV C). A reflection splitter 1510*b* can oscillate a mirror to direct pluralities of the light reflections to two detectors 1520*a* and 1520*b*. Each of the detectors can generate a sequence of reflection signals 1535*c* and 1535*d* that are corresponding to light reflections from the sequence of FOVs. For example, detectors 1520*a* and 1520*b* can both generate reflection signals from FOV A (e.g., 1515) simultaneously. At some time later the FOV combiner switches to providing light reflections from FOV B and hence reflection splitter directs subsets of light reflection representative of a common or overlapping 2D angular range of FOV B to the detectors. In this way a malfunction indicator can receive comparable sets of reflection signals (e.g., 1535*c* and 1535*d*) from multiple FOVs or can receive 3D locations corresponding to comparable sets of light reflections from multiple FOVs.

FIG. 17B illustrates a related embodiment in which the reflection splitter is combined into the FOV combiner 1720*b*. In this embodiment three FOVs provide light reflections to the remote shared ranging subassembly 1705. The FOV combiner 1720*b* can be a rotating mirror assembly or a switching micromirror array and can function to generate time multiplexes output providing light reflections from each of the FOVs in sequence. However unlike FOV combiner 1720*a* that outputs light reflections from a single input FOV at a time, instead FOV combiner 1720*b* can output light reflections from 2 FOVs at a time. Therefore FOV combiner 1720*b* can accept 3 input FOVs and directs each of two output FOVs to a corresponding detector 1520*a* or 1520*b*. For example, detector 1520*a* can receive light reflections from FOVs A-C in a sequence given by A,B,C,A while detector 1520*b* can receive light reflections from FOVs A-C in sequence C,A,B,C. In this way the FOV combiner includes the functionality of the reflection splitter to direct pluralities of light reflections from equivalent or overlapping angular rangers to the two detectors. While it is true that the light reflections received by detector 1520*a* from FOV A are not exactly the same as those received at detector 1520*b* from FOV A a short time later the difference can be quite small and therefore enable a measure of difference to indicate the performance of the associated detectors. Each detector generates a corresponding set of reflection signals 1535*e* and 1535*f* that can be time-delayed comparable copies of one another.

FIG. 18 illustrates several components of a failsafe LIDAR system 1800, in accordance with an embodiment of the present disclosures. LIDAR system 1800 can comprise a FOV combiner 1720*b* that directs FOVs to two detectors 1520*a* and 1520*b* and a LIDAR processor 1810 that computes 3D locations, controls the modulation of emitters and monitors for malfunctions by comparing incoming sets of reflection signals. LIDAR processor 1810 can comprise circuitry such as phase comparators, arithmetic logic units and instruction memories that store instructions which when executed cause the processor 1810 to calculate 3D locations from at least one incoming set of reflection signals. The instructions can further cause the circuitry in the LIDAR processor 1810 to compare data indicative of two sets of reflection signals from two distinct detectors 1520*a* and 1520*b* to thereby determine a measure of difference between the reflection signals. In response to sensing a measure of difference between the data indicative of the sets of reflection signals that is greater than a threshold value, generating a malfunction signal. LIDAR processor 1810 can comprise one or more signal buffers 1820*a* and 1820*b* and store reflection signals in a digital or analog format. Buffers 1820*a* and 1820*b* can serve to delay some of the reflection signals so as to provide reflection signals from each detector for a common FOV to malfunction indicator circuitry. Alternatively in an embodiment where circuitry in the processor 1810 is common to both the malfunction indication and 3D location calculation functions the buffers can store data indicating aspects of the reflection signals until it can be processed.

In the embodiment of FIG. 18 processor 1810 can receive two sequences of reflection signals 1535*e* and 1535*f*. Both sequences can have a degree of correlation when time synchronized (e.g., when one of the sequences is delayed at processor 1810 to coincide with the arrival of reflections from the same FOV detected by the second detector a short time later). Malfunction indicator 1550 can generate an error signal each time a measure of difference is greater than a threshold value. A small number of errors may be acceptable. Error counter 1840 can generate an error signal if the number of errors exceeds a predetermined number in a period of time. 3D location calculator can further receive both reflection signal sequences and calculate a corresponding 3D point cloud. The malfunction signal can be transmitted to the 3D location calculator circuit and can serve to cause the 3D calculator to use one or other or both of the sequences of reflection signals 1535*e* or 1535*f*. For example, initially 3D location calculator can use both sequences of reflection signals 1535*a* and 1535*b* to provide a full resolution point cloud (e.g., 200,000 points per scan). Subsequently, detector 1520*a* can malfunction and the malfunction can be identified by malfunction indicator 1550. The malfunction signal 1555 can cause 3D location calculator to discontinue using reflection signals 1535*a* when calculating 3D locations and instead rely on sequence 1535*b* from detector 1520*b*. One advantage of several embodiments is that each of the two detectors can provide reflection signals representative of the same 2D angular range in a FOV, thereby providing a ½ resolution point cloud that enables a host vehicle (e.g., autonomous car) to operate in a safe manner in response to the malfunction. Additionally, the shared FOV capability enables continued operation at reduced capability for all FOVs. (i.e., a malfunctioning detector can partially degrade performance for several FOVs but provide ranging in all FOVs.)

LIDAR processor 1810 can further comprise emitter trigger circuitry 1860 and a controller 1850 for the FOV combiner and reflection splitter. LIDAR system 1800 can further comprise reset circuitry 1880 operable to reset the LIDAR processor or one or more detectors in the event of a malfunction signal 1555.

FIG. 19 illustrates several components of a failsafe LIDAR system, including a LIDAR processor and a LIDAR co-processor. LIDAR 1900 is designed to operate safely while providing a malfunction signal in the event that a detector or associated LIDAR processor (e.g., primary processor 1810 or co-processor 1920) malfunctions. LIDAR

1900 comprises a reflection splitter 1510*b*, two detectors (1520*a* and 1520*b*), a LIDAR processor 1810, a LIDAR co-processor 1920, a malfunction indicator 1550 and a reset circuit 1880. In this embodiment the LIDAR processor 1810 can control one or more light emitters, FOV combiners, reflection splitters as well as calculating 3D locations using reflection signals 1535*a*. The co-processor calculates 3D locations for a second set of reflection signals 1535*b* from a substantially similar 2D angular range as signals 1535*a*. A 3D location calculator (1540*a* and 1540*b*) in each of the processor and co-processor calculates a set of 3D locations. Two buffers 1820*a* and 1820*b* can temporarily store the 3D locations in order to identify sets of 3D locations from the same FOV. 3D locations can be transmitted from each of the processor 1810 and co-processor 1920 to the malfunction indicator 1550 including error counter 1840. Malfunction indicator 1550 can calculate a measure of difference between the first and second sets of reflection signals based on the 3D data. For example, the malfunction circuit can receive a 3D point clouds (e.g., sets of 100,000 3D locations) covering a similar FOV from both the LIDAR processor and co-processor. The malfunction circuit can function to identify a systematic range or distance error (e.g., a consistent range difference of 3 meters between objects appearing in both point clouds) and thereby generate a malfunction signal. Alternatively, malfunction indicator can identify that either processor 1810 or co-processor 1920 have ceased to provide 3D locations indicating a processor error. When the measure of difference between inputs from the processor 1810 and co-processor 1920 are greater than a threshold value malfunction indicator 1550 can generate a malfunction signal 1555 at a malfunction output pin 1597 of LIDAR 1900. In a related embodiment error counter 1840 can count the number of times in a particular time interval (e.g., in the last hour or since the vehicle has been running) that a measure of difference calculated by the malfunction indicator 1550 has exceeded a threshold value. Malfunction signal 1555 can be used to cause a reset circuit to reset the processor, co-processor or one or more detectors. One common reset circuit design is a capacitor and a resistor in series that charges the capacitor to a value operable to keep an attached processor from resetting. The malfunction signal can function to drain the capacitor, thereby causing the voltage at the reset pin of an attached processor to become low and thereby resetting the processor.

FIG. 19B illustrates another embodiment of a failsafe LIDAR 1905. In LIDAR 1905 both the LIDAR processor 1810 and LIDAR co-processor 1920 each contain a malfunction indicator (1940*a* and 1940*b*) and a reset pin (1950*a* and 1950*b*). In this embodiment each of the malfunction indicators is designed to receive 3D locations from both the processor and co-processor and to generate a corresponding malfunction signal when a measure of difference is greater than a threshold. In one interesting aspect malfunction indicator 1940*a* in the LIDAR processor can indicate that the corresponding co-processor has malfunctioned and therefore the malfunction signal from the LIDAR processor can be used to reset the co-processor. Conversely malfunction indicator 1940*b* is designed to assume that a malfunction can be caused by a malfunction in the LIDAR processor and hence resets LIDAR processor 1810 using malfunction signal 1955*b*. In this way the LIDAR processor and co-processor monitor one another's operation. In one example, a malfunction indicator 1940*a* can be operably coupled to receive 3D location data from two different processors (e.g., 1810 and 1920) and upon recognizing that one of the processors has ceased to transmit 3D location data can generate a malfunction signal that causes a detector or processor to reset. In a related embodiment the LIDAR processor and co-processor can each comprise a program memory and shared circuitry that executes instructions from the corresponding program memory to perform the steps of controlling the emitter, the FOV combiner, the reflection splitter, commanding one of the detectors to transmit reflection signals, calculating a ranges associated with reflection signals, calculating 3D locations associated with the ranges, receiving 3D locations from the other processor (e.g., the co-processor), comparing the 3D locations from both processors to generate a difference value, evaluate a malfunction condition (e.g., a threshold value comparison) on the difference value, and generate a malfunction signal when the malfunction condition is met.

FIG. 20 illustrates a failsafe LIDAR 2000 that uses a scanning mirror assemble 2010 attached to a ranging subassembly 2005 with two detectors 2020*a* and 2020*b*. Mechanically scanned LIDARs are useful because a single emitter 1505 and detector 2020*a* can form a transceiver pair that scans a multitude of direction in a FOV 1515 as a scanning mirror assembly 2010 rotates. An exemplary scanning LIDAR with a rotating mirror assembly is the HDL-64E from Velodyne Lidars of Morgan Hill, CA. In the embodiment of FIG. 20 light pulses from a single emitter 1505 are deflected by a scanning mirror in rotating assembly 2010 and thereby distributed into FOV 1515. Corresponding light reflections 2015 are deflected by the scanning mirror in the rotating assembly and then split by reflection splitter 1510*a* into two pluralities of light reflections. A first plurality of the light reflections can be directed towards detector 2020*a* comprising a single element photodetector 2025*a* (e.g., avalanche photon photodiode), while a similar second plurality of the light reflections can be directed towards detector 2020*b* comprising a second single element photodetector 2025*b*. The speed of rotating assembly 2010 can be controlled by scanning mirror controller 2030. Scanning mirror controller 2030 can be performed by software running on a LIDAR processor (e.g., 1810 in FIG. 19A) or can be dedicated circuitry. Similarly scanning mirror controller 2030 can sense the position of rotating assembly 2010 and can thereby associate a position (e.g., angular position in the azimuthal plane) with reflection signals 1535*a* and 1535*b* from detectors 2020*a* and 2020*b*. 3D location calculators 1540*a* and 1540*b* can receive position indications from scanning mirror controller 2030 or directly from the rotating assembly 2010 and thereby generate a set of 3D locations from each of the sets of reflection signal 1535*a* and 1535*b*. Malfunction indicator 1550 can receive the sets of 3D locations and thereby generate a measure of difference between two sets of inputs. When the measure of difference is greater than a threshold value, malfunction indicator can generate a malfunction signal.

FIG. 21 illustrates a method 2100 for generating a malfunction signal with a LIDAR according to an embodiment of the present disclosures. At block 2110 one or more emitters generate an outgoing set of light pulses in at least one FOV. At block 2120 a first detector generates first reflection signals by detecting a first plurality of light reflections. At block 2120 a second detector generates second reflection signals by detecting a second plurality of light reflections, wherein the first and second pluralities of light reflections each comprise light reflections from overlapping 2D angular ranges in the at least one FOV, and correspond to at least some of the outgoing set of light pulses. At block 2130 at least some of the first reflection signals are processed to generate first data and at least some of the second reflection signals are processed to generate second data. At block 2140 a difference value is calculated by comparing at least some of the first and second data. At block 2015 a malfunction signal is generated at an output pin of the LIDAR based at least in part on a magnitude of the difference value.

Exemplary approaches to calculating the measure of difference (e.g., difference value) between data representative of two pluralities of light reflections include (a) comparing ranges at a specific number of equivalent or similar locations in a FOV reported in two sets of location data, (b) establishing a test region in a FOV and comparing the average, peak or distribution of ranges for locations in the test region reported in both sets of 3D location data, and (c) identifying features (e.g., a range associated with an object in the foreground) and comparing the range of identified features reported in two sets of range data or 3D location data.

While the above description contains many specificities, these should not be construed as limitations on the scope of any embodiment, but as exemplifications of various embodiments thereof. Many other ramifications and variations are possible within the teachings of the various embodiments. Thus the scope should be determined by the appended claims and their legal equivalents, and not by the examples given.

Unlike digital cameras where light is received from many points at once, a laser range finder (e.g., 3110 in FIG. 22) can rely on a relatively small number of laser beams (e.g., 1-64) aimed sequentially at a number of points (e.g., 100,000) during each scan of the FOV. Hence the measurement density of laser ranging systems is often much lower than digital cameras. The laser pulses represent a scarce resource and the FOV is often undersampled with respect to sensing detailed boundaries or changes in topology. For example, a tree in the field of view could be scanned with 1000 points during a scan of the FOV and the same tree could occupy one million pixels in a digital camera image. For the purpose of this disclosure the FOV of a laser transmitter is the set of all directions in which the laser transmitter can emit a laser light. For the purpose of this disclosure the FOV of a detector (e.g., a photodetector) is the set of all directions along which the detector can detect light (e.g., a laser pulse). The FOV of a laser range finder is set of all directions in which the laser range finder can perform laser range finding (e.g., the set of all directions in which the laser range finder can both transmit and receive laser light). For the purpose of this disclosure a single scan of a FOV by a laser range finder is the process of performing laser ranging measurements in the largest substantially unique set of directions (e.g., the longest sequence of directions that does not repeat or cover a substantially similar portion of the FOV). In a simple example, a rotating laser range finder may scan the FOV by performing a 360 degree revolution. A raster scanning laser range finder may scan he FOV by performing 10 left to right sweeps of a FOV and changing the elevation angle of a laser generator after each sweep to cover the entire FOV.

Steerable Laser Assembly

LIDARs often provide laser ranging in a plurality of directions (e.g., a FOV) and thereby generate data for a 3D topology map of the surroundings. To accomplish this, LIDAR can have a steerable laser assembly. For the purpose of this disclosure a steerable laser assembly is an assembly that scans one or more laser beams within a FOV. A steerable laser assembly can include a laser generator (e.g., a laser diode) and a laser positioner (e.g., a rotating scanning mirror) to position the laser beam in a variety of directions during a scan of the FOV. The steerable laser assembly can be mechanically-steerable (e.g., containing moving parts to direct a laser beam) or electronically-steerable (e.g., containing an optical phased array to form a laser beam in one of many directions).

In many LIDARs a mechanically steerable laser assembly rotates with a constant angular velocity and thereby scans the FOV with uniform measurement spacing (e.g., 1 laser pulse and 1 measurement for every 1 degree of the azimuthal FOV). The pattern of generated laser pulses is uniform and largely determined by the angular velocity of the rotating components. The angular velocity can be selected for many mechanical LIDARs (e.g., 5-20 Hz for the HDL-64E from Velodyne Inc. of Morgan Hill, CA), but remains constant (or nearly constant) from one rotation to the next. The uniform angular spacing of laser pulses within the FOV is simple and somewhat inherent in rotating LIDARs, but is sub-optimal for gathering the most information from the FOV. For example, large sections of the FOV can return a predictable, time-invariant, homogeneous response, such as reflections from walls or unoccupied sections of a highway.

Dynamically Steerable Laser Assembly

In a mechanical LIDAR the inertia of the spinning components prevents rapid changes in the angular velocity that would be necessary to dynamically steer a laser beam to produce a complex non-uniform and dynamically defined pattern of laser pulses. Recently, advancements in electronically-steerable lasers and phased array laser beam forming have made it possible to dynamically steer a laser beam within a FOV. Electronically-scanned LIDARs are solid-state and comprise no moving parts (e.g., the model S3 from Quanergy Inc. of Sunnyvale, CA). In a solid state LIDAR, the absence of inertia associated with moving parts makes it possible to move a laser beam with a complex trajectory thereby producing a series of laser pulses with non-uniform spacing, density, and location in the FOV.

For the purpose of this disclosure, dynamically steerable laser assemblies are a subset of steerable laser assemblies wherein the assembly can dynamically steer one or more laser beams by accepting inputs (e.g., user commands) and thereby dynamically changing aspects of the laser beam such as beam power, spot size, intensity, pulse repetition frequency, beam divergence, scan rate or trajectory. A dynamically steerable laser assembly can change aspects of one or more laser beams several times during a scan of the FOV. For example, a differentiating aspect of many dynamically steerable laser assemblies over traditional laser assemblies is circuitry operable to process instructions while the laser beam scans the FOV and continually adjust the direction of a laser beam. This is similar to the dynamic manner in which a 3D printer dynamically rasters a polymer filament to print an arbitrary shaped object. A traditional mechanically steered LIDAR, with associated inertia, can only implement small changes in angular velocity during each scan (e.g., changing from 20 Hz to 20.5 Hz scan rate in the course of a single 360 degree rotation). In contrast, it can be appreciated that a dynamically steerable LIDAR can make several changes to aspects of the laser pulse pattern in the course of a single scan of the FOV (e.g., rapidly changing the trajectory of a laser beam by 90 degrees within 10 milliseconds or tracing the outline of a complex shape with many turns during a single scan).

For the purpose of this disclosure dynamically steering a laser beam with a steerable laser assembly is the process of providing input data to the steerable laser assembly that causes the steerable laser assembly to dynamically modulate at least one aspect of the resulting laser pulse sequence during a scan of the FOV. Exemplary modulated aspects can include the beam or pulse power, spot-size, intensity, pulse repetition frequency (PRF), beam divergence, scan rate or trajectory of the laser beam. For example, a laser assembly that is designed to raster scan a FOV with a constant scan rate and pulse rate (e.g., PRF) is acting as a steerable laser assembly but is not being dynamically steered. The distinction is that such a laser assembly is not receiving input or acting on previous input and dynamically altering aspects of the beam pattern during the course of each scan of the FOV. However, the same steerable laser assembly could be dynamically steered by providing input signals that cause the steerable laser assembly to generate a variable laser power at locations in the FOV, based on the input signals (e.g., thereby generating an image on a surface in the FOV). A trajectory change can be a direction change (i.e., a direction formed by a plurality of pulses) or a speed or scan rate change (i.e., how fast the laser is progressing in a single direction across the FOV). For example, dynamically steering a steerable laser assembly can be dynamically changing the angular velocity, thereby causing the inter-pulse spacing to increase or decrease and generating a dynamic laser pulse density. In one aspect dynamic steering can often be recognized as the process of implementing dynamic control of a laser pulse pattern during a scan of a FOV.

In the context of the present disclosure many rotating LIDAR do comprise steerable laser assemblies, but these assemblies are not dynamically steerable since neither the power nor the trajectory of the laser beam is dynamically controllable within a single scan of the FOV. However, a rotating or mechanical LIDAR could be dynamically steered, for example by providing input data that causes the laser to dynamically vary the laser pulse rate within a scan of the FOV, since the net result is a system that can guide or steer the laser to produce a non-uniform density laser pulse pattern in particular parts of the FOV.

In many laser range finders the laser is periodically pulsed as the laser assembly moves along a trajectory and the exact location of each laser pulse in the FOV is controlled. Nevertheless such a periodically pulsed laser generator can be used in a steerable laser assembly to produce a complex shaped region with greater than average spatial pulse density, for example by increasing the laser dwell time within the complex shaped region. In this way a periodically pulsed laser generator (e.g., a laser diode) can produce a greater density of pulses in the complex shaped region. Other laser range finding systems transmit a continuous laser signal, and ranging is carried out by modulating and detecting changes in the intensity of the laser light. In a continuous laser beam systems the distance to a reflection location is determined based on the phase difference between the received and transmitted laser signals.

In one aspect a dynamically steered laser range finder can be used to mine the FOV for the boundaries. For example, a LIDAR can generate laser pulses with a 3 milliradian beam divergence, thereby resulting in a 30 cm radius laser spot size at a distance of 200m. This small laser spot size enables the LIDAR to identify the boundaries of an object at 200 m. In many cases the resolution of objects at considerable range is limited by the number of pulses devoted to an object rather than the ability of each pulse to identify a boundary. Therefore once a boundary is detected a dynamically steerable laser assembly could be dynamically steered to investigate and refine estimates of the boundary by devoting more pulses to the object. In contrast RADAR has much greater beam divergence and hence a much wider spot size impacts the object (often many times the object size). Hence the reflections from beam-steered RADAR represent the reflections from many points on the object, thereby making beam steered RADAR useful for object detection but impractical for detailed boundary localization. Hence, a small change in beam angle provides little if any actionable information regarding the edges of an object. In contrast the spot size of the laser remains small relative to the boundary of many important objects (people, dogs, curbs). The present technology enables the boundaries of such objects to be dynamically determined by a process of iteratively refining the scan points for the electronically steered LIDAR. For example, a LIDAR with dynamic steering could use a bisection algorithm approach to iteratively search for the boundary of a pedestrian in the FOV. The LIDAR could first process laser reflection data to identify that a 3D point P1 in the point cloud has a TOF consistent with the pedestrian and can subsequently scan iteratively to the right and left of P1 with decreasing angular range (e.g., in a bisection approach) to estimate the exact location of the boundary between the pedestrian and the surrounding environment. In general, this technique can be used to investigate changes in range (e.g., time of flight changes) within a point cloud to iteratively improve boundary definition.

FIG. 22 illustrates laser range finder system 3110 that can scan a steerable laser assembly 3120 within a field of view FOV 3130. The field of view 3130 can be defined by a horizontal sweep angle 3140 and vertical sweep angle 3145. Steerable laser assembly 3120 scans FOV 3130 and generates a plurality of laser pulses (e.g., pulses 3150*a*, 3150*b* and 3150*c*). Some laser pulses (e.g., 3150*a* and 3150*b*) can reflect off objects (e.g., person 3160 and vehicle 3170). In the embodiment of FIG. 22 the laser pulses are evenly spaced in the FOV. Steerable laser assembly 3120 performs a uniform, non-dynamic scan of the FOV in FIG. 22. A challenge with this uniform scan of the FOV is that few of the laser points (e.g., 5 or 6) reflect from person 3160 and vehicle 3170, due in part to the even laser pulse density throughout the FOV.

Figure 23A:
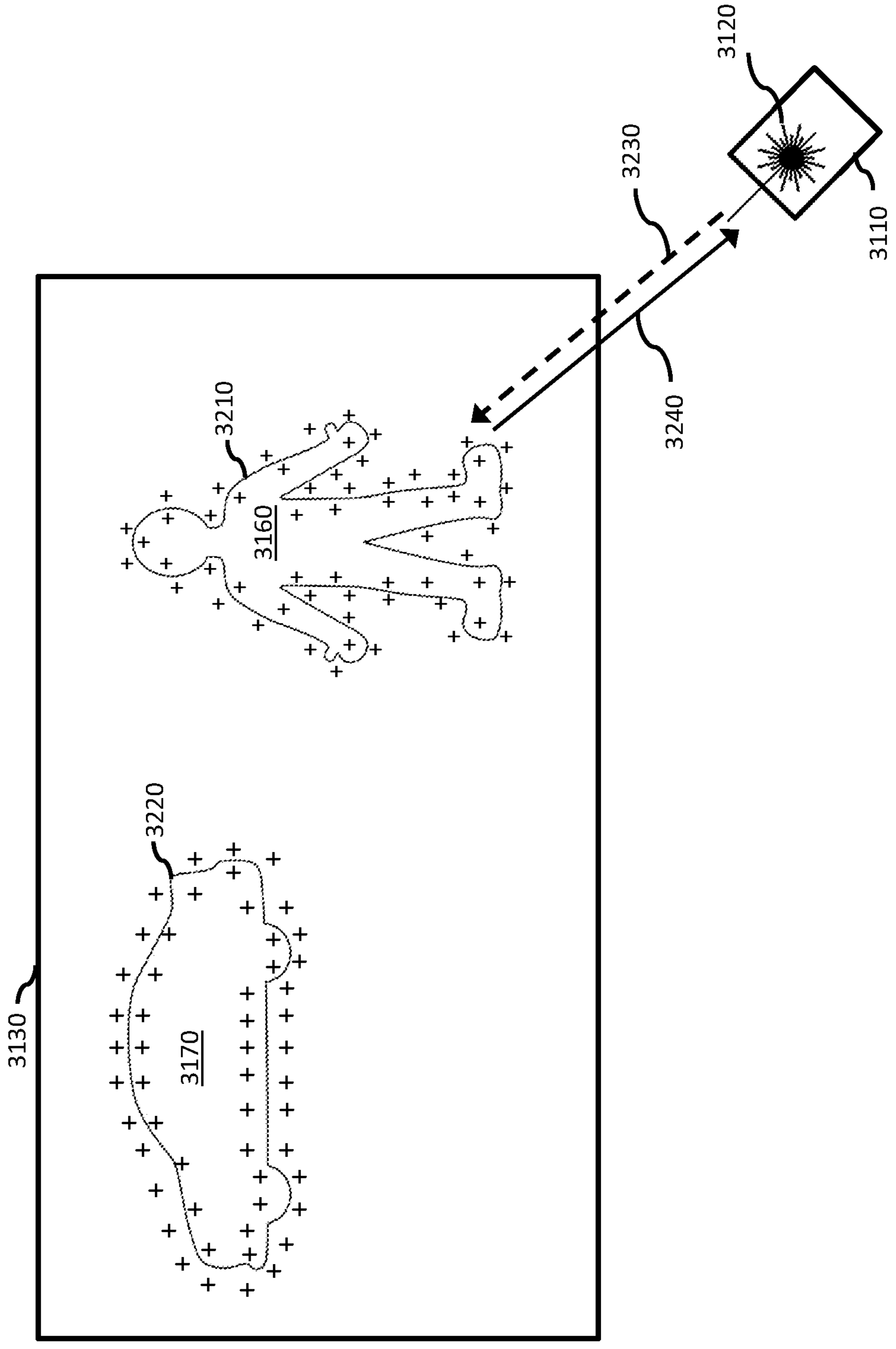

FIG. 23A illustrates the same FOV 3130 with the same number of laser pulses, except that the laser has been dynamically steered to generate a non-uniform high pulse density surrounding the boundaries 3210 and 3220 of the objects 3160 and 3170. Several embodiments of the present technology define laser steering parameters operable to dynamically steer a steerable laser assembly (e.g., an electronically steerable laser assembly) to generate regions of increased laser pulse density or non-uniform pulse density.

Figure 23B:
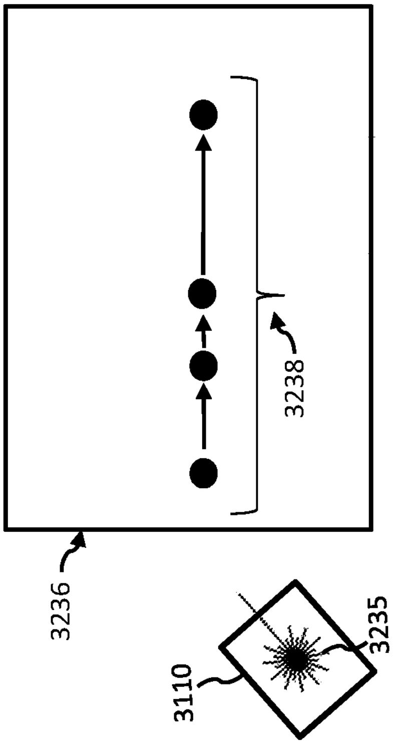

In FIG. 23B LIDAR 3110 is dynamically steered by modulating the angular velocity of laser 3235 while maintaining a constant pulse rate. The result of configuring the electronically steerable laser to dynamically modulate the angular velocity (or position of the laser in the FOV 3236) is a sequence 3238 of laser pulses with directions in a 1-dimensional range that are separated by varying amounts. FIG. 23B illustrates dynamically steering a laser including at least three different velocities in the course of a single sweep of the FOV including an initial nominal velocity followed by slowing down the laser trajectory to group pulses more closely and then followed by speeding up the laser to separate laser pulses by more than the nominal separation.

Figure 23C:
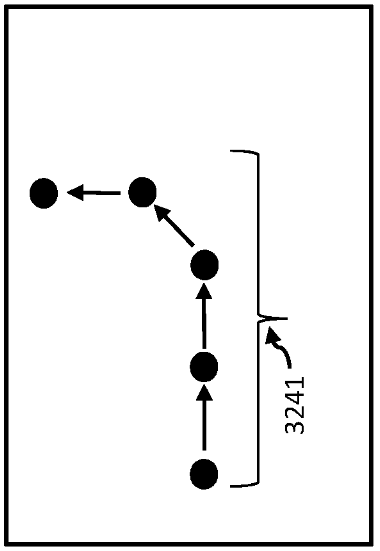

FIG. 23C illustrates dynamically steering a laser in 2 dimensions to generate a sequence of laser pulses 3241 that span a 2-D angular range. The resulting sequence has a 2-D angular range from a single laser, in contrast to a rotating LIDAR where each laser generates a sequence with a 1-dimensional angular range. A LIDAR can be configured to dynamically steer a laser to produce sequence 3241 by dynamically controlling the angular velocity or position of the laser in 2 dimensions (e.g., both azimuthal and elevation). Such a sequence cannot be performed by a rotating LIDAR due in part to the angular momentum of the rotating components preventing fast modulation of the elevation angle above and below an azimuthal plane.

Figure 23D:
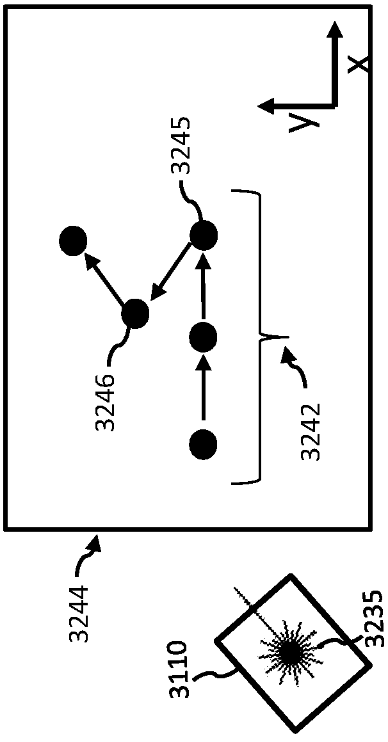

FIG. 23D illustrates dynamically steering a laser to generate a sequence of laser pulses, including several direction reversal during the sequence. For example, laser pulse sequence 3242 begins by progressing the laser from left to right across the FOV 3244. After laser pulse 3245 the laser is reconfigured to reverse the X component of the laser direction from the positive X direction to the negative X direction. After laser pulse 3246 the laser is configured to reverse direction again (i.e., back to a positive X direction). In contrast to merely modulating the speed of laser 3235 in the positive X direction, direction reversals enable a dynamically steered laser to scan back and forth across a discovered boundary. In addition 2-D dynamic steering combined with direction reversal in the course of a scan of FOV 3244 enables laser 3235 to dynamically scan along a complex shaped boundary of an object.

Figure 23E:
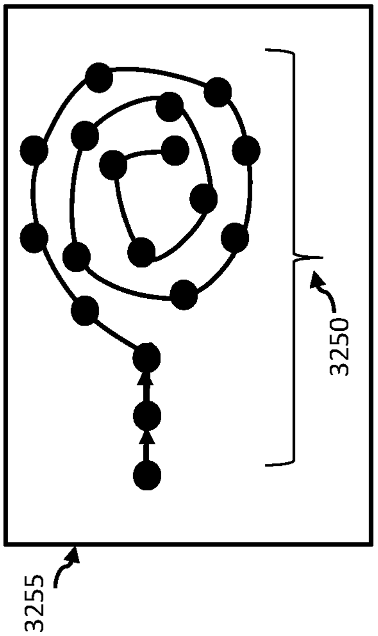

FIG. 23E illustrates dynamically steering a steerable laser (e.g., electronically steerable laser 3235 in FIG. 23D) to generate a sequence of laser pulses 3250 that generate a complex (e.g., spiral) shape. Complex sequence 3250 is not possible with a LIDAR that is not dynamically steered (e.g., a LIDAR that that merely rotates around a single axis). One advantage of generating a complex shaped sequence with non-uniform spacing is the ability to arbitrarily determine the order in which portions of the FOV 3255 are scanned. For example, sequence 3250 may eventually scan a similar region with a similar density as a rotating LIDAR but has the advantage of scanning the outer perimeter first and then gradually progressing towards the center of FOV 3255.

FIG. 24 illustrates some of the components of a solid-state laser range finder 3310 operable to be dynamically steered. Laser range finder 3310 can have a steerable laser transmitter 3315, such as an optical phased array (OPA). Steerable laser transmitter 3315 can comprise a laser generator to generate a set of laser pulses and a laser positioner to transmit the pulses in a set of directions in the field of view of the laser range finder. The laser positioner can comprise a laser splitter, a multimode interference coupler, an optical phase shifter (e.g., linear ohmic heating electrodes) or an out of plane optical coupler to combine the split, phase-shifted beams into an output laser beam pointed in a steerable direction. Laser range finder 3310 has a light detector 3320 (e.g., a PIN photodiode, avalanche photodiode, a focal plane array or CCD array). The light detector can function to detect reflections (e.g., 3350) from the set of laser pulses (e.g., 3340) when they interact with objects in the field of view (e.g., vehicle 3345). Solid state laser range finder 3310 can contain a lens 3335 operable to focus laser reflections onto the detector 3320. Laser range finder 3310 can contain control circuitry 3325. Control circuitry 3325 can function to receive or generate laser steering parameters indicating how the steerable laser transmitter 3315 should be steered (e.g., directions, paths, or regions to scan with the laser). Control circuitry 3325 can further function to generate commands or signals to the steerable laser assembly 3315 instructing the steerable laser assembly to generate a continuous or pulsed laser beam in a sequence of directions.

Dynamically Steerable Laser Range Finder

FIG. 25A illustrates several components of an exemplary laser range finder 3405 operable to be dynamically steered in accordance with an embodiment of this disclosure. Laser range finder 3405 can contain a steerable laser assembly 3120 or a steerable laser transmitter comprising a laser generator 3420 and a laser positioner 3430. Laser range finder 3405 can contain a laser steering parameter generator 3410 to generate laser steering parameters based on processed sensor data from sensor data processor 3475. Laser steering parameter generator 3410 can function to generate laser steering parameters (e.g., instructions) and transmit the parameters to the steerable laser assembly 3120. Laser steering parameter generator 3410 can transmit the parameters in a timed manner, such that upon receiving each laser steering parameter the steerable laser assembly 3120 executes or reacts to the laser steering parameter. Alternatively, laser steering parameters can be transmitted in a batch or instruction file that is executed over a period of time by the steerable laser assembly 3120.

Steerable laser assembly 3120 can comprise one or more laser generators 3420, a laser positioner 3430, and one or more detectors 3440. The one or more laser generators 3420 can be laser diodes (to produce one or more laser beams (e.g., beam 3435) at one or more locations in the FOV determined by the laser positioner 3430. Laser positioner 3430 functions to steer one or more laser beams (e.g., beam 3435) in the FOV based on the laser steering parameters. Laser positioner 3430 can mechanically steer a laser beam from laser generator 3420. Rotating LIDARs often use a mechanically steered laser positioner. An exemplary mechanically steered laser positioner 3430 can include mechanical means such as a stepper motor or an induction motor to move optical components relative to the one or more laser generators. The optical components in an exemplary mechanical laser positioner can include one or more mirrors, gimbals, prisms, lenses and diffraction grating. Acoustic and thermal means have also been used to control the position of the optical elements in the laser positioner 3430 relative to the one or more laser generators 3420. Laser positioner 3430 can also be a solid state laser positioner, having no moving parts and instead steering an incoming laser beam using electronic means to steer the laser beam 3435 in an output direction within the FOV. For example, an electronically steerable laser assembly can have a solid state laser positioner comprising a plurality of optical splitters (e.g., Y-branches, directional couplers, or multimode interference couplers) to split an incoming laser beam into multiple portions. The portions of the incoming laser beam can then be transmitted to a plurality of delay lines where each portion is delayed by a selectable amount (e.g., delaying a portion by a fraction of a wavelength). Alternatively, the delay lines can provide wavelength tuning (e.g., selecting slightly different wavelengths from an incoming laser beam). The variable delayed portions of the incoming laser beam can be combined to form an output laser beam at an angle defined at least in part by the pattern of delays imparted by the plurality of delay lines. The actuation mechanism of the plurality of delay lines can be thermo-optic actuation, electro-optic actuation, electro-absorption actuation, magneto-optic actuation or liquid crystal actuation. Laser positioner 3430 and one or more laser generators 3420 can be combined onto a chip-scale optical scanning system such as DARPA's Short-range Wide-field-of-view extremely agile electronically steered Photonic Emitter (SWEEPER).

Detector 3440 can contain light sensors 3450 (e.g., photodiodes, avalanche photodiodes, PIN diodes or charge coupled devices CCDs), signal amplifiers (e.g., operational amplifiers or transconductance amplifiers), a time of flight calculator circuit 3455 and an intensity calculator 3460.

Detector 3440 can comprise one or more photodiodes, avalanche photodiode arrays, charge coupled device (CCD) arrays, single photon avalanche detectors (SPADs), streak cameras, amplifiers and lenses to focus and detect reflected laser light from laser beam 3435. The construction of the steerable laser assembly 3120 can co-locate detector 3440 and laser positioner 3430 such that detector 3440 is pointed in the direction of the outgoing laser beam and can focus the detector on a narrow part of the FOV where the reflected light is anticipated to come from.

The steerable laser assembly 3120 of laser range finder 3405 can generate a pulsed or continuous laser beam 3435. Steerable laser assembly 3120 can receive one or more laser reflections 3445 corresponding to laser beam 3440. Laser range finder 3405 can contain a light sensor 3450 to detect reflected light from the laser pulses or continuous laser beam.

Steerable laser assembly 3120 can contain a time of flight calculator 3455 to calculate the time of flight associated with a laser pulse striking an object and returning. The time of flight calculator 3455 can also function to compare the phase angle of the reflected laser beam with the phase of the corresponding outgoing laser beam and thereby estimate the time-of-flight. Time of flight calculator 3455 can also contain an analog-to-digital converter to detect an analog signal resulting from reflected photons and convert it to a digital signal. Laser range finder 3405 can contain an intensity calculator 3460 to calculate the intensity of reflected light.

Laser range finder 3405 can contain a data aggregator 3465 to gather digitized data from time of flight calculator 3455 and intensity calculator 3460 or 3D location calculator 3464. Data aggregator 3465 can group data into packets for transmitter 3470 or sensor data processor 3475. Laser range finder 3405 can contain a transmitter 3470 to transmit data packets. Transmitter 3470 can send the data to a processing subassembly (e.g., a computer or a remote located sensor data processor) for further analysis using a variety of wired or wireless protocols such as Ethernet, RS232 or 802.11.

Laser range finder 3405 can contain a sensor data processor 3475 to process sensor data and thereby identify features or classifications for some or all of the FOV. For example, data processor 3475 can identify features in the FOV such as boundaries and edges of objects using feature identifier 3480. Data processor 3475 can use feature localizer 3485 to determine a region in which the boundaries or edges lie. Similarly a classifier 3490 can use patterns of sensor data to determine a classification for an object in the FOV. For example, classifier 3490 can use a database of previous objects and characteristic features stored in object memory 3495 to classify parts of the data from the reflected pulses as coming from vehicles, pedestrians or buildings. In the embodiment of FIG. 25A sensor data processor 3475 is located close to the steerable laser assembly (e.g., in the same enclosure), thereby enabling processing of the sensor data (e.g., reflection ranges) without the need to transmit the reflection data over a wired or wireless link. FIG. 25A is an example of an embedded processing architecture where the latency associated with a long distance communication link (e.g., Ethernet) is avoided when transmitting range data to the sensor data processor.

FIG. 25B illustrates several components of a dynamically steered laser range finder system 3406 in accordance with an embodiment of this disclosure. In this embodiment the data processing and laser steering parameter generation components are remotely located from the steerable laser assembly 3120. Laser range finder 3406 can contain a receiver 3415 to receive laser steering parameters from the remotely located laser steering parameter generator 3410. Receiver 3415 can be a wired or wireless receiver and implement a variety of communication protocols such as Ethernet, RS232 or 802.11. Transmitter 3470 can transmit data from the time of flight calculator 3455, intensity calculators and 3D location calculator 3464 (in FIG. 25A) to a remote located data aggregator 3465.

FIG. 26A illustrates several components of a laser range finder 3510 according to several embodiment of the present disclosure. Laser range finder 3510 can contain a processing subassembly 3520, a steerable laser assembly subassembly 3120 and a communication link 3530 for linking the processing and steerable laser assemblies. Processing subassembly 3520 can include one or more processors (e.g., sensor data processor 3475 in FIGS. 25A and 25B) and one or more transceivers (e.g., a transceiver including receiver 3415 and transmitter 3470 in FIG. 25B) such as an Ethernet, RS485, fiber optic, Wi-Fi, Bluetooth, CANBUS or USB transceiver. Processing subassembly 3520 can also include a computer-readable storage medium (e.g., flash memory or a hard disk drive) operable to store instructions for performing a method to detect and utilize a remote mirror (e.g., a roadside mirror). Steerable laser assembly 3120 can include a laser generator 3420 and a laser positioner 3430 to steer a laser beam at one or more locations in the FOV based on the laser steering parameters. Laser positioner 3430 can include one or more optical delay lines, acoustic or thermally based laser steering elements. In a solid state steerable laser assembly, laser positioner 3430 can function to receive instructions (e.g., laser steering parameters) and thereby delay portions of a laser beam (i.e., create a phase difference between copies of the laser beam) and then combine the portions of the laser beam to form an output beam positioned in a direction in the FOV. A mechanical laser positioner 3430 can be a mirror and mirror positioning components operable to receive input signals (e.g., PWM input to a steeper motor) based on laser steering parameters and thereby steer the mirror to position a laser in a direction in the FOV. Steerable laser subassembly 3120 can also include a detector 3440 comprising components such as light sensor(s) 3450, time of flight calculator 3455 and light intensity calculator 3460 and 3D location calculator. Steerable laser subassembly 3120 can include one or more transceivers (e.g., receivers 3415 and transmitters 3470 in FIG. 25B) such as Ethernet, RS485, fiber optic, Wi-Fi, Bluetooth, CANBUS, or USB transceivers. Communication link 3530 can be a wired link (e.g., an Ethernet, USB or fiber optic cable) or a wireless link (e.g., a pair of Bluetooth transceivers). Communication link 3530 can transfer laser steering parameters or equivalent instructions from the processing subassembly 3520 to the steerable laser assembly 3120. Communication link 3530 can transfer ranging data from the steerable laser assembly to the processing subassembly 3520.

When operably linked to steerable laser assembly 3120 the processing subassembly 3520 can perform one or more embodiments of the method to find, utilize and correct for a remote mirror in the FOV of laser range finder 3510.

FIG. 26B illustrates exemplary laser steering parameters 3501 according to aspects of the technology. Laser steering parameters can be instructions operable to steer a laser beam with a steerable laser assembly in a FOV or steer a controllable magnifier. For example, in an electronically scanned laser range finder (e.g., model S3 from Quanergy Inc. of Sunnyvale, CA) a set of laser steering parameters can define aspects of the output laser beam such as the direction, pulse duration, intensity and spot size. Laser steering parameters can function to instruct the laser generator 3420 in FIG. 25A to define aspects such as laser spot size, intensity and pulse duration. Laser steering parameters can instruct laser positioner 3430 in FIG. 25A how to delay portions of the laser beam and combine the delayed portions to define the direction of the output laser beam. A mechanically steered LIDAR can perform dynamic steering by using laser steering parameters to dynamically position the laser in the FOV or to dynamically position a mirror to reflect the laser beam in a desired direction. Laser steering parameters can be operable to instruct a steerable laser assembly to steer a laser beam and can be transmitted to the steerable laser assembly as a file. Alternatively laser steering parameters can be stored in a file and can be sequentially processed and used to generate electrical signals operable to generate and guide a laser beam. For example, laser steering parameters can be similar to the parts of a stereolithography (.STL) file .STL files are commonly used as instruction sets to position extruder heads and cutting heads in 3D printers, cutting tools and laser stereolithography. A set of laser steering parameters 3501 can include a start location 3502 indicating where one or more other laser steering parameters should be applied. Start location 3502 can be a point in a Cartesian coordinate system with an associated unit of measure (e.g., 20 mm to the right and 20 mm above the lower right corner of the lower left corner of the field of view). In several laser range finders the FOV is described in terms of angular position relative to an origin in the FOV. For example, a starting point could be +30 degrees in the horizontal direction and +10 degrees in the vertical direction, thereby indicating a point in the FOV.

A laser steering parameter can be a region width 3504 or a region height 3506. The width and height can be expressed in degrees within the FOV. One exemplary set of laser steering parameters could include a start location, region width and region height thereby defining a four sided region in the FOV. Other laser steering parameters in the exemplary set of laser steering parameters can indicate how to tailor a scan within this region, such as laser scan speed 3514, laser pulse size 3516 or number of laser pulses 3518.

A laser steering parameter can be one or more region boundaries 3508 defining the bounds of a region. A laser steering parameter can be one or more laser pulse locations 3511. Pulse locations 3511 can provide instructions to a steerable laser to move to corresponding positions in the FOV and generate one or more laser pulses. In some embodiments the laser can be generating a laser beam while being steered from one location to another and can dwell for some time at the laser pulse locations. In other embodiments the steerable laser can use these points 3511 to generate discrete pulses at defined locations. In such embodiments the laser beam can be generated at discrete pulse locations and can dwell at the pulse location for some time.

A laser steering parameter can be one or more path waypoints 3512, which define points in a FOV where a steerable laser can traverse or points at which the steerable laser can implement direction changes. FIG. 26C illustrates two exemplary paths 3540 and 3550 that can be defined by path waypoints (e.g., waypoints 3512) and used to instruct a steerable laser. It would be obvious to a person of skill in the art that several laser steering parameters can produce equivalent or nearly equivalent regions of non-uniform pulse density, for example, selecting various combinations of laser steering parameters such as combinations of paths 3540 and 3550 to produce similar regions of increased or non-uniform laser pulse density.

Remote Mirror

Turning to FIG. 27A reflectors (e.g., mirrors) are an integral part of many vehicles where they provide drivers with an augmented field of view. Humans are well suited to recognizing mirrors and adapting the position of mirrors to achieve desired remote fields of view (e.g., a remote field of view showing a blind-spot over the driver's shoulder). While mirrors provide indirect reflected images from locations in the environment local to the vehicle, the exact locations associated with the reflected images are often difficult to determine.

In the context of laser range finders, two possible categories of mirrors are: integrated mirrors that are integrated or attached to the range finder and remote mirrors that are observed by the laser range finder in the local environment (e.g., a mirror on a passing vehicle that appears in the range finder FOV but is not associated with a laser range finder). Laser range finders use integrated mirrors to perform a variety of functions. For example, an integrated scanning mirror in a rotating LIDAR (e.g., HDL-64e from Velodyne Inc. of Morgan Hill, CA) can distribute laser pulses in a plurality of directions. Similarly, U.S. Pat. No. 9,285,477 issued to Smith discloses a compensation mirror that deflects outgoing and incoming laser pulses that have been distributed by a scanning mirror in a plurality of directions. In the Smith patent, the compensation mirror is part of the laser range finder, has a known position and occupies the entire FOV of the scanning mirror (i.e., all outgoing and incoming laser beams are deflected by the compensation mirror). Integrated mirrors (e.g., attached or integrated) in laser range finders can be characterized during the design or manufacturing process. Therefore, the effect of integrated mirrors can be accounted for at the design stage. Similarly, an integrated mirror in a laser range finder can be controlled by the laser range finder (e.g., rotating a scanning mirror to a controlled direction), and thereby provide a predictable effect on a laser pulse.

In contrast, when a laser range finder encounters a remote mirror in the local vicinity, several aspects of the remote mirror can be unknown (e.g., mirror shape, dimensions or orientation) or uncontrolled (e.g., mirror location in the FOV). For the purpose of this disclosure a mirror is a remote mirror with regard to an optical assembly if the mirror is neither attached to nor integrated into the optical assembly. In some cases the remote mirror can have a variable location in the FOV of the optical system (e.g., laser range finder, optical detector or steerable laser assembly). The location of the remote mirror can be controlled or uncontrolled by the optical system. Exemplary remote mirrors include wing-mirrors and rear-view mirrors in vehicles and roadside mirrors.

In the context of a laser range finder a remote mirror can function to occupy a portion of the FOV (e.g., a subset of all laser directions in which the range finder can perform laser ranging) and provide indirect laser reflections that have been deflected by the remote mirror. As such, a remote mirror can deflect outgoing laser pulses from a laser range finder and thereby provide laser reflections from locations beyond the set of reflection locations that can be directly reached by the laser range finder. A remote mirror can be placed at some fixed or variable distance from a laser range finder (e.g., 10 meters). In this way, the remote placement of the remote mirror acts to provide an alternative FOV. For example, an integrated compensation mirror such as disclosed in U.S. Pat. No. 9,285,477 can reposition an outgoing laser pulse but cannot compensate for obstacles in the local environment. However, a remote mirror with suitable placement at some distance from the laser range finder can provide a valuable alternative FOV (e.g., around corners or in a vehicle blind spot).

A remote mirror can have transient placement in the FOV of a laser range finder, such as a stationary roadside mirror that appears briefly in the FOV of a laser range finder attached to a passing vehicle. A remote mirror can occupy a variable or fixed portion of the FOV of a laser range finder. A remote mirror can have a variable orientation (e.g., a variable angle of rotation or compass direction) while occupying a fixed portion of the FOV of a laser range finder. For example, a wing-mirror on an autonomous vehicle can occupy a fixed portion of the FOV of a range finder while having an unknown orientation. A remote mirror can occupy a portion of the FOV of a laser range finder that is initially unknown to a laser range finder (i.e., initially unknown placement) but is later learned by processing aspects of sensor data (e.g., camera imagery or laser reflection data). A remote mirror and a laser range finder can be attached to a common host vehicle. Alternatively, a remote mirror can be stationary and the laser range finder can be on a host vehicle operable to move relative to the remote mirror. A remote mirror can be dedicated to a laser range finder (e.g., a wing-mirror dedicated to a laser range finder on an autonomous vehicle). Alternatively, a remote mirror can be shared by many laser range finders (e.g., a remote road-side mirror at a busy traffic intersection). A remote mirror can have a concave, convex, flat or complex shape. A remote mirror can be constructed from a reflective metal, metallized glass or metallized plastic. A remote mirror can occupy a small portion of the FOV of a laser range finder (e.g., a small 5×5 degree portion of the FOV) that is operable to provide detailed range data regarding a remote FOV, such as a larger remote field of view provided by a small convex remote mirror.

FIGS. 27A, 27B and 27C illustrate systems in which a laser range finder utilizes a remote mirror in its FOV to deflect some laser reflections and thereby utilize the mirror to access remote reflection locations (e.g., around a bend 3640 in a roadway). Finding a mirror with an unknown location using a laser range finder is a difficult challenge because the mirror appears to be a window to a remote (i.e., indirect) field of view that is being deflected and is difficult to distinguish from the reflected location itself. In this regard a mirror with an unknown location could trick a laser range finder, similar to a how a house-of-mirrors confuses humans. There are many cases when autonomous vehicles (e.g., self-driving cars and robots) could encounter and utilize a remotely located mirror (i.e., a remote mirror) positioned in the vicinity of the vehicle but not necessarily under the control of the vehicle (e.g., roadside mirrors, mirrors in office corridor). Remote mirrors can provide reflections from important or safety critical locations beyond the direct FOV of the laser range finder.

Hence, two relevant challenges when utilizing a remote mirror with a laser range finder are to firstly discover and track the location of a remote mirror with the laser range finder and secondly to determine a correction step in the process of identifying a 3D location representative of the reflection location for the subset of laser reflections that have undergone deflection by a remote mirror. Several embodiments of the present disclosure are directed to systems and methods for discovering and correcting for a remote mirror in the FOV of a laser range finder. In particular, several embodiments provide a method for measuring reflection data, including distance and direction data, for a set of laser reflections resulting from a sequence of outgoing laser pulses. The method can identify the location of a remote mirror with variable or unknown location in the FOV and determine a subset of the set of laser reflections that have undergone deflection by the remote mirror in the process of reaching the laser range finder (i.e., a deflected subset). The method can then compute a 3D location for each of the laser reflections in the set of laser reflections from the corresponding reflection data and apply a correction step in the computation process for those laser reflections in the deflected subset. In some embodiments the correction step can function to generate 3D locations for deflected laser reflections that are more representative of the actual reflection locations than without the correction step.

In some embodiments, the method can generate a 3D location for the complete set of reflections (e.g., as is commonly output by many LIDAR in a .las file format) and the then post process the 3D locations to apply the correction step to the initial 3D location corresponding to reflections in the deflected subset of reflections. In this way, a standard steerable laser assembly such as those found in many LIDAR can be used to gather laser reflections and output 3D locations, via a communication link, to a processing subassembly (e.g., 3520 in FIG. 26A). The processing subassembly can subsequently correct a subset of the locations corresponding to laser reflections that are judged to have undergone deflection by a remote mirror prior to reaching the steerable laser assembly.

FIG. 27A illustrates a laser range finder 3610*a* utilizing a roadside remote mirror 3620 to gather reflections (e.g., 3660*a*) from a vehicle 3630 located around a bend in the road 3640. In FIG. 27A laser range finder 3610*a* can comprise a steerable laser assembly 3120 including a laser generator 3420 and a detector 3440. Laser range finder 3610*a* is mounted to vehicle 3615.

Steerable laser assembly 3120 can rotate or scan thereby enabling the laser generator 3420 to generate a set of outgoing laser pulses (e.g., 3650*a*, 3650*b*) in a variety of different directions. Following each outgoing laser pulse, detector 3440 can monitor for laser reflections (e.g., 3660*a*, and 3660*b*) within a detector FOV 3670. The detector FOV can be defined as the set of all possible directions at the detector in which an incoming laser reflection can reach the detector. Each reflection (e.g., 3660*a*) detected by the detector has an associated reflection direction within the detector FOV 3670.

Some of the outgoing laser pulses, e.g., 3650*a* are reflected by objects in the FOV and generate corresponding laser reflection (e.g., 3660*a*). Other outgoing laser pulses (e.g., 3650*b*) are deflected by a remote mirror 3620 and are subsequently reflected from an object (e.g., vehicle 3630). Reflection 3660*b* can travel a similar path to laser pulse 3650*b*, being deflected by the remote mirror towards detector 3440. In this way, an outgoing beam 3650*b* causes a reflection 3660*b* that is measured by the detector to come from the direction of the mirror, when it actually comes from reflection location 3675. In some embodiments, a correction step performed by electronic circuitry in the laser range finder 3610*a* provides means to identify the actual reflection location 3675 for laser reflection 3660*b* instead of identifying the remote mirror 3620 as the reflection location. Remote mirror 3620 can provide valuable information regarding the location of vehicle 3630 to a variety of systems in vehicle 3615, such as collision avoidance systems and autonomous driving systems. In the embodiment of FIG. 27A both laser generator 3420 and detector 3440 are collocated in a steerable laser assembly 3120. Furthermore, the detector 3440 can be aimed to point in the same direction as the laser generator 3420 as the steerable laser assembly scans. Hence, some of the outgoing laser pulses (e.g., 3650*b*) and the corresponding laser reflections (e.g., 3660*b*) can be deflected by a remote mirror. For the purposes of this disclosure a laser range finder (e.g., 3610*a*) is considered monostatic when the laser generator is collocated with the detector.

FIG. 27B illustrates a system similar to FIG. 27A with a bistatic laser range finder 3610*b*. For the purpose of this disclosure a bistatic laser range finder has a detector that is not co-located with the laser generator. For example, detector 3440 could be located on a different part of a vehicle (e.g., behind the grille or the headlights) while the laser generator 3420 can be located on top of host vehicle (e.g., 3615 in FIG. 27A). One or more outgoing laser pulses (e.g., 3650*c*) can directly reflect from an object (e.g., at reflection location 3675). A reflected laser pulse (e.g., 3660*c*) can be deflected by remote mirror 3620 and hence reach the detector 3440. In the embodiment of FIG. 27B the laser generator and detector can have different fields of view but the detector can nevertheless have a detector FOV 3670 in which some of the laser reflections reaching the detector have undergone deflection by the remote mirror (e.g., a deflected subset of laser reflections). FIG. 27C illustrates a flash laser range finder 3610*c* in which the laser generator illuminated a plurality of directions (e.g., 3680*a* and 3680*b*) simultaneously. The advantage of a flash laser range finder (e.g., 3610*c*) is that many parts of the emitter FOV can be illuminated simultaneously without necessarily having to scan the laser generator to a plurality of individual locations. A flash laser range finder or a 3D camera can provide multiple reflections following a single laser flash transmitted into the surrounding environment. Some of the laser reflections such as 3660*d* can reach the flash laser range finder after being deflected by the remote mirror.

FIG. 28A illustrates a laser range finder 3710 and a FOV 3670 for the detector. A set of laser reflections 3720 is detected by detector 3440, corresponding to an outgoing laser pulse sequence (not shown). Reflections are shown as points in the FOV since each reflection can be represented by a point location in the 2-D X-Y FOV. Some laser reflections (e.g., 3660*a*) come directly from objects (e.g., person 3160) in the FOV.

Deflected Subset of Laser Reflections

In one aspect of several embodiments a portion 3730 of the FOV can contain a remote mirror. In some embodiments the mirror portion 3730 encompasses some of the mirror and in some embodiments the mirror portion encompasses the entire remote mirror. In one aspect, the portion 3730 can be considered the subset of the set of all directions in the detector FOV in which reflections come from the remote mirror. The mirror portion 3730 of the FOV is interesting because some or all of the laser reflections with directions in the mirror portion are from reflection locations outside of the mirror portion (i.e., the remote mirror is deflecting an incoming laser reflection from another location). Previous laser range finders use the time of flight and the incoming direction of laser reflections to calculate a 3D location for each laser reflection. When this approach is applied to reflection from the mirror portion 3730 of FOV 3670, some or all of the 3D locations are incorrect due to the deflection of the laser reflection. For example, vehicle 3630 appears to be in the upper right corner of FOV 3670. A laser range finder without the benefit of this disclosure would likely construct a 3D location map for reflection locations and place the laser reflections from vehicle 3630 along the direction of a vector starting at the detector 3440 and ending at the center of the remote mirror 3620. The result would be the correct estimated distance for vehicle 3630 but the wrong reflection location. FIG. 28B illustrates a deflected subset 3740 of the set of laser reflections 3720. Reporting the wrong location for a laser reflection, due to undetected deflection by a remote mirror has serious safety implications for robotic and autonomous vehicles.

Hence one aspect of several embodiments of this invention is to identify those laser reflections that are in the deflected subset 3740 of the set of laser reflections 3720. In one embodiment of this disclosure laser range finder 3710 can gather a set of laser reflections and compute reflection data indicative of the time-of-flight of each laser reflection and a direction associated with each reflection (i.e., the location in the FOV or the direction can be a pixel in a detector array that detects the laser reflection or a 2-D angular coordinate of a direction in the FOV in which the detector was pointing). The detector 3440 can transmit the set of reflection data to an electronic circuit (e.g., 3D location calculator 3466 in FIGS. 25A and 25B or processing subassembly 3520 in FIG. 26A) configured or operable to discover the location of the mirror in the FOV (i.e., determine portion 3730 of the FOV in FIG. 28A). The electronic circuitry can further function to identify a subset of the set of laser reflections that are deflected by the remote mirror 3620. The electronic circuitry in the laser range finder can finally calculate a 3D reflection location associated with each laser reflection in a set of laser reflections by processing the reflection data corresponding to the reflection indicating the direction and the time of flight. The processing can include a correction step for laser reflections found to be in the subset of laser reflections from the remote mirror.

In one aspect of several embodiments a laser range finder (e.g., 3710) can determine the subset 3740 of laser reflections that have been deflected by a mirror. A first group of embodiments can involve analyzing the set of laser reflections to identify a subset that has undergone deflection. A second group of embodiments can determine the deflected subset by discovering and tracking the location of the mirror in the FOV and thereby calculate a set of directions (e.g., mirror portion of the FOV) for which laser reflections must have undergone deflection.

FIG. 29 illustrates several components operable to help in determining a location estimate for a remote mirror 3820 in the field of view of a laser range finder 3710. Remote mirror 3820 can be a roadside mirror (e.g., similar to remote mirror 3620) or a mirror attached to part of a vehicle (e.g., a rearview mirror or a wing-mirror). In one exemplary embodiment, laser range finder 3810 can determine a location estimate of the remote mirror 3820 by processing camera data and thereby identifying the surrounding structure of the remote mirror (e.g., pattern matching the oval surround structure 3830 to a wing mirror). The location estimate of the mirror can then be used to determine a portion 3730 of the FOV 3670 that contains or encompasses the remote mirror 3820 and thereby determine a subset 3740 of the set of laser reflections that have undergone deflection by the remote mirror.

In a related exemplary embodiment, a mirror location estimate or a mirror portion 3730 of FOV 3670 can be determined by identifying laser reflections indicative of the frame or support structure of a remote mirror (i.e., portions that are not themselves deflective but indicate the a location of a mirror). For example, laser reflections (e.g., 3660*e*) from the frame 3830 of a remote mirror, or reflections (e.g., 3660*f*) from the support structure of the remote mirror can indicate the placement of the remote mirror 3820.

Laser range finder 3810 can obtain a location estimate for remote mirror 3820 by processing sensor data (e.g., camera image data) based on location features (e.g., protrusions or bumps 3835*a* and 3835*b*). Location features can be identified by camera image data or by laser reflections (e.g., reflection 3660*g*). For example, laser range finder 3810 can comprise a processing subassembly (3520 in FIG. 26A) or a sensor data processor (3475 in FIGS. 25A and 25B) to process image data and thereby generate a location estimate of the remote mirror. The location estimate can be a 3D Cartesian coordinate (e.g., 4,3,10 in an XYZ Cartesian coordinate system) or a range of 3D locations (e.g., in a region with X-coordinate between 4 and 6 and Y-coordinate equal to 3 and Z-coordinate equal to 10). In other embodiments, a location estimate can be a 2D coordinate in the FOV of the laser range finder. For example, exemplary laser range finder 3810 can have a FOV 3670 with angular range 0-90 degrees in the azimuthal plane and −10 to 20 in the elevation plane. A location estimate can be a coordinate or a range of coordinates in the field of view (e.g., the point +23 degrees azimuth and −10 degrees elevation or the range 21 to 25 azimuthal and −10 to −5 elevation).

A wireless radio transmitter 3837 associated with remote mirror 3820 can transmit or broadcast the location or orientation of the remote mirror, thereby providing a location estimate to electronic circuitry in the laser range finder. Similarly a wired communication link 3850 between the remote mirror and the laser range finder can transmit information regarding the placement of the remote mirror. Wireless radio transmitter 3837 can be part of a transceiver (e.g., a Bluetooth, Zigbee or Wi-Fi transceiver) Wireless radio transmitter 3837 can be part of a radio frequency transponder system (e.g., an RFID system). The wired communication link 3850 can be similar in both protocol and structure to communication link 3530 in FIG. 26A.

In one example, a plurality of roadside remote mirrors (e.g., 3820) could be placed at strategic points along a roadway. Circuitry coupled to the remote mirrors (e.g., a GPS or indoor positioning system circuitry) could learn the location of the remote mirror (e.g., a GPS coordinate, or a relative location such as at the corner of the hallway at a specified height or relative location at an road intersection) and relay this information to laser range finders (e.g., 3810) that are attached to systems that approach the vicinity of one or more of the remote mirrors (e.g., laser range finders on autonomous vehicles). In this way a remote mirror can transmit a location estimate (e.g., the GPS coordinates of the remote mirror) to electronic circuitry in the laser range finder. Similarly, sensors on the remote mirrors can detect the orientation (e.g., pointing Northeast) of a remote mirror and report this direction or orientation to one or more approaching laser range finders using wired or wireless communication links. In one example, a remote mirror deployed in an environment (e.g., roadway, building, school zone, parking structure) can be one of a set of standard remote mirrors with a characteristic curvature or shape that is indicated by a model number of the remote mirror. The remote mirror can use wireless transmitter 3837 or wired link 3850 to transmit or broadcast the model number of the remote mirror. The laser range finder can access one or more properties of the remote mirror (e.g., location estimate, shape, height, curvature, characteristic shape of the mirror, field of view, reflectivity or purpose) stored in a local or remote memory based on the identifying information (e.g., model number) transmitted by the remote mirror. For example, an exemplary remote mirror could be a standard remote mirror from a series of such remote mirrors that are deployed on vehicle trailers, railway cars or shipping containers. A laser range finder could be located on a tractor (e.g., a truck) designed to pull such a trailer. The exemplary remote mirror could be designed to augment the FOV of the laser range finder. Initially (e.g., prior to determining a location estimate for the remote mirror) the placement of the exemplary remote mirror on the trailer could be unknown. A wired or wireless connection (e.g., transmitter 3837 or wired link 3850) can announce the model number for the exemplary remote mirror (e.g., the model number within the standard series of such remote mirrors). Similarly, a wired or wireless transmitter associated with the remote mirror can transmit a location estimate (e.g., a specific location or a range of locations). The laser range finder can then use the model number and the location estimate or orientation information to identify a portion 3730 of the FOV 3670 that contains the remote mirror or a deflected subset 3740 of the laser reflections. Interestingly, this portion can vary greatly with operation of a vehicle, particularly when the remote mirror is mounted to an articulated portion of a vehicle. Therefore, in one aspect of several embodiments the location estimate and the mirror portion 3730 are continuously determined from sensor data. Laser range finder 3810 can determine a subset 3740 of the laser reflections within the FOV that have undergone deflection by the remote mirror.

In another embodiment, wireless transceiver 3837 or wired link 3850 can transmit identity location or orientation information regarding the remote mirror 3820. Subsequently, for a given laser reflection in a set of laser reflections the laser range finder 3810 can use the information supplied by the remote mirror to determine if that laser reflection has been deflected by the remote mirror. For example, the remote mirror could report that it is located at the bend in a road (e.g., 3640 in FIG. 27A) in the form of a location estimate using GPS coordinates. Laser range finder 3810 can process the location estimate and identify portion 3730 of the FOV corresponding to the remote mirror 3820. Laser range finder 3820 can gather a set of laser reflections (e.g., 3720 in FIG. 28A, 28B) including some reflections that have been deflected by the remote mirror 3820. Electronic circuitry in the laser range finder (e.g., processing subassembly 3520 in FIG. 26A) can determine for each laser reflection in the set of reflections (e.g., 3720) if that laser reflection has been deflected by the remote mirror 3820 based at least in part on the portion 3730 of the FOV 3670 occupied by the remote mirror 3820. An exemplary mirror portion 3730 of the FOV can have an azimuthal range between 40 and 50 degrees and elevation range between 30 and 40 degrees, thereby defining a 10×10 degree portion of the FOV 3670 in which reflections have been deflected by the remote mirror 3820.

In the previous example one or more laser reflections from a set of laser reflections (e.g., 3720 in FIG. 28A, 28B) are determined to have undergone deflection based on correlation with a location estimate for a discovered remote mirror. In several other embodiments a test can be applied directly to sensor data (e.g., laser reflections) received from a portion of the FOV to determine if a laser reflection has undergone deflection by a remote mirror. For example, a camera 3860 can gather image data from a field of view containing some of the detector FOV 3670 and including at least a portion of the mirror. The camera can be coupled to an image processor (e.g., sensor data processor 3475 or processing subassembly 3520) to identify a portion 3730 of the FOV that contains the remote mirror.

Another exemplary method to determine if a laser reflection has been deflected by a remote mirror uses the nature of images reflected in the mirror. For example, remote mirrors such as wing-mirrors and roadside mirrors are often convex in order to capture a wider FOV than an equivalent sized flat mirror. For this reason wing-mirrors on vehicles often carry a warning sign "Warning-Objects in mirror are closer than they appear" The convex nature of a remote mirror can cause a wide variation of the laser reflections provided by the relative small portion of the FOV occupied by the remote mirror. A laser range finder can have a predefined set of criteria or rules based on aspects of laser reflections that are used to determine if a reflection has undergone deflection in a remote mirror. Exemplary criteria can be based on variations in the time-of-flight of reflections or identification of unusually small objects (e.g., smaller than expected people and cars in the reflected data). For example, a subset of the set of laser reflections that exhibit a large variation in time of flight (e.g., indicating ranges between 60m and 160m) in a small 5×5 angular range of the FOV can satisfy a criterion, thereby defining that all laser reflection in that 5×5 degree portion of the FOV should be determined to have undergone deflection by a remote mirror. In another example a subset of the set of laser reflections identified to indicate a car with unusual distortion or an unusual size scale can be used to satisfy a criterion and thereby all reflections from a related portion of the FOV can be determined to have undergone deflection by a remote mirror.

Yet another method to determine if a laser reflection (e.g., 3660*b*) has undergone deflection by a remote mirror 3820 can be to perturb the position of the remote mirror (e.g., using a mirror positioner 3840 such as a motor or an actuator) and thereby identify a portion of the FOV that is modulated when the remote mirror is perturbed. A laser reflection can be determined to have undergone deflection in the remote mirror if it comes from the portion of the FOV that has been identified to undergo a change (i.e., point at a different reflection location) when the mirror is perturbed (e.g., rotated, translated or vibrated).

For example, a first reflection R1 (e.g., 3660*b*) with an associated direction D1 in the detector FOV 3670 can have a time-of-flight of 1 microsecond relative to an outgoing laser pulse, thereby indicating a distance to the reflection location is 150m based on a speed of light of 300 m per microsecond. Laser range finder 3810 can seek to determine if reflection R1 has undergone deflection by remote mirror 3870 using the following method: firstly emit a laser pulse and measure reflection R1, secondly command mirror positioner 3840 to rotate mirror 3820 slightly, thirdly emit a second laser pulse operable to cause a reflection R2 from the same direction D1 as reflection R1 and observe if reflection R2 has a considerably different time of flight (e.g., 2 microseconds instead of 1 microsecond) or a considerably different associated range (e.g., 250 m instead of 150 m). Finally, the laser range finder can determine if R1 has been deflected by a remote mirror based on a measure of the range or time-of-flight difference between R1 and R2. If R1 is determined to be in the deflected subset of all reflections, then associated direction D1 in the FOV can be included in the mirror portion of the FOV.

In a related example, laser range finder 3810 can vary the position of remote mirror 3820 in a periodic manner (e.g., rotating the mirror slightly back and forth), thereby producing a periodic variation in the laser reflections in the mirror portion and helping to identify the mirror portion 3730 of FOV 3670. In another related example, a remote mirror that is not controlled by the laser range finder can execute a periodic position change (e.g., a momentary rotation or vibration) operable to cause one or more laser range finders in the vicinity to experience a shift in range or time of flight from laser reflections within the mirror portion 3730 of FOV 3670 for each laser range finder. For example, an autonomous vehicle approaching a roundabout with a remote mirror could discover and track the location of the remote mirror based on deliberate variations (e.g., small vibrations or rotations) of the remote mirror. In one embodiment the remote mirror can perform a continuous or periodic scanning motion so as to increase the range of reflection locations (i.e., the indirect FOV) provided by the remote mirror.

In another embodiment, the remote mirror can have a characteristic curvature that is initially unknown to the laser range finder. For a given orientation of the remote mirror the curvature characteristic of the mirror acts like a transfer function converting the incident directions of laser reflections from reflection locations into a deflected directions travelling towards the detector in the laser range finder. In one aspect of this embodiment the remote mirror can change its position several times (e.g., perform a slow sweep or rotation) and the laser range finder can perform processing (e.g., correlation analysis) on the laser reflections received at various orientations and thereby determine the characteristic curvature of the remote mirror. For example, an object can reflect laser pulses such that the laser pulses are deflected by different parts of the remote mirror in different orientations as the remote mirror moves, thereby enabling a laser range finder to characterize the curvature of the surface of the remote mirror. The remote mirror can also announce its characteristic curvature using the wireless transmitter 3837 or wired communication link 3850.

In one aspect of several related embodiments, upon obtaining a characteristic curvature and orientation for the remote mirror the laser range finder can use this information to determine a corrected 3D location for laser reflections that are determined to have undergone deflection by the remote mirror.

3D Depth Map

FIGS. 30A and 30B illustrate 3D depth maps comprising a set of 3D locations indicative of the reflection locations corresponding to a set of laser reflections detected by laser range finder 3810. FIG. 30A illustrates a 3D depth map 3910*a* (e.g., a point cloud) comprising a plurality of 3D locations (e.g., locations 3915*a* and 3915*b*) calculated from a set of laser reflections. One simple method for calculating the 3D location corresponding to a laser reflection is to record a direction associated with the reflection and to calculate a distance based on the time-of-flight for the reflection (e.g., 100 m). The laser reflection can then be assigned a corresponding 3D location equal to a point in 3D space at the calculated distance (e.g., 100 m) in the recorded direction. For example, using the detector as the origin (e.g., 0,0,0 in Cartesian coordinates), the computed location for a laser reflection with direction (1,1,1) and a range of 100m, would be located at a 3D location 100 m along the vector (1,1,1) resulting in a 3D location of (58,58,58) meters. This approach works well for the subset of laser reflections (e.g., reflection 3660*a*) that travel directly from their corresponding reflection locations to the detector 3440. For example, subset 3920 of the 3D locations correspond to laser reflections from a person that reflected directly from the person. Hence, the subset of 3D locations 3920 is an accurate representation of the actual reflection locations for the person. Specifically, using the previous method on laser reflection 3660*a*, the computed 3D location 3915*a* is an accurate indication of the actual reflection location. However this approach fails to provide the correct computed 3D location for the deflected subset 3740 of the set of laser reflections. For example, applying the previous method of assigning 3D locations to laser reflections based on simply following sensed direction at the detector, results in a computed 3D location 3915*b* corresponding to laser reflection 3660*b*. In general applying a 3D location generation process to a deflected subset 3740 of laser reflections that fails to account for the deflection of those laser reflections by the remote mirror results in a subset of apparent 3D locations 3930 that would be poor indications of the corresponding 3D locations.

The accuracy of computed 3D locations (e.g., location 3915*c*) corresponding to laser reflections that have undergone deflection by a remote mirror 3620 can be improved by performing one or more correction steps (illustrated by arrow 3935) in the process of computing the corresponding 3D locations. In one aspect of several embodiments the deflected subset 3740 of the set of laser reflections are first identified and then a correction step is performed during the process of calculating the corresponding 3D locations. The correction step can generate a subset of corrected 3D locations 3940 corresponding to the deflected subset of laser reflections. In several embodiments the correction step can account for at least in part the deflection of the deflected subset 3740 of laser reflections by the remote mirror. Exemplary corrections (illustrated by arrow 3935) can include operations on the incident direction associated with a laser reflection in the deflected subset such as adding, subtracting, multiplying or dividing a vector associated with the incident direction by another correction vector or scalar. A more complex correction step could be to determine the position of the mirror in 3D space, calculate the incident angle of a laser reflection on the remote mirror and compute a corrected 3D location based on the position of the mirror and the estimated incident angle. In a related embodiment, laser range finder 3910 can obtain data indicative of the curvature and/or orientation of remote mirror 3620, and can then compute a corrected 3D location based at least in part on the curvature of the remote mirror.

In another exemplary embodiment, a remote mirror (e.g., a roadside mirror on a road bend) can have a known transfer function (e.g., relating incident and outgoing angle on the mirror). Laser range finder 3910 can then obtain the transfer function of the remote mirror 3620 (e.g., by receiving the transfer function in signals from the remote mirror or by lookup of mirror characteristics for a particular road intersection). Laser range finder 3810 can then use the location of the remote mirror and the transfer function to determine a relationship between incident direction on the remote mirror and the incident direction of deflected laser reflections on the detector 3440. Laser range finder 3910 can use this relationship as a correction step in the process of generating 3D locations corresponding to laser reflections in the deflected subset 3740.

FIG. 30B illustrates a 3D depth map wherein the deflected subset 3740 of the laser reflections is corrected using a step that isolates the 3D locations corresponding to the deflected subset in a dedicated secondary portion 3950 of the 3D depth map. In some embodiments, upon identification of one or more laser reflections that have undergone deflection the correction step can be to isolate those 3D locations by moving the resulting 3D locations to corrected locations. The corrected locations can be in a secondary portion of the 3D depth map (e.g., a portion in the top left that is dedicated to showing 3D locations for the deflected subset). One way to perform a correction step that shifts 3D locations corresponding to deflected laser reflections into a secondary portion of the depth map is to define a secondary origin that is applied exclusive to 3D locations in the deflected subset (e.g., remove a value of (10, −20, 30) from each point in the deflected subset in order to place the 3D locations corresponding to the deflected subset in a defined portion of the 3D depth map. One advantage of isolating the 3D locations for the deflected subset is that other systems or humans can readily associate a portion of the 3D depth map or computer screen with objects observed in remote mirrors. Another advantage of a correction step that isolations the deflected subset is that such a step can preserve the relative location of laser reflections within the deflected subset (thereby enabling object identification or classification), while establishing that the deflected subset has an unknown or unspecified spatial relation to the 3D locations corresponding to or derived from the direct laser reflections in the primary portion of the 3D depth map. Correction by isolating deflected 3D locations is similar to the concept of: "here is an indirect FOV from a remote mirror in the local environment, but the exact spatial relation of objects in the mirror to objects in the local environment is unclear". In one aspect the correction step can be a transfer function that is uniformly applied to all laser reflections in the deflected subset (e.g., applied to the direction data and the time of flight data for each laser reflection in the deflected subset). Alternatively, the correction step can be customized to each reflection direction (e.g., a direction based correction step). In one example of a customized correction step a laser range finder can learn the curvature and orientation of a remote mirror (e.g., broadcast wirelessly by the remote mirror) and can determine a correction step based on the curvature and the incident angle of each laser reflection in the deflected subset. In one embodiment, for each laser reflection that has undergone deflection by the remote mirror the correction step can be a multi-stage process, with a first stage that customizes or configures the correction step to the laser reflection and a second stage that performs the correction step on reflection data corresponding to the laser reflection.

Operation

FIG. 31A illustrates an embodiment in which laser range finder 31000 identifies a remote mirror in the local environment (e.g., a roadside mirror), detects a set of laser reflections, some of which have undergone deflection by the remote mirror, and corrects a subset of 3D locations for the presence of the remote mirror in the local environment. In the embodiment of FIG. 31A detector 3440 receives a set of laser reflections from an outgoing sequence of laser pulses. In response detector 3440 generates reflection data 31010 indicative of the time-of-flight and direction corresponding to a set of reflections. Some of the reflections have undergone deflection in a remote mirror but in the embodiment of FIG. 31A the members of the deflected subset need not be known when the reflection data is generated. The reflection data 31010 can be transmitted in detector signals 31020 (e.g., Ethernet packets, or streaming LAS file format) from detector 3440 to electronic circuitry operable to compute a 3D location corresponding to each reflection. For example, in FIG. 31A the electronic circuitry can be processing subassembly 3520 and can include one or more processors such as sensor data processor 3475 in FIG. 25A. Processing subassembly 3520 can obtain a mirror location 31030 for a remote mirror. Mirror location 31030 can be a 3D location relative to the detector 3440. For example, a mirror location can be a 3D location determined by processing laser reflections from the mirror edges (e.g., frame or support structure) or camera image data, or a broadcast location by the remote mirror. Mirror location 31030 can also be a portion of the detector FOV (e.g., a range of directions) that encompasses some or all of the remote mirror. Processing subassembly 3520 can further identify a deflected subset 31040 of the set of laser reflections (e.g., indicating that reflection #2 and reflection #3 have been deflected). Processing subassembly 3520 can then compute a 3D location for each laser reflection in the set of laser reflections, based on the reflection data 31010 delivered from the detector 3440 in detector signals 31020. For example, the computation by the processing subassembly can use the direction and time-of-flight reflection data corresponding to each laser reflection to determine a 3D location. For laser reflections determined to be undeflected by the remote mirror (e.g., reflection #1) in reflection data 31010, the corresponding 3D location can be uncorrected (i.e., no step is performed to account for the remote mirror). For laser reflections determined by the processing subassembly to be deflected by the remote mirror (e.g., reflections #2 and #3), a correction step can be performed to generate corresponding corrected 3D locations such as locations 31055*b* and 31055*c*. The correction step can be translation of the incoming direction, rotation of the incoming direction, or a complex transformation of the incoming direction based on the mirror location 31030. The processing subassembly can display the final 3D locations 31050 (including some corrected and some uncorrected 3D locations) in a 3D depth map such as 3910*a* in FIG. 30A or 3910*b* in FIG. 30B. Alternatively, the processing subassembly can store or transmit the set of 3D locations corresponding to the set of laser reflections.

FIG. 31B illustrates an embodiment of a system 31005 that receives a set of laser reflections, some of which have undergone deflection by the remote mirror, and uses associated electronic circuitry to calculate an initial 3D location for each laser reflection, determine a subset of the laser reflections that have been deflected by a remote mirror and computes a corrected 3D location for the deflected subset of the set of reflections. Several models of LIDAR (e.g., HDL-64 from Velodyne Inc. of Morgan Hill, CA) can output an uncorrected 3D reflection location corresponding to each laser reflection in a set of laser reflections. In such LIDARs the detector can initially measure the time-of-flight and direction as reflection data 31010 and then compute a set of initial 3D locations 31015 using a local computer processor 31012. Processor 31012 can be part of the steerable laser assembly 3120 in FIG. 25A and can be part of detector 3440 or operably coupled to receive reflection data from detector 3440. A LIDAR such as HDL-64 can output an uncorrected set of 3D locations that can subsequently be corrected using one or more embodiments of the present disclosure. In the embodiment of system 31005 electronic circuitry (e.g., local processor 31012 and processing subassembly 3520) can compute a set of 3D locations corresponding to a set of laser reflections in a multi-stage computation process. At a first stage the local processor 31012 calculates initial 3D locations 31015 for a set of laser reflections. The initial 3D locations are transmitted to a processing subassembly 3520 in detector signals 31020. At a second computation stage processing subassembly 3520 can obtain a mirror location 31030 for a remote mirror and can determine a deflected subset 31040 (e.g., members 2 and 3) of the set of laser reflections. At the second stage the processing subassembly can perform a correction step on the initial 3D location for each of the laser reflections in the deflected subset and thereby generate a final set of 3D locations 31050 including some initial 3D locations that are uncorrected (e.g., 31055*a*) and some 3D locations (e.g., 31055*b* and 31055*c*) that have been corrected to at least in part account for deflection of the corresponding laser reflection by the remote mirror.

Processing subassembly 3520 can include a sensor data processor (e.g., processor 3475 in FIG. 25A) operable to receive sensor data from a variety of sensor systems (e.g., laser range finders, cameras, radars and ultrasound sensors) and thereby determine and track the mirror location 31030. In one aspect a processing subassembly can determine a trajectory for a discovered remote mirror (i.e., estimate of future location at a future time). Processing subassembly 3520 can use a GPU and identify a bounding box (e.g., a portion of the detector FOV in which the remote mirror should lie). The electronic circuitry (e.g., local processor 31012 and processing subassembly 3520) can use a database of sensor data gathered by the host vehicle or other vehicles (e.g., other autonomous cars) to determine the placement of a remote mirror. In a similar manner the electronic circuitry in the laser range finder can obtain or modify a correction step based on the effectiveness (e.g., location accuracy) of a previously used correction step. For example, the electronic circuitry can determine a correction step based in part on 3D locations computed by previous laser range finders that have encountered the same remote mirror. For example, two roads can meet at a 37 degree angle and a remote mirror can be placed at the intersection. Initially, a laser range finder moving along one of the roads can initially detect a remote mirror in the detector's FOV but may not have enough information to characterize the curvature of the remote mirror and thereby determine precisely corrected 3D locations representative of the actual reflection locations corresponding to a deflected subset of the set of laser reflections. The laser range finder can realize that insufficient historical data exists (e.g., from its own historical data or other range finders that have encountered the remote mirror) to correct the 3D locations of the deflected subset in a manner that places the 3D locations relative to direct reflection locations (e.g., subset 3920 from person 3160 in FIG. 30A). Therefore, the laser range finder may perform an initial correction step that functions to isolate the 3D locations corresponding to the deflected subset. The laser range finder can subsequently receive laser reflections directly from objects (e.g., buildings and trees) that were previously observed using the remote mirror and compare 3D locations from direct reflections with previously computed (and corrected) reflection locations from the deflected subset. In this way the laser range finder determines the effectiveness of a correction step performed on the deflected subset or refines a correction step based on subsequent direct laser reflections from objects.

A 3D location for a deflected laser reflection can be computed using one or more correction steps that are based at least in part on the accuracy of a previous corrected 3D location. For example, the accuracy of a previous 3D location computed using a correction step to account at least in part for a remote mirror can be compared against a 3D location for the same reflection location gathered directly from the same reflection location. In this way a laser range finder can perform a closed loop comparison of corrected 3D locations and uncorrected 3D locations for the same reflection point from different points in time.

FIG. 32A is a flow chart illustrating a method 31100 for utilizing a remote mirror by a laser range finder in accordance with an embodiment of the present disclosure. At step 31110 a sequence of outgoing laser pulses is generated with a laser generator. At step 31120 a set of laser reflections from one or more laser pulses in the outgoing laser pulse sequence is detected with a detector. The laser generator and the laser detector can be part of the same laser range finder. In method 31100 at least some of the laser reflections in the set of laser reflections have undergone deflection by a remote mirror prior to reaching the detector.

At step 31130 a 3D location is computed for each laser reflection in the set of laser reflections. At step 31130, for each laser reflection in the set of laser reflections, sub-step 31140 is performed to determine if the laser reflection has undergone deflection by the remote mirror and depending on the outcome either sub-step 31150 or 31160 is performed in order to determine the corresponding 3D location. At step 31140 method 31100 determines whether a laser reflection from the set of laser reflections has undergone deflection by the remote mirror. Step 31140 can use one or more approaches previously described to make the determination of whether each laser reflection has been deflected by the remote mirror. Exemplary detection methods can include detecting aspects of the reflection (e.g., reflection range), the dynamic range of surrounding laser reflections, consistency with surrounding laser reflections and a reflection direction that is associated with a remote mirror. Upon determination that a laser reflection has not undergone deflection by a remote mirror at step 31150 a 3D location indicative of a reflection location corresponding to the laser reflection is calculated. At step 31150 a laser reflection can be considered to have a reflection location along the reflection direction of the incoming laser reflection (i.e., the reflection arrives directly from the reflection location without changing direction along the way).

Upon determination at step 31140 that a laser reflection has undergone deflection by a remote mirror the method performs step 31160. At step 31160 a 3D location indicative of a reflection location corresponding to the laser reflection is calculated including performing at least one correction step in the calculation of the 3D location. The at least one correction step can function to account for deflection of the laser reflection by the remote mirror (e.g., improve the accuracy of the computed 3D location relative to the corresponding reflection location for the laser reflection). Alternatively, the correction step can function to isolate, identify or indicate the 3D locations corresponding to laser reflections that have undergone deflections (e.g., isolating the corresponding 3D locations by modifying the 3D location relative to undeflected 3D locations to occupy a particular portion of a 3D depth map).

FIG. 32B is a flow chart illustrating a method 31102 for utilizing a remote mirror by a laser range finder in accordance with an embodiment of the present disclosure. Method 31102 starts with steps 31110 and 31120 similar to method 31100. At step 31135 a first subset of the set of laser reflections that have undergone deflection by the remote mirror can be determined.

At step 31145 a 3D location indicative of a corresponding reflection location is computed for each laser reflection in the set of laser reflections. The computing at step 31145 includes at least one correction step performed exclusively when computing 3D locations corresponding to the laser reflection in the first subset of the set of laser reflections. For example, step 31145 can include performing with a processor a set of instructions stored in a computer memory to determine a 3D location corresponding to each laser reflection in the set of laser reflections. The at least one correction step can comprise one or more instructions that are only included in the set of instructions performed for a laser reflection when that laser reflection is in the first subset of the set of laser reflections.

In a related embodiment, step 31125 can be performed to determine the location of the remote mirror. The location of the remote mirror can be a 3D location, a range of 3D locations, a 2D location within the FOV or a range of locations within the FOV. The location of the remote mirror can subsequently be used at step 31135 to determine the subset of the set of laser reflections that have been deflected by the remote mirror. For example, the mirror can be estimated or determined to occupy a first 2D angular range in the detector FOV (i.e., an azimuthal angular range and an elevation angular range). All laser reflections determined by the detector to have incoming directions within the 2D angular range in the FOV can be considered to have undergone deflection by the remote mirror.

FIG. 32C is a flow chart illustrating a method 31104 for utilizing a remote mirror by a laser range finder in accordance with an embodiment of the present disclosure. Method 31104 starts with steps 31110, 31120 and 31135 similar to method 31102. At step 31145 a 3D location is computed for each laser reflection in the set of laser reflections, based at least in part on at least some of the reflection data. At step 31155 for each laser reflection in the first subset of the set of laser reflections at least one correction step is performed that modifies the corresponding 3D locations for those laser reflections that have been deflected by the remote mirror. The at least one correction step can be performed exclusively for laser reflections in the first subset. The at least one correction step can function to account for the deflection of the laser reflection by the remote mirror in the process of computing the corresponding 3D locations.

A Remote Mirror with Non-Uniform Laser Range Finding

A mirror in the local environment of a laser range finder can augment a direct field of view (i.e., all the directions that the laser range finder can receive a reflection directly) with an indirect field of view. A convex mirror compresses a large field of view into a smaller reflected image which can be difficult for humans to understand or intuitively recognize due to distortion or size scale. A laser range finder can interrogate such a convex mirror with a dense set of incident laser pulses (e.g., with a greater spatial density than the average laser pulse density for the whole FOV) thereby increasing utilization of the remote mirror and increasing the amount of refection data gathered from the remote FOV provided by the remote mirror. For example, a convex roadside mirror may only occupy a 10-by-10 degree portion of a LIDAR's field of view but may offer insight into a 90 degree range of input angles thereby providing a 90 degree indirect field of view to the LIDAR. In one embodiment, a laser range finder identifies a mirror region of range finder FOV that contains a remote mirror and generates a dense non-uniform subset of laser pulses in the mirror region, thereby interrogating the indirect field of view offered by the remote mirror and improving the utilization of the remote mirror.

Mirrors serve a variety of useful purposes that aid human visual activities. For example, rearview mirrors help drivers see objects behind the vehicle without turning their heads and roadside mirrors help drivers see around bends in the road. Similarly, mirrors on trailers help drivers to see the sides and rear of trailers. Cameras can perform some of the functions of mirrors by capturing a remote field of view but cameras capture an image and recreate a representation of the image elsewhere. The recreated image is only representative of the rays of light incident on the camera CCD array. In contrast, mirrors can deflected rays of light from objects in an indirect field of view towards an observer, thereby providing direct optical detection (i.e., actual light rays not recreated reflections) from remote objects.

While a mirror can provide a useful indirect FOV they often distort the shape and condense the size of reflected objects. This can be confusing to humans. For example, vehicle wing mirrors are typically convex mirrors designed to gather reflections from a greater angular range (i.e., indirect FOV) than an equivalent flat mirror. This convex shape causes reflections to appear smaller and hence many wing-mirrors carry a warning label stating "Objects are closer than they appear". Humans can have difficulty making use of remote mirrors because of distortions and image size reduction. For example, a driver could require an increased reaction time to comprehend a distorted image in a roadside mirror (e.g., showing reflections from around a bend in the road). Similarly, the condensing nature of convex mirrors makes them ineffective when drivers are far away. Hence roadside mirrors have been used with only limited success for vehicles driven by humans.

Interestingly, computer-based optical ranging systems (e.g., LIDARs) can make better use of remote mirrors, thereby promoting their use in autonomous driving applications. Reasons for this include the ability of computer systems to zoom in on a discovered remote mirror with greater acuity than humans and thereby gather a wealth of information from the indirect FOV offered by the remote mirror even at considerable distance from the remote mirror. For example, consider a remote mirror (e.g., a roadside mirror) encountered by a laser range finding system on an autonomous vehicle. The remote mirror may not be a permanent fixture in the FOV of the laser range finder. Alternatively, the remote mirror may be a permanent fixture but have a placement (e.g., location in or portion of the FOV) that is variable and not under the direct control of the laser range finder. The laser range finder can start by learning the location of the remote mirror and then can dynamically increase the density of laser ranging measurements in the region of the field of view containing the remote mirror. In this way, a mirror (e.g., a roadside mirror 100 m away) may occupy a small portion of the field of view of the laser range finder but offer reflections from a wide range of angles (e.g., a large indirect FOV). A laser range finder according to one embodiment could generate a non-uniform measurement distribution in the range finder FOV with a high density of measurements located in a portion of the FOV that interrogates the remote mirror and gains a wealth of information about objects reflected in the remote mirror. For example, imagine a remote mirror at an traffic intersection that occupies 1-5% of the FOV of a laser range finder on an approaching vehicle 100 m away and uses a denser than average subset of laser pulses to map the distance to objects reflected in the remote mirror. Such a system could generate a 3-D depth map of the traffic intersection by interrogating the remote mirror while approaching the intersection. In another aspect the remote mirror at the intersection can have a variable orientation (e.g., can rotate or scan) and can report or broadcast the position of the remote mirror, thereby facilitating the approaching laser range finder to correct the laser beams deflected by the remote mirror.

Therefore one aspect of several embodiments is to identify and track the variable location of a remote mirror in the FOV of a laser range finder. Another aspect of several embodiments is to dynamically control the laser range finder to increase the density of laser ranging measurements in a region of the FOV that contains the remote mirror. For example, in one exemplary embodiment a laser range finder periodically determines a region of the FOV that contains a remote mirror, and generates instructions to dynamically steer a steerable laser assembly to track the location of the remote mirror with a high density of laser pulses relative to the average laser pulse density for the whole FOV. A detector in the laser range finder can thereby receive a dense plurality of laser reflections from the region of space reflected in the remote mirror.

In one simple embodiment, a method for increasing the utilization of a remote mirror by a laser range finder comprises the steps of: obtaining at electronic circuitry a location estimate for a remote mirror located in the vicinity of a laser transceiver, operating a laser transceiver subassembly comprising a laser generator and a laser detector, based at least in part on the location estimate and thereby detecting a set of laser reflections from a corresponding set of outgoing laser pulses such that a first subset of the laser reflections are deflected by the remote mirror and that first subset has a greater than average density in the laser transceiver FOV.

In another simple embodiment, a laser range finder apparatus with enhanced utilization of a remote mirror comprises: Electronic circuitry at least some of which is coupled to a laser transceiver subassembly, wherein the electronic circuitry obtains a location estimate for a remote mirror. The laser transceiver subassembly comprises a laser generator, a detector and means to generate a high density measurement region with a higher than average density of laser reflection measurements (e.g., more reflection data gathered per unit solid angle or angular area in the detector FOV). The electronic circuitry instructs the means to generate the high density measurement region to position the high density measurement region such that a subset of the set of reflections measured by the detector is both deflected by the remote mirror and has a greater than average measurement density.

For example, a laser range finder can scan a FOV with a 360 degree azimuthal range and a 20 degree vertical range. The laser range finder can scan the FOV with a nominal measurement density of one outgoing and reflected laser pulse every 5 degree in the azimuthal direction. The laser range finder can detect a vehicle wing-mirror in the FOV and control a laser transceiver subassembly (e.g., a steerable laser assembly) to increase the measurement density to one measurement every 1 degree in the azimuthal direction in a small portion of the FOV, the small portion being based on a location estimate for a remote mirror. The laser range finder can thereby receive a first subset of the laser reflections that has been deflected by the remote mirror and with a greater than average density (e.g., 1 measurement every 1 degree). The higher density subset of reflections can be very useful for improving the utilization of the remote mirror. For example, if the remote mirror condenses a 50 degree angular range (e.g., a remote mirror FOV) into a 10 degree portion of the detector FOV the high density subset of the laser reflections would serve to provide one measurement for every 1 degree of azimuthal range, thereby corresponding to one measurement every five degrees of the angular range captured by the remote mirror.

Various embodiments can improve the utilization of a remote mirror by scanned laser range finders and flash-based laser range finders. Hence, several embodiments provide a method to discover a remote convex mirror in the FOV and develop laser steering parameters designed to interrogate the remote mirror more effectively, for example with a customized non-uniform sequence of laser pulses that has increased density, decreased angular spacing, smaller or larger laser spot sizes, or optimized laser intensity.

In a scanned laser range finder embodiment, a laser transceiver subassembly can be a steerable laser assembly operable to scan a laser beam in a dynamic non-uniform sequence based on instructions from coupled electronic circuitry. The steerable subassembly can comprise a laser generator, a laser positioner and a detector. The electronic circuitry can determine a location estimate for a remote mirror. The electronic circuitry can instruct the steerable laser assembly to scan the FOV in a non-uniform manner based on the location estimate and thereby generate a set of laser reflections with a first subset that has been both deflected by the remote mirror and has a greater than average density, thereby providing enhanced utilization of the remote mirror.

In a flash LIDAR embodiment, the laser generator can generate a set of laser pulses that illuminate some or all of the FOV at once. Hence with a flash LIDAR it is difficult to increase the pulse density specifically in a region of the FOV containing the mirror. In a flash LIDAR embodiment reflections arrive at the detector from many locations in the detector FOV at once. Hence the detector is often an array of individual detectors (e.g., a focal plane array or a CCD). A flash LIDAR can selectively magnify a portion of the FOV onto a portion of the detector, thereby providing a variable measurement density from different regions of the FOV. A magnifying component (e.g., a lens) can be controlled based on the estimated location of the remote mirror to provide a subset of the set of laser reflections with greater than average measurement density and the subset can also be selected to include those reflections that have undergone deflection by the remote mirror. Hence a flash LIDAR with dynamically steerable magnification of a portion of the FOV (e.g., a zoom lens that can be moved relative to a detector array), can implement one embodiment of the remote mirror utilization method.

FIGS. 33A and 33B illustrate components of a laser range finder that obtains a location estimate for a remote mirror in a FOV and controls a laser transceiver subassembly based on the location estimate to generate a denser than average subset of laser reflections that have been deflected by the remote mirror, thereby increasing utilization of the remote mirror. FIG. 33A illustrates an exemplary embodiment where a laser range finder 31210 comprising electronic circuitry 31220 and a laser transceiver subassembly 31230, is operable to gather a set of reflections (31270 in FIG. 33B) from a field of view 3670. At least some of the electronic circuitry (e.g., circuitry 31240) obtains a location estimate for a remote mirror 3620. In the embodiment of FIG. 33A the location estimate is provided to a steering parameter generator/modifier 3410 that generates a set of steering parameters (e.g., instructions to steer an aspect of the laser transceiver subassembly). At least some of the electronic circuitry can be coupled to transmit the laser steering parameters to the laser transceiver subassembly 31230. In the embodiment of FIG. 33A the laser transceiver subassembly is a steerable laser assembly 3120 comprising a laser generator 3420, a laser positioner (not shown) and a detector 3440. The laser positioner (e.g., 3430 in FIGS. 25A and 25B) can steer at least one laser beam from the laser generator 3420 in a variety of directions in FOV 3670. The sequence of directions and aspects of pulses generated in each direction can be based at least in part on the laser steering parameters. In this way steerable laser assembly 3120 can generate a non-uniformly spaced set of outgoing laser pulses.

In the embodiment of FIG. 33A the outgoing set of laser pulses (e.g., 31250 and 31255) has a subset 31255 with a greater than average density, this subset is positioned by the steerable laser assembly 3120 to be directed at the remote mirror in the FOV (e.g., occupying region 31260 of the FOV). The dense subset 31255 of outgoing laser pulses causes a corresponding deflected subset of laser reflections (illustrated as subset 31270 in FIG. 33B) that has been deflected by the remote mirror and has a greater than average density of laser reflections based at least in part on the set of laser steering parameters causing the steerable laser assembly to dynamically steer. In this way the embodiments of FIGS. 33A and 33B can track the location of the remote mirror in the FOV with a dense subset of outgoing laser pulses and a corresponding dense deflected subset of laser reflections. In this way laser range finder 31210 can increase the utilization (e.g., number of laser reflections per unit of angular range of the FOV) of a remote mirror which may have transient placement in the FOV or a variable location in the FOV. In one embodiment of FIG. 33A at least some of the electronic circuitry 31220 can be configured to compute a deflected subset of the set of laser reflections that have undergone deflection by the remote mirror (e.g., subset 3740 in FIG. 30A). At least some of the electronic circuitry 31220 can be configured to compute for each laser reflection in a set of laser reflections that includes the deflected subset a corresponding 3D location indicative of a corresponding reflection location. Further, at least some of the electronic circuitry can be configured to perform for each laser reflection in the deflected subset of the set of laser reflections a correction step when computing the corresponding 3D location.

Turning in detail to FIG. 33A and FIG. 33B laser range finder 31210 can be mounted to a vehicle and thereby encounter remote mirrors (e.g., roadside mirror 3620) along roadways or remote mirrors on other parts of the vehicle. Laser range finder 31210 can comprise electronic circuitry 31220. Exemplary electronic circuitry 31220 can comprise a processing subassembly (e.g., 3520 in FIG. 26A). A communication link (e.g., 3530 in FIG. 26A) can couple at least some of the electronic circuitry 31220 to laser transceiver subassembly 31230. The electronic circuitry 31220 in laser range finder 31210 can comprise circuitry 31240 to obtain a location estimate for a remote mirror (e.g., remote mirror 3620). The circuitry 31240 can include one or more transceivers, processors or memories that receive the location estimate from the remote mirror or from a data processor that has processed sensor data (e.g., camera image data) to determine the location estimate. For example, an autonomous vehicle can approach an intersection with a remote mirror. A GPS receiver in the autonomous vehicle can identify an approximate location for the vehicle. The electronic circuitry 31240 can access a database of remote mirror locations (e.g., for all intersections in the country) and obtain or determine a location estimate for the remote mirror relative to the autonomous vehicle. Based on this location estimate the laser range finder can identify a portion of the FOV estimated to contain the remote mirror.

In several other embodiments the electronic circuitry 31240 can receive sensor data and obtain the location estimate for the remote mirror by processing the sensor data. For example, a processing subassembly (e.g., 3520 in FIG. 26A) or sensor data processor (e.g., 3475 in FIG. 25A) can process laser reflections, camera imagery or radio frequency signals from a remote mirror to determine the location of the remote mirror.

Laser range finder 31210 can include a steering parameter generator/modifier, which can generate a set of steering parameters (e.g., instructions) operable to dynamically steer the steerable laser assembly to generate a non-uniform distribution of laser pulses in the FOV, based on the location estimate for the remote mirror.

Steering parameter generator/modifier 3410 can transmit the set of steering parameters to the laser transceiver subassembly 31210 (e.g., steerable laser subassembly). In the embodiment of FIG. 33A steerable laser assembly 3120 can include a laser positioner (e.g., 3430 in FIGS. 25A and 25B) that is dynamically steerable to dynamically position a laser beam from laser generator 3420. The laser positioner can mechanically steer the laser generator or laser positioner 3430 can use a solid-state mechanism to steer the laser beam. The dynamic steering of the steerable laser assembly (e.g., steering the laser positioner) can generate a set of outgoing laser pulses (e.g., 31250 and 31255) with a non-uniform distribution that is based at least in part on the location estimate for the remote mirror. For example, a mechanical laser positioner can rotate with a first speed thereby scanning the FOV and scan with a slower speed in a first region 31260 of the FOV 3670. For a particular constant laser pulse rate the slower angular velocity in the first region 31260 of FOV 3670 causes a denser than average subset 31255 of the set of outgoing laser pulses in the first region. In one aspect of several embodiments, the laser steering parameters cause the steerable laser assembly to position the denser-than-average subset of outgoing laser pulses within the FOV such that at least some of the subset of outgoing laser pulses is deflected by the remote mirror.

Turning to FIG. 33B a detector 3440 in the steerable laser assembly 3120 can detect a set of laser reflections corresponding to the set of outgoing of laser pulses. A deflected subset 31270 of the set of laser reflections undergoes deflection by the remote mirror in the process of reaching the detector 3440. In several cases the deflected subset 31270 corresponds to those outgoing laser pulses that have been deflected in the outgoing direction by the remote mirror. In one aspect of several embodiments the steerable laser assembly increases the density of laser pulses in a region 31260 of the FOV. The region 31260 is positioned to include at least some of the remote mirror in the FOV and thereby increasing the density of both the outgoing laser pulses that are deflected by the remote mirror and the corresponding deflected subset of reflections 31270. Hence the deflected subset 31270 of the set of laser reflections can have a greater than average density, based at least in part on dynamically steering the steerable laser assembly based on the location of the remote mirror.

FIG. 33C illustrates a flash LIDAR embodiment. In the embodiment of FIG. 33C a flash LIDAR illuminates many points in the local environment simultaneously with a flash of light and a laser transceiver subassembly dynamically magnifies a portion of the FOV containing a remote mirror, thereby generating a subset of laser reflections that have been deflected by the remote mirror and have a greater than average density in the field of view. The light source in a flash LIDAR can be a laser beam or non-collimated non-coherent light (e.g., from one or more LEDs or a light bulb). The flash LIDAR of FIG. 33C comprises electronic circuitry 31220 and a laser transceiver subassembly 31231 similar to the embodiments of FIG. 33A and FIG. 33B. Unlike scanned laser range finders (e.g., 31210) the laser generator 3420 in flash LIDAR 31211 illuminates a plurality of directions at once (e.g., directions 31280*a* and 31280*b*). The flash LIDAR has an arrayed detector 31275 (e.g., a focal plane array or a CCD array) designed to capture all of the reflections from the laser flash (or light flash) in a short period of time. Therefore unlike a scanned laser range finder that completes 10-15 scans of the FOV per second, a flash LIDAR can pulse the entire FOV with laser light and gather reflections in less than 100 milliseconds.

One challenge with flash LIDAR is limited measurement density (i.e., the number of measurements gathered from each laser flash). Often the FOV is uniformly magnified onto the detector array 31275. Interestingly, the embodiment of FIG. 33C has a dynamically controllable magnifier 31285 that can selectively magnify a portion of the FOV thereby spreading light from the magnified region onto an increased number of the detector pixels in the detector array 31275. This is similar to how a telescope magnifies an image from a small portion of the surroundings and a person can receive enhanced resolution from a small, but variable portion of the total available field of view. Therefore controllable magnifier 31285 magnifies a region of the FOV onto the detector array 31275 to produce more detected laser reflections, thereby increasing the resolution of laser ranging from the magnified portion of the FOV. Controllable magnifier 31285 can be similar to a zoom lens in a camera and can include mechanical or solid-state positioning components to position the optical elements in the controllable magnifier. In the embodiment of FIG. 33C electronic circuitry 31220 operates similarly to a scanned laser range finder by obtaining a location estimate for the remote mirror and generating a set of laser steering parameters. However in the case of a flash LIDAR the laser steering parameters steer the controllable magnifier to magnify a portion of the FOV. For example, controllable magnifier 31285 can receive at least some of the set of laser steering parameters and dynamically position the controllable magnifier to expand (i.e., magnify) a portion of the FOV containing a remote mirror, thereby detecting a greater than average number of reflections from the portion of the FOV. Without the controllable magnifier the subset 31270 from the convex mirror could be mapped onto a single pixel (or a few pixels) in the detector array, thereby losing much of the information from the mirror, particularly a convex mirror that condensed the reflected image. Instead, the controllable magnifier 31285 functions to magnify the deflected subset 31270 from the remote mirror, thereby increasing the density of laser reflections in the deflected subset. In the exemplary embodiment of FIG. 33C laser reflections 31265*a* and 31265*b* are not associated with the remote mirror and have nominal measurement density at the detector (e.g., one detected laser reflection for every 10 degrees of the azimuthal range in the FOV). The deflected subset 31270 of the set of laser reflections contains a wealth of information from the region reflected by remote mirror 3620. Unfortunately, the deflected subset is tightly grouped in a small angular range. The controllable magnifier increases the number of pixels in the detector array that record reflections from region 31290, thereby increasing the density of the deflected subset 31295 of detected laser reflections. For example, the average density of all laser reflections could be one laser reflections for every 10 degrees of azimuthal range in the FOV and the density in the reflected subset could be one laser reflection for every two degrees of azimuthal angular range. In this example the controllable magnifier increases the density of laser reflections from the remote mirror detected at the detector by a factor of five.

FIGS. 34A, 34B and 34C illustrate an exemplary field of view 31310 for an exemplary laser range finder in accordance with embodiments of the present disclosure. In FIGS. 34A, 34B and 34C a set of outgoing laser pulses (e.g., laser pulse 31320) is generated within the FOV 31310. Consider that exemplary FOV 31310 has a 40 degree azimuthal range and a 40 degree elevation range. The nominal density of outgoing laser pulses is one pulse for each 10 degree of azimuthal sweep and 10 degree of elevation. In FIG. 34A FOV 31310 encompasses a remote mirror 31330*a*. In an exemplary embodiment a steerable laser assembly can dynamically generate a subset of outgoing laser pulses 31340_a_ with a higher than average spatial density that is positioned in the FOV to overlap at least a portion of remote mirror 31330_a_. For example, in FIG. 34A the pulse density of subset 31340_a_ is increased to one laser pulse every 2 degrees of azimuthal sweep and 2 degrees of elevation.

Upon estimating the location of a remote mirror in the FOV several embodiments can dynamically vary other properties of the outgoing laser pulses (e.g., pulse intensity, laser spot size, laser divergence angle, pulse repetition rate, or laser color) to increase utilization of the remote mirror for ranging activities. For example, FIG. 34B illustrates a set of outgoing laser pulses with a nominal pulse density equal to that of FIG. 34A and a dense subset 31340_b_. The dense subset 31340_b_ is used to interrogate a remote mirror 31330_b_. The laser spot size of the dense subset 31340_b_ is reduced relative to the nominal laser spot size. For example, laser pulse 31320 can have a nominal spot size of 2 square centimeters at a distance of 1 meter from the laser range finder and laser pulses in the dense subset (e.g., laser pulse 31350) can have a spot size of 1 square centimeter. The smaller spot size can enhance the ability of a laser range finder to interrogate a convex remote mirror by reducing overlap between neighboring laser pulses. Dense subset 31340_b_ has a complex non-uniform distribution of laser pulses (e.g., the complex diamond pattern). In several embodiments the pattern requires the ability to dynamically steer a steerable laser assembly (e.g., assembly 3120 in FIG. 33A). FIG. 34C illustrates a similar situation except that both the density and intensity of laser pulses is modulated in the dense subset 31340_c_. The dense, intense subset 31340_c_ is positioned to overlap with remote mirror 31330_c_. For example, nominal laser pulses (e.g., 31320) can have a nominal intensity of 1 joule per square centimeter and the laser pulse intensity in the dense subset 31340_c_ can be 2 joules per square centimeter.

FIG. 35A is a flow chart illustrating a method 31400 for generating with a laser range finder a deflected subset of reflections that have undergone deflection by a remote mirror in the FOV and wherein the laser range finder causes the deflected subset to have a greater than average density, thereby utilizing the remote mirror to perform laser ranging in accordance with one embodiment of this disclosure. At step 31410 a location estimate for a remote mirror that occupies some of the FOV of a laser range finder is obtained at electronic circuitry. At step 31420 a laser generator generates a set of outgoing laser pulses. The laser generator can be part of a steerable laser assembly. The laser generator can be a laser diode in a laser transceiver subassembly (e.g., laser transceiver subassembly 31230 in FIG. 33A or 31231 in FIG. 33B). At step 31430 a detector detects a set of reflections from at least one laser pulse in the outgoing set of laser pulses. Upon detection by the detector at step 31430, a first subset of the set of laser reflections have undergone deflected by the remote mirror. At step 31440 the electronic circuitry controls a first means disposed in the laser range finder to generate a greater average density of laser reflections in the first subset of the set of laser reflections than the average density of the set of laser reflections in the field of view. Exemplary means can be a laser positioner (e.g., 3430 in FIG. 25A and FIG. 25B or a controllable magnifier such as 31285 in FIG. 33C). For example, at step 31440 the electronic circuitry can transmit a set of instructions (e.g., laser steering parameters 3501 in FIG. 26B) to a steerable laser assembly comprising a laser generator and a laser positioner. The set of instructions can cause the steerable laser assembly to generate a non-uniform distribution of the set of outgoing laser pulses at step 31420 and thereby cause the first subset of set of reflections (e.g., a deflected subset) detected at step 31430 to have a greater than average density. One or more steps in method 31400 can be performed iteratively or periodically thereby enabling a laser range finder to track a remote mirror in the FOV with a high-density subset of the outgoing laser pulses (e.g., subset 31255 in FIG. 33A). In this way performing some or all of the steps in method 31400 in a variety of orders can provide that more laser reflections are gathered (e.g., converted into reflection data) from the remote mirror (e.g., more reflection per unit area or per unit solid angle of the FOV) than the average number of laser reflections gathered per unit area or per unit solid angle in the entire FOV.

FIG. 35B is a flow chart illustrating a method 31405 for generating with a laser range finder a deflected subset of light reflections that have undergone deflection by a remote mirror in the FOV and wherein the laser range finder causes the deflected subset to have a greater than average density in accordance with one embodiment of this disclosure. At step 31415 a location estimate for a remote mirror that occupies some of the field of view of a steerable laser assembly is obtained by electronic circuitry. At step 31425 the electronic circuitry generates a set of laser steering parameters based at least in part on the location estimate for the remote mirror. At step 31435 the steerable laser assembly dynamically steers at least one laser beam, based at least in part on the set of laser steering parameters, and thereby generates a set of outgoing laser pulses with non-uniform spacing in the FOV of the laser range finder. At step 31445 a detector detects a set of laser reflections from the set of outgoing laser pulses, wherein a first subset of the set of laser reflections have undergone deflection by the remote mirror and wherein the dynamic steering of the at least one laser beam by the steerable laser assembly causes the first subset of the set of laser reflections to have a greater average density in the field of view than the average density of the set of laser reflections in the field of view.

Lidar with Feedback Control of Remote Mirror

In a related area, autonomous vehicles may increasing rely on mirrors to augment the direct FOV of several sensors (e.g., laser range finders and cameras) with an indirect FOV provided by directions in the FOV of the sensors for which light is deflected by the mirrors. In several situations these mirrors can be remote mirrors and have aspects that complicate their interaction with autonomous vehicle sensors. Exemplary remote mirror aspects can include transient placement in the FOV of a sensor, occupying a small (e.g., <10%) variable portion of the FOV of a sensor, uncontrolled variable position in the FOV of a sensor and uncontrolled variable distance of the remote mirror and placement of the remote mirror on an unknown part of a vehicle enabling unforeseen movement independently of the sensor. Modern laser range finders (e.g., LIDARs) often incorporate rotating or scanning mirrors to scan a FOV and have used compensation mirrors to deflect all outgoing laser pulses. These mirrors are typically incorporated into the housing of the range finder and have a predetermined position in the FOV of the laser range finder (e.g., a compensation mirror or a scanning mirror). The controlled motion or controlled position of integrated mirrors enables the manufacturer to anticipate the effect of the mirror on a laser beam or accurately characterize the transfer function of the mirror. For example, a scanning mirror in a rotating LIDAR is assumed to deflect one or more laser beams from a laser generator in a predetermined manner as the scanning mirror rotates. For example, a scanning mirror in a LIDAR is characterized by the manufacturer and a dedicated position sensor is often provided such that the direction of a laser reflection can be estimated from the known characteristics and position of the scanning mirror.

In the real world, a laser range finder can encounter remotely located mirrors that are not well characterized (e.g., occupies an unknown position, or occupies a variable and unknown region of the FOV). A remote mirror may have unknown characteristics such as curvature, orientation, distance and occupy an unknown region of the FOV. In one example, a remote mirror on the trailer of an articulated truck can provide a very useful indirect FOV (e.g., in a blind spot behind the trailer). One challenge for a laser range finders with control over a remote mirror (e.g., on a vehicle trailer) is to select a position (e.g., orientation) for that remote mirror that provides the most effective indirect portion of the FOV (e.g., that portion in which laser reflections have been deflected by the remote mirror). In several aspects this challenge can be likened to how rental-car customers often adjust the wing-mirrors on their rental car, based on their preferences and visual feedback. A remote mirror can be useful for laser range finding as well as computer vision system (e.g., camera systems) on an autonomous or semi-autonomous vehicle. In one aspect the remote mirror can be remotely positioned based at least in part on processing laser reflections that have undergone deflection by the remote mirror.

Consider that an autonomous articulated truck can benefit greatly from remotely located mirrors located on the trailer. The tractor portion can contain a laser range finder and can have an electrical cable with a separable coupling (e.g., an electrical connector) operable to connect to a mirror positioner to position a remote mirror on a trailer. During a typical week the tractor can pull a variety of different trailers, each comprising a different arrangement and placement of remote mirrors. Hence in one aspect of several embodiments a method includes the steps of coupling two communication components (e.g., the two halves of an electrical connector) to form a communication link between a laser range finder in the tractor of a vehicle and a remote mirror in the trailer portion of an articulated vehicle. Upon establishing a communication link with a remote mirror, the laser range finder with remote mirror control capability can adjust the one or more remote mirrors. Electronic circuitry (e.g., a processing subassembly) can send position signals to the remote mirror to adjust the remote mirror based on a criterion (e.g., that some of the rear of the trailer must appear in reflections from the remote mirror) or based on stored preferences. In one aspect the mirror positioning signals can be based on processed aspects of laser reflections that have been deflected by the remote mirror, thereby providing range based feedback control of the remote mirror to address the challenges associated with the unknown remote mirror characteristics.

Consider that upon sensing a new remote mirror coupled to a laser range finder several key aspects may be unknown such as the location of the remote mirror in 3D space relative to the laser range finder, the portion of the FOV of the laser range finder occupied by the remote mirror, the orientation (e.g., direction) of the remote mirror or the actual locations of objects reflected in the remote mirror (e.g., the indirect FOV). While the initial orientation of the remote mirror can be reported to a processing subassembly in the laser range finder, properties such as the reflection locations provided by the remote mirror and the portion of the FOV in which laser reflections are deflected by the remote mirror can require feedback of reflection data and subsequent adjustment of the remote mirror.

In one exemplary embodiment, a method for provisioning a remote mirror by a laser range finder includes the steps of; generating a set of outgoing laser pulse, detecting a corresponding set of laser reflections including at least some reflections that have been deflected by the remote mirror. The exemplary method then generates reflection data from the set of laser reflections and processes at least some of the reflection data to generate one or more position signals operable to instruct a mirror positioner to change the position of the remote mirror. In some embodiments the method continues to adjust the remote mirror based on gathered laser reflections until a criterion is satisfied (e.g., a quality aspect of the remote FOV offered by the remote mirror, or a determination of the portion of the FOV in which reflections are deflected by the remote mirror). In one example, the processing subassembly can process the reflection data and adjust the remote mirror position until a criterion is satisfied such as seeing a portion of the trailer in the deflected subset of laser reflections. Embodiments of this disclosure enable the mirror to be provisioned by the laser range finder based on desired range or desired reflection location.

In one embodiment a system for adjusting a remote mirror can comprise a laser transceiver subassembly to gather laser ranging data, a processing subassembly, a remote mirror, a mirror positioner, a communication cable and a separable coupling (e.g., an electrical connector). The system for adjusting the remote mirror operates to position the remote mirror based on processing reflection data from a set of laser reflections, including some laser reflections that have undergone deflection in the remote mirror.

FIG. 36 illustrates several components of several embodiments of a system 31500 for adjusting a remote mirror based on feedback from a laser range finder. Laser transceiver subassembly 31520 functions to transmit laser light in an at least 2D range of directions in a field of view 3670 and gather a corresponding set of laser reflections. In the first embodiment laser transceiver subassembly 31520 can be part of a laser range finder 31510. Laser transceiver subassembly 31520 can be a steerable laser assembly (e.g., steerable laser assembly 3120 in FIG. 33B) and comprise a laser generator 3420 and a laser positioner to scan a laser beam from the laser generator in the at least 2D range of directions within the FOV. In an alternative embodiment laser transceiver subassembly 31520 can have a flash laser generator that generates laser light in the 2D range of directions from a single laser pulses. For example, a flash laser generator can comprise laser generator 3420 and a laser positioner 3430 designed to position the laser beam in a wide range of directions at once (e.g., a spreader or a diffuser). In this way a flash can illuminate many locations in the FOV 3670 at once.

Laser transceiver subassembly 31520 can further comprise a detector 3440. Laser detector 3440 can comprise a single photodiode, PIN diode or an array of photo diodes, PIN diode or charge coupled devices (CCDs) that functions to receive a set of laser reflections corresponding to a set of outgoing laser pulses from the laser generator and thereby generate reflection data. A remote mirror 3620 positioned in the FOV 3670 causes some of the set of laser reflections (e.g., 31525*a*) to undergo deflection by the remote mirror prior to reaching the detector. Other laser reflections (e.g., 31525*b*) reach the detector directly.

Detector 3440 can comprise circuitry to generate reflection data corresponding to the set of laser reflections indicative of the reflection location. Detector 3440 can transmit at least some of the reflection data to a processing subassembly 3520. Reflection data can include a corresponding range for each laser reflection in the set of laser reflections. The range can be calculated based on the time of flight of the corresponding laser reflection relative to the transmission time of a corresponding outgoing laser pulse. For example, if light travels at 300 meters per microsecond and the time of flight of a reflection is 1 microsecond then the range for the laser reflection can be estimated as 150 meters from the detector. Reflection data can include a corresponding direction for each laser reflection in the set of laser reflections. The direction can be at least a two-dimensional direction. The direction corresponding to each laser reflection can be a measure of the direction of a mechanically steerable laser assembly at the time of arrival of the laser reflection or can be a pixel (e.g., single element) of a detector array indicating the direction in which the laser reflection struck a detector comprising an array of elements (e.g., photodetectors). In FIG. 36 detector 3440 is operably coupled to transmit at least some of the reflection data to an electronic circuitry such as processing subassembly 31520.

Processing subassembly 31520 can be housed in laser range finder 31510 with laser transceiver subassembly 31520 or can be a separate processing subassembly coupled to laser transceiver subassembly 31520 by a communication link (e.g., an Ethernet cable). Processing subassembly 3520 can perform a variety of functions including processing at least some of the reflection data and thereby generating one or more position signals operable to cause a mirror positioner 3840 to change the position of remote mirror 3620. For example, processing subassembly 3520 can process at least some of the reflection data, to identify a subset of the laser reflections that has been deflected by remote mirror 3620 (or the corresponding subset of the reflection data) and thereby generate a position signal based on the identified subset. In another example, processing subassembly 3520 can identify a deflected subset of the reflection data and evaluate a test on the deflected subset of the reflection data and determine one or more position signals for the mirror positioner based on the test result.

Processing subassembly 3520 can further comprise a transmitter 31530. Mirror positioner 3840 can comprise a receiver 31535 that functions to communicatively couple the processing subassembly 3520 to the mirror positioner 3840. Transmitter 31530 can transmit position signals using a cable 31540 comprising at least one wire to carry position signals to the mirror positioner. The cable 31540 can be designed to carry a specific signal protocol such as an Ethernet cable, CANBUS cable, a serial communication cable, USB cable. Alternatively the communication cable can carry voltage pulses designed to actuate a mechanical motor or actuation component in the mirror positioner. Cable 31540 can include one or more signal wires to carry position signals and one or more power wires to carry power from electronic circuitry to the mirror positioner.

In one example, many tractor-trailer vehicles use coiled cables (e.g., SAE J2394 7-conductor cables) for coupling ABS brakes in the trailer to ABS controllers in the tractor portion. A tractor-trailer truck with a remote mirror 3620 and mirror positioner 3840 located on the trailer can transmit position signals from electronic circuitry (e.g., processing subassembly 3520) located in the tractor portion using one or more SAE J2394 standard coiled cables. Cable 31540 can have a separable coupling, such as connector 31545*a*, (e.g., a 7-way connector, common in commercial vehicles) operable to connect a corresponding connector 31545*b* connected to mirror positioner 31545*b*. Connectors 31545*a* and 31545*b* can provide a separable communication link for transmitting position signals from communication circuitry (e.g., processing subassembly 3520) to the mirror positioner 3840.

Transmitter 31530 can be a wired transceiver such as a CANBUS, SAE J1939 or Ethernet transceiver. Transmitter 31530 can receive position data from processing subassembly 3520 and subsequently generate corresponding position signals based on the position data. For example, transmitter 31530 can perform actions such as assigning a communication address to mirror positioner 3840 and then generating position signals using the assigned address and the position data.

Transmitter 31530 can also be a wireless transmitter that utilizes an antenna 31550*a* to transmit one or more position signals wirelessly to a corresponding receiver 31535 and antenna 31550*b* at the mirror positioner. Transmitter 31530 can use a variety of short range wireless protocols (e.g., Bluetooth, Zigbee, or Wi-Fi) to transmit position signals to the mirror positioner. For the purposes of this disclosure a short range wireless signal is a wireless signal with an effective operating range of less than 400m. Transmitter 31530 can use a variety of long range wireless protocols such as 3G, 4G or 5G protocols to transmit position signals. For the purposes of this disclosure, a long range wireless protocol has a range greater than 400 m. Transmitter 31530 can be responsible for forming a wired or wireless link between electronic circuitry (e.g., processing subassembly 3520) and the mirror positioner 3840, including receiver discovery, protocol arbitration, address assignment advertising and link maintenance. In one example, upon receiving power a remote mirror positioner 3840 can begin advertising its presence and capabilities. Transmitter 31530 can be part of a transceiver that receives the advertising signals from the remote mirror positioner and establishes a communication link operable to transfer position signals from the processing subassembly 3520 to the mirror positioner 3840.

The mirror positioner 3840 can be mechanically coupled to the remote mirror 3620 and communicatively coupled to processing subassembly 3520. Mirror positioner 3840 can function to position the remote mirror in response to receiving one or more position signals from the processing subassembly or other electronic circuitry attached to the laser transceiver subassembly 31520. Mechanical positioner 3840 can comprise a motor or actuator (e.g., a steeper motor, a linear actuator, or servo motor) to change the position of remote mirror 3620.

The mirror positioner 3840 can change the orientation of a remote mirror (e.g., cause the mirror to rotate by a specified amount or to a specified direction about an axis). For example, the mirror positioner can comprise an axle 31570 around which the remote mirror can rotate. In some instances, position signals cause a change in position by a specific amount (e.g., 1 degree per voltage pulse). A position signal can specify a change in position relative to a known or unknown starting position for the remote mirror. In some instances, position signals can specify a specific position (e.g., a position signal that specifies positioning a remote mirror at 12 o'clock relative to a trailer). The mirror positioner can change the location of the mirror, for example by extending axle 31570 to raise or lower the remote mirror by a specified amount or to a known height.

A position signal can cause the mirror positioner to perform a discrete position change on the remote mirror (e.g., a single position change from North to West facing). An example of a discrete position change in response to a position signals can be a one-time rotation of a stepper motor by 10 degrees, or raising a mechanical coupling by 1 cm. A position signals can be a discrete position signal if it causes the mirror positioner to perform a non-continuous change in the position of a remote mirror. The non-continuous position change can be a single position change or a non-continuous sequence (e.g., change the position of the remote mirror from North to West in 10 degree increments with a 1 second pause in between each increment). For the purpose of this disclosure a mirror positioner that causes a remote mirror to discretely change the position of a remote mirror is performing a non-continuous or discrete position change.

Alternatively, a position signal can cause the mirror positioner to continuously change the position of the mirror (e.g., a signal that causes the mirror positioner to spin the remote mirror). For example, one or more position signals from a processing subassembly 3520 can cause the mirror to rotate or scan from side to side at a new speed. For the purpose of this disclosure a position signal is a continuous position signal if it causes the remote mirror to continuously change position. A mirror positioner that causes a remote mirror to continuously change position is performing a continuous position change. For example, a continuous sequence of discrete position signals can cause a mirror positioner to perform a continuous position change on a remote mirror.

In a first simple embodiment, a remote mirror control system 31500 comprises a laser transceiver subassembly 31520, electronic circuitry (e.g., processing subassembly 3520) and a means to transmit position signals to a mirror positioner 3840, thereby controlling a remote mirror 3620 that appears in the FOV 3670 of the laser transceiver subassembly 31520. The means to transmit position signals to remote mirror position 3840 can include one or more of electrical cable 31540, connector 31545*a*, transmitter 31530 and antenna 31550*a*.

In a second embodiment a laser range finder 31510 comprises laser transceiver 31520, and processing subassembly 3520. Laser range finder 31510 can be operably coupled to mirror positioner 3840 and operable to generate one or more position signals based on processing reflection data and thereby cause mirror positioner 3840 to change the position of a remote mirror in the FOV of laser range finder 31510.

In a third embodiment a remote mirror control system 31500 can include a laser range finder 31510 and means to transmit position signals to a mirror positioner 3840, thereby controlling a remote mirror 3620 that appears in the FOV 3670 of the laser transceiver subassembly. In another related embodiment a remote mirror control system 31500 can include a laser range finder 31510, one or more mirror positioners (e.g., 3840) coupled to one or more remote mirrors (e.g., 3620) and means to transmit position signals to a mirror positioner 3840. In response to processing at least some of the reflection data from the detector 3440 processing subassembly 3520 can transmit control signals to the mirror positioner to change the position of the remote mirror. Processing subassembly 3520 can receive sensor data (e.g., from steering sensor 31531 indicating the steering angle of a vehicle or camera data indicating the orientation of the vehicle or surrounding scene). The processing subassembly can generate a criterion based on the sensor data. The criterion can be a measure of performance of the remote mirror or the laser range finder system 31510, such as the ability to see a particular blind spot around a vehicle when turning. The processing subassembly can perform feedback control of the remote mirror in order to satisfy the criterion. For example, the processing subassembly can repeatedly generate and transmit signals to the mirror positioner to reposition the mirror in a process to eventually satisfy the criterion based on the laser reflections in the deflected subset. In some embodiments one or more position signals can be selected based on a known lookup table or transfer function that uses the steering angle of the vehicle as an input. For example, a steering angle of 15 degrees can cause the processing subassembly to command the remote mirror to reorient to provide coverage of a blind spot.

FIG. 37 illustrates several components of a remote mirror control system 31605 located on a tractor-trailer truck. In several embodiments illustrated in FIG. 37 a tractor portion 31620 of a tractor-trailer truck can have a laser range finder 31610 that functions to process reflection data and thereby position one or more mirrors on the truck. A tractor portion 31620 such as a big-rig tractor can be attached to several different trailers during a typical week or over the lifetime of the tractor. In one aspect each time a trailer 31630 is connected to the tractor 31620 the best position of a set of wing-mirrors 31625*a* and 31625*b* can change (e.g., can be a function of the trailer geometry). Laser range finder 31610 or a computer system in the tractor can store data indicating one or more criteria or a figure of merit for the wing-mirrors or aspects of the reflected field of view. For example, a trailer could have a different width, length, height, payload or cargo hazard requirement relative to a previous trailer. Hence wing-mirrors 31625*a* and 31625*b* can require adjustment upon attachment of a new trailer. In one embodiment a laser transceiver subassembly generates a set of outgoing laser pulses, measures a set of laser reflections from the set of outgoing laser pulses and generates reflection data indicating a reflection direction and a reflection range for each laser reflection in the set. In the embodiments of FIG. 37 some of the laser reflections (e.g., 31645) have been deflected by the remote mirror. Laser range finder 31610 can have a processing subassembly (e.g., 3520 in FIG. 26A) that processes at least some of the reflection data and thereby generates position signals operable to change the position of the wing-mirrors 31625*a* and 31625*b*. The wing-mirrors can be exemplary remote mirrors. A transmitter in processing subassembly 3520 in FIG. 26A can transmit the position signals to one or more mirror positioners (e.g., mirror positioner 31635) attached to the wing-mirrors. In this embodiment the subset of the set of laser reflections that have been deflected by the remote mirror (e.g., laser reflections in angular range 31640) can initially be indistinguishable from direct laser reflections that have not undergone deflection. The processing subassembly can transmit position signals instructing the mirror positioner 31535 to change the position of the wing mirrors and then process new reflection data using differential analysis to identify the deflected subset 31645 of the laser reflections or the portion of the FOV of laser range finder 31610 occupied by wing-mirrors 31625*a* and 31625*b*. The processing subassembly can process at least some of the reflection data to identify if one or more criteria or figures of merit are met by the laser reflections. For example, a processing subassembly can determine whether the deflected subset of laser reflections is operably positioned to gather reflections from a region parallel to the trailer, or if reflections include a portion of the trailer or if a remote mirror (e.g., 31625*a*) is positioned to further reflect laser beams from a remote mirror 31650 positioned on the trailer. In one example, a feature on the trailer can be used as a fiduciary mark and the wing-mirror can be adjusted until processing of the laser reflections indicates that the fiduciary mark is appropriately positioned.

In another example, adjustment of the mirror can be guided by and continue until the processed reflection data indicates a sufficient maximum distance or quality aspect of the indirect field of view (i.e., the set of all directions or reflection locations provided by laser reflections that have undergone deflection in the remote mirror). Upon connecting a trailer 31630, processing subassembly (e.g., 3520 in FIG. 36) can iteratively process laser reflection data and thereby generate position signals operable to position the wing-mirrors (e.g., 31625*a* and 31625*b*). In this way the mirrors can be tailored to satisfy one or more criteria or optimize one or more figures of merit prior to or while the truck being driven. An exemplary criterion can be the ability to see a particular indirect field of view or blindspot behind the truck.

In a related embodiment, a remote mirror 31650 and a corresponding mirror positioner 3840 can be located on the trailer portion 31630. Upon connecting a new trailer to the tractor an operator or a robot can attach connectors 31545*a* and 31545*b*. Following attachment of the connectors, cable 31540 can supply power to mirror positioner 3840 and communicatively couple laser range finder 31610 to mirror positioner 3840. Remote mirror 31650 can be one of a plurality of remote mirrors on trailer 31630 that are communicatively coupled by cable 31530 and connector 31545*a*. Hence the remote mirror positioning system can be used to dynamically learn and adjust the position of remote mirrors in the FOV of laser range finder 31610. In some embodiments laser reflections can travel directly from the laser range finder 31610 to a remote mirror on the trailer. In other embodiment laser reflections (e.g., angular range 31640) are deflected by a plurality of mirrors in the path to and from a remote mirror. For example, laser reflections that undergo deflection by remote mirror 31650 also undergo deflection by wing-mirror 31625*a* in the process of reaching the detector in laser range finder 31610. For this and other reasons the transfer function between position signals and reflection data can be complex and be best learned by performing a sequence of initial adjustments on the remote mirrors. Several embodiments of this disclosure provide a system and method for learning the arrangement-specific transfer function between remote mirrors and their effect on the FOV of a laser range finder (e.g., laser range finder 31610 in a tractor of an articulated vehicle). For example, upon attaching a new trailer, laser range finder 31610 can perform a series of adjustments to remote mirror 31650 to ensure that the range of possible reflection locations includes the space behind the trailer where person 3160 can be standing. The series of adjustments can include first processing at least some of the reflection data from a detector in the laser range finder and thereby adjusting wing-mirror 31625*a* to position remote mirror 31650 in the FOV of wing-mirror 31625*a*. The series of adjustments can further include processing at least some of the reflection data thereby generating position signals to cause the mirror positioner 3840 to change the position of remote mirror 31650 until a criterion involving the reflection locations offered by remote mirror 31650 is satisfied.

FIG. 38 illustrates an exemplary method 31700 for adjusting a remote mirror based on processing laser reflections according to an embodiment of the present disclosure. At step 31710 a laser transceiver subassembly generates a set of outgoing laser pulses in a plurality of directions in a field of view. For example, the laser transceiver subassembly can comprise a steerable laser assembly that steers a laser beam in the field of view and thereby generates the outgoing set of laser pulses in an at least 2D range of directions.

At step 31720, one or more detectors in the laser transceiver subassembly detects a set of laser reflections corresponding to at least one of the set of outgoing laser pulses and thereby generating reflection data, wherein at least some of the laser reflections in the set of reflections have undergone deflection by a remote mirror. At step 31730 at least some of the reflection data is processed and one or more position signals are thereby generated. In one embodiment the at least some of the laser reflection data includes data from at least one laser reflection that has been deflected by the remote mirror. At step 31740 the one or more position signals are transmitted to a mirror positioner that changes the position of the remote mirror, based at least in part on the one or more position signals.

In a group of related embodiments one or more remote mirrors on an articulated vehicle can be used by a laser range finding system to provide laser ranging of indirect fields of view outside of the FOV of the laser range finder that can be accessed directly. When the articulated vehicle is travelling in a straight line these remote mirrors can occupy a first position that can be optimized for driving in a straight line. The laser range finder can process at least some of the reflection data and identify objects or aspects of the region shown in the remote mirrors (e.g., a range of remote reflection locations behind the articulated vehicle). The laser range finder can identify a portion of the FOV in which laser reflections are deflected by the remote mirror. At some later time the vehicle can execute a turn and sensor data from one or more sources can indicate the turn (e.g., an angle detector on the trailer kingpin or steering angle measured by the steering wheel). In response to receiving sensor data indicating the turn, the laser range finder can calculate an updated location or orientation for one or more remote mirrors in the FOV. In another aspect a processing subassembly associated with a laser range finder can signal a mirror positioner associated with the remote mirrors to change the position of the remote mirrors to compensate for the change in shape of the articulated vehicle. For example, when executing a sharp right turn the processing subassembly can sense the turn and instruct one or more mirror positioners to turn the mirrors to compensate for a laser ranging blind-spot that would otherwise occur if the remote mirrors were not repositioned during the turn. Therefore, in one aspect a processing subassembly can dynamically track the position of the remote mirrors as the vehicle turns and in another aspect the processing subassembly associated with the laser range finder can instruct the mirror positioner to compensate for the change in position of the remote mirror.

FIG. 39A and FIG. 39B illustrates two related embodiments of a laser range finder that can utilize a controllable remote mirror. In a first embodiment illustrated in FIG. 39A, a laser range finder 31810 can generate a set of outgoing laser pulses and detect a corresponding set of laser reflections with a subset of the laser reflections being deflected by remote mirrors (e.g., wing mirrors 31625*a*, 31625*b* or trailer mirror 31650). When the tractor trailer truck (e.g., tractor 31620 and trailer 31630) is driving in a straight line the tractor is approximately parallel to the trailer. For example, a line 31820*a* parallel to the tractor portion 31620 is parallel to a line 31820*b* parallel to the trailer portion 31630 when driving in a straight line. In one aspect reflection data from a detector in laser range finder 31810 can be processed to generate a position estimate for a remote mirror (e.g., 31650) on the trailer portion 31630 of the vehicle (either in 3D space or a 2D location within the FOV of the laser range finder). FIG. 39B illustrates another aspect that as the vehicle turns, data indicative of the steering angle 31830 can be used to estimate an updated location of the remote mirrors in the FOV or in 3D space and/or generate one or more position signals operable to compensate the remote mirror positions for the change in shape of the vehicle. For example, in FIG. 39A the positions of wing-mirror 31625*b* is well suited to seeing vehicle 3170 in the lane next to the trailer. However in FIG. 39B the same remote mirror orientation relative to the tractor would increasingly provide laser reflections from the trailer itself as the vehicle turns to the right. Hence vehicle 3170 may not be seen by laser range finder 31810 if wing-mirror 31625*b* remains in its original orientation as the tractor turns. A processing subassembly associated with the laser range finder 31810 can process reflection data to generate one or more position signals to compensate the orientation of wing-mirror 31625*b*. Alternatively processing subassembly (e.g., 3520 in FIG. 36) can receive sensor data indicating the steering angle 31830 between lines 31820*a* and 31820*b* and base the position signals at least in part on the sensor data indicating the steering angle.

FIG. 40-FIG. 47C describe embodiments of systems wherein a remote mirror and in some cases lenses are used to provide light reflections to a sensor (e.g. a LIDAR) on a vehicle and thereby extend the FOV of the sensor. FIG. 46A illustrated that remote mirrors attached to a vehicle can be adapted by a system when the vehicle is performing a particular task (e.g. parking, reversing, driving on a highway or making a turn) or adapted to a particular driving environment (e.g. travelling on a highway, driving in a location with pedestrians or objects are likely to approach the vehicle). Additional embodiments can be found in U.S. patent application Ser. No. 17/492,513, filed Oct. 1, 2021 which is hereby incorporated by reference in its entirety.

FIG. 40 is an exemplary diagram of a vehicle-integrated laser reflection acquisition system 32142, embedded in the roof portion 32135 of a vehicle 32110. Vehicle-integrated laser reflection acquisition system 32142 can function to acquire laser reflections (e.g. laser reflection 32146*a*) from objects around a vehicle. In one embodiment a vehicle-integrated laser reflection acquisition system 32142 comprises a LIDAR 32120*b* and a beam guide 32141*c*. LIDAR 32120*b* comprises a laser detector 32121 having a FOV 32137 comprising a set of directions in which the laser detector can detect laser reflections. LIDAR 32120*b* is positioned on vehicle 32110 such that FOV 32137 comprises a direct portion of the FOV 32138 and an indirect portion 32139 that is obstructed (e.g. by the roof panel) from directly receiving laser reflections from beyond the vehicle.

LIDAR 32120*b* is a bi-static LIDAR and further comprises one or more lasers 32143*a* and 32143*b*, located remotely from the detector 32121, to transmit laser pulses to a plurality of reflection locations beyond the vehicle. This bi-static arrangement enables one or more lasers to be mounted at a variety of points on the vehicle with different FOVs. The lasers can reach a variety of overlapping or mutually exclusive reflection locations around the vehicle, thereby providing coverage that can be adapted to various purposes (e.g. parking) or hazard locations (e.g. blindspots). In FIG. 40 beam guide 32141*c* is disposed on the vehicle, separate from the laser detector 32121, and configured (e.g. with reflectors 32150*a*-32150*d* and lenses 32160*a*-32160*b*) to receive laser reflections (e.g. reflection 32180*a*) corresponding to the laser pulses from reflection locations and to change, for each of the laser reflections, a corresponding input direction (e.g. input elevation angle) and to thereby guide the laser reflections to the laser detector 32121 with output directions at the laser detector in the indirect portion of the FOV.

It can be appreciated that the vehicle-integrated laser range finding system of FIG. 40 provides an indirect reflection path for laser reflections from reflection locations outside of the direct FOV 32138 of LIDAR 32120*b*. Hence, laser reflections received in the indirect portion (e.g. portion 32139) of FOV 32137 arrive at the laser detector 32121 in directions that are related to their reflection locations (e.g. location 32136) but have been changed by the beam guide. Circuitry such as 3-D location calculator 32191, including input/output angle converter 32192 can be used to calculate 3-dimensional coordinates of reflection locations corresponding to the laser reflections. This circuitry can include computer processors, microcontrollers, and analog circuits. The 3-D location calculator 32191 can be configured with a transfer function that relates the arrival direction or input angles of laser reflections at the beam guide (e.g. at lens 32160*a*) to the angle or direction in the indirect portion of the FOV of laser detector 32121. The 3-D location calculator can process reflection data from laser reflections, including the reflection direction at the detector, identify an indirect subset of laser reflections with directions in the indirect portion of the FOV (i.e. those reflections in need of angular conversion), process the indirect subset of laser reflections according to the transfer function and thereby generate 3-dimensional coordinates 32193 of the reflection locations. The 3-dimensional coordinates 32193 of the reflection locations can be displayed in a point cloud.

In several embodiments, optical elements in the beam guide can be reconfigured based on a variety of factors such as vehicle location (e.g. urban streets or parking). The beam guide can therefore be reconfigured to change the relationship between input angles of laser beams at a first end (e.g. at lens 32160*a*) and a second end (e.g. at detector 32121). In a vehicle-integrated laser distribution system the beam guide can be reconfigured to change the relationship between directions in a laser FOV of a transmitted laser beam into the beam guide and the output direction of that laser beam form a second end of the beam guide remote from the laser. The 3-D location calculator can reconfigure the transfer function in response to the reconfiguration of the beam guide and calculate 3-dimensional coordinates 32193 of the reflection locations accordingly. For example, a set of reflectors in a beam guide can be reconfigured to provide obstacle avoidance while an autonomous vehicle is parking in a garage. The 3-D location calculator can access a computer memory to retrieve data to reconfigure a transfer function used to relate laser reflections to 3-dimensional coordinates of reflection locations for the reconfigured beam guide. In another embodiment the transfer function in the 3-D location calculator can be replaced with a new transfer function obtained by calculation or from memory based on data indicating the new state of a reconfigured beam guide.

FIG. 41A illustrates a beam guide 32141*b* that functions to guide a laser beam in an incident direction (e.g. 32145*b*) to a lens 32160*a* and thereby transmit an output beam 32180*b* from the lens. Beam guide 32141*b* can further function to generate the output beam 32180*b* in a direction such that beam 32180*b* strikes an indirect reflection location that is outside the direct ranging region but inside the indirect ranging region (i.e. a point that cannot be reached by a laser from the LIDAR travelling in straight line direction in the set of directions forming the FOV). For the purpose of this disclosure the straight-line distance between where the laser beam (e.g. 32145*b*) exits the LIDAR (e.g. 32120*a*) to the point that the laser beam is transmitted from the lens is the defined as the guided distance (e.g. distance 32210). In some embodiments, the beam guide functions to provide an enclosed or semi-enclosed region to guide the laser beam along the guided distance 32210. Unlike sealed light assemblies (e.g. headlight or rear brake lights on passenger vehicles) the beam guide can function to guide the laser beam over large guided distance around a vehicle (e.g. 30 centimeters, 1 meter or from the front of a vehicle to the rear of a vehicle). Similarly, the beam guide can function to distribute the laser beam from a centralized source or gather laser beams from around large and diverse portions of the vehicle. In the embodiment of FIG. 41A beam guide 32141*b* with lens 32160*a* is attached to substrate 32220. Incident laser beam can travel close or parallel to the substrate. Substrate 32220 can be an exterior panel of the vehicle (e.g. roof panel 32155 in FIG. 40). In FIG. 41B beam guide 32141*c* comprises two vehicle panels (e.g. panel 32156 and roof panel 32155) a reflector 32150*a* and a lens 32160*a*. In the beam guide of FIG. 41B the incident laser beam 32145*b* from solid state LIDAR 32120*c*, travels behind the front surface 32227 of a body panel (e.g. 32155). The front surface of the body panel can be defined as the surface between the vehicle and the environment surrounding the vehicle. In another aspect at least one non-light transmitting interior surface (e.g. an opaque or reflective surface 32225) is located behind the front surface (e.g. 32227) of a body panel (e.g. 32155). In beam guide 32141*c* a reflector is attached to or embedded in interior surface 32225 behind the front surface 32227. Reflector 32150*a* serves to guide a range of input beams with a range of incident angles e.g. 32145*b* to form a corresponding range of output beam angles. Lens 32160*a* can refract or simply transmit laser beam 32180*b*. Lens 32160*a* can function to seal the gap between panels 32156 and 32155 at the end of the beam guide. Interior surface 32225 of panel 32155 and reflector 32150*a* can be formed by functionalizing panel 32155 with opaque or reflective coatings or tapes. Cavity 32152*a* can be defined as the space or the region between the interior surfaces 32255 and 32226 located behind the exterior surface 32227 of body panel 32155. In the embodiment of beam guide 32141*c* the cavity is elongated along the path of the laser beam (e.g. in the direction formed by a line between the laser input point at the LIDAR and the out point at the lens). The cavity can be thin (e.g. 1 mm to 10 centimeters) in the direction normal to the interior surface 32225 and can have substantially uniform thickness if surfaces 32225 and 32226 remain parallel along the direction of travel of the laser beam. Cavity 32152*a* can be at least partially enclosed by body panels 32155 and 32156, thereby keeping the cavity free from dirt, or obstacles that can obstruct laser distribution or gathering. For example, enclosing the LIDAR 32120*b* in cavity 32152*a* enables the laser distribution path (e.g. for beam 32145*c*) to be kept free of dust and foreign objects through the life of a vehicle. Lens 32160*a* can be an elongated strip at the edge of body panel 32155 with a larger surface area than the aperture of LIDAR 32120*b*, thereby providing increased immunity from dirt and debris building up on the lens exterior.

Turning to FIG. 41C automobile manufacturers have increasingly implemented sealed headlight units comprising reflectors, and lenses. Beam guide 32141*d* illustrates a sealed or semi-sealed beam guide comprising two or more non-transmitting surfaces 32225 and 32226, lens 32160*a* and one or more reflectors (e.g. 32150*a* and 32150*d*) located on the substrate 32230. Non-light transmitting surfaces 32225 and 32226 can be part of one or more substrates 32230 (e.g. molded polymer or formed metal). Substrate 32230 can be sealed to the lens similar to sealed headlights, thereby providing a watertight seal designed to keep dirt and moisture from entering into the sealed beam guide 32141*d*. At the entrance to the beam guide LIDAR 32120*a* can make close contact with the substrate 32230. Substrate 32230 can be attached to the vehicle frame (e.g. at 32240) using a variety of attachment technologies (e.g. rivets, screws, spacers). In one example sealed beam guide 32141*d* can be a single metalized polymer substrate similar to a headlight reflector, and designed to guide an incident laser beam to a lens.

In several embodiments a beam guide comprises a cavity in which light can travel, the cavity being located between two or more substantially opposing non-light transmitting surfaces located behind the front surface of a vehicle body panel. The beam guide further comprises an opening at a first end to accept a laser beam with an input angle and a lens at a second end to transmit the laser beam, wherein upon transmission of the laser beam from the lens the laser beam travels in an output direction (e.g. direction of beam 32180*b*) that is based on the input direction (e.g. the direction of beam 32145*c*) and strikes a point outside the set of direct ranging points. The laser beam can be guided along the cavity by one or more reflective portions of the two or more substantially opposing non-light transmitting surfaces.

FIG. 42 is an exploded view of a variety of components of a vehicle-integrated laser distribution system in accordance with an embodiment of the present disclosure. Four elongated lenses 32160*a*, 32160*b*, 32160*c* and 32160*d* are arranged at the edges of the vehicle roof. Lenses can be integrated behind the windows or windshields of the vehicle. For example, many vehicles integrate a lens for a third rear brake light inside the rear windshield, where it is protected by the windshield. Lens 32160*d* could be similarly placed behind the windshield. In one embodiment one or more lenses can be existing lenses for brake lights or headlights. A set of reflectors can be arranged in two substantially opposing subsets (e.g. 32150*f* and 32150*g*) arranged on opposing side of a narrow (e.g. 1 inch) cavity. Reflector subsets 32150*f* and 32150*g* can be metalized plastic similar to those used in headlight reflectors. In some embodiments reflector subset 32150*f* can be attached to roof panel 32155. For example, reflector subset 32150*f* can be reflective tape adhered to locations on roof panel 32155. Reflector subsets 32150*f* and 32150*g* can be polished metal portions of the vehicle body (e.g. panels) or frame (e.g. A pillar or B pillar). Cavity 32152*a* can contain a wide variety of traditional structural support elements such as metal roof support 32310. In one aspect holes or openings 32320 in the vehicle roof supports (e.g. 32310) can be strategically placed to permit laser beams to travel in the laser distribution system.

FIG. 43A illustrates a plurality of planes (e.g. 32410*a*, 32410*b*, 32410*c*, 32410*d*, 32410*e* and 32410*f*), each representing a plurality of directions along which the indirect reflections from objects that are outside the direct FOV of a laser LIDAR 32120*a* can be provided to the LIDAR using various components of a vehicle-integrated laser distribution system, in accordance with an embodiment of the present disclosure. Each plane (e.g. 32410*a*) comprises a plurality of output directions at a variety of angles in the azimuthal plane and a constant angle in the elevation plane. Planes 32410*a*-32410*f* also illustrate portions of the ranging region (i.e. the 3-dimensional space) through which laser pulses and reflections can travel beyond the vehicle to and from ranging locations). FIG. 43B illustrates additional plane 32410*h* operable to provide laser reflections at low elevation angles in front of the vehicle and plane 32410*g* operable to provide reflections from low elevation angles behind the vehicle. These low elevation planes (e.g. 32410*a*) can be particularly beneficial for parking (e.g. in garages and compact parking spots). Low elevation angle planes (e.g. 32410*a*) also have the advantage that they emanate from a high point and can therefore image the entire way to the ground without the need to subtend a wide arc in the manner that a side mounted LIDAR would.

FIG. 44 illustrates several components of a vehicle-integrated laser distribution system, including a LIDAR and an elongated lens. Elongated lens 32160*a* can be placed at the edge of a vehicle body panel (e.g. 32155). It is common in passenger cars to have molding strips at the junction between a roof panel 32155 and a side panel 32510 and to cover the joint between the panels. Elongated lens 32160*a* can be located in the junction region 32520 between roof panel 32155 and side panel 32510. This choice of placement enables a laser beams to be guided above the roof panel as illustrated in FIG. 44 or beneath the roof panel (e.g. 32145*a* in FIG. 40). With reference to FIG. 44 and FIG. 45 lens 32160*a* can have a variety of features operable to transmit laser beams in a variety of ways. For example, flat section 32510 can transmit an input laser beam 32145*b* as an output beam 32180*e* with the same direction and thereby contribute to the direct FOV. Input laser beam 32145*d* can be magnified by section 32520 of lens 32160*a* and thereby create a larger laser spot size 32180*d*. The larger spot size 32180*d* can be useful for object detection by providing reflections from more of an object than a small spot size. Input laser beam 32145*c* can be reflected by reflector 32150*b* and can be refracted by section 32530 of lens 32160*a* and create output beam 32180*c*. FIG. 45 illustrates a vehicle-integrated laser distribution system comprising a lens, a LIDAR and a reflector 32150*b* integrated into the roof panel 32155. In FIG. 45 output beam 32180*c* can travel through indirect laser measurement region 32610 outside of the direct FOV and can reflect from an indirect reflection location (e.g. 32620). In this way lens 32160*a* integrated into vehicle 32160*a* can extend the range of reflection locations to locations outside the FOV of LIDAR 32120*a*, or compensate for a portion of the FOV that has been obscured by the vehicle. In this way lens 32160*a* can turn an otherwise obstructed portion of a FOV into an unobstructed portion by providing an indirect path for laser reflections. Input beam 32145*e* can travel in the direct FOV beyond the vehicle. In one embodiment of the laser distribution system of FIG. 45 a majority of the FOV can be comprised of a direct FOV similar to traditional rotating LIDAR. At one or more angles of elevation a range of azimuthal angles (e.g. 32190 in FIG. 44) can interact with the vehicle integrated laser distribution system and thereby be distributed in a complex manner to adapted to the vehicle shape (e.g. diverting the beam around parts of the vehicle, concentrating or expanding the angular resolution to provide enhances resolution in certain areas such as blindspots).

FIG. 46A is an exemplary diagram of an vehicle-integrated laser distribution system, embedded in the roof of a vehicle, including a laser range finder and a beam guide, according to an embodiment of the present disclosure. LIDAR 32120*b* can be a solid state LIDAR with no moving parts such as the model S3 from Quanergy Inc. of Sunnyvale CA. Solid state LIDARs often have a restricted azimuthal angular range in the FOV (e.g. +25 degrees and −25 degrees from the forward facing direction). As a result LIDAR 32120*b* may not be able to provide coverage behind towards the rear of vehicle 32110 within the direct FOV. LIDAR 32120*b* can function to provide ranging in a direct FOV 32125*c* and provide indirect ranging for objects in planes 32410*g* and 32410*h* that are beyond the direct FOV but capture important blind spots (e.g. for vehicle lane changes). A laser distribution system can comprise LIDAR 32120*b*, a set of reflectors 32150*g* and 32150*f* and curves lens 32160*e*. Reflector 32150*g* can function to reflect some of the FOV of LIDAR 32120*b*, thereby guiding laser beams substantially parallel and in close proximity to vehicle panel 32156, towards lens 32160*e*, where they can be transmitted into plane 32410*g*. For example, a particular azimuthal range (e.g. 20-25 degrees relative to the forward facing direction of LIDAR 32120*b*) and one or more elevation angles (e.g. +20 degrees relative to the horizon) can be reflected by reflector 32150*g*, refracted by lens 32160*e* and used to create indirect laser ranging plane 32410*g*. In this way a beam guide can provide a narrow (e.g. enclosed 1 inch) region to guide laser pulses with a narrow angular range (e.g. 5-10 degrees) within a vehicle that can be expanded to a much larger angular range (e.g. 30-60 degrees) in an indirect laser measurement region surrounding the vehicle.

In several embodiments one or more reflectors in the set of reflectors can be repositionable (e.g. motorized). While many LIDAR have a fast spinning mirror to create the azimuthal angular range, mirrors in the laser distribution system can be repositioned for the purpose of changing the laser measurement regions or planes (e.g. 32410*g*) provided in the indirect FOV. The reflectors can be repositioned in response to changes in the state of the vehicle (e.g. shifting into reverse, traveling above a speed threshold). Reflectors can also be repositioned in response to location data or sensor data (e.g. camera images or radar data), corresponding to particular tasks (e.g. parking) or hazards (e.g. curbs or vehicle wing mirrors). For example, in response to data indicating that vehicle 32110 is parking the laser distribution system can reposition reflectors 32150*g* for the task of parking. Reflector 32150*g* can be repositioned such that input laser beams are directed at a section (e.g. 32530) of lens 32160*e* operable to refract the laser beam at a low elevation angle (e.g. towards the ground). In this way a laser distribution system can be dynamically adapted to watch for situation specific hazards (e.g. objects in a garage while parking). The same laser distribution system can adapt reflectors (e.g. 32150*g* and 32150*h*) for driving on the highway by raising the elevation of planes 32410*g* and 32410*h* to provide blind spot coverage extending a longer distance from vehicle 32110. Planes 32410*g* and 32410*h* can also be extended to provide rear-view coverage.

FIG. 46B is a diagram of an integrated laser distribution system comprising LIDAR 32120*a* and lens 32160*e*. Lens 32160*e* refracts light in a narrow range of elevation angles in the FOV of LIDAR 32198*a* into a curtain shape plane 32410*i*. Curtain shaped plane 32410*i* can have a small output angular range (e.g. 32195) corresponding to the input angular range (e.g. 32190) operable to strike the lens 32160*e*. However Lens 32160*e* can provide a wide azimuthal range (e.g. 32180 degrees as illustrated in FIG. 46B). In this way plan 32410*i* can be very efficient at detecting the range of objects close to vehicle 32110, requiring only a small elevation range. The elevation range can be selected from the obstructed portion of the FOV. Hence the design of FIG. 46B provides efficient repurposing of a portion of the obstructed FOV to image objects (e.g. people, curbs or objects in a cluttered home garage) close to the sides of the vehicle 32110. In comparison, a side-mounted LIDAR (e.g. 32120*d*) requires a large elevation angular range (e.g. 32116) and a large azimuthal range (not illustrated) to provide ranging in the same region (e.g. 32125*d*) of the vehicle 32110.

FIG. 46C illustrates another embodiment of a laser distribution system comprising a LIDAR 32120*a* embedded partially beneath the roof of vehicle 32110 and a lens 32160*f* to provide laser ranging in a plane 32410*i* beyond the direct FOV of the LIDAR. In the embodiment of FIG. 46C lens 32160*f* and a portion of the LIDAR FOV are embedded beneath the roof of vehicle 32110. This design enables lens 32160*f* to be integrated below the roofline (e.g. behind a rear windshield). This design also enables the laser distribution system to use the lens associated with a brake light as some or all of lens 32160*i*. A portion of the FOV of LIDAR 32120*a* can be distributed below the roof panel of vehicle 32110 to lens 32160*f*. Another portion of the LIDAR FOV can be above the roof panel and provide a direct FOV.

FIG. 47 illustrates a functional diagram wherein sensor data from a one or more of a variety of sources can be used to steer a remote mirror. In one embodiment a method comprising generating sensor data by sensing with plurality of sensors attached to a vehicle an environment around the vehicle, determining a position of a mirror by processing with a processing subassembly or sensor data processor on the vehicle at least some of the sensor data and, deflecting light from the mirror into the at least one of the plurality of sensors to thereby provide a portion of the sensor data. In another embodiment the sensor data can be processed to classify one or more aspects of the environment and the remote mirror can be repositioned in response to the classification of the aspect of the environment. For example a self-driving truck may processing sensor data from a camera, classify an object in the local environment as a car (e.g. the object classification is "a car") and adapt a remote mirror based on the classified object (i.e. car) to thereby position the mirror to provide deflected light from the car to the camera as the self-driving truck moves.

In general, a wide variety of sensor data can be gathered from a variety of sources such as camera 910*a*, inter-vehicle transceiver 910*b*, GPS receiver 910*c*, RADARs 910*d*, LIDAR 910*e*, passive infrared sensor (PIR) 910*f*, sound sensor 910*g* and weather/environmental sensor 910*h*. This sensor data can be processed by a data processor 475, classified by a classifier 490. A remote mirror can be configured by a mirror positioner in response to or based on the classification from classifier 490.

In one example a classifier 490 in a processing subassembly (e.g. sensor data processor) may identify a classification of an environment in which a vehicle is driving. Exemplary object classifications include a passenger car 32601*a*, a portion of a vehicle (e.g. vehicle rear 32601*b*), a person 32601*c*. The process subassembly 475 may configure a remote mirror on a vehicle according to an object classification, in order to track the object or deflect light from a portion of an object (e.g. image the wheels of a vehicle in the local environment). The processing subassembly may configure the remote mirror using remote mirror positioning signals 32650 and a mirror positioner 3840 as illustrated in FIG. 36 and described in FIG. 38. In another embodiment the mirror can be configured both in response to an object (e.g. a car behind the trailer of a truck) and a movement of some or all of the vehicle (e.g. as the truck turns and the tractor moves relative to the trailer).

In another embodiment a processing subassembly (e.g. 3520 in FIG. 36) or a sensor data processor 475 in FIG. 47 can process sensor data to determine a classification of task to be performed by the vehicle. Exemplary task classifications 32601*d* include parking, reversing, turning or merging. In other embodiments the processing assembly may simply receive a signal identifying a task to be performed. The processing subassembly can configure a remote mirror based on a task or category of task to be performed by the vehicle. This reconfiguration of a remote mirror can happen as the vehicle is moving (e.g. on-the-fly). The process of reconfiguring the mirror can be automatic when the vehicle identified a task to be performed (e.g. the task of parking or reversing).

In another embodiment a processing subassembly or sensor data processor can process some of the sensor data to determine a classification for the local environment of the vehicle and configure a remote mirror based on the environmental classification. Exemplary environment classifications 32601*e* include an urban environment (e.g. driving in a city with narrow streets), a highway environment, the presence of rain (e.g. a rainy environment) or the presence of a low sun-angle that might cause glare in a camera. Exemplary mirror configurations can include configurations to deflect light from around the perimeter of a vehicle to a sensor during parking as well as configurations to deflect images from surrounding cars on the highway to a camera or LIDAR on the vehicle to aid with lane changes or lane keeping.

While the above description contains many specificities, these should not be construed as limitations on the scope of any embodiment, but as exemplifications of various embodiments thereof. Many other ramifications and variations are possible within the teachings of the various embodiments. Thus the scope should be determined by the appended claims and their legal equivalents, and not by the examples given.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control performance any of the steps, including but not limited to: displaying, communicating with the user, analyzing, modifying parameters (including timing, frequency, intensity, etc.), determining, alerting, or the like.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system on a vehicle comprising:

sensors to gather sensor data from an environment around the vehicle;

a remote mirror, located separate from the sensors, the remote mirror being configured to provide light reflections to at least one of the sensors, and thereby provide a portion of the sensor data; and a processing subassembly configured to determine a position of the remote mirror by processing at least some of the sensor data.

2. The method of claim 1, wherein the remote mirror is disposed on a trailer of the vehicle and wherein the at least one of the sensors is located on a portion of the vehicle other than the trailer.

3. The system of claim 1, wherein the remote mirror is located on a trailer of the vehicle such that the trailer changes the position of the remote mirror relative to the sensors when the trailer moves relative to the sensors; and wherein the processing subassembly functions at least in part to track the position of the remote mirror when the trailer moves relative to the sensors.

4. The system of claim 1, wherein the processing subassembly is further configured to identify a portion of a field of view of the at least one of the sensors, wherein light from the portion of the field of view has been deflected by the remote mirror.

5. The system of claim 1, wherein the processing subassembly is further configured to determine a location of an object, using the position of the remote mirror and the portion of the sensor data.

6. The system of claim 1, wherein the at least one of the sensors is a camera, wherein the sensors comprise a LIDAR and wherein the processing subassembly functions to determine the position of the remote mirror based at least in part on processing some of the sensor data from the LIDAR.

7. The system of claim 1, wherein the at least one of the sensors comprises a first camera, wherein the sensors comprise a second camera and wherein the processing subassembly is configured to determine the position of the remote mirror based at least in part on processing the at least some of the sensor data from the second camera.

8. The system of claim 1, wherein the processing subassembly functions in part to configure the position of the remote mirror in response to a task to be performed by the vehicle.

9. The system of claim 1, wherein the processing subassembly is configured to determine a blind spot of the vehicle by processing the at least some of the sensor data and further configured to position the remote mirror to provide at least some of the light reflections from the blind spot.

10. A system on a vehicle comprising:

sensors positioned on the vehicle to receive light from an environment around the vehicle and thereby generate sensor data;

a remote mirror attached to the vehicle that functions to reflect light from the environment around the vehicle towards at least one of the sensors, and thereby provide a portion of the sensor data;

wherein at least some of the sensor data indicates a location of the remote mirror; and, a processing subassembly that functions at least in part to calculate a location of the remote mirror relative to the at least one of the sensors by processing the at least some of the sensor data.

11. The system of claim 10, wherein the processing subassembly functions at least in part to configure the remote mirror according to a task in advance of the vehicle performing the task.

12. The system of claim 10, wherein the at least some of the sensor data includes the portion of the sensor data.

13. The system of claim 10, wherein the processing subassembly is further configured to position the remote mirror in response to computing a position of a trailer.

14. The system of claim 10, wherein the remote mirror is attached to a trailer of the vehicle and wherein the processing subassembly is configured to track the location of the remote mirror relative to the at least one of the sensors.

15. A method comprising:

generating sensor data by sensing with a plurality of sensors attached to a vehicle an environment around the vehicle;

determining a position of a mirror by processing with a processing subassembly on the vehicle at least some of the sensor data, wherein the mirror is located remotely from at least one of the plurality of sensors; and, deflecting light from the mirror into the at least one of the plurality of sensors to thereby provide a portion of the sensor data.

16. The method of claim 15, further comprising the step of configuring the mirror to track an object, wherein the step of configuring the mirror to track the object comprising moving the mirror to deflect light from the object into the at least one of the plurality of sensors.

17. The method of claim 15, further comprising the step of tracking a location of the mirror by repeatedly processing the at least some sensor data.

18. The method of claim 15 further comprising the steps of:

while the vehicle is being driven determining a classification of the environment around the vehicle; and, positioning the mirror based on the classification of the environment around the vehicle.

19. The method of claim 15 further comprising the steps of:

classifying an object in the environment around the vehicle to determine an object classification; and, configuring the mirror based on the object classification.

20. The method of claim 15 further comprising the steps of:

receiving at the processing subassembly data indicating a task operable to be performed by the vehicle; and repositioning the mirror based on the task to deflect light from a blind spot in the environment around the vehicle to the at least one of the plurality of sensors.

* * * * *